United States Patent
Kent et al.

(10) Patent No.: US 12,465,631 B2
(45) Date of Patent: Nov. 11, 2025

(54) REDUCING IMMUNOGENICITY TO PEGLOTICASE

(71) Applicant: Horizon Therapeutics USA, Inc., Deerfield, IL (US)

(72) Inventors: Jeffrey D. Kent, Deerfield, IL (US); Brian Lamoreaux, Deerfield, IL (US); John Botson, Anchorage, AK (US); Jeff Peterson, Kirkland, WA (US)

(73) Assignee: Horizon Therapeutics USA, Inc., Deerfield, IL (US)

( * ) Notice: Subject to any disclaimer, the term of this patent is extended or adjusted under 35 U.S.C. 154(b) by 249 days.

(21) Appl. No.: 17/955,437

(22) Filed: Sep. 28, 2022

(65) Prior Publication Data

US 2023/0173035 A1    Jun. 8, 2023

Related U.S. Application Data

(63) Continuation of application No. 16/777,646, filed on Jan. 30, 2020, now abandoned.

(60) Provisional application No. 62/903,570, filed on Sep. 20, 2019, provisional application No. 62/855,519, filed on May 31, 2019, provisional application No. 62/798,786, filed on Jan. 30, 2019.

(51) Int. Cl.
| | | |
|---|---|---|
| *A61K 38/44* | (2006.01) | |
| *A61K 31/519* | (2006.01) | |
| *A61K 47/34* | (2017.01) | |
| *A61P 19/06* | (2006.01) | |

(52) U.S. Cl.
CPC ............ *A61K 38/44* (2013.01); *A61K 31/519* (2013.01); *A61K 47/34* (2013.01); *A61P 19/06* (2018.01)

(58) Field of Classification Search
CPC ...... A61K 38/44; A61K 47/34; A61K 31/519; A61P 19/06
See application file for complete search history.

(56) References Cited

U.S. PATENT DOCUMENTS

| | | | |
|---|---|---|---|
| 1,141,973 A | 6/1915 | Nichols | |
| 3,451,996 A | 6/1969 | Sumyk et al. | |
| 3,613,231 A | 10/1971 | Pugh et al. | |
| 3,616,231 A | 10/1971 | Bergmeyer et al. | |
| 3,931,399 A | 1/1976 | Bohn et al. | |
| 4,027,676 A | 6/1977 | Mattei | |
| 4,064,010 A | 12/1977 | Harris et al. | |
| 4,141,973 A | 2/1979 | Balazs | |
| 4,169,764 A | 10/1979 | Takezawa et al. | |
| 4,179,337 A | 12/1979 | Davis et al. | |
| 4,251,431 A | 2/1981 | Carswell et al. | |
| 4,297,344 A | 10/1981 | Schwinn et al. | |
| 4,301,153 A | 11/1981 | Rosenberg | |
| 4,312,979 A | 1/1982 | Takemoto et al. | |
| 4,315,852 A | 2/1982 | Leibowitz et al. | |
| 4,317,878 A | 3/1982 | Nakanishi et al. | |
| 4,343,735 A | 8/1982 | Menge et al. | |
| 4,343,736 A | 8/1982 | Uemura et al. | |
| 4,376,110 A | 3/1983 | David et al. | |
| 4,421,650 A | 12/1983 | Nagasawa et al. | |
| 4,425,431 A | 1/1984 | Takemoto et al. | |
| 4,445,745 A | 5/1984 | Cartesse | |
| 4,450,103 A | 5/1984 | Konrad et al. | |
| 4,460,575 A | 7/1984 | D'Hinterland et al. | |
| 4,460,683 A | 7/1984 | Gloger et al. | |
| 4,485,176 A | 11/1984 | Bollin, Jr. et al. | |
| 4,753,796 A | 6/1988 | Moreno et al. | |
| 4,766,106 A | 8/1988 | Katre et al. | |
| 4,797,474 A | 1/1989 | Patroni et al. | |
| 4,816,567 A | 3/1989 | Cabilly et al. | |
| 4,847,079 A | 7/1989 | Kwan | |
| 4,847,325 A | 7/1989 | Shadle et al. | |
| 4,917,888 A | 4/1990 | Katre et al. | |
| 4,945,086 A | 7/1990 | Benitz et al. | |
| 4,946,778 A | 8/1990 | Ladner et al. | |
| 4,966,963 A | 10/1990 | Patroni | |
| 4,987,076 A | 1/1991 | Takashio et al. | |
| 4,992,531 A | 2/1991 | Patroni et al. | |
| 5,008,377 A | 4/1991 | Patroni et al. | |
| 5,010,183 A | 4/1991 | Macfarlane | |
| 5,114,916 A | 5/1992 | Shirahata et al. | |
| 5,122,614 A | 6/1992 | Zalipsky | |
| 5,225,539 A | 7/1993 | Winter | |
| 5,283,317 A | 2/1994 | Saifer et al. | |
| 5,286,637 A | 2/1994 | Veronese et al. | |

(Continued)

FOREIGN PATENT DOCUMENTS

| | | |
|---|---|---|
| AU | 5251599 A | 2/2000 |
| CA | 2193993 A1 | 1/1996 |

(Continued)

OTHER PUBLICATIONS https://www.accessdata.fda.gov/drugsatfda_docs/label/2018/125293s092lbl.pdf (Year: 2018).*

Chhana et al., "Advanced imaging assessment of gout: comparison of dual-energy CT and MRI with anatomical pathology", Annals of the Rheumatic Diseases Published Online First: Mar. 10, 2017. doi: 10.1136/annrheumdis-2017-211343 (Year: 2017).

Pascart et al., "Ultrasonography and dual-energy computed tomography provide different quantification of urate burden in gout: results from a cross-sectional study", Arthritis Res Ther 19, 171 (2017). https://doi.org/10.1186/s13075-017-1381-2 (Year: 2017).

Van Ede et al., "Effect of folic or folinic acid supplementation on the toxicity and efficacy of methotrexate in rheumatoid arthritis: a forty-eight week, multicenter, randomized, double-blind, placebo-controlled study", Arthritis Rheum. Jul. 2001;44(7): 1515-24. doi: 10.1002/1529-0131(200107)44:7<1515: (Year: 2001).

(Continued)

*Primary Examiner* — Ruth A Davis
(74) *Attorney, Agent, or Firm* — David Roadcap

(57) ABSTRACT

The disclosure provides methods of treating gout in patients comprising administering a PEGylated uricase. Also provided are methods of treating gout in patients comprising co-administering a PEGylated uricase and methotrexate (MTX). Also provided are methods of reducing immunogenicity of a PEGylated uricase and prolonging the urate lowering effect comprising co-administration of the PEGylated uricase and MTX.

18 Claims, 1 Drawing Sheet

(56) References Cited

U.S. PATENT DOCUMENTS

| | | |
|---|---|---|
| 5,362,641 A | 11/1994 | Fuks et al. |
| 5,382,518 A | 1/1995 | Caput et al. |
| 5,428,128 A | 6/1995 | Mensi-Fattohi et al. |
| 5,458,135 A | 10/1995 | Patton et al. |
| 5,468,478 A | 11/1995 | Saifer et al. |
| 5,529,915 A | 6/1996 | Phillips et al. |
| 5,541,098 A | 7/1996 | Caput et al. |
| 5,567,422 A | 10/1996 | Greenwald |
| 5,585,089 A | 12/1996 | Queen et al. |
| 5,612,460 A | 3/1997 | Zalipsky |
| 5,624,903 A | 4/1997 | Muller et al. |
| 5,633,227 A | 5/1997 | Muller et al. |
| 5,637,749 A | 6/1997 | Greenwald |
| 5,643,575 A | 7/1997 | Martinez et al. |
| 5,653,974 A | 8/1997 | Hung et al. |
| 5,711,944 A | 1/1998 | Gilbert et al. |
| 5,762,923 A | 6/1998 | Gross et al. |
| 5,766,897 A | 6/1998 | Braxton |
| 5,811,096 A | 9/1998 | Aleman et al. |
| 5,816,397 A | 10/1998 | Pratt |
| 5,824,784 A | 10/1998 | Kinstler et al. |
| 5,880,255 A | 3/1999 | Delgado et al. |
| 5,919,455 A | 7/1999 | Greenwald et al. |
| 5,929,231 A | 7/1999 | Malkki et al. |
| 5,932,462 A | 8/1999 | Harris et al. |
| 5,948,668 A | 9/1999 | Hartman et al. |
| 5,955,336 A | 9/1999 | Shigyo et al. |
| 6,006,753 A | 12/1999 | Efendic |
| 6,130,318 A | 10/2000 | Wild et al. |
| 6,201,110 B1 | 3/2001 | Olsen et al. |
| 6,211,341 B1 | 4/2001 | Zeelon et al. |
| 6,245,901 B1 | 6/2001 | Von et al. |
| 6,468,210 B2 | 10/2002 | Iliff |
| 6,475,143 B2 | 11/2002 | Iliff |
| 6,524,241 B2 | 2/2003 | Iliff |
| 6,527,713 B2 | 3/2003 | Iliff |
| 6,569,093 B2 | 5/2003 | Iliff |
| 6,575,235 B2 | 6/2003 | Zupanick et al. |
| 6,576,235 B1 | 6/2003 | Williams et al. |
| 6,608,892 B2 | 8/2003 | Shaffer et al. |
| 6,783,965 B1 | 8/2004 | Sherman et al. |
| 6,913,915 B2 | 7/2005 | Ensor et al. |
| 7,056,713 B1 | 6/2006 | Hershfield et al. |
| 7,723,089 B2 | 5/2010 | Williams et al. |
| 7,811,800 B2 | 10/2010 | Hartman et al. |
| 7,927,589 B2 | 4/2011 | Williams et al. |
| 7,927,852 B2 | 4/2011 | Sherman et al. |
| 7,964,381 B2 | 6/2011 | Hartman et al. |
| 8,034,594 B2 | 10/2011 | Hartman et al. |
| 8,067,553 B2 | 11/2011 | Williams et al. |
| 8,148,123 B2 | 4/2012 | Hartman et al. |
| 8,178,334 B2 | 5/2012 | Hartman et al. |
| 8,188,224 B2 | 5/2012 | Hartman et al. |
| 8,293,228 B2 | 10/2012 | Hartman et al. |
| 8,465,735 B2 | 6/2013 | Hartman et al. |
| 8,541,205 B2 | 9/2013 | Hartman et al. |
| 8,618,267 B2 | 12/2013 | Williams et al. |
| 8,913,915 B2 | 12/2014 | Makino |
| 8,921,064 B2 | 12/2014 | Sherman et al. |
| 9,017,980 B2 | 4/2015 | Hartman et al. |
| 9,377,454 B2 | 6/2016 | Rosario-Jansen et al. |
| 9,402,827 B2 | 8/2016 | Miner et al. |
| 9,534,013 B2 | 1/2017 | Fischer et al. |
| 9,670,467 B2 | 6/2017 | Hartman et al. |
| 9,885,024 B2 | 2/2018 | Williams et al. |
| 9,926,537 B2 | 3/2018 | Hartman et al. |
| 9,926,538 B2 | 3/2018 | Hartman et al. |
| 10,139,399 B2 | 11/2018 | Rosario-Jansen et al. |
| 10,160,958 B2 | 12/2018 | Hartman et al. |
| 10,731,139 B2 | 8/2020 | Hartman et al. |
| 10,823,727 B2 | 11/2020 | Rosario-Jansen et al. |
| 11,345,899 B2 | 5/2022 | Hartman et al. |
| 11,598,767 B2 | 3/2023 | Rosario-Jansen et al. |
| 11,639,927 B2 | 5/2023 | Rosario-Jansen et al. |
| 2002/0010319 A1 | 1/2002 | Ansaldi et al. |
| 2002/0151703 A1 | 10/2002 | Yokoyama et al. |
| 2003/0082786 A1 | 5/2003 | Ensor et al. |
| 2003/0166249 A1 | 9/2003 | Williams et al. |
| 2005/0014240 A1 | 1/2005 | Sherman et al. |
| 2005/0084478 A1 | 4/2005 | Liu et al. |
| 2006/0188971 A1 | 8/2006 | Hershfield et al. |
| 2007/0274977 A1 | 11/2007 | Hartman et al. |
| 2008/0031864 A1 | 2/2008 | Williams et al. |
| 2008/0057048 A1 | 3/2008 | Sherman et al. |
| 2008/0145876 A1 | 6/2008 | Armstrong et al. |
| 2008/0159976 A1 | 7/2008 | Hartman et al. |
| 2009/0023715 A1 | 1/2009 | Brown et al. |
| 2009/0169534 A1 | 7/2009 | Hartman et al. |
| 2009/0209021 A1 | 8/2009 | Hartman et al. |
| 2009/0317889 A1 | 12/2009 | Fischer et al. |
| 2010/0152305 A1 | 6/2010 | Cedarbaum |
| 2010/0160351 A1 | 6/2010 | Jenkins et al. |
| 2010/0323422 A1 | 12/2010 | Williams et al. |
| 2010/0323423 A1 | 12/2010 | Williams et al. |
| 2011/0104751 A1 | 5/2011 | Hartman et al. |
| 2011/0217755 A1 | 9/2011 | Hartman et al. |
| 2011/0287466 A1 | 11/2011 | Sherman et al. |
| 2012/0070876 A1 | 3/2012 | Hartman et al. |
| 2012/0149083 A1 | 6/2012 | Williams et al. |
| 2012/0225046 A1 | 9/2012 | Hartman et al. |
| 2012/0301454 A1 | 11/2012 | Rosario-Jansen et al. |
| 2012/0309085 A1 | 12/2012 | Hartman et al. |
| 2013/0052677 A1 | 2/2013 | Williams et al. |
| 2013/0084273 A1 | 4/2013 | Hartman et al. |
| 2013/0330803 A1 | 12/2013 | Hartman et al. |
| 2014/0363414 A1 | 12/2014 | Sherman et al. |
| 2015/0197732 A1 | 7/2015 | Hartman et al. |
| 2016/0035091 A1 | 2/2016 | Kubassova |
| 2016/0158318 A1 | 6/2016 | Cohen et al. |
| 2016/0160188 A1 | 6/2016 | Williams et al. |
| 2016/0377604 A1 | 12/2016 | Rosario-Jansen et al. |
| 2017/0166873 A1 | 6/2017 | Fischer et al. |
| 2017/0258927 A1 | 9/2017 | Johnston |
| 2017/0298326 A1 | 10/2017 | Hartman et al. |
| 2017/0313993 A1 | 11/2017 | Hartman et al. |
| 2017/0313994 A1 | 11/2017 | Hartman et al. |
| 2017/0313995 A1 | 11/2017 | Hartman et al. |
| 2017/0321193 A1 | 11/2017 | Hartman et al. |
| 2018/0008665 A1 | 1/2018 | Qiao et al. |
| 2018/0127432 A1 | 5/2018 | Trzupek et al. |
| 2018/0188242 A1 | 7/2018 | Rosario-Jansen et al. |
| 2018/0223263 A1 | 8/2018 | Sherman et al. |
| 2018/0289776 A1 | 10/2018 | Johnston |
| 2019/0316097 A1 | 10/2019 | Hartman et al. |
| 2019/0317083 A1 | 10/2019 | Rosario-Jansen et al. |
| 2020/0056160 A1 | 2/2020 | Fischer et al. |
| 2020/0237879 A1 | 7/2020 | Kent et al. |
| 2020/0237880 A1 | 7/2020 | Kent et al. |
| 2020/0237881 A1 | 7/2020 | Kent et al. |
| 2020/0353057 A1 | 11/2020 | Kent et al. |
| 2021/0079362 A1 | 3/2021 | Hartman et al. |
| 2021/0181187 A1 | 6/2021 | Rosario-Jansen et al. |
| 2022/0073886 A1 | 3/2022 | Fischer et al. |
| 2022/0323445 A1 | 10/2022 | Peloso et al. |
| 2022/0323550 A1 | 10/2022 | Peloso |
| 2022/0409620 A1 | 12/2022 | Kent et al. |
| 2023/0028134 A1 | 1/2023 | Rosario-Jansen et al. |
| 2023/0034252 A1 | 2/2023 | Hartman et al. |
| 2023/0085022 A1 | 3/2023 | Kent et al. |

FOREIGN PATENT DOCUMENTS

| | | |
|---|---|---|
| CN | 1322141 A | 11/2001 |
| CN | 1322243 A | 11/2001 |
| CN | 101168052 A | 4/2008 |
| CN | 101198693 A | 6/2008 |
| CN | 104066324 A | 9/2014 |
| DE | 837379 C | 8/1955 |
| DE | 279486 A1 | 6/1990 |
| DE | 279489 A1 | 6/1990 |
| EP | 0028033 A2 | 5/1981 |
| EP | 0034307 A2 | 8/1981 |
| EP | 0043980 A2 | 1/1982 |
| EP | 0055188 A1 | 6/1982 |

(56) References Cited

FOREIGN PATENT DOCUMENTS

| | | | |
|---|---|---|---|
| EP | 0204283 | A2 | 12/1986 |
| EP | 0226448 | A2 | 6/1987 |
| EP | 0279486 | A2 | 8/1988 |
| EP | 0321134 | A2 | 6/1989 |
| EP | 0408461 | A1 | 1/1991 |
| EP | 0727437 | A2 | 8/1996 |
| EP | 1100542 | A2 | 5/2001 |
| EP | 1100880 | A2 | 5/2001 |
| EP | 2349280 | A1 | 8/2011 |
| JP | S5599189 | A | 7/1980 |
| JP | S55135590 | A | 10/1980 |
| JP | S57192435 | A | 11/1982 |
| JP | S6255079 | A | 3/1987 |
| JP | S62223192 | A | 10/1987 |
| JP | H01216939 | A | 8/1989 |
| JP | H0354581 | A | 3/1991 |
| JP | H03148298 | A | 6/1991 |
| JP | H06255079 | A | 9/1994 |
| JP | H09154581 | A | 6/1997 |
| JP | H10500565 | A | 1/1998 |
| JP | H10502360 | A | 3/1998 |
| JP | H1175876 | A | 3/1999 |
| JP | 3148208 | B2 | 3/2001 |
| JP | 3148298 | B2 | 3/2001 |
| JP | 2002522399 | A | 7/2002 |
| JP | 2002524053 | A | 8/2002 |
| JP | 2003521937 | A | 7/2003 |
| JP | 2005241424 | A | 9/2005 |
| JP | 2008505656 | A | 2/2008 |
| JP | 2008535499 | A | 9/2008 |
| JP | 2008535500 | A | 9/2008 |
| JP | 2013009960 | A | 1/2013 |
| JP | 5599189 | B2 | 10/2014 |
| KR | 19980069019 | A | 10/1998 |
| KR | 0159107 | B1 | 11/1998 |
| KR | 100318706 | B1 | 12/2001 |
| KR | 100333148 | B1 | 12/2002 |
| KR | 100365606 | B1 | 2/2003 |
| KR | 100369838 | B1 | 9/2003 |
| KR | 100488848 | B1 | 5/2005 |
| RU | 2246318 | C2 | 2/2005 |
| RU | 2281954 | C2 | 8/2006 |
| RU | 2290439 | C2 | 12/2006 |
| WO | WO-8604145 | A1 | 7/1986 |
| WO | WO-8700056 | A1 | 1/1987 |
| WO | WO-9216221 | A1 | 10/1992 |
| WO | WO-9419007 | A1 | 9/1994 |
| WO | WO-9419470 | A1 | 9/1994 |
| WO | WO-9423735 | A1 | 10/1994 |
| WO | WO-9423740 | A1 | 10/1994 |
| WO | WO-9511987 | A1 | 5/1995 |
| WO | WO-9525785 | A1 | 9/1995 |
| WO | WO-9601274 | A1 | 1/1996 |
| WO | WO-9623064 | A1 | 8/1996 |
| WO | WO-9808873 | A1 | 3/1998 |
| WO | WO-9831383 | A1 | 7/1998 |
| WO | WO-0007629 | A2 | 2/2000 |
| WO | WO-0008196 | A2 | 2/2000 |
| WO | WO-0008196 | A3 | 3/2000 |
| WO | WO-0159078 | A2 | 8/2001 |
| WO | WO-02070007 | A1 | 9/2002 |
| WO | WO-03011211 | A2 | 2/2003 |
| WO | WO-03045436 | A1 | 6/2003 |
| WO | WO-2004092393 | A1 | 10/2004 |
| WO | WO-2005110386 | A2 | 11/2005 |
| WO | WO-2006110761 | A2 | 10/2006 |
| WO | WO-2006110819 | A2 | 10/2006 |
| WO | WO-2007100741 | A2 | 9/2007 |
| WO | WO-2008051178 | A2 | 5/2008 |
| WO | WO-2010071865 | A1 | 6/2010 |
| WO | WO-2010151823 | A1 | 12/2010 |
| WO | WO-2010151831 | A1 | 12/2010 |
| WO | WO-2011032175 | A1 | 3/2011 |
| WO | WO-2013066353 | A1 | 5/2013 |
| WO | WO-2017156513 | A1 | 9/2017 |
| WO | WO-2018089808 | A1 | 5/2018 |
| WO | WO-2020160322 | A1 | 8/2020 |
| WO | WO-2020160324 | A1 | 8/2020 |
| WO | WO-2020160325 | A1 | 8/2020 |
| WO | WO-2022035828 | A1 | 2/2022 |

OTHER PUBLICATIONS

Akkemik et al., "Effects of some drugs on human erythrocyte glocose 6-phosphate dehydrogenzse: an in vitro study," Journal of Enzyme Inhibition and Medicinal Chemistry, 25(6), Dec. 2010, pp. 871-875, DOI: 10.3109/14756360903489581.

Asci et al., "The impact of gallic acid on the methotrexate-induced kidney damage in rats," Journal of Food and Drug Analysis, vol. 25, Issue 4, Oct. 2017, pp. 890-897.

Baert et al., "Influence of Immunogenicity on the Long-Term Efficay of Infliximab in Crohn's Disease," The New England Journal of Medicine 348, No. 7, Feb. 2003, pp. 601-608.

Broadwell et al., "Community Practice Experiences with a Variety of Immunomodulatory Agents Co-Administered with Pegloticase for the Treatment of Uncontrolled Gout," Rheumatology and Therapy, Dec. 2022, 9(6), pp. 1549-1558.

Crews et al., "Effect of Allopurinol Versus Urate Oxidase on Methotrexate Pharmacolinetics in Children With Newly Diagnosed Acute Lymphoblastic Leukemia," Cancer, Jan. 2010, pp. 227-232.

Dean et al., "Pegloticase Therapy and G6PD Genotype," National Center of Biotechnology Information, Oct. 2020, pp. 1-10.

Ducourau et al., "Methotrexate effect on immunogenicity and long-term maintenance of adalimumab in axial spondyloarthritis: a multicentric randomised trial," Rheumatic & Musculoskeletal Diseases Open, Jan. 2020, 6:e001047, pp. 1-9.

Feagan et al., "Methotrexate in combination with infliximab is No. more effectve than infliximab alone in patients with crohn's disease," Gastroenterology, Mar. 2014, 146(3), pp. 681-688.

Goldman et al., "A ramdomized comparison between rasburicase and allopurinol in children with lymphoma or leukemia at hgih risk for tumor lysis," Clinical Observations, Interventions, and Therapeutic Trials, Bloo, May 15, 2001, vol. 97, No. 10, pp. 2998-3003.

"Guidance for Industry: Immunogenicity Assessment for Therapeutic Protein Products," U.S. Department of Health and Human Services Food and Drug Administration, Aug. 2014, 39 pages.

Hess et al., "Cancer metabolism and oxidative stress: Insights into carcinogenesis and checmotherapy via the non-dihydrofolate reductase effects on methotrexate," BB Clinical 3, Jun. 2015, pp. 152-161.

Jani et al., "The role of DMARDs in reducing the immunogenicity of TNF inhibitors in chronic inflammatory diseases," Rheumatology, 53(2), Feb. 2014, pp. 213-222.

Karri et al., "Methotrexate and Leucovorin exposure modulates biochemical markers in female accessory reproductive organs of albino rats," General Endocrinology, Jul. 2012, pp. 369-386, doi: 10.4183/aeb.2012.369.

Keenan et al., "The effect of immunomodulators on the efficacy and tolerability of pegloticase: a systematic review," Seminars in Arthritis and Rheumatism, vol. 51, No. 2, Apr. 2021, pp. 347-352.

Khanna et al., "2012 American College of Rheumatology Guidelines for Management of Gout Part I: Systematic Non-Pharmacologic and Pharmacologic Therapeutic Approaches to Hyperuricemia," Arthritis Care & Research, Oct. 2012, 64(10), pp. 1431-1466 (28 pages).

Khanna et al., "2012 American College of Rheumatology Guidelines for Management of Gout Part II: Therapy and Anti-Inflammatory Prophylaxis of Acute Gouty Arthritis," Arthritis Care & Research, Oct. 2012, 64(10), pp. 1447-1461 (23 pages).

Khanna et al., "Reducing Immunogenicity of Pegloticase (RECIPE) with Concomitant use of Mycophenolate Mofetil in Patients with Refractory Gout—a Phase II Double Blind Ramdomized Controlled Trial," ACR Convergence 2020, Abstract #0952, Nov. 2020, 5 pages.

Khanna et al., "Reducing Immunogenicity of Pegloticase (RECIPE) with Concomitant use of Mycophenolate Mofetil in Patients with Refractory Gout—a Phase II Double Blind Ramdomized Controlled

(56) References Cited

OTHER PUBLICATIONS

Trial," ACR Convergence Where Rheumatology Meets, Abstract #0952, Nov. 2020, Final Presentation, 17 pages.

Khanna et al., "Reducing Immunogenicity of Pegloticase with Concomitant use of Mycophenolate Mofetil in Patients with Refractory Gout: A Phase II, Ramdomized, Double-Blind, Placebo-Controlled Trial," Arthritis & Rheumatology, vol. 73, No. 8, Aug. 2021, pp. 1523-1532.

Lee et al., "Reduction in Serum Uric Acid May Be Related to Methotrexate Efficacy in Early Rheumatoid Arthritis: Data from the Canadian Early Arthritis Cohort (CATCH)," Clinical Medicine Insights: Arthritis and Musculoskeletal Disorders, Jan. 2016, vol. 9, pp. 37-43.

Lie et al., "The effect of comedication with conventional synthetic disease modifying antirheumatic drugs on TNF inhibitor drug survival in patients with ankylosing spondylitis and undifferentiated spondyloarthritis: results from a nationwide prospective study," Annals of the Rheumatic Diseases, Jun. 2015;74(6), pp. 970-978.

Schlensinger et al., "Enhancing the response rate to recombinant uricases in patients with gout," BioDrugs, Mar. 2022, 36(2), pp. 95-103.

Schlensinger et al., "Pegloticase," Nature Reviews: Drug Discovery, vol. 10, Jan. 2011, pp. 17-18.

Smolenska et al., "Effect of methotrexate on blood purine and pyrimidine levels in patients with rheumatoid arthritis," Rheumatology, Oct. 1999, vol. 38, No. 10, pp. 997-1002.

Verma et al., "Folate Conjugated Double Liposomes Bearing Prednisolone and Methotrexate for Targeting Rheumatoid Arthritis," Pharmaceutical Research, Aug. 2019, 36(8):123, pp. 1-13.

Alvarez-Hernandez et al., "Validation of the health assessment questionnaire disability index in patients with gout," Arthritis & Rheumatism, May 2008, vol. 59, No. 5, pp. 665-669.

Cipolleta E., et al., "Association between gout flare and subsequent cardiovascular events among patients with gout," JAMA, Aug. 2022, 328(5), pp. 440-450.

Cipolleta, E., et al., "Risk of venous thromboembolism with gout flares," Arthritis & Rheumatology, Feb. 2023, 30 pages.

International Preliminary Report on Patentability for International Application No. PCT/US2021/045350 dated Feb. 23, 2023, 8 pages.

Male et al., "Immunology," 8th edition, Chapter 11, pp. 183-198 and Chapter 19, pp. 307-321, Philadelphia, PA, Elsevier Inc., 2013.

Van Groen et al., "Application of the health assessment questionnaire disability index to various rheumatic diseases," Quality of Life Research, Nov. 2010, 19, pp. 1255-1263.

Declaration of Sherman M.R., Ph.D. Under 37 C.F.R. Section 1.132 for U.S. Appl. No. 09/501,730, mailed Sep. 20, 2002, 5 Pages.

Declaration of Sherman M.R., Under 37 C.F.R. Section 1.132 for U.S. Appl. No. 09/839,946, mailed May 26, 2005, 8 Pages.

Declaration of Sherman M.R., Under 37 C.F.R. Section 1.132 for U.S. Appl. No. 09/839,946, mailed Sep. 18, 2007, 19 Pages.

Declaration of Fischer M., Under 37 C.F.R Section 1.132 for U.S. Appl. No. 11/918,292, mailed Aug. 17, 2011, 3 Pages.

Declaration of Rosario-Jansen T., et al., Under 37 C.F.R. Section 1.132 for U.S. Appl. No. 13/379,704, mailed Jul. 24, 2014, 4 Pages.

Hershfield et al., U.S. Appl. No. 09/762,097.

Abstract Review: "Management of Gout After Pegloticase; Observations of US Clinical Practice from Trio Health and the American Rheumatology Network (ARN)," ACR Convergence, 2020, Abstract ID: 903234, 9 pages.

Abstract Review: "Management of Gout with Pegloticase; Real-World Utilization and Outcomes from Trio Health and the American Rheumatology Network (ARN)," ACR Convergence, 2020, Abstract ID: 903292, 11 pages.

Altschul et al., "Basic Local Alignment Search Tool," Journal of Molecular Biology, Oct. 1990, vol. 215, pp. 403-410.

Altschul, Stephen F., et al., "Gapped BLAST and PSI-BLAST: a new generation of protein database search programs," Nucleic Acids Research, Sep. 1997, 25(17), pp. 3389-3402.

Arellano et al., "Allopurinol hypersensitivity syndrome: a review," Mar. 1993, 27(3), pp. 337-343.

Bessen et al., "Recapture and improved outcome of pegloticase response with methotrexate—A report of two cases and review of the literature," Seminars in Arthritis and Rheumatism, Accepted Manuscript, (2018), 12 pages.

Chen et al., " Contemporary Prevalence of Gout and Hyperuricemia in the United States and Decadal Trends: The National Health and Nutrition Examination Survey 2007-2016," Arthritis Rheumatology, Jun. 2019; 71(6), pp. 991-999.

ClinicaiTrials.gov Identifier NCT02598596 (Year: 2015), 14 pages.

ClinicaiTrials.gov Identifier NCT03303989 (Year: 2017), 30 pages.

Majjhoo et al., "Prophylaxis for Infusion Reactions to Pegloticase: An Analysis of Two Different Corticosteroid Pre-Infusion Regimens in US Community Rheumatology Practices," vol. 68, NJ, USA: Wiley, Poster, (2016), 1 page.

Myers EW, et al., "Optimal alignments in linear space,", Bioinformatics, Mar. 1988, 1;4(1):11-17.

Needleman, Saul B., et al., "A general method applicable to the search for similarities in the amino acid sequence of two proteins", Journal of Molecular Biology, Mar. 1970, 48(3), pp. 443-453.

Sherman, F., et al., "Methionine or Not Methionine at the Beginning of a Protein," Bio Essays, Jul. 1985, vol. 3, Issue 1, pp. 27-31.

Gaffo et al., "Developing a provisional definition of flare in patients with established gout," May 2012, 64(5), pp. 1508-1517, https://pubmed.ncbi.nlm.nih.gov/22083456/.

Keenan et al., "Use of Pre-Infusion Serum Uric Acid Levels as a Biomarker for Infusion Reaction Risk in Patients on Pegloticase," Rheumatology and Therapy, Jun. 2019, 6(2), pp. 299-304, Epub Mar. 14, 2019, https://pubmed.ncbi.nlm.nih.gov/30875075/.

Kidney International, "Kidney Disease: Improving Global Outcomes (KDIGO) Guidelines," Aug. 2009, vol. 76, Supplement 113, 140 pages, https://kdigo.org/wp-content/uploads/2017/02/KDIGO-2009-CKD-MBD-Guideline-English.pdf.

Malamet et al., "SAT0355 Real World Risk of Infusion Reactions with Pegloticase Treatment: Findings from Post-Approval US Safety Data," Annals of the Rheumatic Diseases, Jun. 2013, 72(Suppl 3), pp. A703-A704, https://ard.bmj.com/content/72/Suppl_3/A703.3.

Abeles, A.M., "PEG-ing down (and preventing?) the cause of pegloticase failure," Arthritis Research & Therapy, Jun. 2014, 16:112., 2 pages.

Abuchowski, A. et al., "Effect of Covalent Attachment of Polyethylene Glycol on Immunogenicity and Circulating Life of Bovine Liver Catalase," The Journal of Biological Chemistry, American Society for Biochemistry and Molecular Biology, United States, Jun. 10, 1977, vol. 252, No. 11, pp. 3582-3586.

Abuchowski, A. et al., "Reduction of Plasma Urate Levels in the Cockerel With Polyethylene Glycol-Uricase," The Journal of Pharmacology Experimental Therapeutics, Nov. 1981, vol. 219, No. 2, pp. 352-354.

Abukhalaf et al., "Nonsteroidal Anti-inflammatory Drugs, Disease-Modifying Antirheumatic Drugs, and Agents used in Gout," Handbook of Drug Interactions, Jul. 2011, pp. 415-475.

Acetaminophen Extra Strength-acetaminophen tablet, Physicians Total Care, Inc., Apr. 29, 2016 (Apr. 29, 2016), pp. 1-4. Retrieved from the Internet: https://bit.ly/36wVn98 on Nov. 7, 2020 (Nov. 7, 2020).

Adams, P., et al., "Current Estimates From the National Health Interview Survey, 1996," Vital Health Study, Oct. 1999, Series 10, No. 200, 212 Pages.

"Aggregate", Stedman's Medical Dictionary 27th Edition, PDR Electronic Library, Accessed on Jun. 10, 2009, 1 Page, Retrieved from URL: http://www.thomsonhe.com/pdrel/librarian/ND.

Alamillo J.M., et al, "Purification and Molecular Properties of Urate Oxidase From Chlamydomonas Reinhardtii," Biochimica et Biophysica Acta, Elsevier Science Publishers B.V., Netherlands, Jan. 29, 1991, vol. 1076, pp. 203-208.

Albert et al., "Increased Efficacy and Tolerability of Pegloticase in Patients With Uncontrolled Gout Co-Treated With Methotrexate: A Retrospective Study," Rheumatology and Therapy, Sep. 2020, vol. 7, pp. 639-648.

Al-Shawi A., et al., "A Novel Immunoradiometric Assay for Human Liver Ferritin," Journal of Clinical Pathology, Apr. 1983, vol. 36, No. 4, pp. 440-444, Abstract only.

(56) References Cited

OTHER PUBLICATIONS

Alvares K., et al., "Rat Urate Oxidase Produced by Recombinant Baculovirus Expression: Formation of Peroxisome Crystalloid Core-like Structures," Cell Biology, Proceedings of the National Academy of Sciences of the USA, Jun. 1992, vol. 89, pp. 4908-4912.

Alvares K., et al., "The Nucleotide Sequence of a Full Length cDNA Clone Encoding Rat Liver Urate Oxidase," Biochemical and Biophysical Research Communications, Academic Press, Inc., United States, Feb. 15, 1989, vol. 158, No. 3, pp. 991-995.

Alvarez-Lario et al., "Uric acid and evolution," Rheumatology, Jul. 2010, 49, pp. 2010-2015.

"Amino Acid Sequence of Amino Truncated Chimeric Pig-Baboon Uricase," May 30, 2000, Retrieved from EBI Accession No. GSP: AAY69153, 2 Pages, XP002404207.

Antonopoulos C.A., et al., "The Precipitation of Polyanions by Long-Chain Aliphatic Ammonium Compounds," Biochimica et Biophysica Acta, Dec. 9, 1961, vol. 54, pp. 213-226.

Assadi F., "Managing New Onset Gout in Pediatric Renal Transplant Recipients: when, how, to what extent," Journal of Nephrology, Jul.-Aug. 2013, 26(4), pp. 624-628 2013.

Augustsson J., et al., "Low-Dose Glucocorticoid Therapy Decreases Risk for Treatment-Limiting Infusion Reaction to Infliximab in Patients with Rheumatoid Arthritis," Extended Report, Annals of the Rheumatic Diseases, Nov. 2007, vol. 66, pp. 1462-1466.

Baraf et al., "Infusion-related reactions with pegloticase, a recombinant uricase for the treatment of chronic gout refractory to conventional therapy," Journal of Clinical Rheumatology, Dec. 2014, 20(8):427-432.

Baraf H.S.B., et al., "Resolution of Tophi With Intravenous Peguricase in Refractory Gout," Arthritis & Rheumatism, 2005, September Supplement, vol. 52, No. 9, p. S105.

Baraf H.S.B., et al., "Resolution of Tophi With Intravenous Peguricase in Refractory Gout," Presented at American College of Rheumatology, Annual Scientific Meeting, San Diego, CA, Poster 194, Nov. 13-17, 2005, 1 Page.

Baraf H.S.B., et al., "Resolution of Tophi With Intravenous Peguricase in Treatment-Failure Gout," Presented at the EULAR—Annual European Congress of Rheumatology, Amsterdam, Netherlands, Poster 465, Annals of the Rheumatic Diseases, Jun. 21-24, 2006, vol. 65, Supplement 2: 256, 1 Page.

Baraf H.S.B., et al., "Tophus Burden Reduction With Pegloticase: Results From Phase 3 Randomized Trials and Open-Label Extension in Patients With Chronic Gout Refractory to Conventional Therapy," Arthritis Research & Therapy, Sep. 26, 2013, vol. 15, No. 5:R137, 11 Pages.

Bastos et al., "Methotrexate: Studies on cellular metabolism. IV. Effect on the mitochondrial oxidation of cytosolic-reducing equivalents in HeLa cells," Cell Biochemistry & Function, Oct. 1990, vol. 8, Issue 4, pp. 199-203.

Bayat S., et al., "Development of a Dual-Energy Computed Tomography Scoring System for Measurement of Urate Deposition in Gout," Arthritis Care & Research, Jun. 2016, vol. 68, No. 6, pp. 769-775.

Becker M., et al., "Activation of Hydroxylic Polymers—by Reaction with Carbonate or Chloroformate Ester in Presence of Amine," English Abstract, Derwent World Patents Index, Accession No. 8448552, 2004, 1 Page.

Becker M.A., et al., "Febuxocat Compared with Allopurinol in Patients with Hyperuricemia and Gout," The New England Journal of Medicine, Dec. 8, 2005, vol. 353, No. 23, pp. 2450-2461.

Becker M.A., "Hyperuricemia and Gout," The Metabolic and Molecular Bases of Inherited Disease, Edited by Scriver C.R, Beaudet A.L, Sly W.S, Valle D, 8th Edition, New York, McGraw-Hill, 2001, vol. 11, pp. 2513-2535.

Benbacer L., et al., "Interspecies Aminopeptidase-n Chimeras Reveal Species-specific Receptor Recognition by Canine Coronavirus, Feline Infectious Peritonitis Virus, and Transmissible Gastroenteritis Virus," Journal of Virology, Jan. 1997, vol. 71, No. 1, pp. 734-737, JPN6014045520.

Ben-Bassat A., et al., "Amino-Terminal Processing of Proteins," Nature, Mar. 19, 1987, vol. 326, 1 Page.

Ben-Bassat A., et al., "Processing of the Initiation Methionine From Proteins: Properties of the *Escherichia coli* Methionine Aminopeptidase and Its Gene Structure," Journal of Bacteriology, Feb. 1987, vol. 169, No. 2, pp. 751-757.

Ben-Horin et al., "Addition of an Immunomodulator to Infliximab Therapy Eliminates Antidrug Antibodies in Serum and Restores Clinical Response of Patients With Inflammatory Bowel Disease," Clinical Gastroenterology and Hepatology, vol. 11, Issue 4, Apr. 2013, pp. 444-447.

Berendsen H.J.C., "A Glimpse of the Holy Grail?," Science, Oct. 23, 1998, vol. 282, pp. 642-643.

Berhanu A., et al., "Pegloticase Failure and a Possible Solution: Immunosuppression to Prevent Intolerance and Inefficacy in Patients With Gout," Seminars in Arthritis and Rheumatism, 2017, vol. 46, No. 6, pp. 754-758.

Bessen et al., "Concomitant immunosuppressant use with pegloticase in patients with tophaceous gout—a case series," International Journal of Clinical Rheumatology 2019;14(6):238-245.

Bessen et al., "Recapture and improved outcome of pegloticase response with methotrexate—A report of two cases and review of the literature," Seminars in Arthritis and Rheumatism, Aug. 2019, vol. 49, No. 1, pp. 56-61.

Biggers et al., "Pegloticase, a polyethylene glycol conjugate of uricase for the potential intravenous treatment of gout," Current Opinion in Investigational Drugs (London, England: 2000), vol. 9, Issue 4, Apr. 1, 2008, pp. 422-429.

Bird R.E., et al., "Single-Chain Antigen-Binding Proteins," Science, Oct. 21, 1988, vol. 242, No. 4877, pp. 423-426.

Blumberg B.S., et al., "Further Evidence on the Protein Complexes of Some Hyauronic Acids," Biochemical Journal, Jan. 1958, vol. 68, pp. 183-188.

Bossavy J.P., et al., "Comparison of the Antithrombotic Effect of PEG-Hirudin and Heparin in a Human Ex Vivo Model of Arterial Thrombosis," Arteriosclerosis, Thrombosis and Vascular Biology, Journal of the American Heart Association, United States, May 1999, vol. 19, pp. 1348-1353.

Botson et al., "Pegloticase in combination with methotrexate in patients with uncontrolled gout: A multicenter, open-label study (MIRROR)," The Journal of Rheumatology, May 2021;48:767-774, doi: 10.3899/jrheum.200460.

Botson et al., "Pretreatment and Coadministration with Methotrexate Improved Durability of Pegloticase (Krystexxa) Response: A Prospective, Proof-of-Concept, Case Series," Abstract, Arthritis Rheumatology, 2018; 70 (suppl 10), https://acrabstracts.org/abstract/pretreatment-andcoadministration- with-methotrexate-improved-durability-of-pegloticase-krystexxa-response-aprospective- proof-of-concept-case-series/, Accessed Sep. 11, 2018.

Botson et al., "Pretreatment and co-administration with methotrexate improved durability of pegloticase response: a prospective observational, proof-of-concept, case series [Abstract]," SAT0404 Annals of the Rheumatic Diseases, Jun. 2019, vol. 78, Issue Suppl. 2, A1289-A1290.

Botson et al., "Pretreatment and Co-Administration with Methotrexate Improved Durability of Pegloticase Response: A Prospective, Observational, Proof-of-Concept, Case Series," Poster presented at the 2018 Annual Scientific Meeting of the American College of Rheumatology, Oct. 19-24, 2018.

Botson et al., "Pretreatment and co-administration with methotrexate improved durability of pegloticase response," Journal of Clinical Rheumatology, vol. 28, No. 1, Jan. 2022, e129-e134, doi: 10.1097/RHU.0000000000001639.

Bradley C.M., et al., "Limits of Cooperativity in a Structurally Modular Protein: Response of the Notch Ankyrin Domain to Analogous Alanine Substitutions in Each Repeat," Journal of Molecular Biology, Nov. 22, 2002, vol. 324, pp. 373-386.

Braun A., et al., "Development and Use of Enzyme-Linked Immunosorbent Assays (ELISA) for the Detection of Protein Aggregates in Interferon-Alpha (IFN-.alpha) Formulations," Pharmaceutical Research, Plenum Publishing Corporation, United States, Oct. 1997, vol. 14, No. 10, pp. 1394-1400.

(56) References Cited

OTHER PUBLICATIONS

Braun A., et al., "Protein Aggregates Seem to Play a Key Role Among the Parameters Influencing the Antigenicity of Interferon Alpha (IFN-.alpha.) in Normal and Transgenic Mice," Pharmaceutical Research, Plenum Publishing Corporation, United States, Oct. 1997, vol. 14, No. 10, pp. 1472-1478.
Brenda Enzyme Database: "E.C. 1.7.3.3, Urate Oxidase," 42 Pages, [Retrieved on Mar. 27, 2008] Retrieved from URL: www.brenda-enzymes.info.
Bringham, M. D. et al., "Immunosuppressant Use and Gout in the Prevalent Solid Organ Transplantation Population," J of the American Society of Nephrology, Progress in Transplantation, Jun. 2020, 30(2), pp. 103-110.
Buch M.H., et al., "Shortening Infusion Times for Infliximab Administration," Rheumatology, Apr. 2006, vol. 45, pp. 485-486.
Burnham N.L., "Polymers for Delivering Peptides and Proteins," American Journal of Hospital Pharmacy, American Society of Hospital Pharmacists, Inc., United States, Jan. 15, 1994, vol. 51, pp. 210-218.
Caetano et al., "Effect of methotrexate (MTX) on NAD(P)+ dehydrogenases of HeLa cells malic enzyme, 2-oxoglutarate and isocitrate dehydrogenases," Cell Biochemistry & Function, Dec. 1997, vol. 15, Issue 4, pp. 259-264.
Calabrese L.H., et al., "Frequency, Distribution and Immunologic Nature of Infusion Reactions in Subjects Receiving Pegloticase for Chronic Refractory Gout," Arthritis Research & Therapy, Dec. 2017, vol. 19, No. 1:19, 1-7 Pages.
Caliceti P., et al., "Biopharmaceutical Properties of Uricase Conjugated to Neutral and Amphiphilic Polymers," Bioconjugate Chemistry, American Chemical Society, Jun. 2, 1999, vol. 10, No. 4, pp. 638-646.
Carter W.A., "Interferon: Evidence for Subunit Structure," Proceedings of the National Academy of Sciences of the United States of America, Oct. 1970, vol. 67, No. 2, pp. 620-628.
Chen R.H.-L., et al., "Properties of Two Urate Oxidases Modified by the Covalent Attachment of Poly(Ethylene Glycol)," Biochimica et Biophysica Acta (BBA)—Enzymology, Aug. 13, 1981, vol. 660, pp. 293-298.
Chinese Second Office Action for Chinese Application No. 01807750. 1, dated Mar. 21, 2008, Chinese Patent Office, Beijing, China, 6 Pages.
Choe et al., "Association between serum uric acid and inflammation in rheumatoid arthritis: Perspective on lowering serum uric acid of leflunomide," Clinica Chimica acta, vol. 438, Jan. 1, 2015, pp. 29-34, https://doi.org/10.1016/j.cca.2014.07.039.
Chua C.C., et al., "Use of Polyethylene Glycol-Modified Uricase (PEG-Uricase) to Treat Hyperuricemia in a Patient with Non-Hodgkin Lymphoma," Annals of Internal Medicine, American College of Physicians, United States, Jul. 15, 1988, vol. 109, pp. 114-117.
Clark R., et al., "Long-acting Growth Hormone Produced by Conjugation with Polyethylene Glycol," Journal of Biological Chemistry, Sep. 6, 1996, vol. 271, No. 36, pp. 21969-21977.
Clive, D. M. "Renal Transplant-Associated Hyperuricemia and Gout," Journal of the American Society of Nephrology, May 1, 2000, vol. 11, pp. 974-979.
Coiffier et al., "Efficacy and safety of rasburicase (recombinant urate oxidase) for the prevention and treatment of hyperuricemia during induction chemotherapy of aggressive non-hodgkin's lymphoma: Results of the GRAAL1 (Groupe d'Etude des lymphomes de l'adulte trial on rasburicase activity in adult lymphoma) study," Journal of Clinical Oncology, vol. 21, No. 23, Dec. 2003, pp. 4402-4406.
Cole S.P.C., et al., "The EBV-Hybridoma Technique and its Application to Human Lung Cancer," Monoclonal Antibodies and Cancer Therapy, 1985, pp. 77-96.
Cole-Showers et al., "Effects of proanthocyanidin and methotrexate on glucose-6-phosphate dehydrogenase (G6PD) and glutathione reductase (GR) in an animal model," Journal of Food Agriculture and Environment, vol. 10, Issue 1, Jan. 2012, pp. 231-234.

Colloc'h N., et al., "Crystal Structure of the Protein Drug Urate Oxidase-Inhibitor Complex at 2.05 Ang. Resolution," Nature Structural Biology, Nature Publishing Group, Nov. 1997, vol. 4, No. 11, pp. 947-952.
Conley T.G., et al., "Thermodynamics and Stoicheiometry of the Binding of Substrate Analogues to Uricase," Biochemical Journal, The Biochemical Society, United Kingdom, Jun. 1, 1980, vol. 187, pp. 727-732.
Cooper J.F., "Resolving LAL Test Interferences," Journal of Parenteral Science and Technology, Jan.-Feb. 1990, vol. 44, No. 1, pp. 13-15.
Cote R.J., et al., "Generation of Human Monoclonal Antibodies Reactive with Cellular Antigens," Proceedings of the National Academy of Sciences of the United States of America, Immunology, Apr. 1983, vol. 80, pp. 2026-2030.
Cotton et al., "Glucose-6-Phosphate Dehydrogenase in the Blood of Psoriatics, and the Effects of Methotrexate," Dermatology, 1973, vol. 147, No. 6, pp. 399-405.
Crivelli E., et al., "A Single Step Method for the Solubilization and Refolding of Recombinant Protein from *E. coli* Inclusion Bodies," Australian Journal of Biotechnology, Apr. 1991, vol. 5, No. 2, pp. 78-80, 86.
Dady et al., "Methotrexate with thymidine, inosine, and allopurinol rescue: a phase I clinical study," Cancer Treatment Report 65, Jan. 1, 1981, pp. 37-43.
Davis F.F., et al., "Enzyme-Polyethylene Glycol Adducts: Modified Enzymes with Unique Properties," In Enzyme Engineering, Edited by Broun G.B., et al., Plenum Press, New York, 1978, vol. 4, pp. 169-173.
Davis S., et al., "Hypouricaemic Effect of Polyethyleneglycol Modified Urate Oxidase," The Lancet, London, GB, Aug. 8, 1981, pp. 281-283, XP000577404.
Delgado et al., "The uses and properties of PEG-linked proteins". Critical Reviews in Therapeutic Drug Carrier Systems (Jan. 1, 1992); 9(3-4): 249-304.
Derynck R., et al., "Expression of Human Fibroblast Interferon Gene in *Escherichia coli*," Nature, Sep. 18, 1980, vol. 287, pp. 193-197.
Donadio, D., et al., "Anaphylaxis-like Manifestations After Intravenous Injection of Urate Oxidase in an Asthmatic Child With Acute Leukemia," La Nouvelle Presse Medicale, 1981, vol. 10, pp. 711-712. (1 page English Translation).
Doyle et al., "Treatment with Infliximab plus Methotrexate Improves Anemia in Patients with Rheumatoid Arthritis Independent of Improvement in Other Clinical Outcome Measures—A Pooled Analysis from Three Large, Multicenter, Doubled-Blind, Randomized Clinical Trials," Seminars in Arthritis and Rheumatism, vol. 39, Issue 2, Oct. 2009, pp. 123-131.
"EC 1.7.3.3, urate oxidase," BRENDA Enzyme Database, available via internet at www.brenda.uni-koeln.de/ (cited in related U.S. Appl. No. 09/501,730, filed Feb. 10, 2000, in Notice of Allowance dated Jan. 13, 2004).
Embery, G., "Glycosaminoglycans of Human Dental Pulp," Journal de Biologie Buccale, Sep. 1976, vol. 4, pp. 229-236.
Emmerson, B.T., "The Management of Gout," The New England Journal of Medicine, Feb. 15, 1996, vol. 334, No. 7, pp. 445-451.
Estimated Glomerular Filtration Rate (eGFR), Kidney Health Australia, May 31, 2017, (Apr. 31, 2017), Retrieved from the Internet: https://kidney.org.au/uploads/resources/egfr-fact-sheet.pdf, Nov. 7, 2020 (Nov. 7, 2020). pp. 1-3.
European Examination Report for European Application No. 01923265. 1, dated Dec. 13, 2007, European Patent Office, Munich, DE, 6 Pages.
European Search Report for European Application No. 05011069.1, mailed Aug. 5, 2005, 6 Pages.
European Search Report for European Application No. 99938996.8, mailed Mar. 4, 2002, 2 Pages.
"ExPasy ProtParam Tool," pp. 1-2, [Retrieved on Dec. 19, 2018], Retrieved from the Internet: URL: https://web.expasy.org/cgi-bin/protparam/protparam.
Extended European Search Report for European Application No. 09175303.8, mailed Jan. 26, 2010, 6 Pages.
Extended European Search Report for European Application No. 10007912.8, mailed Oct. 25, 2010, 06 Pages.

(56) References Cited

OTHER PUBLICATIONS

Extended European Search Report for European Application No. 10158016.5, mailed May 11, 2010, 10 Pages.
Extended European Search Report for European Application No. 10180428.4, mailed Feb. 24, 2011, 7 Pages.
Extended European Search Report for European Application No. 10180672.7, mailed Mar. 30, 2011, 6 Pages.
Extended European Search Report for European Application No. 10792756.8, mailed Oct. 18, 2013, 04 Pages.
Extended European Search Report for European Application No. 14192835.8, mailed Jun. 5, 2015, 9 Pages.
Extended European Search Report for European Application No. 15156612.2, mailed Aug. 14, 2015, 7 Pages.
Extended European Search Report for European Application No. 17192971.4, mailed Feb. 7, 2018, 8 Pages.
Extended European Search Report for European Application No. 17869608.4, mailed Jul. 1, 2020, 10 Pages.
Extended European Search Report for European Application No. 18214393.3, mailed Apr. 12, 2019, 5 Pages.
Fam, A.G., "Strategies and Controversies in the Treatment of Gout and Hyperuricaemia," Bailliere's Clinical Rheumatology: International Practice and Research, Elsevier Science Ltd., Aug. 1990, vol. 4, No. 2, pp. 177-192.
FDA—Drug Safety Brouchure—Ref ID 3116893, Published on the Web for Krystexxa, Apr. 2012, pp. 1-14, Retrieved from URL: http://www.accessdata.fda.gov/drugsatfda_docs/label/2012/125293s034lbl.pdf.
"FDA Approves KRYSTEXXA® (pegloticase) Injection Co-Administered with Methotrexate, Expaning the Labeling to Help More People with Uncontrolled Gout Achieve a Complete Response to Therapy," Benzinga, Business Wire Press Releases, Jul. 8, 2022, 4 pages.
"FDA Approves KRYSTEXXA® (pegloticase) Injection Co-Administered with Methotrexate, Expaning the Labeling to Help More People with Uncontrolled Gout Achieve a Complete Response to Therapy," BioSpace, Jul. 8, 2022, 5 pages.
"FDA Approves KRYSTEXXA® (pegloticase) Injection Co-Administered with Methotrexate, Expaning the Labeling to Help More People with Uncontrolled Gout Achieve a Complete Response to Therapy," StreetInsider, Business Wire, Press Releases, Jul. 8, 2022, 3 pages.
"FDA Approves KRYSTEXXA® (pegloticase) Injection Co-Administered with Methotrexate, Expaning the Labeling to Help More People with Uncontrolled Gout Achieve a Complete Response to Therapy," Yahoo!Finance, Business Wire, Press Releases, Jul. 8, 2022, 4 pages.
"FDA Approves Peglioticase Injection Plus Methotrexate for Patients with Uncontrolled Gout," Rheumatology Network, Jul. 8, 2022, 1 page.
"FDA approves peglioticase, methotrexate combo in patients with uncontrolled gout," Healio Rheumatology, Jul. 8, 2022, 2 pages.
"FDA Approves Peglioticase Plus Methotrexate for Uncontrolled Gout," HCPLive, Jul. 8, 2022, 1 page.
"FDA approves pegloticase injection coadministered with methotrexate for gout," AJMC, Jul. 8, 2022, 2 pages.
"FDA decisions to watch in rheumatology in Second Half of 2022," Rheumatology Network, Jun. 29, 2022, 3 pages.
Flinta, C., et al., "Sequence Determinants of Cytosolic N-Terminal Protein Processing," European Journal of Biochemistry, Jan. 2, 1986, vol. 154, No. 1, pp. 193-196.
Forrest A., et al., "A New Approach for Designing Population Sparse Sampling Strategies—Applied to Ciprofloxacin PKS," Abstracts of Papers, Feb. 1991, vol. 49, No. 2, p. 153.
Francis, G., et al., "PEGylation of Cytokines and other Therapeutic Proteins and Peptides: the Importance of Biological Optimisation of Coupling Techniques," International Journal of Hematology, Jul. 1998, vol. 68, pp. 1-19.
Freyne B., "A Case Report of Immunosuppressant Medication-Associated Polyarticular Tophaceous Gout Successfully Treated Using the Polyethylene Glycol-Conjugated Uricase Enzyme Pegloticase," Transplantation Proceedings, Dec. 2018, vol. 50, No. 10, pp. 4099-4101.
Fridovich I., "The Competitive Inhibition of Uricase by Oxonate and by Related Derivatives of s-Triazines," The Journal of Biological Chemistry, Jun. 1965, vol. 240, No. 6, pp. 2491-2494.
Friedman T., et al., "THe Urate Oxidase Gene of *Drosophila pseudoobscura* and *Drosophila melanogaster*: Evolutionary Changes of Sequence and Regulation," Journal of Molecular Evolution, Jan. 1992, vol. 34, No. 1, pp. 62-77, Abstract only.
Fuertges F., et al., "The Clinical Efficacy of Poly (Ethylene Glycol)-Modified Proteins," Journal of Controlled Release, Elsevier Science, The Netherlands, Jan. 1990, vol. 11, pp. 139-148.
Fujita T., et al., "Tissue Distribution of In-Labeled Uricase Conjugated with Charged Dextrans and Polyethylene Glycol," Journal of Pharmacobio-Dynamics, Pharmaceutical Society of Japan, Nov. 1991, vol. 14, pp. 623-629.
Gaertner H.F., et al., "Site-Specific Attachment of Functionalized Poly(ethylene glycol) to the Amino Terminus of Proteins," Bioconjugate Chemistry, American Chemical Society, United States, Jan. 30, 1996, vol. 7, No. 1, pp. 38-44.
Ganson N.J., et al., "Antibodies to Polyethylene Glycol (PEG) during Phase I Investigation of PEG-Urate Oxidase (PEG-uricase; Puricase.RTM.) for Refractory Gout," Presented at American College of Rheumatology Annual Scientific Meeting at San Antonio, TX, Oct. 16-21, 2004, Poster 808, 7 Pages.
Ganson N.J., et al., "Control of Hyperuricemia in Subjects with Refractory Gout, and Induction of Antibody against Poly(ethylene Glycol) (PEG), in a Phase I Trial of Subcutaneous PEGylated Urate Oxidase," Arthritis Research and Therapy, 2006, vol. 8, No. 1 : (R12), pp. 1-10.
Garay R., et al., "Antibodies Against Polyeththelene Glycol in Healthy Subjects and in Patients Treated with PEG-Conjugated Agents," Expert Opinion, Nov. 2012, vol. 9, No. 11, pp. 1319-1323.
Giglione C., et al., "Control of Protein Life-span by N-terminal Methionine Excision," The EMBO—European Molecular Biology Organization Journal, Jan. 2, 2003, vol. 22, No. 1, pp. 13-23.
Goeddel D.V., et al., "Human Leukocyte Interferon Produced by *E. coli* Is Biologically Active," Nature, Oct. 2, 1980, vol. 287, 6 Pages.
Goldman S.C., et al., "A Randomized Comparison Between Rasburicase and Allopurinol in Children with Lymphoma or Leukemia at High Risk for Tumor Lysis," Blood, May 15, 2001, vol. 97, No. 10, pp. 2998-3303.
Goss et al., "Methotrexate Dose in Patients With Early Rheumatoid Arthritis Impacts Methotrexate Polyglutamate Pharmacokinetics, Adalimumab Pharmacokinetics, and Efficacy: Phacmacokinetic and Exposure-response Analysis of the CONCERTO Trial," Clinical Therapeutics, vol. 40, Issue 2, Feb. 2018, pp. 309-319.
Greenberg M.L., et al., "A Radiochemical-High-Performance Liquid Chromatographic Assay for Urate Oxidase in Human Plasma," Analytical Biochemistry, Academic Press, Inc., United States, Feb. 1, 1989, vol. 176, pp. 290-293.
Guttmann A., et al., "Pegloticase in Gout Treatment - Safety Issues, Latest Evidence and Clinical Considerations," Therapeutic Advances in Drug Safety, Dec. 2017, vol. 8, No. 12, pp. 379-388.
Hamburger, S., et al., "Arthritis Advisory Committee Meeting, Pegloticase (Krystexxa) IV fusion," dated Jun. 16, 2009, pp. 1-155, [Retrieved on Aug. 4, 2010], Available on the internet: <url: http="" <a=href=>www.fda.gov/downloads/AdvisoryCommittees/CommitteesMeetingMaterials/DrugsAdvisoryCommittee/UCM167777.pdf, Especially, pp. 108-115.</url:>.
Hande K.R., et al., "Severe Allopurinol Toxicity. Description and Guidelines for Prevention in Patients in Renal Insufficiency," The American Journal of Medicine, Excerpta Medica, United States, Jan. 1984, vol. 76, pp. 47-56.
Harris J.M., et al., "Effect of Pegylation on Pharmaceuticals," Nature Reviews Drug Discovery, Mar. 2003, vol. 2, No. 3, pp. 214-221.
Hartmann G., "Exchange In Vitro of Subunits between Enzymes from Different Organisms: Chimeras of Enzymes," Angewandte Chemie International edition in English, Apr. 1976, vol. 15, No. 4, pp. 181-186, JPN6014045522.

(56) References Cited

OTHER PUBLICATIONS

Hascall V., et al., "Aggregation of Cartilage Proteoglycans," Journal of Biological Chemistry, Jul. 10, 1974, vol. 249, No. 13, pp. 4232-4241, pp. 4242-4249, and pp. 4250-4256.

Hazen J., "Adjuvants—Terminology, Classification, and Chemistry," Weed Technology, Oct. 2000, vol. 14, pp. 773-784.

Hedlund L., et al., "Magnetic Resonance Microscopy of Toxic Renal Injury by Bromoethylamine in Rats," Fundamental and Applied Toxicology, Academic Press, May 1991, vol. 16, pp. 787-797.

Heftmann E., et al., "Chromatography: Fundamentals and Applications of Chromatographic and Electrophoretic Methods. Part A: Fundamentals and Techniques," Journal of Chromatography, 1983, vol. 22A, pp. A104-A110.

Heinegard D., et al., "Characterization of Chondroitin Sulfate Isolated from Trypsin-Chymotrypsin Digests of Cartilage Proteoglycans," Archives of Biochemistry and Biophysics, Nov. 1974, vol. 165, No. 1, pp. 427-441.

Henney C., et al., "Antibody Production to Aggregated Human gamma.G-Globulin in Acquired Hypogammaglobulinemia," New England Journal of Medicine, Massachusetts Medical Society, United States, May 23, 1968, vol. 278, pp. 1144-1146.

Herbst R., et al., "Folding of Firefly (*Photinus pyralis*) Luciferase: Aggregation and Reactivation of Unfolding Intermediates," Biochemistry, Apr. 17, 1998, vol. 37, No. 18, pp. 6586-6597.

Hershfield M., "Biochemistry and Immunology of Poly(ethylene glycol)-Modified Adenosine Deaminase (PEG-ADA)," In: ACS Symposium Series 680, Poly(ethylene glycol), Chemistry and Biological Applications, Harris J.M., and Zaplipsky S., eds., American Chemical Society, Washington, DC, Apr. 1997, pp. 145-154.

Hershfield M. et al., "Induced and Pre-Existing Anti-Polyethylene Glycol Antibody in a Trial of Every 3-Week Dosing of Pegloticase for Refractory Gout, including in organ transplant recipients," Arthritis Research & Therapy, Mar. 2014, 16(2), pp. 1-11.

Hershfield M.S., et al., "Use of Site-Directed Mutagenesis to Enhance the Epitope-Shielding Effect of Covalent Modification of Proteins with Polyethylene Glycol," Proceedings of the National Academy of Sciences of the United States of America, Aug. 15, 1991, vol. 88, pp. 7185-7189.

Hinds K., et al., "Synthesis and Characterization of Poly(Ethylene Glycol)-Insulin Conjugates," Bioconjugate Chemistry, American Chemical Society, United States, Feb. 15, 2000, vol. 11, pp. 195-201.

Hirel P., et al., "Extent of N-terminal Methionine Excision from *Escherichia coli* Proteins is Governed by the Side-Chain Length of the Penultimate Amino Acid," Proceedings of the National Academy of Sciences of the United States of America, Jul. 24, 1989, vol. 86, pp. 8247-8251.

"Horizon gets FDA approval for Krystexxa's use with methotrexate for uncontrolled gout," Seeking Alpha, Ravikash, SA News Editor, Jul. 8, 2022, 2 pages.

Horizon, "Horizon Therapeutics plc announces FDA has granted priority review of the supplemental biologics license application (sBLA) for the concomitant use of KRYSTEXXA® (pegloticase injection) plus methotrexate for people living with uncontrolled gout," Mar. 7, 2022, 3 pages.

"Horizon's Krystexxa wins FDA combo nod to fight drug resistance," Fierce Pharm, Jul. 8, 2022, 3 pages.

"Horizon nabs FDA expanded label for gout med Krystexxa," Endpoints, Jul. 8, 2022, 2 pages.

"Horizon Therapeutics: FDA Approves Expanded Labeling for KRYSTEXXA With Methotrexate," Nasdaq, Jul. 8, 2022, 1 page.

"Horizon Therapeutics: FDA approves expanded labeling for KRYSTEXXA with methotrexate," RTTNews, Published Jul. 8, 2022, 5 pages.

"Horizon therapeutics receives FDA approval for uncontrolled gout candidate," BENZINGA, Jul. 8, 2022, 7 pages.

Hortnagl H., et al., "Membrane Proteins of Chromaffin Granules, Dopamine-Hydroxylase, A Major Constituent," Biochemical Journal, Aug. 1972, vol. 129, No. 1, pp. 187-195.

Huse W.D., et al., "Generation of a Large Combinatorial Library of the Immunoglobulin Repertoire in Phage Lambda," Research Article, Dec. 8, 1989, vol. 246, pp. 1275-1281.

Huston U.S., et al., "Protein Engineering of Antibody Binding Sites: Recovery of Specific Activity in an Anti-Digoxin Single-Chain Fv Analogue Produced in *Escherichia coli*," Proceedings of the National Academy of Sciences of the United States of America, Aug. 1988, vol. 85, pp. 5879-5883.

Inada Y., et al. "Biomedical and Biotechnological Applications of PEG- and PM-Modified Proteins," Trends Biotechnology, Elsevier Science Limited, Mar. 1995, vol. 13, pp. 86-91.

Information on EC 1.7.3.3—Urate Oxidase: Retrieved from URL: www.brenda-enzymes.org/php/flat.sub.--result.php4?ecno=1.7.3.3 &organisms-ub.--list=&Suchword=, Date Jul. 20, 2009, 53 pages.

International Preliminary Report on Patentability for International Application No. PCT/US1999/017678, mailed Aug. 24, 2000, 5 Pages.

International Preliminary Report on Patentability for International Application No. PCT/US2001/040069, mailed May 24, 2002, 2 Pages.

International Preliminary Report on Patentability for International Application No. PCT/US2006/013502, mailed Jul. 16, 2007, 5 Pages.

International Preliminary Report on Patentability for International Application No. PCT/US2006/013660, mailed Mar. 20, 2012, 5 Pages.

International Preliminary Report on Patentability for International Application No. PCT/US2006/013751, date of completion Apr. 11, 2005, 05 Pages.

International Preliminary Report on Patentability for International Application No. PCT/US2010/040082, mailed Jan. 12, 2012, 7 Pages.

International Preliminary Report on Patentability for International Application No. PCT/US2017/061126, mailed May 23, 2019, 08 Pages.

International Preliminary Report on Patentability for International Application No. PCT/US2020/015956, mailed Aug. 12, 2021, 10 Pages.

International Preliminary Report on Patentability for International Application No. PCT/US2020/015958, mailed Aug. 12, 2021, 12 Pages.

International Preliminary Report on Patentability for International Application No. PCT/US2020/015959, mailed Aug. 12, 2021, 13 Pages.

International Preliminary Report on Patentability for International Application No. PCT/US2020/048803, mailed Mar. 10, 2022, 9 Pages.

International Search Report and Written Opinion for International Application No. PCT/US2001/040069, mailed Dec. 12, 2001, 4 Pages.

International Search Report and Written Opinion for International Application No. PCT/US2006/013751, mailed Sep. 6, 2006, 10 Pages.

International Search Report and Written Opinion for International Application No. PCT/US2010/040082, mailed Aug. 19, 2010, 8 Pages.

International Search Report and Written Opinion for International Application No. PCT/US2017/061126, mailed Feb. 20, 2018, 11 Pages.

International Search Report and Written Opinion for International Application No. PCT/US2020/015956, mailed May 5, 2020, 13 Pages.

International Search Report and Written Opinion for International Application No. PCT/US2020/015959, date of mailing Apr. 8, 2020, 16 pages.

International Search Report and Written Opinion for International Application No. PCT/US2020/048803, mailed Nov. 24, 2020, 13 Pages.

International Search Report and Written Opinion for International Application No. PCT/US2021/045350, mailed Dec. 27, 2021, 10 Pages.

(56) References Cited

OTHER PUBLICATIONS

International Search Report and Written Opinion of the International Search Authority for International Application No. PCT/US2006/013660, mailed Nov. 17, 2006, 10 Pages.
International Search Report and Written Opinion of the International Searching Authority for International Application No. PCT/US2006/013502, mailed Dec. 13, 2006, 10 Pages.
International Search Report and Written Opinion of the International Searching Authority for International Application No. PCT/US2010/040093, mailed Aug. 19, 2010, 6 Pages.
International Search Report and Written Opinion of the International Searching Authority for International Application No. PCT/US2020/015958, mailed Apr. 14, 2020, 14 Pages.
International Search Report for International Application No. PCT/US1999/017514, mailed Mar. 17, 2000, 5 Pages.
International Search Report for International Application No. PCT/US1999/017678, mailed Feb. 2, 2000, 4 Pages.
International Search Report for International Application No. PCT/US2000/017398, mailed Dec. 6, 2000, 3 Pages.
Ishino, K., et al., "Protein Concentration Dependence on Aggregation Behavior and Properties of Soybean 7S and 11S Globulins during Alkali-Treatment," Agricultural and Biological Chemistry, Jun. 1980, vol. 44, No. 6, pp. 1259-1266.
Ito M., et al., "Identification of an Amino Acid Residue Involved in the Substrate-binding Site of Rat Liver Uricase by Site-directed Mutagenesis," Biochemical and Biophysical Research Communications, Academic Press, United States, Aug. 31, 1992, vol. 187, pp. 101-107.
Jaques L., "The Reaction of Heparin with Proteins and Complex Bases," Biochemical Journal, Jul. 1943, vol. 37, pp. 189-195.
Jones A., "The Isolation of Bacterial Nucleic Acids using Cetyltrimethylammonium Bromide," Biochimica et Biophysica Acta, Apr. 1953, vol. 10, pp. 607-612.
Kabat E.A., et al., "Sequences of Proteins of Immunological Interest," US Department of Health and Human Services, 1983, 4 Pages.
Kahn K., et al., "Kinetic Mechanism and Cofactor Content of Soybean Root Nodule Urate Oxidase," Biochemistry, American Chemical Society, United States, Apr. 15, 1997, vol. 36, pp. 4731-4738.
Kawata Ak., et al., "Validation of the Sf-36 and Haq-Di in Patients With Treatment-Failure Gout," Annals of the Rheumatic Diseases, 2007, 66 (Suppl II), 236, Poster 359, 1 Page.
Kelly S.J., et al., "Diabetes Insipidus in Uricase-Deficient Mice: A Model for Evaluating Therapy with Poly(Ethylene Glycol)-Modified Uricase," Journal of the American Society of Nephrology, Lippincott Williams & Wilkins, United States, May 2001, vol. 12, pp. 1001-1009.
Kinsella, J.E., et al., "Uricase From Fish Liver: Isolation and Some Properties," Comparative Biochemistry and Physiology, American Society of Zoologists, Division of Comparative Physiology, Elsevier, Great Britain, Dec. 30, 1985, vol. 82B, No. 4, pp. 621-624.
Kinstler O.B., et al., "Characterization and Stability of N-Terminally PEGylated rhG-CSF," Pharmaceutical Research, Plenum Publishing Corporation, United States, Jul. 1996, vol. 13, No. 7, pp. 996-1002.
Kishimoto et al., "Improving the efficacy and safety of biologic drugs with tolerogenic nanoparticles," Nature Nanotechnology 11, Aug. 2016, pp. 890-899.
Kissel P., et al., "Modification of Uricaemia and the Excretion of Uric Acid Nitrogen by an Enzyme of Fungal Origin," Nature, Jan. 6, 1968, vol. 217, pp. 72-74.
Kito M., et al., "A Simple and Efficient Method for Preparation of Monomethoxypolyethylene Glycol Activated with p-Nitrophenylchloroformate and its Application to Modification of L-Asparaginase," Journal of Clinical Biochemistry and Nutrition, Institute of Applied Biochemistry, Japan, Sep. 1996, vol. 21, pp. 101-111.
Kohler, G., et al., "Pillars Article: Continuous Cultures of Fused Cells Secreting Antibody of Predefined Specificity," Nature, Mar. 1975, vol. 256, No. 5517, pp. 495-497. The Journal of Immunology, Mar. 2005, 1:174(5):2453-2455.
Kontsek, P., et al., "Forty Years of Interferon," Acta Virologica, Slovak Academic Press, Slovak Republic, Dec. 1997, vol. 41, pp. 349-353.
Kozbor D., et al., "The Production of Monoclonal Antibodies From Human Lymphocytes," Immunology Today, Mar. 1983, vol. 4 (3), pp. 72-79.
Kozma et al., "Anti-PEG antibodies: Properties, formation, testing and role in adverse immune reactions to PEGylated nano-biopharmaceuticals," Advanced Drug Delivery Reviews, vols. 154-155, 2020, pp. 163-175.
Kozma E.M., et al., "An Accumulation of Proteoglycans in Scarred Fascia," Molecular and Cellular Biochemistry, Jan. 2000, vol. 203, pp. 103-112.
Kral L.G., et al., "Cloning a cDNA for *Drosophila melanogaster* Urate Oxidase," Gene, Elsevier Science Publishers B.V, Netherlands, 1986, vol. 45, pp. 131-137.
Krieckaert, C.L. et al. "Methotrexate reduces immunogenicity in adalimumab treated rheumatoid arthritis patients in a dose dependent manner" Ann Rheum Dis, 71(11):1914-1915 (2012).
KRYSTEXXA (pegloticase) [prescribing information] Horizon, Apr. 2012, 14 pages.
"Krystexxa plus methotrexate approved for uncontrolled gout," MedMDS, Jul. 8, 2022, 4 pages.
"Krystexxa plus methotrexate approved for uncontrolled gout," MPR, Jul. 8, 2022, 4 pages.
Kunitani M., et al., "Classical Light Scattering Quantitation of Protein Aggregates: Off-line Spectroscopy Versus HPLC Detection," Journal of Pharmaceutical and Biomedical Analysis, Elsevier Science B.V., Netherlands, Dec. 1997, vol. 16, 16 Pages.
Kunitani M., et al., "On-Line Characterization of Polyethylene Glycol-Modified Proteins," Journal of Chromatography, Elsevier Science Ltd., Dec. 27, 1991, vol. 588, pp. 125-137.
Larsen K., "Purification of Nodule-Specific Uricase From Soybean by Arginine-Sepharose Affinity Chromatography," Preparative Biochemistry and Biotechnology, 1990, vol. 20, No. 1, 1 Page, (Abstract Only).
Laurent T.C., et al., "Fractionation of Hyaluronic Acid: The Polydispersity of Hyaluronic Acid from the Bovine Vitreous Body," Biochimica et Biophysica Acta, Aug. 26, 1960, vol. 42, pp. 476-485.
Lawrence R.C., et al., "Estimates of the Prevalence of Arthritis and Selected Musculoskeletal Disorders in the United States," Arthritis & Rheumatology, May 1998, vol. 41, No. 5, pp. 778-799.
Leach, M., et al., "Efficacy of Urate Oxidase (Uricozyme) in Tumor Lysis Induced Urate Nephropathy," Clinical & Laboratory Haematology, Blackwell Science Limited, Jun. 1998, vol. 20, pp. 169-172.
Leaustic M., et al., "Allergic Manifestation of the Bronchospasm Type After Intravenous Injection of Urate Oxidase in a Female Patient Treated for Myeloma," Rev Rhum Mal Osteoartic, 1983, vol. 50, No. 7, 5 Pages.
Lee C.C., et al., "Generation of cDNA Probes Directed by Amino Acid Sequence: Cloning of Urate Oxidase," Science, American Association for the Advancement of Science, United States, Mar. 4, 1988, vol. 239, No. 4844, pp. 1288-1291.
Lee et al., "THU0149 does methotrexate lower serum uric acid levels? Data from the catch cohort," Poster Presentations, Annals of the Rheumatic Diseases, Jun. 2015, vol. 74, pp. 248.
Lee, S-S., "Studies on Glycosaminoglycans in Tissues," Fukushima Journal of Medical Sciences, Jan. 1973, vol. 19, No. 1-4, pp. 33-39.
Lee T.H., et al., "A Novel Secretory Tumor Necrosis Factor-Inducible Protein (TSG-6) is a Member of the Family of Hyaluronate Binding Proteins, Closely Related to the Adhesion Receptor CD44," The Journal of Cell Biology, Jan. 1, 1992, vol. 116, No. 2, pp. 545-557.
Legoux R., et al., "Cloning and Expression in *Eschericia coli* of the Gene Encoding Aspergillus Flavus Urate Oxidase," The Journal of Biological Chemistry, American Society for Biochemistry and Molecular Biology, United States, Apr. 25, 1992, vol. 267, No. 12, pp. 8565-8570.

(56) References Cited

OTHER PUBLICATIONS

Lim S.Y., et al., "Trends in Gout and Rheumatoid Arthritis Hospitalizations in the United States, 1993-2011," The Journal of the American Medical Association, Jun. 7, 2016, vol. 315, No. 21, pp. 2345-2347.

Lipsky P.E., et al., "Pegloticase Immunogenicity: The Relationship Between Efficacy and Antibody Development in Patients Treated for Refractory Chronic Gout," Arthritis Research & Therapy, Mar. 4, 2014, vol. 16, No. 2, R60, 8 Pages.

Lit, J-Y., et al., "Mutations at the S1 Sites of methionine Aminopeptidases From *Escherichia coli* and *Homo sapiens* Reveal the Residues Critical for Substrate Specificity," Journal of Biological Chemistry, May 14, 2004, vol. 279, No. 20, pp. 21128-21134.

Liu C., et al., "Prednisone in Uric Acid Lowering in Symptomatic Heart Failure Patients With Hyperuricemia (PUSH-PATH) Study," Canadian Journal of Cardiology, Sep. 2013, vol. 29, No. 9, pp. 1048-1054, Especially Abstract.

Li-Yu J., et al., "Treatment of Chronic Gout. Can We Determine When Urate Stores Are Depleted Enough to Prevent Attacks of Gout?," The Journal of Rheumatology, Mar. 2001, vol. 28, No. 3, pp. 577-580.

London M., et al., "Uricolytic Activity of Purified Uricase in Two Human Beings," Science, May 10, 1957, vol. 125, pp. 937-938.

Lundquist et al., "Psoriasis and Normouricemic Gout," Dermatology, 1982, vol. 164, No. 2, pp. 104-108.

Macart M., et al., "An Improvement of the Coomassie Blue Dye Binding Method Allowing an Equal Sensitivity to Various Proteins: Application to Cerebrospinal Fluid," Clinica Chimica Acta, Elsevier Biomedical Press, Jun. 16, 1982, vol. 122, pp. 93-101.

Maccari F., et al., "Glycosaminoglycan Blotting on Nitrocellulose Membranes Treated With Cetylpyridinium Chloride After Agarose-Gel Electrophoretic Separation," Electrophoresis, Sep. 2002, vol. 23, pp. 3270-3277.

Mahler H.R., et al., "Studies of Uricase. 1. Preparation, Purification, and Properties of a Cuproprotein," Journal of Biological Chemistry, American Society for Biochemistry and Molecular Biology, United States, Oct. 1955, vol. 216, pp. 625-641.

Mahmoud H.H., et al., "Advances in the Management of Malignancy-Associated Hyperuricaemia," British Journal of Cancer, Supplement 4, Churchill Livingstone, United Kingdom, Jun. 1998, vol. 77, pp. 18-20.

Majijhoo et al., "Comparison of two corticosteriod pre-infusion regimes for pegloticase in the United States: A retrospective analysis in community rheumatology practices," Drugs Real World Outcomes, Dec. 2019;6(4):165-171.

Majjhoo A., et al., "Prophylaxis for Infusion Reactions to Pegloticase: An Analysis of Two Different Corticosteroid Pre-Infusion Regimens in US Community Rheumatology Practices," ACR/ARHP Annual Meeting, Abstract No. 213, Prophylaxis to Pegloticase, Sep. 28, 2016, 4 Pages, Retrieved from URL: https://acrabstracts.org/abstract/.

Malakhova E.A., et al., "Kinetic Properties of Bacterial Urate Oxidase Entrapped in Hydrated Reversed Micelles," Biologicheskie Membrany, 1991, vol. 8, No. 5, 1 Page, (Abstract Only).

Martin et al., "Methotrexate in Psoriasis: Precipitation of Gout," Arch Dermatol., Oct. 1967, vol. 96, No. 4, pp. 431-433, doi:10.1001/archderm.1967.01610040081015.

Matsumura G., et al., "The Preparation of Hyaluronic Acid from Bovine Synovial Fluid," Short Communications, Biochimica et Biophysica Acta, Mar. 5, 1963, vol. 69, pp. 574-576.

Mcsweeney et al., "Pre-treatment with high molecular weight free PEG effectively suppresses anti-PEG antibody induction by PEG-liposomes in mice," Journal of Controlled Release, vol. 329, Jan. 10, 2021, pp. 774-781.

Milgroom, A. et al., "Immunosuppressant Use and Gout in the Prevalent Solid Organ Transplant Population," Journal of the American Society of Nephrology, Oct. 2018, 29:152 Abstract TH-P0160.

Miura S., et al., "Urate Oxidase is Imported into Peroxisomes Recognizing the C-terminal SKL Motif of Proteins," European Journal of Biochemistry, Blackwell Science Ltd., United Kingdom, Jul. 1, 1994, vol. 223, pp. 141-146.

Moerschell R.P., et al., "The Specificities of Yeast Methionine Aminopeptidase and Acetylation of Amino-terminal Methionine in Vivo," Journal of Biological Chemistry, Nov. 15, 1990, vol. 265, No. 32, pp. 19638-19643.

Monkarsh, S.P., et al., "Positional Isomers of Monopegylated Interferon Alpha-2a: Isolation, Characterization, and Biological Activity," Analytical Biochemistry, Academic Press, United States, May 1997, vol. 247, pp. 434-440.

Montagna, R., et al., "Letter to Editor," Nephrologie, 1990, vol. 11, No. 4, 259, 3 Pages.

Montalbini, P., et al., "Isolation and Characterization of Uricase From Bean Leaves and Its Comparison With Uredospore Enzymes," Plant Science, Elsevier Science Ireland Ltd., Ireland, Sep. 1999, vol. 147, pp. 139-147.

Montalbini, P., et al., "Uricase From Leaves: Its Purification and Characterization From Three Different Higher Plants," Planta, Springer-Verlag, Germany, Jul. 1997, vol. 202, pp. 277-283.

Moolenburgh, J.D., et al., "Rasburicase Treatment In Severe Tophaceous Gout: A Novel Therapeutic Option," Clinical Rheumatology, Sep. 2006, vol. 25, pp. 749-752.

Moore, W.V., et al., "Role of Aggregated Human Growth Hormone (hGH) in Development of Antibodies to hGH," The Journal of Clinical Endocrinology and Metabolism, The Endocrine Society, United States, Oct. 1980, vol. 51, pp. 691-697.

Morrison, S.L., et al., "Chimeric Human Antibody Molecules: Mouse Antigen-binding Domains With Human Constant Region Domains," Proceedings of the National Academy of Sciences of the United States of America, Nov. 1984, vol. 81, pp. 6851-6855.

Motojima, K., et al., "Cloning and Sequence Analysis of cDNA for Rat Liver Uricase," Journal of Biological Chemistry, Nov. 15, 1988, vol. 263, No. 32, pp. 16677-16681.

Mountain View Pharmaceuticals, Inc., "PURICASE.RTM.," U.S. Trademark Registration No. 2,246,623 (report obtained from U.S. Trademark Electronic Search System (TESS), Dec. 5, 2001), 1 page.

Mourad, G., et al., "Role of Anti-Urate Oxidase Precipitant Antibodies in Urate Oxidase Resistant Hyperuremic," La Presse Medicale, Nov. 24, 1984, vol. 13, No. 42, p. 2585.

Moussy, G., et al., "Inter-Species DNA Polymerase Delta Chimeras Are Functional in *Saccharomyces cerevisiae*," European Journal of Biochemistry, Jul. 1, 1995, vol. 231, No. 1, pp. 45-49.

"N- and C-Terminally Truncated Pig-Baboon Chimeric Uricase (PBC-NT-CT)," Retrieved from EBI Accession No. GSP: AAY81255, Jun. 19, 2000, 2 Pages, XP002404208.

Nagata S., et al., "Synthesis in *E. coli* of a Polypeptide With Human Leukocyte Interferon Activity," Nature, Mar. 27, 1980, vol. 284, 5 Pages.

Nahm B.H., et al., "Induction and De Novo Synthesis of Uricase, a Nitrogen-Regulated Enzyme in Neurospora Crassa," Journal for Bacteriology, American Society for Microbiology, United States, May 1987, vol. 169, No. 5, pp. 1943-1948.

Neuberger M.S., et al., "Recombinant Antibodies Possessing Novel Effector Functions," Nature, Dec. 13, 1984, vol. 312, pp. 604-608.

Ngo, J.T., et al., "Computational Complexity, Protein Structure Prediction, and the Levinthal Paradox," The Protein Folding Problem and Tertiary Structure Prediction, Merz et al., (ed.), Birkhauser, Boston, MA, 1994, pp. 491-495.

Nishida Y., et al., "Hypouricaemic Effect After Oral Administration in Chickens of Polyethylene Glycol-modified Uricase Entrapped in Liposomes," Journal of Pharmacy and Pharmacology, Pharmaceutical Press, United Kingdom, May 1984, vol. 36, pp. 354-355.

Nishimura, H., et al., "Improved Modification of Yeast Uricase with Polyethylene Glycol: Accompanied with Nonimmunoreactivity Towards Anti-Uricase Serum and High Enzymic Activity," Enzyme, Karger, Switzerland, 1981, vol. 26, pp. 49-53.

Nishimura H., et al., "Modification of Yeast Uricase with Polyethylene Glycol: Disappearance of Binding Ability towards Anti-Uricase Serum," Enzyme, Karger, Switzerland, 1979, vol. 24, pp. 261-264.

(56) References Cited

OTHER PUBLICATIONS

Nucci M.L., et al., "The Therapeutic Value of Poly(Ethylene Glycol)-Modified Proteins," Advanced Drug Delivery Reviews, Elsevier Science Publishers, Netherlands, Mar.-Apr. 1991, vol. 6, No. 2, pp. 133-151.

"$NZNP—Horizon gets FDA approval for Krystexxa's use with methotrexate for uncontrolled gout," Breaking News @MarketCurrents, Jul. 8, 2022, SANewsTwitter, 1 page.

Osman A.M., et al., "Liver Uricase in Camelus Dromedarius: Purification and Properties," Comparative Biochemistry and Physiology B, Pergamon Press, London, GB, Dec. 6, 1989, vol. 94B, No. 3, pp. 469-474, ISSN 0305-0491, XP002125210.

Otta M.E., et al., "Solubilization of Particle-Linked Urate Oxidase by Different Agents," Acta Physiologica Latinoamericana, 1975, vol. 25, pp. 451-457.

Pakula A.A., et al., "Genetic Analysis of Protein Stability and Function," Annual Review of Genetics, United States, 1989, vol. 23, pp. 289-310.

Palleroni A.V., et al., "Interferon Immunogenicity: Preclinical Evaluation of Interferon-alpha.2a," Journal of Interferon and Cytokine Research, Mary Ann Liebert, Inc., United States, Jul. 1997, vol. 17, Supplement 1, pp. S23-S27.

Pearce R.H., et al., "Quantitative Isolation of Purified Acidic Glycosaminoglycans from Rat Skin," Canadian Journal of Biochemistry and Physiology, Oct. 1967, vol. 45, pp. 1565-1576.

Perez-Ruiz F., et al., "Effect of Urate-Lowering Therapy on the Velocity of Size Reduction of Tophi in Chronic Gout," Arthritis & Rheumatology, Aug. 15, 2002, vol. 47, No. 4, pp. 356-360.

Philippovich, Y.B., "The Fundamentals of Biochemistry," AGAR, Moscow, Russia, 1999, pp. 29-30, (with unverified, Partial English language translation).

Pitts O.M., et al., "Uricase: Subunit Composition and Resistance to Denaturants," Biochemistry, American Chemical Society, United States, Feb. 26, 1974, vol. 13, No. 5, pp. 888-892.

Porstmann, B., et al., "Comparison of Chromogens for the Determination of Horseradish Peroxidase as a Marker in Enzyme Immunoassay," Journal of Clinical Chemistry and Clinical Biochemistry, Walter de Gruyter & Co., Germany, Jul. 1981, vol. 19, pp. 435-439.

Potaux L., et al., "Uricolytic Therapy Value of Urate Oxidase in the Treatment of Hyperuricemia," La Nouvelle Presse Medicale, Apr. 12, 1975, vol. 4, No. 15, 10 Pages.

"Prevent—Definition by Merriam-Webster Online Dictionary," pp. 1-3, [Retrieved on Jun. 27, 2013] Retrieved from URL: http://www.merriam-webster.com/dictionary/prevent.

Pui et al., "Recombinant Urate Oxidase for the Prophylaxis or Treatment of Hyperuricemia in Patients With Leukemia or Lymphoma," Journal of Clinical Oncology, vol. 19, Issue 3, Feb. 2001, pp. 697-704.

Pui et al., "Recombinant Urate Oxidase (rasburicase) in the prevention and treatment of malignancy-associated hyperuricemia in pediatric and adult patients: results of a compassionate-use trial," Leukemia 15, Oct. 2001, pp. 1505-1509.

Pui et al., "Urate oxidase in prevention and treatment of hyperusicemia associates with lymphoid malignancies," Leukemia 11, Nov. 1997, pp. 1813-1816.

R&D Focus Drug News: "PEG-uricase BioTechnology General, Duke University, Mountain View licensing agreement," DataStar File IPNR/IPNA, Accession No. 1998:2984 DRUGNL, Aug. 24, 1998, 1 Page.

Reinders, M., "Practice Research in the Field of Gout: Clinical Pharmacology of Antihyperuricemic Drugs", University of Groningen, Doctoral Thesis, Nov. 28, 2008, pp. 1-152. p. 18, Table 2; p. 131, para 2.

Richette P., et al., "Rasburicase for Tophaceous Gout not Treatable with Allopurinol: An Exploratory Study," The Journal of Rheumatology, Oct. 2007, vol. 34, No. 10, pp. 2093-2098.

Richette P., et al., "Successful Treatment with Rasburicase of a Tophaceous Gout in a Patient Allergic to Allopurinol," Nature Clinical Practice Rheumatology, Jun. 2006, vol. 2, No. 6, pp. 338-342.

Rinella J.V., et al., "Elutability of Proteins from Aluminum-Containing Vaccine Adjuvants by Treatment with Surfactants," Journal of Colloid and Interface Science, Jan. 1, 1998, vol. 197, pp. 48-56.

Rosenberg A.S., "Effects of Protein Aggregates: An Immunologic Perspective," The American Association of Pharmaceutical Scientists Journal, United States, Aug. 4, 2006, vol. 8, No. 3, pp. E501-E507.

Rosenberg A.S., et al., "Urate-Oxidase for the Treatment of Tophaceous Gout in Heart Transplant Recipients," Rev Rhum, Eng. Ed., May 1995, vol. 62, No. 5, pp. 392-394.

Rudinger, J., "Characteristics of the Amino Acids as Components of a Peptide Hormone Sequence," Peptide Hormones, JA Parsons Edition, University Park Press, Jun. 1976, pp. 1-7.

Saag et al. "Initial results of a clinical study to determine whether a tolerizing regimen of pegloticase can increase the frequency of subjects having sustained lowering of serum urate," American College of Rheumatology, Abstract 1141, Sep. 2017, 2 pages.

Saag K., et al., "FRI0240: Clinical Trial to Determine Whether Altering the Regimen of Pegloticase Administration Can Increase the Frequency of Subjects Having Sustained Lowering of Serum Urate," Annals of Rheumatic Disease, Friday, Jun. 15, 2018, vol. 77, p. 661.

Saifer M.G.P., et al., "Improved Conjugation of Cytokines Using High Molecular Weight Poly(ethylene glycol): PEG-GM-CSF as a Prototype," Polymer Preprints, American Chemical Society, United States, Apr. 1997, vol. 38, pp. 576-577.

Saifer M.G.P., et al., "Plasma Clearance And Immunologic Properties of Long-Acting Superoxide Dismutase Prepared Using 35,000 to 120,000 Dalton Poly-Ethylene Glycol," Advances in Experimental Medicine and Biology, 1994, vol. 366, pp. 377-387.

Saito, S., "Coagulation and Peptization of Polyelectrolyte Solution by Detergent Ions. I," Kolloid-Zeitschrift, 1955, vol. 143, No. 2, 18 Pages.

Sakane T., et al., "Carboxyl-Directed Pegylation of Brain-Derived Neurotrophic Factor Markedly Reduces Systemic Clearance with Minimal Loss of Biologic Activity," Pharmaceutical Research, Plenum Publishing Corporation, United States, Aug. 1997, vol. 14, pp. 1085-1091.

Sartore L., et al., "Enzyme Modification by mPEG with an Amino Acid or Peptide as Spacer Arms," Applied Biochemistry and Biotechnology, Jan. 1991, vol. 27, No. 1, pp. 45-54.

Savoca K., et al., "Induction of Tolerance in Mice by Uricase and Monomethoxypolyethylene Glycol-Modified Uricase," International Archives of Allergy and Applied Immunology, 1984, vol. 75, pp. 58-67.

Scandella, C.J., et al., "A Membrane-Bound Phospholipase AI Purified from *Escherichia colt*," Biochemistry, Nov. 23, 1971, vol. 10, No. 24, pp. 4447-4456.

Schiavon O., et al., "Therapeutic Proteins: A Comparison of Chemical and Biological Properties of Uricase Conjugated to Linear or Branched Poly(Ethylene Glycol) and Poly(N-Acryloylmorpholine)," Il Farmaco, Apr. 2000, vol. 55, No. 4, pp. 264-269.

Schinzel R., et al., "The Phosphate Recognition Site of *Escherichia coli* Maltodextrin Phosphorylase," Federation of European Biochemical Societies, Jul. 1991, vol. 286, No. 1, 2, pp. 125-128.

Schlesinger et al., "Evaluation of proposed criteria for remission and evidence-based development of criteria for complete response in patients with chronic refractory gout," ACR Open Rheumatology, Jun. 2019, vol. 1, No. 4, pp. 236-243, doi: 10.1002/acr2.1025.

Schumacher H.R., et al., "Effects of Febuxostat Versus Allopurinol and Placebo in Reducing Serum Urate in Subjects with Hyperuricemia and Gout: A 28-Week, Phase III, Randomized, Double-Blind, Parallel-Group Trial," Arthritis & Rheumatism (Arthritis Care & Research), Nov. 15, 2008, vol. 59, No. 11, pp. 1540-1548.

Schumacher, H.R., et al., "Outcome Evaluations in Gout," The Journal of Rheumatology, Jun. 2007, vol. 34, No. 6, pp. 1381-1385, XP008158539.

Scott, J., "The Precipitation of Polyanions by Long-Chain Aliphatic Ammonium Salts," Journal of Biochemistry, 1961, vol. 81, pp. 418-424.

(56) References Cited

OTHER PUBLICATIONS

Scott, J., "The Reaction of Long-Chain Quarternary Ammonium Salts with Acidic Polysaccharides," Chemistry and Industry, Feb. 12, 1955, pp. 168-169.
Scott, J., "The Solubility of Cetylpyridinium Complexes of Biological Polyanions in Solution of Salts," Biochimica et Biophysica Acta, Nov. 1955, vol. 18, pp. 428-429.
Scott, J.E., "Aliphatic Ammonium Salts in the Assay of Acidic Polysaccharides from Tissues," Methods of Biochemical Analysis, Jan. 1960, vol. 8, pp. 145-197.
Serafini-Fracassini A., et al., "The Protein-Polysaccharide Complex of Bovine Nasal Cartilage," Journal of Biochemistry, Nov. 1967, vol. 105, pp. 569-575.
Sharma B., "Immunogenicity of Therapeutic Proteins. Part 3: Impact of Manufacturing Changes," Biotechnology Advances, Elsevier Inc., Netherlands, Jan. 2007, vol. 25, pp. 325-331.
Shearwater Polymers Inc:, "Functionalized Biocompatible Polymers for Research and Pharmaceuticals," Shearwater Polymers, Inc., Catalog, Jul. 1997, 6 Pages.
Sherman, M., et al., "Conjugation of High-Molecular Weight Poly(ethylene glycol) to Cytokines: Granulocyte-Macrophage Colony-Stimulating Factors as Model Substrates," ACS Symposium Series 680, Poly(ethylene glycol), Chemistry and Biological Applications, Harris J.M., and Zaplipsky S., eds., American Chemical Society, Washington, DC, Aug. 5, 1997, pp. 155-169.
Sherman, M., et al., "PEG-Uricase in the Management of Treatment-Resistant Gout and Hyperuricemia," Advanced Drug Delivery Reviews, Jan. 3, 2008, vol. 60, No. 1, pp. 59-68.
Shoji A., et al., "A Retrospective Study of the Relationship Between Serum Urate Level and Recurrent Attacks of Gouty Arthritis: Evidence for Reduction of Recurrent Gouty Arthritis With Antihyperuricemic Therapy," Arthritis & Rheumatology, Jun. 15, 2004, vol. 51, No. 3, pp. 321-325.
Sigma Catalog, p. 1008, Product Nos. U 3250, 292-8, U3500, U 9375 or U 3377, (1993).
Sigma Genosys: "Designing Custom Peptides," Accessed on Dec. 16, 2004, pp. 1-2.
Smith T., et al., "Human Lung Tryptase," Journal of Biological Chemistry, Sep. 10, 1984, vol. 259, No. 17, pp. 11046-11051.
Somack R., et al., "Preparation of Long-Acting Superoxide Dismutase Using High Molecular Weight Polyethylene Glycol (41,000-72,000 Daltons)," Free Radical Research Communications, Harwood Academic Publishers GmBH, Germany, 1991, vol. 12-13, pp. 553-562.
Sorensen L.B., "Suppression of the Shunt Pathway in Primary Gout by Azathioprine," Proceedings of the National Academy of Science of the USA, Mar. 1966, vol. 55, No. 3, pp. 571-575.
Sparks et al., "Effect of Low-Dose Methotrexate on eGFR and Kidney Adverse Events: A Randomized Clinical Trial," Journal of the American Society of Nephrology, Dec. 2021, 32(12):3197-3207.
Stamp et al., "Expert opinion on emerging urate-lowering therapies," Expert Opinion on Emerging Drugs, vol. 23, 2018, pp. 201-209.
Strand et al., "Immunogenicity of Biologics in Chronic Inflammatory Diseases: A Systematic Review," BioDrugs, Aug. 2017, 31(4):299-316.
Streuli, et al., "Target Cell Specificity of Two Species of Human Interferon-a Produced in *Escherichia coli* and of Hybrid Molecules Derived from them," Proceedings of the National Academy of Sciences, USA, Aug. 1981, vol. 85, pp. 5879-5883.
Sundy J., et al., "A Multicenter Longitudinal Study of Disease Characteristics in Patients With Treatment-Failure Gout," Presented at the EULAR-Annual European Congress of Rheumatology, Amsterdam, Netherlands, Poster 518, Jun. 21-24, 2006, 1 Page.
Sundy J., et al., "A Phase 2 Study of Multiple Doses of Intravenous Polyethylene Glycol (PEG)-uricase in Patients with Hyperuricemia and Refractory Gout," Presented at the EULAR—Annual European Congress of Rheumatology, Amsterdam, Netherlands, Poster 516, Jun. 21-24, 2006, 1 Page.

Sundy, J., et al., "A Phase I Study of Pegylated-Uricase (Puricase. RTM.) in Subjects with Gout," Presented at American College of Rheumatology Annual Scientific Meeting at San Antonio, TX, on Oct. 16-21, 2004, Poster 807.
Sundy J., et al., "Efficacy and Tolerability of Pegloticase for the Treatment of Chronic Gout in Patients Refractory to Conventional Treatment: Two Randomized Controlled Trials," American Medical Association, Aug. 17, 2011, vol. 306, No. 7, pp. 711-720.
Sundy J., et al., "Pharmacokinetics and Pharmacodynamics of Intravenous PEGylated Recombinant Mammalian Urate Oxidase in Patients With Refractory Gout," Arthritis & Rheumatology, Mar. 2007, vol. 56, No. 3, pp. 1021-1028.
Sundy J., et al., "Quality of Life in Patients With Treatment-Failure Gout," Presented at the EULAR—Annual European Congress of Rheumatology, Amsterdam, Netherlands, Poster 517, Jun. 21-24, 2006, 1 Page.
Sundy J., et al., "Reduction of Plasma Urate Levels Following Treatment with Multiple Doses of Pegloticase in Patients with Treatment-Failure Gout," Arthritis & Rheumatism, Sep. 2008, vol. 58, No. 9, pp. 2882-2891.
Sundy J., et al., "Uricase and Other Novel Agents for the Management of Patients With Treatment-Failure Gout," Current Rheumatology Reports, Jun. 2007, vol. 9, No. 3, pp. 258-264.
Sundy, J.S., et al., "A Phase 2 Study of Multiple Doses of Intravenous Polyethylene Glycol (PEG)-uricase in Patients with Hyperuricemia and Refractory Gout," Presented at American College of Rheumatology 2005 Annual Scientific Meeting at San Diego, CA, #1836 on Nov. 13-17, 2005, 51 pages.
Sundy S., et al., Arthritis & Rheumatism, Sep. 2005, vol. 52, No. 9 (Supplement), Abstract Supplement, Annual Scientific Meeting, San Diego, California, Nov. 12-17, 2005, Abstract #1836, 3 Pages.
Sutterlin, et al., "Mixtures of Quaternary Ammonium Compounds and Anionic Organic Compounds in the Aquatic Environment: Elimination and Biodegradability in the Closed Bottle Test Monitored by LC-MS/MS," Chemosphere, Jun. 2008, vol. 72, No. 3, pp. 479-484, Abstract only.
Suzuki, H., et al., "Soybean Nodule-Specific Uricase (Nodulin-35) is Expressed and Assembled into a Functional Tetrameric Holoenzyme in *Escherichia coli*," Plant Physiology, American Society of Plant Physiologists, United States, Feb. 1991, vol. 95, pp. 384-389.
Takeda, et al., "Construction of Chimaeric Processed Immunoglobulin Genes Containing Mouse Variable and Human Constant Region Sequences," Nature, Apr. 4, 1985, vol. 314, pp. 452-454.
Talkington et al., "High MW polyethylene glycol prolongs circulation of pegloticase in mice with anti-PEG antibodies," Journal of Controlled Release, vol. 338, Oct. 10, 2021, pp. 804-812.
Terkeltaub R., "Gout", Clinical Practice, The New England Journal of Medicine, 2003, vol. 349, No. 17, pp. 1647-1655.
"The @US_FDA's decision on the co-treatment of pegloticase (#Krystexxa) plus methotrexate (#MTX) for patients with uncontrolled #gout was based on the phase 4 MIRROR clinical trial," HCPLive Tweet Twitter, Jul. 8, 2022, 1 page.
"The @US_FDA expanded the #pegloticase label to include the co-treatment of pegloticase (KRYSTEXXA) injection plus methotrexate in patients with uncontrolled #gout. @HorizonNews," Rheumatology Network Tweet Tweeter, Jul. 8, 2022, 1 page.
Thomas et al., "Comparative Immunogenicity of TNF Inhibitors: Impact on Clinical Efficacy and Tolerability in the Management of Autoimmune Diseases. A Systematic review and Meta-Analysis," BioDrugs 29, Aug. 2015, pp. 241-258.
Tla S., et al., "Urate Oxidase from Pig Liver: Biochemical and Immunological Properties," Prikl Biokhim Mikrobiol, Izdatesltvo Nauka, Russia, Jul. 1, 1978, vol. 14, pp. 533-542.
Tomanee P., et al., "Fractionation of Protein, RNA, and Plasmid DNA in Centrifugal Precipitation Chromatography Using Cationic Surfactant CTAB Containing Inorganic Salts NaCl and NH4Cl," Wiley InterScience, Sep. 9, 2004, 8 Pages, DOI: 10.1002/bit.20203.
Top 10 Home Remedies: "How to Control Uric Acid Levels," Accessed on Sep. 22, 2015, pp. 1-6, Retrieved from URL: http://www.top10homeremedies.com/how-to/control-uric-acid-levels.html.

(56) References Cited

OTHER PUBLICATIONS

Treuheit M., et al., "Inverse Relationship of Protein Concentration and Aggregation," Pharmaceutical Research, Plenum Publishing Corporation, United States, Apr. 2002, vol. 19, pp. 511-516.

Truscoe R., "Effect of Detergents on Extraction and Activity of Ox-Kidney Urate Oxidase," Enzymologia, Jul. 31, 1967, vol. 33, pp. 119-132.

Truscoe R., et al., "Effect of pH on Extraction and Activity of Ox-kidney Urate Oxidase," Biochimica et Biophysica Acta, Elsevier Publishing Co., Netherlands, Jul. 8, 1964, vol. 89, pp. 179-182.

Tsuji J., et al., "Studies on Antigenicity of the Polyethylene Glycol (PEG)-Modified Uricase," International Journal of Immunopharmacology, Elsevier Science, 1985, vol. 7, No. 5, pp. 725-730.

Tsunasawa S., et al., "Amino-terminal Processing of Mutant Forms of Yeast Iso-1-cytochrome c, The Specificities of Methionine Aminopeptidase and Acetyltransferase," The Journal of Biological Chemistry, May 10, 1985, vol. 260, No. 9, pp. 5382-5391.

Tutton, R et al., "Pharmacogenomic Biomarkers in Drug Labels: What do they tell us?," Pharmacogenomics, Feb. 2014, 15(3), pp. 297-304.

U.S. Trademark Registration No. 2,246,623, entitled "Puricase," filed on Jul. 15, 1997, 1 Page.

Varelas J., et al., "Expression and Characterization of a Single Recombinant Proteoglycan Tandem Repeat Domain of Link Protein That Binds Zinc and Hyaluronate," Archives of Biochemistry and Biophysics, Aug. 1, 1995, vol. 321, No. 1, pp. 21-30.

Venkataseshan V., et al., "Acute Hyperuricemic Nephropathy and Rental Failure after Transplantation," Nephron, Karger AG, Switzerland, 1990, vol. 56, pp. 317-321.

Verhoef et al., "Potential induction of anti-PEG antibodies and complement activation toward PEGylated therapeutics," Drug Discovery Today, vol. 19, Issue 12, Dec. 2014, pp. 1945-1952.

Vermeire et al., "Effectiveness of concomitant immunosuppresive therapy in suppressing the formation of antibodies to infliximab in Crohn's disease," Gut, Jan. 2007, vol. 56, pp. 1226-1231.

Veronese F., "Branched and Linear Poly(Ethylene) Glycol: Influence of the Polymer Structure on Ezymological, Pharmacokinetic, and Immunological Properties of Protein Conjugates," Journal of Bioactive and Compatible Polymers, Tectonic Publishing Co., Inc., United States, Jul. 1, 1997, vol. 12, pp. 196-207.

Veronese F., et al., "New Synthetic Polymers for Enzyme and Liposome Modification," In: ACS Symposium Series 580, Poly(Ethylene Glycol) Chemistry and Biological Applications, Harris J.M., and Zaplipsky S., eds., American Chemical Society, Washington, D.C., 1997, pp. 182-192.

Veronese F., et al., "Surface Modification of Proteins. Activation of Monomethoxy-Polyethylene Glycols by Phenylchloroformates and Modification of Ribonuclease and Superoxide Dismutase," Applied Biochemistry and Biotechnology, The Humana Press, Inc., United States, Apr. 1985, vol. 11, pp. 141-152.

Veronese F.M., et al., "Preface: Introduction and Overview of Peptide and Protein Pegylation," Advanced Drug Delivery Reviews, 2002, vol. 54, pp. 453-456.

Voet D., et al., Biochemistry, Second Edition, John Wiley & Sons, Inc., Apr. 1995, pp. 235-241.

Voshaar M et al., "Dutch Translation and Cross-Cultural Adaptation of the PROMIS Physical Function Item Bank and Cognitive Pre-Test in Dutch Arthritis Patients," Arthritis Research & Therapy, Mar. 5, 2012, vol. 14, No. 2, 7 Pages.

Wallrath L., et al., "Molecular Characterization of the *Drosophila melanogaster* Rate Oxidase Gene, an Ecdysone-Repressible Gene Expressed Only in the Malpighian Tubules," Molecular and Cellular Biology, American Society for Microbiology, United States, Oct. 1990, vol. 10, pp. 5114-5127.

Waltrip R., et al., "Pharmacokinetics and Pharmacodynamics of Peg-Uricase in Patients With Hyperuricemia and Treatment Failure Gout," Presented at the EULAR—Annual European Congress of Rheumatology, Barcelona, Spain, Poster 358, Jun. 13-16, 2007, 2 Pages.

Waltrip R., et al., "Weekly Flare Burden Index: A New Metric for Evaluating Gout Treatment," Annals of the Rheumatic Diseases, 2007, vol. 66 (Suppl II), Abstract 748, p. 624.

Wang L., et al., "Purification and Characterization of Uricase, a Nitrogen-Regulated Enzyme, from Neurospora Crassa," Archives of Biochemistry and Biophysics, Academic Press, Inc., United States, Apr. 15, 1980, vol. 201, pp. 185-193.

Wang X., et al., "Rat Urate Oxidase: Cloning and Structural Analysis of the Gene and 5'-Flanking Region," Gene, Elsevier Science Publishers B.V., The Netherlands, Jan. 15, 1991, vol. 97, pp. 223-229.

Wang X.D., et al., NCBI Entrez Protein (PRF) Database, Deposited Sequence for Rat Urate Oxidase (NP 446220), National Library of Medicine, National institutes of Health, Accession No. 20127395, Accessed at http://www.ncbi.nlm.nih.gov/protein/20127395, Accessed on Dec. 10, 2003.

Ward E.S., et al., "Binding Activities of a Repertoire of Single Immunoglobulin Variable Domains Secreted from *Escherichia coli*," Nature, Oct. 12, 1989, vol. 341, No. 6242, pp. 544-546.

Watanabe T., et al., "A Simple Purification Method for Rat Liver Urate Oxidase," Analytical Biochemistry, Academic Press, Inc., United States, Sep. 1978, vol. 89, No. 2, pp. 343-347.

WHO Drug Information, vol. 21, No. 4, 2007, List 98, p. 344.

Wortmann R., et al., "Gout and Hyperuricemia," Kelley's Textbook of Rheumatology, Edited by Ruddy S., Harris E., Sledge C., 6th edn. St. Louis: W.B. Saunders, 2001, pp. 1339-1371.

Wu, E.Q., et al., "Comorbidity Burden, Healthcare Resource Utilization, and Costs in Chronic Gout Patients Refractory to Conventional Urate-Lowering Therapy," American Journal of Therapeutics, Nov. 2012, vol. 19, No. 6, pp. e157-e166.

Wu X., et al., "Hyperuricemia and Urate Nephropathy in Urate Oxidase-Deficient Mice," Proceedings of the National Academy of Sciences, USA, National Academy of Sciences, United States, Jan. 18, 1994, vol. 91, No. 2, pp. 742-746.

Wu X., et al., "Two Independent Mutational Events in the Loss of Urate Oxidase during Hominoid Evolution," Journal of Molecular Evolution, Springer-Verlag, Germany, Jan. 1992, vol. 34, No. 1, pp. 78-84.

Wu X., et al., "Urate Oxidase: Primary Structure and Evolutionary Implications," Proceedings of the National Academy of Sciences, USA, Dec. 1989, vol. 86, No. 23, pp. 9412-9416.

Wuthrich, H et al., "Guidelines for the Treatment of Gout: A Swiss Perspective," Swiss Medical Weekly 146, (Year: 2016), pp. 1-7.

Yamamoto K., et al., "Nucleotide Sequence of the Uricase Gene from *Bacillus* sp. TB-90," Journal of Biochemistry, Oxford University Press, England, Jan. 1996, vol. 119, No. 1, pp. 80-84.

Yamanaka H., et al., "Optimal Range of Serum Urate Concentrations to Minimize Risk of Gouty Attacks during Anti-Hyperuricemic Treatment," Advances in Experimental Medicine and Biology, 1998, vol. 431, pp. 13-18.

Yasuda Y., et al., "Biochemical and Biopharmaceutical Properties of Macromolecular Conjugates of Uricase with Dextran Polyethylene Glycol," Chemical and Pharmaceutical Bulletin, Pharmaceutical Society of Japan, Jul. 1990, vol. 38, No. 7, pp. 2053-2056.

Yeldandi A.V., et al., "Human Urate Oxidase Gene: Cloning and Partial Sequence Analysis Reveal a Stop Codon within the Fifth Exon," Biochemica et Biophysica Research Communication, Academic Press, United States, Sep. 14, 1990, vol. 171, No. 2, pp. 641-646.

Yelverton, E., et al., "Bacterial Synthesis of a Novel Human Leukocyte Interferon," Nucleic Acids Research, Feb. 11, 1981, vol. 9, No. 3, pp. 731-741.

Yokoyama S., et al., "Rapid Extraction of Uricase from Candida Utilis Cells by Use of Reducing Agent Plus Surfactant," Enzyme and Microbial Technology, Jan. 1988, vol. 10, No. 1, pp. 52-55.

Yue, C.S., et al., Population Pharmacokinetic and Pharmacodynamic Analysis of PEG-uricase in Subjects With Hyperuricemia and Refractory Gout, presented at the American College of Clinical Pharmacy 2006 Annual Meeting on Oct. 26-29, 2006 at St. Louis, Missouri, Poster.

Zhang, T., et al., "Affinity Extraction of BSA with Reversed Micellar System Composed of Unbound Cibacron Blue," Biotechnology Progress, Nov.-Dec. 1999, vol. 15, No. 6, pp. 1078-1082.

(56) References Cited

OTHER PUBLICATIONS

Zhang, W., et al., "Forward and Backward Extraction of BSA using Mixed Reverse Micellar System of CTAB and Alkyl Halides," Biochemical Engineering Journal, Oct. 2002, vol. 12, No. 1, pp. 1-5.

Zhu J., et al., "Can Dynamic Contrast-Enhanced MRI (DCE-MRI) and Diffusion-Weighted MRI (DW-MRI) Evaluate Inflammation Disease," A Preliminary Study of Crohn's Disease, Medicine (Baltimore), Apr. 2016, vol. 95, No. 14, Article e3239, pp. 1-9.

Highlights of Prescribing Information for Allegra (fexofenadine hydrochloride) tablets, ODT 1-18, orally disintegrating tablets) and oral suspension, Jul. 31, 2007 (Apr. 31, 2007), pp. 1-19. Retrieved from the Internet: www.accessdata.fda.gov/drugsatfda_docs/label/2008/020872s018,021963s0021bl.pdf on Nov. 7, 2020 (Nov. 7, 2020).

\* cited by examiner

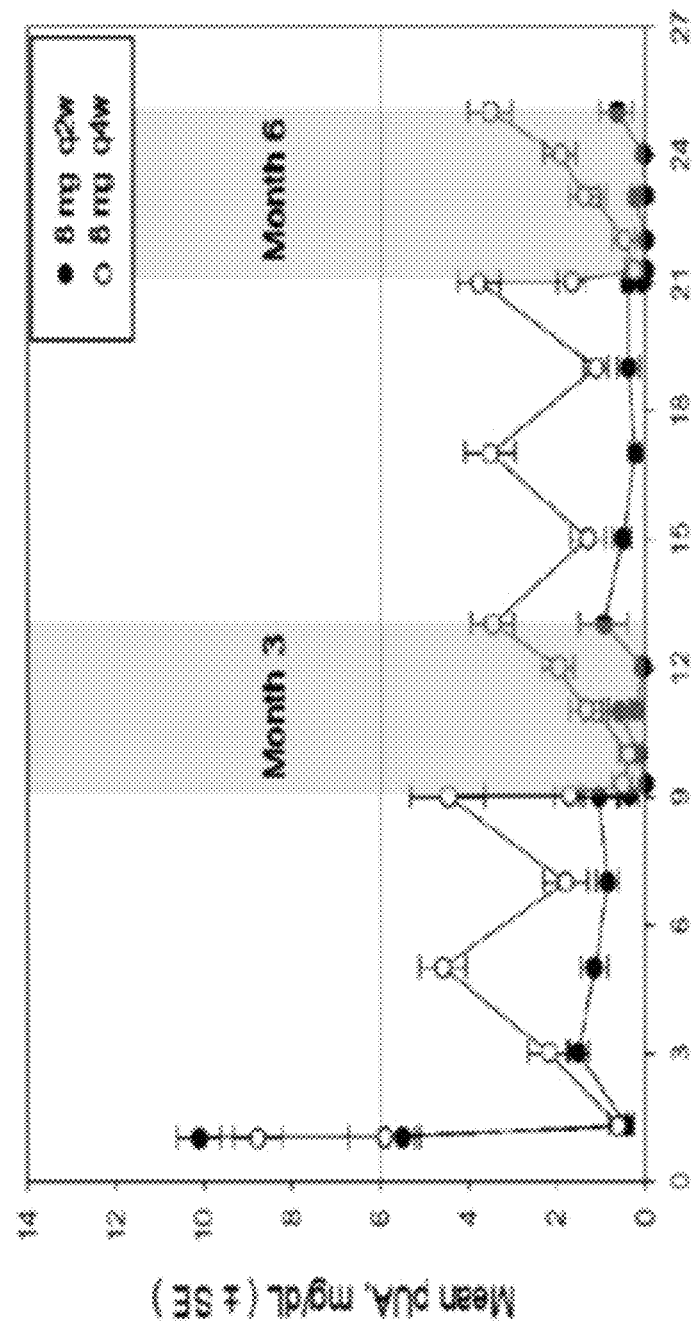

REDUCING IMMUNOGENICITY TO PEGLOTICASE

CROSS REFERENCE TO RELATED APPLICATIONS

This application is a continuation of U.S. application Ser. No. 16/777,646, filed Jan. 30, 2020, which claims the benefit of U.S. Provisional Patent Application No. 62/798,786, filed Jan. 30, 2019, U.S. Provisional Patent Application No. 62/855,519, filed May 31, 2019, and U.S. Provisional Patent Application No. 62/903,570, filed Sep. 20, 2019, the disclosures of which are incorporated by reference herein in their entireties.

FIELD OF THE DISCLOSURE

Gout affects approximately 4% of the U.S. population, is the most common form of inflammatory arthritis in men, and is associated with decreased quality of life. The frequency of gout is increasing worldwide, with prevalence rates estimated to be as high as 7% in older men. It is estimated that up to 400,000 (up to 5% of the estimated 8 million persons with gout) in the United States experience chronic refractory gout, characterized by ongoing symptoms of active disease and a failure to control/maintain serum urate<6 mg/dL with conventional xanthine oxidase inhibitors (i.e., allopurinol and febuxostat) and uricosuric agents (i.e., probenecid). These patients often have significant, disabling urate deposits in soft tissues and bone known as tophi.

Uric acid (UA) is the end metabolite in the human purine catabolic pathway. When the concentration of serum uric acid (SUA) is above the biochemical limit of solubility, 6.8 mg/dL, monosodium urate crystals may precipitate in tissues. It is hypothesized that after many years of persistent hyperuricemia, accumulation of monosodium urate crystals causes symptoms of gout, such as acute inflammation of joints (gout flare), formation of gout tophi, gouty arthritis, and UA nephropathy (including UA renal stones). Control of chronic gout cannot be achieved without maintaining SUA<6 mg/dL. A total of 8.3 million patients have been diagnosed with gout in the United States. The principal pharmaceutical approach to the treatment of gout is the use of the xanthine oxidase inhibitors, allopurinol, and febuxostat, to block the synthesis of UA. Approximately 2% of patients treated with allopurinol develop allergic reactions and a severe hypersensitivity syndrome occurs in about 0.4% of the patients. Patients with medical contraindications to xanthine oxidase inhibitors because of allergy/hypersensitivity, or who have failed to normalize SUA at maximum medically appropriate doses of these medications, can go on to develop chronic gout.

Pegloticase or PEGylated uricase (KRYSTEXXA®; "KXX") is a monomethoxypoly(ethylene glycol) (PEG) modified recombinant mammalian uricase (urate oxidase) which reduces levels of UA in the serum (or plasma) by catalyzing its conversion to allantoin, a water-soluble metabolite more readily excreted in the urine than uric acid. Pegloticase provides a new therapeutic mechanism to reduce SUA in patients with chronic gout refractory to conventional oral therapy. These patients experience a severe burden of gout disease characterized by tophi (approximately 70%), frequent and often crippling flares (approximately 7 per year), and deforming arthritis. Pegloticase provides medical benefits in patients who respond by lowering SUA and by reducing tophus burden in these patients who currently have no therapeutic options.

Seven clinical studies have been conducted with pegloticase in patients with refractory chronic gout. The Phase 1 program established an acceptable profile of tolerability and safety for intravenous (IV) dosing, whereas subcutaneous dose administration was less well tolerated. The Phase 2 program identified a minimally effective dose (4 mg), a dose-response plateau dose (12 mg), a safe and optimally effective dose (8 mg), and a once every 2 weeks or once every 4 weeks dosing regimen.

Two randomized, double-blind, placebo-controlled, multi-center, 6-month safety and efficacy Phase 3 studies have been conducted in a total of 225 hyperuricemic patients (SUA>8 mg/dL) with symptomatic gout who reported contraindication to or who had failed to normalize SUA with allopurinol therapy. The pooled efficacy results showed improvements in tophus burden consistent with urate-lowering effect of pegloticase in both dose groups. Improvements were more rapid in patients who received pegloticase 8 mg every 2 weeks compared to every 4 weeks and met the outcomes data of complete resolution of at least 1 tophus with no new or progressive tophi as assessed by blinded assessment of digital photographs of target tophi.

The pooled safety results from these Phase 3 studies showed that gout flares were more common in the pegloticase groups than in the placebo group during the first 3 months of therapy, a physiological effect resulting from SUA-lowering which is commonly observed upon the initiation of all urate-lowering therapies. During the second 3 months of treatment, a lower proportion of pegloticase-treated patients experienced flares than patients receiving placebo. The incidence of flares during this period was lowest in the group receiving pegloticase 8 mg every 2 weeks than in the group who received pegloticase 8 mg every 4 weeks, as was the incidence of infusion-related reactions (26% with biweekly dosing vs. 40% with the every-4-week dosing regimen). Both infusion reactions (IRs) and gout flares were least common in patients with sustained urate-lowering responses to treatment and those who received bi-weekly treatment. In most pegloticase-treated patients with IRs, a loss of response to pegloticase (return to SUA>6 mg/dL) preceded the time of the first IR (20/21; 95%).

A relationship between the loss of urate-lowering efficacy, incidence of IRs, and high-titer antibody formation was identified in a post-hoc analysis of the pooled data from the Phase 3 studies. Patients with high anti-pegloticase antibody titers (>1:2430) showed a loss of pegloticase activity attributed to a more rapid clearance of drug in the presence of these antibodies. In one study, 69 (41%) of 169 patients receiving pegloticase developed high titer anti-pegloticase antibodies and subsequently lost response to the drug. In a second study, only 1 of 52 participants with high antibody titers maintained a response to pegloticase (serum urate<6 mg/dL). In addition, 60% participants with high titers developed IR. Anti-pegloticase antibodies were largely directed to the polyethylene glycol (PEG) portion of the molecule and altered the pharmacokinetic clearance of pegloticase, resulting in inhibition of SUA lowering activity. In another study, only 7 of 65 patients (10.8%) with an antibody titer exceeding 1:2430 at any time during treatment maintained a response to pegloticase compared with 89.2% (58/65) who had never had an antibody titer above that level. In addition, 31 of 52 (60%) patients with titers exceeding 1:2430 developed IRs. The ability of pegloticase to induce antibody production demonstrated the antigenic potential of the drug, and thus raised the possibility that relatively large or more frequent doses of pegloticase (antigen) might reduce antibody formation by induction of antigen-specific non-responsiveness (high zone tolerance). By preventing the formation of anti-pegloticase antibodies, a tolerizing dose regimen should prevent loss of response to the drug and decrease the incidence of IRs associated with it.

As described herein, an alternate approach to prevent immunogenicity by pegloticase and therefore reduce the incidence of IRs, as well as to enhance the response rate seen with pegloticase alone in adults with uncontrolled gout, is co-administration or concomitant administration of pegloticase and an immunosuppressive agent. As described herein, one such immunosuppressive agent is methotrexate (MTX) immunosuppressive therapy.

The long-term safety of pegloticase has been demonstrated in an open-label extension study that enrolled 151 patients: 149 received pegloticase either bi-weekly or every 4 weeks for up to 30 months and 2 chose observation only. No new safety signals were observed and ongoing patient benefit in several clinical outcome measures was maintained beyond the 6-month period of the double-blind studies.

In one aspect, the disclosure provides a method of treating gout in a patient having a serum uric acid level of ≥6 mg/dL comprising: administering MTX to said patient at a dose of 15 mg per week for a period of 4 weeks prior to the first administration of a PEGylated uricase; co-administering the PEGylated uricase and MTX to said patient using a dosage regimen comprising a dose of 8 mg of the PEGylated uricase intravenously every 2 weeks for a total of 26 doses; and a dose of 15 mg of MTX per week, wherein the co-administered MTX is administered concurrently with each administration of the PEGylated uricase.

In another aspect, the disclosure provides a method of reducing immunogenicity to a PEGylated uricase and prolonging the urate lowering effect comprising co-administration of the PEGylated uricase at a dosage of 8 mg intravenously every 2 weeks and MTX at a dosage of 15 mg per week to a patient having a serum uric acid level of >6 mg/dL prior to PEGylated uricase treatment initiation; wherein the co-administration of the PEGylated uricase and MTX result in the serum uric acid level being normalized relative to a patient not receiving co-administration of the PEGylated uricase and MTX immunosuppressive therapy.

In one embodiment, these methods further comprise an altered dosage of MTX, wherein the altered dosage comprises increasing folic acid; or dividing the dosage of MTX; or reducing the dosage of MTX, wherein the altered dosage of MTX is based on the development of laboratory findings as provided in Table 1. In another embodiment, a method as described herein further comprises a prophylactic regimen of colchicine for a period of at least 2 weeks prior to the first administration of the PEGylated uricase. In another embodiment, wherein the SUA levels of the patient are determined prior to each dose of the PEGylated uricase. In another embodiment, such a method further comprises measuring one or more of trough PEGylated uricase levels, anti-PEGylated uricase antibody levels, and anti-PEG antibody levels, prior to each dose of the PEGylated uricase after the first dose.

In another embodiment, any of such methods further comprises measuring serum uric acid (SUA) levels, hematology, and/or liver function tests on a weekly basis during treatment. In another embodiment, blood tests may be performed every other week, or every third week. For example, blood tests may be performed at screening, at weeks 0 (baseline), 3, 5, 7, 9, 11, 13, 15, 17, 19, 21, 23. In another embodiment, blood tests may be performed for any purpose (i.e., hematology or clinical chemistry) at screening, baseline, week 12, and week 26. In some embodiments, a blood test as described herein may be performed on the same day each week or may be performed within 1 or 2 or 3 days of the previous blood test performed. Blood tests may be drawn for any blood tests described herein within 24 hours prior to administration of KXX or from about 1 to about 3 days prior to each KXX infusion.

For determination of serum uric acid, if the SUA is >6 mg/dL, the subject may not be dosed and the SUA may be repeated. In some embodiments, if the SUA is >6 mg/dL, a subject may be withdrawn from the study. In other embodiments, samples that result in discordant results between laboratories may be evaluated to discuss whether the subject should continue on the study drug or discontinue dosing.

In another embodiment, said co-administration of the PEGylated uricase and MTX results in normalization of the SUA level in the patient relative to a patient not receiving co-administration of the PEGylated uricase and MTX. In another embodiment, the SUA level is reduced to less than 6 mg/dL as a result of co-administration of the PEGylated uricase and MTX. In another embodiment, the SUA level is reduced to less than 5 mg/dL as a result of co-administration of the PEGylated uricase and MTX. In another embodiment, the SUA level is reduced to less than 2 mg/dL as a result of co-administration of the PEGylated uricase and MTX.

In another embodiment, the incidence of infusion reaction, gout flare, or anaphylaxis is reduced as a result of co-administration of the PEGylated uricase and MTX. In another embodiment, the level of MTX metabolite is increased relative to a patient not receiving co-administration of the PEGylated uricase and MTX.

In another embodiment, such a method further comprises measuring one or more of peripheral joint urate deposition volume and inflammatory volume via any advanced imaging technique. In another embodiment, peripheral joint urate deposition volume is reduced in the patient relative to a patient not receiving treatment using co-administration of the PEGylated uricase and MTX. In another embodiment, peripheral joint urate deposition volume is determined by dual-energy computed tomography (DECT) scanning. In another embodiment, peripheral joint urate deposition volume is determined by ultrasound.

In another embodiment, inflammatory volume is reduced in the patient relative to a patient not receiving treatment using co-administration of the PEGylated uricase and MTX. In another embodiment, inflammatory volume is determined by Dynamic Contrast Enhanced—Magnetic Resonance Imaging (DCE-MRI) or Mill without contrast, or both.

In another embodiment, the mean titer of anti-PEGylated uricase antibodies is less than or equal to 1:6000 as a result of co-administration of the PEGylated uricase and MTX treatment. In another embodiment, the serum uric acid level is normalized by week 12 after co-administration of the PEGylated uricase and MTX treatment begins.

These and other embodiments of the disclosure are described in detail below.

BRIEF DESCRIPTION OF THE DRAWINGS

FIG. 1 shows a graph of the urate reducing efficacy of pegloticase.

DETAILED DESCRIPTION

Overview

In one embodiment, the disclosure provides a method of treating gout in a patient having a serum uric acid level of ≥6 mg/dL comprising: administering methotrexate (MTX) to said patient at a dose of 15 mg per week for a period of 4 weeks prior to the first administration of a PEGylated uricase; co-administering the PEGylated uricase and MTX to said patient using a dosage regimen comprising a dose of 8 mg of the PEGylated uricase intravenously every 2 weeks for a total of 26 doses; and a dose of 15 mg MTX per week, wherein the co-administered MTX is administered concurrently with each administration of the PEGylated uricase. In another embodiment, the disclosure provides a method of reducing or preventing loss of response to a PEGylated uricase and prolonging the urate lowering effect comprising co-administration of the PEGylated uricase at a dosage of 8 mg intravenously every 2 weeks and MTX at a dosage of 15 mg per week to a patient having a serum uric acid level of ≥6 mg/dL prior to PEGylated uricase treatment initiation; wherein the administration of the PEGylated uricase and MTX result in the serum uric acid level being normalized relative to a patient not receiving co-administration of the PEGylated uricase and MTX immunosuppressive therapy.

KRYSTEXXA® (Pegloticase)

KRYSTEXXA® ("KXX," pegloticase) is a uric acid specific enzyme, which is a PEGylated product that consists of recombinant modified mammalian urate oxidase (uricase) produced by a genetically modified strain of *Escherichia coli*. KXX is indicated for the treatment of chronic gout in patients that are refractory to conventional therapy. KXX® is described at least in U.S. Pat. Nos. 8,188,224; 7,811,800; 9,534,013; 6,576,235; 9,377,454; 6,783,965; as well as PCT Publ. No. WO 2018/089808, each of which is incorporated herein in its entirety. In some embodiments, non-mammalian uricases may be used as deemed appropriate, or a uricase from any species. In other embodiments, muteins of a uricase as described herein, having an altered amino acid sequence, may be used and are encompassed within the present disclosure.

Certain uricases are useful for preparing conjugates with various forms of poly(ethylene glycol) or poly(ethylene oxide) (both referred to as PEG) to produce therapeutically efficacious forms of uricase having increased protein half-life and reduced immunogenicity. Thus, in some embodiments, uricase is covalently conjugated to monomethoxy-poly(ethylene glycol) [mPEG] (10 kDa molecular weight). The cDNA coding for uricase is based on mammalian sequences. Each uricase subunit has a molecular weight of approximately 34 kDa per subunit. The average molecular weight of pegloticase (tetrameric enzyme conjugated to mPEG) is approximately 540 kDa.

In some embodiments, a uricase as described herein may be conjugated to any desired number of PEG or mPEG molecules, such as 1, 2, 3, 4, 5, 6, 7, 8, 9, 10, 11, 12, 13, 14, or the like. In other embodiments, a uricase as described herein may be conjugated to other modifiers in addition to, or alternatively to, PEG or mPEG. Such PEG or mPEG molecules may be attached to a uricase using any means appropriate in accordance with the disclosure. For example, a PEG or mPEG molecule may be conjugated to a uricase as described herein by a cysteine residue, or a serine residue, or a lysine residue. A PEG or mPEG may be attached to a uricase as described herein using any specific amino acid in accordance with the disclosure.

In other embodiments, a uricase of the present disclosure may be modified with a non-PEG modification. For example, one or more residues of proline, alanine, and/or serine (PAS), or combinations thereof, referred to herein as PASylation. In other embodiments, a uricase as described herein may be modified by conjugation with an antibody, a protein, or a small molecule, or may be conjugated to poly(2-ethyl-2-oxazoline) referred to herein as POZylation. In other embodiments, a uricase may be modified at the amine end or the carboxy end, or both. In other embodiments, any other modifiers deemed appropriate may be used to extend the half-life in circulation in accordance with the present disclosure.

Mode of Action of KXX

KXX achieves its therapeutic effect by catalyzing the oxidation of uric acid to allantoin, thereby lowering serum uric acid. Allantoin is an inert and water-soluble purine metabolite. It is readily eliminated, primarily by renal excretion.

KXX (pegloticase) concentrations are expressed as concentrations of uricase protein. Each mL of KXX contains 8 mg of uricase protein (conjugated to 24 mg of 10 kDa mPEG), 2.18 mg Disodium Hydrogen Phosphate Dihydrate ($Na_2HPO_4 \cdot 2H_2O$), 8.77 mg Sodium Chloride (NaCl), 0.43 mg Sodium Dihydrogen Phosphate Dihydrate ($NaH_2PO_4 \cdot 2H_2O$), and Water for Injection to deliver 8 mg of pegloticase (as uricase protein).

KXX was granted orphan designation by the FDA on Feb. 21, 2001 (ODA #00-1356) and KXX 8 mg every 2 weeks by IV infusion was approved by the United States (US) FDA on Sep. 14, 2010 for the treatment of adult patients with chronic gout refractory to conventional therapy. Since pegloticase was approved in the US, there have been no new safety signals reported to Horizon Pharma, PLC (Horizon) the manufacturer of KXX. The most common adverse events continue to be IRs, anaphylaxis, and gout flares. Post-marketing safety information suggests that the concomitant use of pegloticase with urate-lowering agents may mask the detection of patients who have lost therapeutic response to the drug and increase the risk of IR and/or anaphylaxis. Pegloticase is contraindicated in patients with glucose-6-phosphate dehydrogenase (G6PD) deficiency because of the risk of hemolysis and methemoglobinemia.

Treatment of Patients with KXX

KXX treatment may be initiated with monitoring of SUA levels prior to each infusion. In some embodiments, KXX therapy may be discontinued if the SUA levels increase to above 6 mg/dL, particularly when 2 consecutive levels above 6 mg/dL are observed, or when SUA levels at 2 consecutive visits are above 6 mg/dL.

In addition, to reduce the incidence of infusion reactions, adverse events (AEs), such as gout flare, or serious adverse events (SAEs) such as anaphylaxis, patients may be pre-medicated with antihistamines and/or corticosteroids. AEs and SAEs are described in detail below. Anaphylaxis or other IRs may occur with any infusion, including a first infusion, or any subsequent infusion, and generally manifests within 2 hours of the infusion. Delayed-type hypersensitivity reactions may also occur. The most common adverse reactions (occurring in about 5% or more of KXX-treated patients) are gout flares, infusion reactions, nausea, contusion or ecchymosis, nasopharyngitis, constipation, chest pain, anaphylaxis, and vomiting. Additional monitoring of patients during and after infusion may be beneficial to prevent or detect such reactions. In some embodiments, patients are monitored for one hour or more following administration of KXX. In some embodiments, gout flare prophylaxis may be recommended for patients when treating with KXX. For example, gout flare prophylaxis may be recommended for a period of about the first six months of KXX therapy.

In some embodiments, patients or subjects receiving KXX therapy, either alone or co-administered with an immunosuppressive agent, may experience exacerbation of congestive heart failure. For such patients, close monitoring after infusion may be beneficial.

In some embodiments, and to prevent or manage reactions to KXX therapy, such as anaphylaxis and/or infusion reactions, KXX may be administered in a healthcare setting and by a healthcare provider. The KXX admixture may be administered by intravenous infusion over a minimum of 120 minutes via gravity feed, syringe-type pump, or infusion pump. As described in detail below, KXX may be administered alone to a patient, or may be co-administered to a patient or subject with an immunosuppressive agent such as methotrexate (MTX). In some embodiments, KXX may be administered in a healthcare setting as described herein, and an immunosuppressive agent may be administered at home. In other embodiments, both KXX and an immunosuppressive agent such as MTX may be administered in a healthcare setting.

In some embodiments, pre-screening of patients or subjects to be administered KXX, either alone of co-administered with an immunosuppressive agent, such as MTX, for the presence of, or a risk for developing glucose-6-phosphate dehydrogenase (G6PD) deficiency may be beneficial. Such patients may be excluded from treatment with KXX because of a risk of hemolysis and/or methemoglobinemia.

In some embodiments, KXX, either alone, or in combination with an immunosuppressive agent or therapy, may be used to treat a patient with gout as described herein.

Dosage of KXX

In some embodiments, KXX may be administered at a dosage of 0.5 to 24 mg of uricase in solution every 2 to 4 weeks. The uricase may be administered in any appropriate way known to one of skill in the art, for example intravenously, intramuscularly or subcutaneously. In some embodiments, when the administration is intravenous, 0.5 to 12 mg of uricase is administered. In some embodiments, when the administration is subcutaneous, 4 to 24 mg of uricase is administered. In some embodiments, the uricase is administered by intravenous infusion over a 30- to 240-minute period. In some embodiments, 8 mg of uricase is administered once every two weeks. The recommended dose and regimen of KXX for adult patients is 8 mg (uricase protein) given as an intravenous (IV) infusion every two weeks. The optimal treatment duration with KXX has not been established. KXX is a sterile, clear, colorless solution containing 8 mg/mL pegloticase in phosphate-buffered saline, and it intended for intravenous infusion.

Dosage Forms of KXX

KXX may be provided in a 1-mL sterile concentrate for dilution containing 8 mg of pegloticase protein, expressed in uricase protein amounts.

Methotrexate (MTX)

It some embodiments, as described herein, KXX may be administered alone as a treatment, or may be co-administered with an immunosuppressive or immunomodulatory agent, such as MTX. In some embodiments, a course of MTX can mitigate immunogenicity to pegloticase, and/or enhance the response rate seen with pegloticase alone in adults with uncontrolled gout. In some embodiments, MTX may be administered to patients receiving KXX to prevent the formation of anti-KXX antibodies. Development of anti-KXX antibodies may increase the clearance of KXX, thereby causing loss of a drug response in the patient.

To the Inventors' knowledge, this was the first study to test the hypothesis that immunogenicity to pegloticase can be attenuated via MTX, and that the response rate seen with KXX alone in adults with uncontrolled gout can be enhanced by combining KXX with MTX. For this study, MTX was co-administered with KXX to patients or subjects to improve treatment efficacy and reduce IR in patients being treated for chronic refractory gout as an innovative approach to gout management with pegloticase. New strategies to deal with the growing burden of gout and to improve use of existing therapies are urgently needed and the present disclosure represents a novel approach addressing both clinical and immunological questions. In some embodiments, MTX may be administered for a specified period before KXX treatment begins (i.e., pre-dosing of MTX), which may be referred to herein as an MTX "lead-in" period. A lead-in period may begin, for example, 8 weeks, 7 weeks, 6 weeks, 5 weeks, 4 weeks, 3 weeks, 2 weeks, 1 week, 6 days, 5 days, 4 days, 3 days, 2 days, or 1 day prior to KXX treatment, at a dosage as described herein. In some embodiments, such a pre-dosing period may begin at week −4 (i.e., 4 weeks prior to KXX treatment begins) and continue for as long as deemed appropriate or beneficial. In some embodiments, an MTX lead-in period may continue from week −4 through day 1 of KXX treatment. In some embodiments, MTX may be administered after the lead-in period and for the duration of KXX treatment as described herein.

In some embodiments, MTX may be administered to the patient in any form, either orally or subcutaneously, and at any dose deemed appropriate by a clinician or practitioner. For subcutaneous administration, an auto-injector may be used by a patient or subject, or may be used by a clinician or practitioner. In some embodiments, oral MTX exposure plateaus at doses of greater than or equal to 15 mg/week. Thus, in some embodiments, the dosage of MTX used in the present study is 15 mg per week, administered orally. In other embodiments, MTX may be administered at a dosage of 15 mg per week, administered subcutaneously. One of skill in the art will understand that different routes of administration may be used without deviating from the scope of the disclosure.

Such a dosage may be administered to a patient to prevent or control immunogenicity to KXX or associated AEs, SAES, or IRs occurring as a result of KXX treatment. In some embodiments, such a dosage may also be administered to enhance the response rate seen with pegloticase alone in adults with uncontrolled gout. In some embodiments, MTX may be administered to a patient starting when the serum uric acid level is greater than 6 mg/dL. Alternate dosages of MTX may be used as deemed appropriate by a clinician. For example, MTX may be administered at a dosage of 1.0 mg, 1.5 mg, 2.0 mg, 2.5 mg, 3.0 mg, 3.3 mg, 3.5 mg, 4.0 mg, 4.5 mg, 5.0 mg, 5.5 mg, 6.0 mg, 6.5 mg, 7.0 mg, 7.5 mg, 8.0 mg, 8.5 mg, 9.0 mg, 9.5 mg, 10.0 mg, 10.5 mg, 11.0 mg, 11.5 mg. 12.0 mg, 12.5 mg, 13.0 mg, 13.5 mg, 14.0 mg, 14.5 mg, 15.0 mg, 15.5 mg, 16.5 mg, 17.0 mg, 17.5 mg, 18.0 mg, 18.5 mg, 19.0 mg, 19.5 mg, 20.0 mg, 20.5 mg, 21.0 mg, 21.5 mg, 22.0 mg, 22.5 mg, 23.0 mg, 23.5 mg, 24.0 mg, 24.5 mg, 25 mg, 50 mg, 75 mg, 100 mg, 125 mg, 150 mg, 175 mg, 200 mg, or the like. In some embodiments, the dosage may be from 10 mg to 25 mg, 15 mg to 30 mg, 5 mg to 50 mg, or the like. In some embodiments, a maximum dose of 20 mg of MTX may be administered to a patient per week.

In some embodiments, MTX dosages may be altered or down-titrated as necessary in the event of gastrointestinal distress, central nervous system symptoms, or elevation in liver function tests. In some embodiments, for subjects experiencing adverse symptoms as described above, folic acid supplementation may be initiated or increased, or the dosage of MTX may be divided into two doses on the same day. In some embodiments, the dosage of MTX may be reduced to, for example, 10 mg in such subjects. In some embodiments, a temporary stop of MTX may be ordered for the patient or subject.

Table 1 below provides lab parameters that may be used to determine the dosage of MTX. The most common reasons to have a temporary stop are typically laboratory based (e.g., increased liver function tests, a decline in renal function, or a decline in white blood cells) or clinical, such as for gastrointestinal-related symptoms, infections, or other intolerance.

In some embodiments, if liver tests or renal tests become slightly abnormal or changed from baseline, the dosage of MTX may be reduced or temporarily stopped for 2-4 weeks. After re-evaluation of the laboratory tests, MTX may be restarted if appropriate. In other embodiments, a temporary stop of MTX may be ordered if an infection occurs, and maintained while the patient is on antibiotics, which is often 7-14 days unless the infection is severe. MTX may then be resumed if still clinically indicated.

For gastrointestinal symptoms or other tolerance issues, the dose of folic acid, which is given as a supplement to MTX to reduce side effects, may be reduced, or MTX may be held for 1-2 weeks if necessary.

TABLE 1

MTX Dose Guidance During Run-In Period and KXX + MTX Treatment Period

| Lab Parameters | Value | MTX Dose Change |
|---|---|---|
| WBC | $3.0 \times 10^9/L \sim 3.5 \times 10^9/L$ | Decrease to 10 mg |
|  | $<3.0 \times 10^9/L$ | Temporary stop |
| Platelets | $<50 \times 10^9/L$ | Temporary stop |
| Hematocrit | <27% | Temporary stop |
| AST/ALT | Between 1.5~2 × ULN | Decrease to 10 mg |
|  | >2 × ULN | Temporary stop |
| eGFR | <30 ml/min/1.73 m² | Temporary stop |
| New clinically important symptoms/signs* | Yes | Temporary stop |

In some embodiments, new clinically important symptoms or signs may also affect the dosage of MTX, such as rash or oral ulceration, persistent nausea, vomiting and diarrhea, new or increasing dyspnea or dry cough, or unexplained cough with fever, severe sore throat, abnormal bruising, severe headaches, fatigue, and problems concentrating, any other important medical events that might increase methotrexate toxicity or pre-dispose to new or worsening infection (e.g., undergoing surgery, hospitalization, being treated with antibiotics, having a clinical infection, developing new clinically significant pericardial/pleural effusion or ascites). In such cases, MTX may be temporarily stopped as deemed appropriate.

One of skill in the art will understand that dosages of drugs as described herein may be altered as needed for a patient or subject without deviating from the scope of the disclosure.

In other embodiments, MTX may be administered once per day, twice per day, 3 times per day, or more times per day as needed. In other embodiments, MTX may be administered every 2 days, or every 3 days, or every 4 days, or every 5 days, or every 6 days, or every 7 days, or every 8 days, or every 9 days, or every 10 days, or every 11 days, or every 12 days, or every 13 days, or every 14 days. In other embodiments, the drug may be administered one per week, twice per week, 3 times per week, 4 times per week, 5 times per week, 6 times per week, 7 times per week, 8 times per week, 9 times per week, 10 times per week, 11 times per week, 12 times per week, 13 times per week, 14 times per week, or the like. In some embodiments, different dosages or frequencies may be used on different days, as described herein.

Pharmacokinetic (PK) Analysis

In some embodiments, patients or subjects of the present disclosure may have blood samples taken for PK analysis during treatment with KXX, either alone, or co-administered with an immunosuppressive or immunomodulatory agent, such as MTX. Although limited PK results have been reported in subjects receiving pegloticase, and no PK studies have been performed in subjects weighing≥120 kg, the present disclosure provides PK analysis in patients receiving KXX treatment, either alone or co-administered with an immunosuppressive agent or therapy. Sundy et al. (JAMA 306(7):711-20, 2011) reported results from 24 subjects with refractory gout who received single doses from 0.5 to 12 mg of pegloticase. PK parameters included plasma uricase activity (pUox) and the plasma urate concentration (pUAc). In this study, the pUox half-life was 6.4 to 13.8 days. After doses of 4 to 12 mg, the pUAc fell within 24 to 72 hours, from a mean±SD value of 11.1±0.6 mg/dL to 1.0±0.5 mg/dL; the AUC value for the pUAc was equivalent to maintaining the pUAc at 1.2 to 4.7 mg/dL for 21 days post-infusion. It remains uncertain whether body mass affects drug distribution. Since pegloticase is administered as a single dose regardless of body mass, this is important to assess.

Joint Imaging

In some embodiments, joint imaging may be performed for patients or subjects receiving KXX, either alone or co-administered with immunosuppressive therapy, such as MTX. Clinical research has shown that measuring tophus volume alone in gout is incomplete as successful therapy also needs to be associated with a reduction in inflammation, chronic synovitis, acute flares and slowing the progression or even healing of bone erosion, and thus, application of all-inclusive measurements that can measure all parameters of the physiologic impact of urate deposition will allow for comprehensive assessment of chronic gout and the impact of treatment. In some embodiments, a sub-study may also be performed to assess the ability of DECT and DCE-MRI to measure treatment response to pegloticase in subjects with chronic refractory gout.

Co-Administration of KXX and Immunosuppressive Therapy

Immunogenicity in response to pegloticase therapy (anti-pegloticase antibodies) may give rise to low serum drug levels, loss of therapeutic response, poor drug survival, and/or adverse events (e.g., IR). The development of anti-drug antibodies can be influenced by drug- and treatment-related factors, as well as participant characteristics. A potential prophylactic strategy to manage anti-drug antibody response with biologic response modifiers is the co-administration of immune modulating therapy. Reduction of immunogenicity with concomitant administration of other biologic agents (e.g., methotrexate use with adalimumab, infliximab) has been attributed to two mechanisms: 1) an immune modulating effect downregulating B cell activation, differentiation, and immunoglobulin production, and 2) alteration in Fc gamma R-mediated clearance mechanisms leading to prolongation of the half-life of monoclonal antibodies.

Thus, in some embodiments, the addition of immune modulating therapy (i.e., co-administration of KXX with an immunosuppressive or immunomodulatory agent) with an induction regimen or loading dose provides additive benefit in abrogating immunogenicity associated with biologics. As described herein, the immune modulating agent, methotrexate (MTX), is beneficial for use as a therapy to improve treatment efficacy and reduce IR in patients being treated for chronic gout with KXX, and to enhance the response rate seen with pegloticase alone in adults with uncontrolled gout.

Various embodiments of the disclosure provide for treatment of gout or gout related symptoms by administering KXX, either alone or co-administered with an immunosuppressive or immunomodulatory agent. In some embodiments, KXX may be administered alone to a patient for treatment of gout. In other embodiments, KXX may be co-administered with an immunosuppressant, such as MTX, for a combined immunosuppressive therapy. As used herein, "immunosuppressive agent" may also be referred to as "immunosuppressant" or "immunosuppressive therapy." In some embodiments, an "immunosuppressant" may also be referred to herein as an "immunomodulatory agent."

Administration of an immunosuppressive drug may reduce or eliminate any immune reactions that may occur in the patient. An immune reaction that may be encountered in a drug treatment as described herein may be an allergic reaction or any associated symptoms, including, but not limited to, hives, itching, nasal congestion, rash, scratchy throat, watery or itchy eyes. Severe allergic reactions may have additional symptoms, including, but not limited to abdominal cramping or pain, pain or tightness in the chest, intestinal upset, dizziness, nausea, weakness, or the like. In some embodiments, a severe allergic reaction may include symptoms of anaphylaxis as described herein. Drug reactions may be referred to herein as adverse events (AEs), and may be mild AEs or may be serious AEs (SAES). Such combination of KXX and another drug, such as MTX, may reduce adverse events in a patient or subject. Thus, in some embodiments, administration of an immunosuppressive therapy with KXX may be beneficial for patients having gout or symptoms thereof. In some embodiments, a patient or subject may be an individual having a serum uric acid level of ≥6 mg/dL.

In some embodiments, co-administration of a PEGylated uricase as described herein and MTX results in normalization of the serum uric acid level in a patient relative to a patient not receiving co-administration of the PEGylated uricase and MTX. In some embodiments, the serum uric acid level may be reduced to less than 6 mg/dL as a result of co-administration of the PEGylated uricase and MTX. In other embodiments, the serum uric acid level may be reduced to less than 5 mg/dL as a result of co-administration of the PEGylated uricase and MTX. In another embodiment, the serum uric acid level is reduced to less than 2 mg/dL as a result of co-administration of the PEGylated uricase and MTX.

In some embodiments, patients or subjects weighing less than 120 kg may benefit from a particular dosage of KXX, or a particular dosage regiment, as described herein. For example, patients weighing less than 120 kg may be initially treated with a tolerizing dose of KXX, such as a dose of 8 mg KXX on a weekly basis for 3 weeks for a total of 3 doses. In some embodiments, such tolerizing dosage may be altered as deemed necessary by a clinician or practitioner.

Alternatively, for patients weighing greater than or equal to 120 kg, a tolerizing dose of KXX may include a dose of 8 mg, 12 mg, or 16 mg KXX intravenously at the first week of treatment for a total of one dose, followed by 8 mg intravenously on a weekly basis for 2 weeks after the first week of treatment, for a total of 2 doses. Such alternate dosing may be beneficial for patients having greater body weight, or a higher body mass index (BMI). In some embodiments, patients weighing greater than or equal to 120 kg may be grouped into treatment groups, with each group receiving a different tolerizing dosage of KXX. For example, one group may receive a tolerizing dose of 8 mg KXX, while another group may receive a tolerizing dose of 12 mg KXX, and still another group may receive a tolerizing dose of 16 mg KXX.

In some embodiments, KXX may be administered to a patient following a tolerizing dose at a dosage such as 8 mg by intravenous infusion every 2 weeks. This dosage may be continued for any period of time deemed appropriate by a clinician or practitioner. For example, 8 mg KXX may be given to a particular patient every 2 weeks following a tolerizing dosage regimen and lasting for a period of time totaling 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, 20 weeks, 21 weeks, 22 weeks, 23 weeks, 24 weeks, 25 weeks, 26 weeks, 27 weeks, 28 weeks, 29 weeks, 30 weeks, 31 weeks, 32 weeks, 33 weeks, 34 weeks, 35 weeks, 36 weeks, 37 weeks, 38 weeks, 39 weeks, 40 weeks, 41 weeks, 42 weeks, 43 weeks, 44 weeks, 45 weeks, 46 weeks, 47 weeks, 48 weeks, 49 weeks, 50 weeks, 51 weeks, 52 weeks, 53 weeks, 54 weeks, 55 weeks, 60 weeks, 65 weeks, 70 weeks, or the like. In some embodiments, KXX may be given to a patient for more than 6 months, or more than 7 months, or more than 8 months, or more than 9 months, or more than 10 months, or more than 11 months, or more than 12 months, or more than 13 months, or more than 14 months, or more than 15 months, or more than 18 months, or more than 24 months. In other embodiments, KXX may be given to a patient for any length of time deemed appropriate by a clinician or practitioner, and as described herein, for the remainder of the patient's life.

In some embodiments, the patient may be treated with KXX plus an immunosuppressive or immunomodulatory agent or therapy for at least one month. In some embodiments, the patient is treated for 2 months, 3 months, 4 months, 5 months, 6 months, 7 months, 8 months, 9 months, 10 months, 11 months, 12 months, 13 months, 14 months, 15 months, 18 months, 21 months, 24 months, 30 months, 36 months, or more. In some embodiments, the patient may be treated for up to 52 weeks, or 51 weeks, or 50 weeks, or 49 weeks, or 48 weeks, or 47 weeks, or 46 weeks, or 45 weeks, or 44 weeks, or 43 weeks, or 42 weeks, or 41 weeks, or 40 weeks, or 39 weeks, or 38 weeks, or 37 weeks, or 36 weeks, or 35 weeks, or 34 weeks, or 33 weeks, or 32 weeks, or 31 weeks, or 30 weeks, or 25 weeks, or 20 weeks, or 17 weeks, or 12 weeks, or 6 weeks, or 4 weeks, or 2 weeks, or 24 months, or up to 36 months, or up to 48 months. In some embodiments, the patient may be treated for more than 24 months. In some embodiments, the patient is treated with for the rest of the patient's life.

In some embodiments, a tolerizing dosage regimen as described herein may be combined with the use or co-administration of an immunosuppressive agent or therapy. Such a tolerizing dosage regimen may involve escalation of a dose of KXX and an immunosuppressive agent or therapy such that the patient or subject is able to better tolerate KXX or the dosage thereof. In other embodiments, such a tolerizing dosage regimen may involve increasing or escalating doses of KXX with a particular dose of an immunosuppressive agent or therapy. Such treatments may be employed for any duration as described herein.

In some embodiments, treatment with KXX either alone or co-administered with an immunosuppressive or immunomodulatory agent, may be continued as appropriate for any length of time, as long as the patient experiences an improvement in the symptoms or signs of gout. Such signs/symptoms of gout that may serve as a metric for improvement in disease severity may include, but are not limited to, serum uric acid level, peripheral joint urate deposition volume, and inflammatory volume. For example, KXX treatment, either alone, or co-administered with an immunosuppressive agent, such as MTX, may be monitored with regular assessment of the patient or subject before, during, and following treatment. Any number of diagnostic or evaluative testing procedures may be performed at any time, and at any frequency as deemed necessary by a clinician or practitioner.

KXX treatment typically is monitored using regular determination of the patient's SUA levels. A reduction in the serum uric acid level relative to the SUA in the patient before KXX treatment may generally be indicative of successful treatment with KXX, alone, or co-administered with an immunosuppressive agent or therapy, such as MTX, as described herein. Collection and measurement of a patient's serum uric acid levels are known to those of skill in the art. In some embodiments, the patient's serum uric acid levels are assayed before each KXX therapy. In some embodiments, any suitable method for collecting appropriate samples and methods of measuring or quantifying uric acid levels may be used in accordance with the disclosure.

Additional measurements to assess the efficacy and safety of KXX treatment may be used in accordance with the disclosure. These may include trough KXX levels, anti-KXX antibody levels, and/or anti-PEG antibody levels. In some embodiments, these measurements may be taken prior to each dose of KXX after the first dose. In other words, an initial dose of KXX may be administered to a patient without measurement of KXX levels, anti-KXX antibody levels, and/or anti-PEG antibody levels. Then, prior to each subsequent dose of KXX, such measurements may be taken as described herein. For treatment regiments wherein KXX is co-administered with an immunosuppressive agent or therapy, the same measurements may be taken at the same time periods, without deviating from the scope of the disclosure. Such measurements may be obtained from each patient as necessary to evaluate response to the treatment, or a lack thereof. Specific criteria for responders and non-responders to treatment with KXX are described in the Examples.

For example, in some embodiments, serum uric acid levels may be evaluated to assess the response rate of the patient to the KXX+MTX therapy or treatment. Some embodiments provide for lowering or normalization of the SUA levels to 6 mg/dL or below as described herein. Other embodiments provide for lowering or normalization of the SUA levels to 5 mg/dL or below as described herein. In some embodiments, certain objectives of the present disclosure and the studies described herein may include estimation of response rate during Month 3 (i.e., Weeks 10, 12 and 14) of KXX+MTX therapy, as measured by the sustained normalization of SUA to <6 mg/dL for at least 80% of the time during Month 3 in subjects receiving pegloticase with MTX. In some embodiments, estimation may be performed of the overall response rate, as measured by the sustained normalization of SUA to <6 mg/dL for at least 80% of the time during both Month 3 (Weeks 10, 12 and 14) and Month 6 (Weeks 20, 22 and 24) combined of KXX+MTX therapy in subjects receiving pegloticase with MTX. In other embodiments, estimation may be performed of the 5 mg/dL response rate during Month 3, during Month 6, and Overall (Months 3 and 6 combined), as measured by the sustained normalization of SUA to <5 mg/dL for at least 80% of the time in subjects receiving pegloticase with MTX. In some embodiments, estimation may be performed of the mean change from baseline to Weeks 14, 24, 36, and 52 in SUA for subjects receiving KXX+MTX. Such measurements and the methods for their collection and evaluation are described in detail in the Examples.

In some embodiments, when KXX is co-administered with an immunosuppressive agent or therapy, such as MTX, additional measurements for assessing the efficacy of treatment may be obtained. For example, trough methotrexate metabolite levels may be obtained for each patient or subject prior to each dose of KXX, as described herein. In other embodiments, measurement of hematology and liver function may be obtained for each patient on a weekly basis during treatment. This type of measurement may provide information to clinicians relating to the breakdown of the immunosuppressive agent in the patient's body.

In some embodiments, co-administration of KXX and methotrexate immunosuppressive therapy results in normalization of the serum uric acid level in the patient relative to a patient not receiving KXX and MTX immunosuppressive therapy. As used herein, "normalization" refers to lowering of the serum uric acid level similar to that found in normal healthy patients. In other embodiments, normalization may refer to SUA levels being reduced to levels similar to that found in patients not requiring KXX treatment or therapy. In some embodiments, the serum uric acid level is normalized after KXX and methotrexate immunosuppressive therapy begins.

In some embodiments, as described herein, the serum uric acid level in patients treated with KXX and an immunosuppressive therapy such as MTX is reduced to less than 6 mg/dL as a result of treatment, including, but not limited to, 6 mg/dL, 5.9 mg/dL, 5.8 mg/dL, 5.7 mg/dL, 5.6 mg/dL, 5.5 mg/dL, 5.4 mg/dL, 5.3 mg/dL, 5.2 mg/dL, 5.1 mg/dL, 5 mg/dL, 4.9 mg/dL, 4.8 mg/dL, 4.7 mg/dL, 4.6 mg/dL, 4.5 mg/dL, 4.4 mg/dL, 4.3 mg/dL, 4.2 mg/dL, 4.1 mg/dL, 4 mg/dL, 3.9 mg/dL, 3.8 mg/dL, 3.7 mg/dL, 3.6 mg/dL, 3.5 mg/dL, 3.4 mg/dL, 3.3 mg/dL, 3.2 mg/dL, 3.1 mg/dL, 3 mg/dL, 2.9 mg/dL, 2.8 mg/dL, 2.7 mg/dL, 2.6 mg/dL, 2.5 mg/dL, 2.4 mg/dL, 2.3 mg/dL, 2.2 mg/dL, 2.1 mg/dL, 2 mg/dL, 1.9 mg/dL, 1.8. mg/dL, 1.7 mg/dL, 1.6 mg/dL, 1.5 mg/dL, 1.4 mg/dL, 1.3 mg/dL, 1.2 mg/dL, 1.1 mg/dL, 1 mg/dL, or the like. In other embodiments, the serum uric acid level may be reduced to less than 5 mg/dL as a result of treatment. In still further embodiments, the serum uric acid level is reduced to less than 2 mg/dL as a result of KXX and methotrexate immunosuppressive therapy. Treatment with KXX plus an immunosuppressive therapy may be able to reduce the serum uric acid levels to levels that result in improvement of symptoms associated with gout as described herein.

In some embodiments, normalization of the SUA levels in a subject may be achieved within a specific amount of time as a measurement of success or efficacy. For example, in some embodiments, normalization of the SUA may be achieved by 2 weeks after initiation of treatment with KXX+MTX, such as by week 1, or week 2, or week 3, or week 4, or week 5, or week 6, or week 7, or week 8, or week 9, week 10, or week 11, or week 12, or week 13, or week 14, or week 15, week 16, or week 17, or week 18, or week 19, or week 20, or week 21, or week 22, or week 23, or week 24, or week 25, or week 26, or week 27, or week 28, or week 29, or week 30, or week 31, or week 32, or week 33, or week 34, or week 35, or week 36, or week 37, or week 38, or week 39, or week 40, or week 41, or week 42, or week 43, or week 44, or week 45, or week 46, or week 47, or week 48, or week 49, or week 50, or week 51, or week 52, or week 53, or week 54, or week 55, or week 56, or week 57, or week 58, or week 59, or week 60, or the like.

In some embodiments, treatment of a patient or subject with KXX plus an immunosuppressive or immunomodulatory agent such as MTX results in a reduction of the incidence of infusion reaction, gout flare, or anaphylaxis.

In some embodiments, the level of MTX metabolite is increased relative to a patient not receiving KXX and methotrexate immunosuppressive therapy.

In some embodiments, analysis of the efficacy of a method as described herein for treating gout may further comprise measurements to assess disease severity. For example, a diagnostic imaging test, such as including, but not limited to, computed tomography (CT), magnetic resonance imaging (MM), X-ray, ultrasound, positron emission tomography (PET), fluoroscopy, or the like.

In some embodiments, peripheral joint urate deposition volume and inflammatory volume may be measured in a patient and used to evaluate disease severity or to evaluate efficacy of the drug treatment. For example, in some embodiments, peripheral joint urate deposition volume is reduced in the patient relative to a patient not receiving KXX and methotrexate immunosuppressive therapy. In other embodiments, peripheral joint urate deposition volume is determined by dual-energy computed tomography (DECT) scanning. In other embodiments, inflammatory volume is reduced in the patient relative to a patient not receiving KXX and methotrexate immunosuppressive therapy. In other embodiments, inflammatory volume is determined by Dynamic Contrast Enhanced—Magnetic Resonance Imaging (DCE-MRI) or MM without contrast, or both.

In some embodiments, administration of KXX alone or co-administration of KXX with an immunosuppressive therapy or agent or with a drug having monomethoxypoly (ethylene glycol) (PEG) may elicit an immune reaction in the patient or subject. Evaluation of antibodies in a subject or patient receiving KXX therapy may provide an assessment of such an immune reaction to the drug treatment. For example, in some embodiments, determination of a mean titer of anti-KXX antibodies or anti-monomethoxypoly(ethylene glycol) (PEG) antibodies may be performed to determine an immune reaction in the patient or subject, or to determine the efficacy of immunosuppressive therapy. In some embodiments, a mean titer of anti-KXX antibodies may be determined for a patient. In other embodiments, a mean titer of anti-monomethoxypoly(ethylene glycol) (PEG) antibodies may be determined. In some embodiments, antibody titers may be any value determined by any appropriate measurements or analyses. Antibody titers in a patient as used herein are a metric for and may indicate an immune response to a drug such as KXX. In some embodiments, an antibody titer as described herein may refer to antibodies in a patient directed against KXX or PEG. In some embodiments, an anti-KXX or anti-PEG mean antibody titer may be less than or equal to about 1:6000 as a result of KXX administration. For example, an antibody titer for a patient receiving KXX therapy, either alone or in combination with MTX, may be less than or equal to about 1:100, about 1:200, about 1:300, about 1:400, about 1:500, about 1:600, about 1:700, about 1:800, about 1:900, about 1:1000, about 1:2000, about 1:3000, about 1:4000, about 1:5000, about 1:6000, about 1:7000, about 1:8000, about 1:9000, about 1:10000, or the like. In some embodiments, a responder may have an anti-KXX antibody titer of about 1:837±1687, or about 1:4211, or about 1:5898. In other embodiments, the antibody titers recited above may generally be found in patients who exhibit a positive response to KXX therapy (i.e., a responder). In some embodiments, a non-responder may have substantially or significantly higher antibody titers, for example, less than or equal to about 1:30000, about 1:40000, about 1:50000, about 1:60000, about 1:70000, about 1:80000, about 1:90000, about 1:100000, about 1:150000, about 1:200000, about 1:250000, about 1:300000, about 1:350000, about 1:400000, about 1:450000, about 1:500000, or the like. In some embodiments, a non-responder may have an anti-KXX antibody titer of about 1:34528±42,228. In other embodiments, such antibody titers may be determined for KXX treatment alone or may be determined for KXX+MTX immunosuppressive therapy. Anti-KXX or anti-PEG mean antibody titers as a result of KXX and MTX immunosuppressive therapy may be beneficially maintained at or below any threshold value tolerable for the patient.

In some embodiments, anti-drug antibody titers may be reduced as a result of use of an immunosuppressive agent or therapy, such as MTX as described herein. In other embodiments, the titer of specific types of antibodies may be reduced. For example, in some embodiments, the levels or titer of any specific type of antibodies may be reduced as a result of KXX co-administered with an immunosuppressive agent or therapy, such as IgG antibodies, IgA antibodies, IgM antibodies, IgD antibodies, IgE antibodies, or combinations thereof.

In some embodiments, evaluation of antibody titers may be beneficial for patients receiving KXX, either alone, or co-administered with an immunosuppressive agent or therapy such as MTX, for the first time. In other embodiments, evaluation of antibody titers may be beneficial for patients who have developed anti-KXX antibodies, or who have been classified as non-responders to KXX treatment. Criteria for classifying a patient or subject as a responder or a non-responder are described herein elsewhere.

In some embodiments, heavier and/or younger patients may have a higher incidence of anti-KXX antibodies, or may have higher anti-KXX drug titers, than lighter and/or older patients. In other embodiments, lighter and/or older patients may have higher drug loading of KXX than heavier and/or younger patients. In some embodiments, lighter patients may have higher exposures of KXX than heavier patients. For example, in some embodiments, lighter patients may have greater than 2-fold exposure to KXX than heavier patients. In some embodiments, lower drug levels in a patient may result in anti-KXX antibodies. For example, the mean area under the curve (AUC) for lighter patients may be about 8.92 mg/L versus about 4.04 mg/L in heavier patients. In other embodiments, older patients may have higher exposures of KXX than younger patients. For example, in some embodiments, older patients may have greater than 2-fold exposure to KXX than younger patients. In some embodiments, the mean area AUC for older patients may be about 8.86 mg/L versus about 3.93 mg/L in younger patients, indicating that younger patients may have a more robust immune system. Thus, in some embodiments, additional 8-mg doses of KXX may be beneficial for younger and/or heavier patients. In other embodiments, younger and/or heavier patients may benefit from one or more loading doses of 16 mg of KXX.

In some embodiments, production of anti-drug antibodies, such as antibodies to KXX, may be reduced or eliminated by increasing the amount of KXX delivered to a patient, i.e., maintaining higher trough levels of KXX in a patient. Higher trough levels of KXX may reduce anti-drug antibody production. In some embodiments, possible dosing strategies for increasing the amount of KXX delivered to a patient, and thus producing higher trough levels in the patient, may include reducing the interval between doses of KXX, or using higher doses at the beginning of and/or during treatment. Another possible strategy for reducing anti-KXX antibodies is the use of immunomodulators, such as MTX, as described herein. Immunomodulators may reduce or eliminate an immune response to unfamiliar proteins. One of skill in the art will understand that other immunomodulators may be used with similar results, including, but not limited to, corticosteroids (i.e., prednisone), Rapimmune, myophenolate, methotrexate, or the like.

The methods disclosed herein presume that the patient is effectively receiving all the prescribed dose. In some embodiments, depending on the age of the patient, it may be difficult to deliver a drug to a patient, for example when administering a drug to an infant and, therefore, the compliance and effectiveness of drug delivery by the patient's parent(s), guardian(s), or health care provider(s) may also be assessed.

Definitions

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

As used in this specification and the appended claims, the singular forms "a," "an," and "the" include plural referents unless the context clearly dictates otherwise. Thus, for example, "an active agent" refers not only to a single active agent but also to a combination of two or more different active agents, "a dosage form" refers to a combination of dosage forms as well as to a single dosage form, and the like.

Unless defined otherwise, all technical and scientific terms used herein have the meaning commonly understood by one of ordinary skill in the art to which the disclosure pertains. Specific terminology of importance to the description of the present disclosure is defined below.

As used herein "KXX" may be used interchangeably with KRYSTEXXA® or pegloticase. Likewise, as used herein, "Pegloticase+IMM Period" may also be referred to herein as "KXX+IMM Period."

"IMM" as used herein refers to an immunomodulatory agent, such as MTX as described herein. As such, IMM may also be used interchangeably herein with MTX. Therefore, "Pegloticase+IMM Period" or other similar terminology refers to the presently described co-administration or concomitant administration of KXX and MTX.

As used herein, an "adverse event" or "AE" refers to any untoward medical occurrence associated with the use of a drug in humans, whether it is considered drug-related or not. An AE or suspected adverse reaction is considered a "serious adverse event" or "SAE" if, in the view of either the Investigator or Sponsor, it results in any of the following outcomes: (1) Death, (2) Life-threatening: an AE is considered "life-threatening" if, in the view of either the Investigator or Sponsor, its occurrence places the subject or subject at immediate risk of death. It does not include an AE that, had it occurred in a more severe form, might have caused death; (3) Inpatient hospitalization or prolongation of existing hospitalization; (4) A persistent or significant incapacity or substantial disruption of the ability to conduct normal life functions. (5) A congenital anomaly/birth defect; (6) Important medical events that may not result in death, be life-threatening, or require hospitalization may be considered serious when, based upon appropriate medical judgment, they may jeopardize the patient or subject and may require medical or surgical intervention to prevent one of the outcomes listed in this definition. Examples of such medical events include allergic bronchospasm requiring intensive treatment in an emergency room or at home, blood dyscrasias or convulsions that do not result in inpatient hospitalization, or the development of drug dependency or drug abuse.

As used herein, "anaphylaxis" refers to a severe, acute onset allergic reaction that may occur over minutes to several hours. Anaphylaxis may involve the skin, mucosal tissue, or both, and may have one or more symptoms including, but not limited to, generalized hives, pruritus (itching), flushing, swelling of the lips, tongue, throat or uvula, shortness of breath, vomiting, lightheadedness, wheezing, hemodynamic instability, and rash or urticaria. In addition, anaphylaxis may be accompanied by at least one of the following: respiratory compromise (e.g., dyspnea, wheeze-bronchospasm, stridor, reduced peak expiratory flow, hypoxemia), and reduced blood pressure (i.e., systolic blood pressure<90 mm Hg or greater than 30% decrease from that person's baseline) or associated symptoms of end-organ failure (e.g., hypotonia [collapse], syncope, incontinence). Anaphylaxis in accordance with the disclosure is defined by the National Institute of Allergy and Infectious Disease/Food Allergy and Anaphylaxis Network (NIAID/FAAN) clinical criteria for diagnosing anaphylaxis. Anaphylaxis reactions were reported as a serious adverse event (SAE) for the present disclosure.

Cardiovascular Events: The following cardiovascular events were collected. Major Adverse Cardiovascular Events (MACE) defined as: Non-Fatal Myocardial Infarction: The presence of at least 2 of the 3 following criteria: 1) chest pain consistent with angina, 2) abnormal values of cardiac enzymes (<upper limit of normal of the MB fraction of creatinine phosphokinase and/or troponin that follows a pattern of myocardial injury), 3) myocardial injury current (ST segment elevation) or the development of new Q waves in 2 contiguous leads of the electrocardiogram. Non-Fatal Stroke: ischemic or hemorrhagic stroke defined as an acute, focal neurologic event that persisted for >24 hours. If neurologic symptoms last for <24 hours but magnetic resonance imaging (MM) confirms an infarct, it was considered as a stroke. Confirmation by imaging studies (magnetic resonance imaging or computerized tomography of the brain) were sought in all cases but was not an absolute requirement for consideration of the event. Cardiovascular deaths: including any death from a cardiovascular cause including: myocardial infarction, stroke, heart failure, arrhythmic death, aortic dissection or rupture, any fatal thromboembolic event, sudden cardiac death, any death of unknown cause and unwitnessed death. Congestive heart failure defined as: hospitalization or prolonged (<12 hours) emergency department visit due to dyspnea, shortness of breath, with progressive edema accompanied by clinical findings of pulmonary vascular congestion. Radiographic and/or echocardiographic documentation is desirable but not required. Treatment by intravenous (Parenteral) diuretics or inotropes is required to confirm this diagnosis versus ultrafiltration, hemodialysis or left ventricular assist devices.

Clinical Laboratory Safety Tests: For the open-label study, blood (for hematology and clinical chemistry) and urine (for uric acid:creatinine ratio) samples were collected at the Screening, Week −4 (prior to the first dose of MTX), and Week −2 Visits during the Screening/MTX Run-in Period; prior to pegloticase infusion on Day 1 and at the Weeks 2, 6, 14, 22, 24 and 36, Visits during the Pegloticase+IMM Period; and the non-infusion End of Pegloticase Infusions Visit (if applicable), Week 52/End of Study/Early Termination and 3 and 6 month Post Treatment Follow-up Visits. For the randomized study, Blood (for hematology and clinical chemistry) was collected at the Screening, Week −6 (prior to the first dose of MTX), and Week −4 and −2 Visits during the Run-in Period; prior to pegloticase infusion on Day 1 and at the Weeks 2, 6, 14, 22, 24, 36 and the non-infusion End of Pegloticase Infusions Visit (if applicable), Week 52/End of Study/Early Termination and 3 and 6 month Post Treatment Follow-up Visits.

Urine (for albumin:creatinine ratio and allantoin acid) samples were collected prior to the pegloticase infusion on Day 1 and at the Weeks 14, 24, 36 and the non-infusion End of Pegloticase Infusions Visit (if applicable) and Week 52/End of Study/Early Termination Visits.

Urine (for human chorionic gonadotropin) samples were collected at all visits except the Screening Visit and Weeks 21, 23 and 3- and 6-month Post Treatment Follow-up Visits for all female subjects of childbearing potential.

Safety laboratory assessments may include: Hematology: complete blood count with differential (hemoglobin concentration, hematocrit, erythrocyte count, platelet count, leukocyte count, and differential leukocyte count); Chemistry: albumin, transaminases (aspartate aminotransferase, alanine aminotransferase), alkaline phosphatase, total bilirubin, creatinine (including calculation for eGFR calculated by the abbreviated MDRD equation: creatinine (including calculation for eGFR calculated by the MDRD study equation: $175 \times (S_{cr[mg/dL]})^{-1.154} \times (\text{age})^{-0.203} \times (0.742 \text{ if female}) \times (1.212 \text{ if African American})$ or $175 \times (S_{cr[\mu mol/L]}/88.4)^{-1.154} \times (\text{age})^{-0.203} \times (0.742 \text{ if female}) \times (1.212 \text{ if African American})$, glucose, sodium, potassium, calcium, chloride, total protein, blood urea nitrogen, and human chorionic gonadotropin (at the Screening Visit for all female subjects of childbearing potential); Urine: uric acid:creatinine ratio and human chorionic gonadotropin (at all visits except the Screening Visit for all female subjects of childbearing potential).

As used herein, "co-administration" refers to the simultaneous administration of one or more drugs with another in a treatment regimen. For example, as described herein, co-administration of KXX with MTX may refer to administration of MTX at the same time as KXX or may refer to administration of MTX at a specific period of time before or after KXX administration. In some embodiments, MTX may be administered before KXX. In other embodiments, KXX may be administered before MTX. In other embodiments, both drugs are administered at the same time. As described herein elsewhere, co-administration may also refer to any particular time period of administration of either KXX or MTX, or both. For example, as described herein, MTX may be administered hours, days, weeks, or months before KXX treatment, as long as both drugs are to be provided to a patient or subject in a particular treatment regimen. In other embodiments, MTX may be administered to a patient hours, days, weeks, or months after KXX treatment. In some embodiments, co-administration may refer to any time of administration of KXX and/or MTX such that both drugs are present in the body of a patient at the same. In some embodiments, either drug may be administered before or after the other, so long as they are both present within the patient for enough time that the patient received the intended clinical or pharmacological benefits.

As used herein, "concomitant administration" refers to a therapeutic or drug regimen in which one or more medications are given together, i.e., at the same time. In some embodiments, concomitant administration and co-administration may be referred to interchangeably.

Digital Photography: Digital photography of the hands and feet was completed at Week −6, Day 1 and Weeks 14, 24, 36, and the End of Pegloticase Infusions Visit (if applicable) and Week 52/End of Study/Early Termination and the 3- and 6-month Post Treatment Follow-up Visits for the randomized study. Other anatomical sites with large tophi may be photographed in addition to the hands and feet at the Investigator's discretion.

Dual-energy Computed Tomography (DECT): For sites with DECT capability, DECT was obtained at Day 1 and Weeks 24, 36 Visits, or at Day 1 and weeks 14, 24, visits during the Pegloticase+IMM Period for the open-label and randomized studies, respectively; at the End of Pegloticase Infusions Visit (if applicable), the Week 52/End of Study/Early Termination Visit during the and 52/End of Study/Early Termination. The DECT may be completed within +/−5 days of the scheduled timepoint. Subjects who end pegloticase infusions prior to Week 52 followed the scheduled timepoints but avoid a repeat DECT scan within 6 weeks of a prior scan. Images were obtained for the hands/wrists, knees, ankles/feet, and the Investigator identified the primary area of major urate deposition. The imaging was performed by a study-specific, qualified radiologist.

Electrocardiogram: A 12-lead ECG was performed on Day 1 before the pegloticase infusion for all subjects and at the discretion of the Investigator thereafter.

By the terms "effective amount" and "therapeutically effective amount" of an agent, compound, drug, composition or combination which is nontoxic and effective for producing some desired therapeutic effect upon administration to a subject or patient (e.g., a human subject or patient).

As used herein, a "gout flare" refers to a manifestation of physiological or biochemical symptoms of gout, which is a possible side effect or AE associated with treatment with KXX. A gout flare may produce burning itching, tingling, or stiffness in the joints, particularly the peripheral joints. An individual may also experience redness, swelling, and pain in the joints. In accordance with the disclosure, gout flares may initially increase when starting treatment with KXX. For such individuals, medications to help reduce flares may be taken regularly for the first few months after KXX is started. Prophylactic treatment for gout flares may include, but is not limited to, colchicine or non-steroidal anti-inflammatory drugs (NSAID). In some embodiments, prophylactic treatment may be given prior to an infusion of KXX, for example one week prior to treatment with KXX.

As used herein, "glucose-6-phosphate dehydrogenase (G6PD) Deficiency" or "G6PD" refers to a condition caused by an inborn error of metabolism that predisposes an individual to red blood cell breakdown. Individuals with G6PD deficiency are not included in the present study and are generally advised not to take KXX.

As used herein, "immuno-tolerance" refers to the lack of an immune response in a patient as a result of a drug treatment such as KXX. In some embodiments, establishing immune-tolerance may also refer to reducing immunogenicity to KXX, or to reduce or prevent loss of a response to KXX. Such loss of response may be the result of the formation of anti-drug antibodies, which may increase clearance of KXX, causing a loss of response.

Individual Tophi Response: All measurable tophi were measured bi-dimensionally (using the longest diameter and the longest perpendicular to that diameter) and the response of each individual tophus was categorized according to the change from baseline in area of each tophus at each visit as follows: Complete Response (CR)—A 100% decrease in the area of the tophus; Marked Response (MR)—At least a 75% decrease in the area of the tophus; Stable Disease (SD)—Neither a 50% decrease nor a 25% increase in the area of the tophus can be demonstrated; Progressive Disease (PD)—A 25% or more increase in the area of the tophus; Unable to Evaluate (UE)—The tophus cannot be accurately measured for any reason at any given post-baseline time point (e.g., image missing or of poor quality, obvious infection of the tophus).

Each individual unmeasured tophus was semi-quantitatively assessed based upon the impression of the central reader using the following guideline: Complete Response—the disappearance of the tophus; Improved—an approximate 50% or more reduction from baseline in the size of the tophus; Stable Disease—neither improvement nor progression from baseline can be determined; Progressive Disease—an approximate 50% or more increase from baseline in the area of the tophus. Unable to Evaluate—the tophus cannot be assessed for any reason at any given post-baseline time point (e.g., image missing or of poor quality, or obvious infection of the tophus).

The overall response for a subject was based upon the best response among all tophi (including measurable and unmeasured) for that subject (e.g., if any one tophus shows complete response, the overall response is Complete Response). If any single tophus shows progression, or if a new tophus appears during the study, the overall response for that subject was Progressive Disease, regardless of the response of any other tophi. New tophi arising outside of the regions photographed at baseline were captured by the Investigator on the case report form, and also resulted in an overall response assessment of Progressive Disease.

As used herein, an "infusion reaction" or "IR" refers to a reaction of a patient or subject to a drug. Infusion reactions generally refer to drugs administered by intravenous (IV) infusion. most common signs and symptoms of an infusion reaction, including urticaria (skin rash), erythema (redness of the skin), dyspnea (difficulty breathing), flushing, chest discomfort, chest pain, and rash. For the present disclosure, IRs were recorded as Infusion Reaction AEs. If the IR meets the definition for "Serious" as described herein, it is also reported as an SAE. In some embodiments, an IR was defined as any infusion-related AE or cluster of temporally-related AEs, not attributable to another cause, which occur during or within 2 hours after the infusion of pegloticase. Other AEs that occur outside of the 2-hour window following the infusion may also be categorized as an IR per the discretion of each study site. Signs and symptoms of the IR, and treatments administered, were documented in the medical record and in the CRF. Examples of AEs not considered possible IRs include but are not limited to: laboratory abnormalities that are unlikely to have occurred during or within 2 hours following the infusion (e.g., anemia, hypercholesterolemia), gout flares, most infectious diseases, or the recurrence or worsening of a known chronic medical problem identified in the participant's medical history.

As used herein, "IR Prophylaxis" refers to a treatment regimen to prevent infusion reactions. In some embodiments, all participants received pre-treatment prophylaxis consisting of at least an antihistamine and corticosteroid prior to each infusion of pegloticase. In some embodiments, to standardize this prophylaxis regimen, participants may take (60 mg) fexofenadine orally the night before and again on the morning of the infusion with 1000 mg/day of acetaminophen. Prior to the infusion, hydrocortisone 200 mg IV was administered and a targeted physical exam was performed. The name, dose, route, date, and time of administration of each prophylactic medication were recorded in the medical record and in the CRF.

Joint Pain Assessment: Joint pain was assessed at the Screening and Week −4 (prior to the first dose of MTX) Visits during the MTX Run-in Period; prior to pegloticase infusion at the Day 1 and Weeks 14, 24 and 36 Visits during the Pegloticase+IMM Period; at the End of Pegloticase Infusions Visit (if applicable); the Week 52/End of Study/Early Termination Visit and the Post Treatment Periods 3 and 6 Month Follow-up Visits.

As used herein, "KRYSTEXXA®" or "KXX" or "pegloticase" or "PEGylated uricase" refers to a covalent conjugate of uricase produced by a genetically modified strain of *Escherichia coli* and monomethoxypoly (ethylene glycol). Although the term "uricase" or "PEGylated uricase" may be used herein to refer to a PEGylated uricase such as KRYSTEXXA®, one of skill in the art would understand that many different forms of a uricase may be known and used in accordance with the disclosure, and therefore any PEGylated uricase, such as KRYSTEXA or KXX, may be used for treatment of a patient with elevated SUA as described herein.

As used herein, the term "normal uric acid level" refers to a patient's blood plasma uric acid concentration in a range that does not cause physiological or biochemical symptoms or signs of gout. In some embodiments, a normal uric acid level may not exceed the biochemical limit of solubility. For females, a normal uric acid range may fall between about 2.4 mg/dL and about 6 mg dL, and for males, about 3.4 mg/dL to about 7 mg/dL. One of skill in the art will recognize that these values may vary slightly depending on the subject or patient, as well as on the laboratory. As used herein, the term "elevated uric acid levels" refers to refers to a patient's blood plasma or serum uric acid concentration equal to or greater than about 6 mg/dL. In some embodiments, the uric acid level in a patient may be normalized to less than about 6 mg/dL, or less than about 5 mg/dL, or less than about 2 mg/dL, following treatment with KXX, either alone or co-administered with an immunosuppressive agent or therapy. To this effect, uric acid levels can vary based on the particular testing methodology and from laboratory to laboratory.

Patient Global Assessment: The patient global assessment was collected at the Screening and Week −4 (prior to the first dose of MTX) Visits during the MTX Run-in Period; prior to KXX infusion at the Day 1 and Weeks 14, 24 and 36 Visits during the KXX+MTX Period; at the End of Pegloticase Infusions Visit (if applicable); the Week 52/End of Study/Early Termination Visit and the Post Treatment Periods 3 and 6 Month Follow-up Visits.

By "pharmaceutically acceptable" is meant a material that is not biologically or otherwise undesirable, i.e., the material may be incorporated into a pharmaceutical composition administered to a patient without causing any undesirable biological effects or interacting in a deleterious manner with any of the other components of the composition in which it is contained. When the term "pharmaceutically acceptable" is used to refer to a pharmaceutical carrier or excipient, it is implied that the carrier or excipient has met the required standards of toxicological and manufacturing testing or that it is included on the Inactive Ingredient Guide prepared by the U.S. Food and Drug administration. "Pharmacologically active" (or simply "active") as in a "pharmacologically active" (or "active") derivative or analog, refers to a derivative or analog having the same type of pharmacological activity as the parent compound and approximately equivalent in degree. The term "pharmaceutically acceptable salts" include acid addition salts which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

Pharmacokinetic and Anti-drug Antibody Measurements: Serum samples for PK analysis of pegloticase were collected prior to the pegloticase infusion and after the end of infusion (prior to discharge) on Day 1 and at the Weeks 2, 4, 6, 8 and 36 Visits or weeks 2, 6, 14, 24, 36, for the open-label and randomized studies, respectively, and prior to the pegloticase infusion only at the Weeks 10, 14, 18, 22, 24 (open-label study); at the End of Pegloticase Infusions Visit (if applicable); and the Week 52/End of Study/Early Termination Visits. Visits for frequent sampling of a subset of subjects who consent for additional non-infusion visit PK sampling occured at Weeks 1 and 7 or at week 21 for the open-label and randomized studies, respectively.

Immunogenicity of pegloticase was assessed via serum samples for evaluation of anti-PEG and anti-uricase IgG antibodies. Samples were collected prior to the pegloticase infusion on Day 1 and at the Weeks 2, 4, 6, 8, 10, 14, 18, 22, 24, 36, or weeks 2, 6, 14, 22, 24, 36 for the open-label and randomized studies, respectively; at the End of Pegloticase Infusions Visit (if applicable); and 52/End of Study/Early Termination Visits and Post Treatment 3 month Follow-up Visit. Visits for frequent sampling of a subset of subjects who consent for additional non-infusion visit PK sampling occurred at Weeks 1 and 7 (open-label study). In the event of an AE suspected to be an infusion reaction, a serum sample was collected at that time or at the subsequent visit for evaluation of pegloticase antibodies.

Blood samples were collected prior to pegloticase infusion on Day 1 and at the Weeks 4, 8, 22 and 36 Visits or at Day 1 and weeks 14, 24, and 36 visits during the Pegloticase+IMM for MTX Polyglutamate analysis for the open-label and randomized studies, respectively.

For the randomized study, optional blood samples for PBMC, RNA isolation and serum were collected from each consenting subject prior to the first dose of MTX at Week −6, prior to the infusion on Day 1 and Weeks, 6, 14, 24, 36 and the End of Pegloticase Infusions Visit (if applicable) and the Week 52/End-of-Study/Early Termination. During visits at Weeks 2, 4, 8, 10 and 12, optional samples were only collected if subjects were experiencing an acute gout flare on the day of visit.

Subjects may still participate in the study even if they decline to provide consent for the optional future use blood samples.

Samples were retained for potential future analyses which may include biomarkers relevant to gout (e.g., inflammatory markers) or gout co-morbidities in response to pegloticase or other potential treatments for gout.

Physical Examinations: A complete physical examination was performed at the Screening Visit, including assessment of HEENT, heart, lungs, abdomen, skin, extremities, and neurological status, and/or musculoskeletal. The exam included assessment for presence of tophi, as well as gout history and symptom severity. For the open-label study, a targeted physical examination per the investigator judgement but at a minimum included heart, lungs and abdominal exam and include a joint and skin evaluation and assessment of AEs at Week −4, Day 1, and prior to administration of pegloticase at Weeks 4, 8, 12, 16, 20, 24, 36, the End of Pegloticase Infusions Visit (if applicable), Week 52/End of Study/Early Termination and 3 and 6 month Post Treatment Follow-up Visits. For the randomized study, a targeted physical examination per investigator judgement was conducted at Week −6, Day 1, and prior to administration of pegloticase at Weeks 4, 8, 12, 16, 20, 24, 36 and the non-infusion End of Pegloticase Infusions Visit (if applicable), Week 52/End of Study/Early Termination and 3 and 6 month Post Treatment Follow-up Visits; at a minimum this included heart, lungs, and abdominal exam.

Physician Global Assessment: The physician global assessment was collected at the Screening and Week −4 or week −6 (prior to the first dose of MTX) Visits during the MTX Run-in Period for the open-label and randomized studies, respectively; prior to pegloticase infusion at the Day 1 and Weeks 14, 24 and 36 Visits, and the Day 1 and week 6, 14, 20, 24, 30, 36, and 44 visits during the Pegloticase+IMM Period for the open-label and randomized studies, respectively; at the End of Pegloticase Infusions Visit (if applicable), the Week 52/End of Study/Early Termination Visit and the Post Treatment Periods 3 and 6 Month Follow-up Visits (open-label study).

As used herein, "prolonging" refers to extending the duration of the treatment effects of KXX therapy, either alone or co-administered with MTX. For example, as described herein, treatment of a patient with KXX co-administered with MTX, may result in a more enhanced response to the drug in the patient, resulting in a lowered SUA, when compared with treatment with KXX alone.

As used herein, "reducing" refers to a lowering or lessening, such as reducing immunogenicity to KXX in a patient. In some embodiments, co-administration of KXX and MTX results in "reducing" immunogenicity to KXX, indicating that the patient does not produce anti-KXX antibodies, or produces fewer anti-KXX antibodies than would be expected for a patient not receiving the same treatment. "Reducing" may also refer to a reduction in disease symptoms as a result of KXX treatment, either alone, or co-administered with MTX. "Reducing" immunogenicity to KXX may also be referred to herein as increasing or enhancing "immuno-tolerance."

As used herein, "relatedness" or "causality" assessment is required for AEs (and SAEs) that occur during clinical investigations. The following terms were used during this study:

Likely: Reasons to consider an AE likely related to treatment may include but are not limited to the following: (1) Timing of the event relative to the administration of the investigational product. (2) Location of the AE relative to the site of investigational product administration. (3) Likelihood based on experience with similar products. (4) There is a biologically plausible explanation based on the mechanism of action or mode of delivery of the treatment. (5) The AE is repeated on subsequent treatments. (6) No other explanation is likely.

Quality-of-Life Assessment: The HAQ was administered at the Screening and Week −4 or week −6 (prior to the first dose of MTX) Visits during the MTX Run-in Period for the open-label and randomized studies, respectively; prior to pegloticase infusion at the Day 1 and Weeks 14, 24 and 36 Visits or at the Day 1 and weeks 6, 14, 20, 24, 30, 36, and 44 visits during the Pegloticase+IMM Period for the open-label and randomized studies, respectively; at the End of Pegloticase Infusions Visit (if applicable), the Week 52/End of Study/Early Termination Visit and the Post Treatment Periods 3 and 6 Month Follow-up Visits (open-label study). The HAQ-DI is a self-report functional status instrument that can be filled out by a subject in less than 5 minutes and requires 1 minute to score. The index measures disability over the past week by asking a total of 20 questions covering 8 domains of function: dressing and grooming, arising, eating, walking, hygiene, reach, grip, and usual activities. There are at least 2 questions in each domain and the 8 domains represent a comprehensive set of functional activities. The HAQ-DI is calculated by scoring the answer to each question in the HAQ from 0 to 3, with 0 representing the ability to do without any difficulty, and 3 representing inability to do. Any activity that requires assistance from another individual or requires the use of an assistive device raises a 0 or 1 score to a 2. The highest score for each of the 8 domains is summed (range from 0 to 24) and divided by 8 to yield, on a scale with 25 possible values, a Functional Disability Index with a range from 0 to 3. The disability index is based on the number of domains answered and is computed only if the subject completes answers to at least 6 domains. The HAQ pain scale asks subjects to record how much pain they have had in the past week on a scale of 0 to 100, where zero represents "no pain" and 100 represents "severe pain". The HAQ health scale is a measure of overall health. Subjects are asked to rate how well they are doing on a score of 0 to 100, where zero represents "very well" and 100 represents "very poor" health.

Safety Variables: Safety was assessed via AE and concomitant medication use monitoring, physical examinations, vital signs, clinical safety laboratory evaluations (hematology, chemistry, urine uric acid:creatinine ratio), pregnancy testing (if applicable), electrocardiograms (ECGs), and AEs of special interest (i.e., IRs, anaphylaxis, gout flares, and cardiovascular events).

As used herein, a "severe adverse event" or "severe AE" refers to a sign, symptom, or event that causes severe discomfort to the participant and significantly affects clinical status or the ability to perform usual life activities, whether the event is considered related to the study drug or not. In some embodiments, treatment intervention may be warranted for a severe AE.

Examples of an AE include: (1) Conditions newly detected or diagnosed after the signing of the ICF, including conditions that may have been present but undetected prior to the start of the study; (2) Conditions known to have been present prior to the start of the study that worsen after the signing of the ICF; (3) Signs, symptoms, or the clinical sequelae of a suspected drug interaction; (4) Signs, symptoms, or the clinical sequelae of a suspected overdose of either investigational product or a concomitant medication (overdose per se was not reported as an AE). AEs of special interest may include IRs, anaphylaxis, gout flares, and cardiovascular events.

Severity in accordance with the disclosure is reported according to the following: Grade 1 (Mild)—No interference with daily activity. Grade 2 (Moderate)—Some interference with daily activity but medical intervention not required (e.g., doctor visit and/or medication); over the counter medicine permitted. Grade 3 (Severe)—Prevents daily activity and requires medical intervention (e.g., doctor visit and/or medication). Grade 4 (Potentially Life-threatening)—Emergency room visit or hospitalization.

As used herein, "stopping rule" refers to subjects with an SUA>6 mg/dL at 2 consecutive study visits beginning with the week 2 visit (not including post-infusion samples). Individuals for whom this condition is met discontinued treatment and remained in the study.

As used herein, "subject" or "individual" or "patient" refers to any patient for whom or which therapy is desired, and generally refers to the recipient of the therapy.

As used herein, a "temporary stop" refers to a short-term interruption in a dosing regimen as described herein, such as for KXX and/or MTX. A temporary stop typically lasts 2 to 4 weeks, after which the patient or subject resumes taking the drug or discontinues the drug completely. For example, as provided in Table 1, a patient taking MTX as described herein, and for whom WBC levels fall below $3 \times 10^9$/L, was instructed to stop taking MTX for a short period of time. Following a temporary stop, the patient or subject may either resume taking the drug or may be instructed to discontinue the drug completely.

Tender and Swollen Joint Counts: Tender and swollen (excludes hip) joint counts were recorded at the Week −4 or week −6 (prior to the first dose of MTX) Visit during the MTX Run-in Period for the open-label and randomized studies, respectively; prior to pegloticase infusion at the Day 1 and Weeks 14, 24 and 36 Visits, or at the Day 1 and weeks 6, 14, 20, 24, 30, 36, and 44 visits during the Pegloticase+IMM Period for the open-label and randomized studies, respectively; and at the End of Pegloticase Infusions Visit (if applicable) and the Week 52/End of Study/Early Termination Visit and the Post Treatment 3 and 6 month Follow-up visits. Tender and swollen joint counts were assessed by physical examination.

As used herein, a "tolerizing dosage regimen" refers to a dosage or treatment regimen with KXX that induces immunological tolerance to the drug. A tolerizing dosage regimen prevents the loss of response to a drug in a patient by preventing the formation of anti-KXX antibodies. A tolerizing dosage regimen may also decrease the incidence of IRs associated with the drug.

The terms "treating" and "treatment" as used herein refer to reduction in severity and/or frequency of symptoms, elimination of symptoms and/or underlying cause, and improvement or remediation of damage. In certain aspects, the term "treating" and "treatment" as used herein refer to the prevention of the occurrence of symptoms. In other aspects, the term "treating" and "treatment" as used herein refer to the prevention of the underlying cause of symptoms associated with obesity, excess weight, and/or a related condition. The phrase "administering to a patient" refers to the process of introducing a composition or dosage form into the patient via an art-recognized means of introduction.

As used herein, "trough" refers to the lowest concentration of a drug in a patient before the next dose of the drug is administered. For example, trough KXX levels refer to the lowest levels of KXX in a patient before the next infusion of KXX. Trough levels may be used by clinicians or practitioners to determine the efficacy of the drug, or the response of the patient to the drug treatment. Trough levels of KXX or MTX may be determined or measured at any point during a treatment period as described herein, such as before any infusion of KXX, or before any administration of MTX.

As used herein, an "unexpected adverse event" or "unexpected AE" refers to any AE, the specificity, frequency or severity of which is not consistent with either: The known or foreseeable risk of AEs associated with the procedures involved in the research that are described in the protocol-related documents, such as the IRB-approved research protocol, any applicable investigator brochure, the current IRB-approved informed consent document, and other relevant sources of information (e.g., product labeling and package inserts); or the expected natural progression of any underlying disease or condition of the participant(s) experiencing the AE.

Unlikely: An AE with no temporal association with the study drug but rather related to other etiologies such as concomitant medications or conditions, or subject's known clinical state.

Vital Signs, Height, and Weight: Routine vital signs, including blood pressure, respiratory rate, temperature, and heart rate were measured at Screening, Week −4 and at all infusion visits during the Pegloticase+IMM Period and the End of Pegloticase Infusions Visit (if applicable), Week 52/End of Study/Early Termination and 3- and 6-month Post Treatment Follow-up Visits for the open-label study. For the randomized study, such measurements were taken at Screening, Week −6, Week −4, Day 1 and Weeks 2, 4, 6, 8, 10, 12, 14, 16, 18, 20, 22, 24, 26, 28, 30, 32, 34, 36, 38, 40, 42, 44, 46, 48, 50 and the End of Pegloticase Infusions Visit (if applicable), Week 52/End of Study/Early Termination and 3 and 6 month Post Treatment Follow-up Visits.

For the randomized study, at sites who participate and from subjects who consent, optional intensive blood pressure measurements were taken prior to the infusion on Day 1 and at Weeks 6, 12, 18, 24, 30, 36, 42, 48 and at the non-infusion End of Pegloticase Infusions Visit (if applicable) and Week 52/End of Study/Early Termination Visit. At these intensive blood pressure collections, three blood pressure measurements were performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements were obtained.

During the Pegloticase+IMM Period study visits, vitals were taken before the pegloticase infusion and any time after the end of the infusion, but prior to subject's discharge/release from the site. Weight was measured in kilograms or pounds without shoes and recorded at the Screening Visit; prior to pegloticase infusion on Day 1 and at the Weeks 8, 16, 24, 36 and at the non-infusion End of Pegloticase Infusions Visit (if applicable), Week 52/End of Study/Early Termination and Months 3 and 6 Post Treatment Follow-up Visits.

X-ray of hands and feet: For sites with X-ray capability, and subjects who provide consent, an optional X-ray of the hands and feet was obtained at Day 1, Week 24 and End of Pegloticase Infusions Visit (if applicable) and Week 52/End of Study/Early Termination Visit for the randomized study.

Subjects who end pegloticase infusions prior to Week 52 followed the scheduled timepoints but avoided a repeat X-ray within 3 months of a prior X-ray (detailed guidance was provided with the imaging manual).

EXAMPLES

Examples of embodiments of the present disclosure are provided in the following examples. The following examples are presented only by way of illustration and to assist one of ordinary skill in using the disclosure. The examples are not intended in any way to otherwise limit the scope of the disclosure.

Example 1

Study Design

The disclosure describes a study in subjects initiating pegloticase for treatment of chronic refractory gout. The purpose of the present study was to determine the efficacy and safety of using immune modulating therapy with MTX to prevent immunogenicity conferred by pegloticase and to enhance the response rate seen with pegloticase alone in adults with uncontrolled gout.

This was a multicenter, open-label, efficacy and safety study of pegloticase with MTX in adult subjects with uncontrolled gout.

The study design included: (1) up to a 2-week Screening Period (screening was completed within 2 weeks prior to Week −4); (2) a 4-week MTX Run-in Period (week −4 through day 1); (3) a 52-week Pegloticase+MTX Period (day 1 through week 52), MTX dosed weekly and 50 weeks of KXX infusions visits every 2 weeks; non-infusion visits at Weeks 1, 7 and 52); (4) a Safety Follow-up (Phone/Email/Site Visit); and (5) a 3- and 6-month Post Treatment Follow-up.

In addition, if applicable, the following additional study periods applied:

End of Pegloticase Infusions Visit—completed within approximately 2 weeks of the last infusion if the subject discontinued pegloticase treatment prior to infusion Week 50, such as due to the SUA stopping rules. Subjects continued in the study.

Week 52/End-of-study/Early Termination Visit: Week 52 or earlier if the subject withdrew consent to participate in the study.

Safety Follow-up Visits: All subjects received a safety follow-up phone call/e-mail/visit approximately 30 days after the last dose of pegloticase/MTX to assess if any SAE's had occurred. Subjects who received at least one dose of MTX and were females of childbearing potential, received a safety follow-up phone call/e-mail/Site Visit approximately 30 days after the last dose of MTX to verify at least one ovulatory cycle occurred after the last dose of MTX. If the subject had not ovulated, a urine pregnancy test was performed. Subjects who received at least one dose of MTX and were non-vasectomized males, a phone/e-mail/Site Visit inquiry was conducted 3 months after MTX discontinuation regarding partner pregnancy (inquiry could occur during the 3-month Post Treatment Follow-up).

3- and 6-Month Post Treatment Follow-up Visits: All subjects were followed for a minimum of 6 months following the last infusion, with follow-up after Week 52 as warranted.

All subjects who meet eligibility criteria at Screening began oral MTX at a dose of 15 mg weekly on the same day each week for 4 weeks prior to the first dose of KXX. During the KXX+MTX period, subjects were instructed to take MTX weekly on the same day each week within 1 to 3 days prior to each KXX infusion and one additional weekly dose after the last infusion for subjects who had not stopped pegloticase due to SUA stopping rules; however, if a subject does not do so, MTX were taken≥60 minutes prior to each pegloticase infusion.

The subjects also took folic acid 1 mg orally every day beginning at Week −4 (the start of MTX) continuing until prior to the Week 52/End of Study/Early Termination Visit. Subjects had to be able to tolerate MTX at a dose of 15 mg during the 4-week MTX Run-in Period (prior to Day 1) to be eligible to participate in the KXX+MTX Period. Subjects who were unable to tolerate MTX at a dose of 15 mg during the MTX Run-in Period were considered screen failures.

As used herein, a "screen failure" refers to a subject who does not meet all the inclusion criteria or meet any of the exclusion criteria. In addition, subjects who were unable to tolerate MTX at an oral dose of 15 mg weekly during the MTX Run-in Period were considered screen failures. Screen failure subjects who were females of childbearing potential who took at least one dose of MTX, received a Safety Follow-up Phone call/E-mail/Site Visit approximately 30 days after the last dose of MTX to verify at least one ovulatory cycle after the last dose of MTX. If the subject had not ovulated, a urine pregnancy test was performed at the study site. Screen failure subjects who receive at least 1 dose of MTX and were non-vasectomized males received a Phone/E-mail/Site Visit 3 months after MTX discontinuation regarding partner pregnancy.

Screen failure subjects may be allowed to rescreen for the study if both the Investigator and Sponsor agree regarding rescreening and if the Investigator determines that the subject can satisfy all the eligibility criteria.

During the MTX Run-in or Tolerability assessment period, a subject was considered a screen failure if any of the following new laboratory findings or symptoms reflecting MTX immunogenicity occur:

Abnormal Hematology findings:
WBC<$3.5 \times 10^9$/L
Platelets<$75 \times 10^9$/L Hematocrit<32%
Abnormal hepatic function findings:
AST/ALT>1.5×upper limit of reference range and
Albumin<lower limit of reference range
Abnormal renal function: eGFR<40 mL/min/1.73 m² (as estimated with the MDRD equation)
New clinically important signs and symptoms, such as the following:
 Rash or oral ulceration
 Persistent nausea, vomiting and diarrhea
 New or increasing dyspnea or dry cough, or unexplained cough with fever
 Severe sore throat, abnormal bruising
 Severe headaches, fatigue, and problems concentrating
If minor clinical symptoms emerge, such as mild stomatitis, mild GI discomfort, etc., the investigator may increase folic acid dose (e.g., 2 mg daily) or recommend a divided dose of MTX (e.g., 3 tabs of 2.5 mg in the morning and evening on the day of dosing); if symptoms improve, subject were not considered a screen failure based on that symptom.

During the Run-In and Pegloticase+IMM Period, MTX or placebo dose guidance based on new laboratory findings or new symptoms is as follows:

| Lab Parameters | Value | MTX Dose Change |
|---|---|---|
| WBC | $3.0 \times 10^9$/L~$3.5 \times 10^9$/L | Decrease to 10 mg |
|  | <$3.0 \times 10^9$/L | Temporary stop |
| Platelets | <$50 \times 10^9$/L | Temporary stop |
| Hematocrit | <27% | Temporary stop |
| AST/ALT | Between 1.5~2 × ULN | Decrease to 10 mg |
|  | >2 × ULN | Temporary stop |
| eGFR | <30 ml/min/1.73 m² | Temporary stop |
| New clinically important symptoms/signs* | Yes | Temporary stop |

New clinically important symptoms or important medical events may include rash or oral ulceration, persistent nausea, vomiting and diarrhea, new or increasing dyspnea or dry cough, or unexplained cough with fever, severe sore throat, abnormal bruising, severe headaches, fatigue, and problems concentrating, or any other important medical events that might increase methotrexate toxicity or pre-dispose to new or worsening infection (e.g., undergoing surgery, hospitalization, being treated with antibiotics, having a clinical infection, developing new clinically significant pericardial/pleural effusion or ascites).

Any other important medical events that might increase methotrexate toxicity or pre-dispose to new or worsening infection (e.g., undergoing surgery, hospitalization, being treated with antibiotics, having a clinical infection, developing new clinically significant pericardial/pleural effusion or ascites)

Subjects who take at least one dose of MTX and who were females of childbearing potential, received a safety follow-up phone call/e-mail approximately 30 days after the last dose of MTX to verify at least one ovulatory cycle had occurred after the last dose of MTX. If the subject had not ovulated, a urine pregnancy test was performed. For those subjects who took at least one dose of MTX and who were non-vasectomized males an inquiry was conducted at the Post-Treatment 3-month follow-up visit (or 3 months after the subject's last dose of MTX) after MTX discontinuation regarding partner pregnancy.

All subjects who complete the Run-In Period received the first pegloticase infusion on Day 1. All subsequent doses and study visits were scheduled based on the Day 1 visit date.

After Day 1, if a subject became unable to tolerate 15 mg of MTX, the MTX dose was reduced and/or discontinued, and the subject remained in the study.

The study followed each participant from screening for up to one year until completion of the full study. Participants were randomized to either pegloticase+MTX (Peg+MTX) or to pegloticase+placebo (peg+PBO). Randomization allocation were balanced in time and by site to achieve the desired number of participants. Treatment assignment were determined by a random number generator and stratified by site using a central randomization system to ensure the desired allocation. During the first 12 weeks, participants randomized to the peg+MTX arm received a combination of pegloticase and MTX. Patients experience reduced immunogenicity when a loading dose of anti-proliferative agent is administered prior to a monoclonal antibody in other disease states, thus, for those randomized to the KXX+MTX arm, a MTX run-in may be begun prior to initial pegloticase infusion. MTX (or matching PBO in the other arm) was administered concurrent with the first pegloticase infusion. Next, infusions of pegloticase 8 mg IV were administered on a biweekly basis. To understand the long-term efficacy (durability) and safety of this approach, and to minimize the exposure to MTX, following the study, all participants may be given an additional three months of open-label pegloticase only therapy and were followed.

Each subject was followed up for at least 6 months after cessation of pegloticase infusions. If these 6 months occur prior to end of study at Week 52, such as in the case of a subject who ends pegloticase infusions on or before Week 24, there were no follow-up visits after the Week 52/End of Study Visit. For subjects who end pegloticase infusions between Weeks 26 and 36, there were at least 3 months of follow-up while the subject remains on-study prior to Week 52, and then one follow-up visit after the Week 52/End of Study Visit. For subjects who end pegloticase infusions between Weeks 38 and 52, there were two follow-up visits at intervals of 3 months after the Week 52/End of Study Visit.

The Investigator reviewed the clinical status and individual subject treatment goals at Week 24, and the End of Pegloticase Infusions Visit (if applicable) and the Week 52/End of study/Early Termination Visit.

Samples for measurement of SUA levels, PK analysis of pegloticase, pegloticase immunogenicity and MTX Polyglutamate analysis were collected at periodic visits as set forth herein.

Safety assessments, including monitoring and recording of all AEs, whether drug-related or not, measurement of vital signs, physical examinations, and monitoring of hematology and blood chemistry, were performed.

Criteria for Evaluation: Efficacy was assessed by SUA levels, tender and swollen joint counts, patient and physician global assessments of gout, joint pain, and DECT.

Quality of life was assessed using the HAQ.

The PK of pegloticase and pegloticase immunogenicity as assessed by the incidence of anti-PEG and anti-uricase IgG antibodies were assessed at specified time points.

Safety assessments included monitoring and recording of all AEs, whether drug-related or not, measurement of vital signs, physical examinations, and monitoring of hematology and blood chemistry.

A scientific advisory group consisting of 3 physicians (2 site physicians and 1 Sponsor physician) and a Sponsor statistician provided oversight for the overall directions and strategy for the study and met periodically during the study.

If the study drug is discontinued, unless the subject withdraws consent, the subject was followed for the full study period and all data were collected as scheduled. Participants that were lost to follow-up or withdraw and were not evaluable were replaced. This may include but is not limited to the following reasons:

The subject deciding to withdraw consent for study

An intolerable adverse event (AE) as judged by study site PI and participant

The subject discontinuing acceptable birth control methods or becoming pregnant

The subject enrolling in a conflicting investigational drug trial.

Example 2

Study Outcomes/Objectives

The overall objective of the study is to assess the efficacy, safety, tolerability, and pharmacokinetics (PK) of the concomitant use of KXX with MTX to enhance the response rate seen with pegloticase alone in adults with uncontrolled gout.

Primary Objectives/Outcomes

The primary objective is to estimate the response rate during Month 6 (Weeks 20, 22, and 24), as measured by the sustained normalization of serum uric acid (SUA) to <6 mg/dL for at least 80% of the time during Month 6 in subjects receiving KXX with MTX.

The primary efficacy outcome endpoint is the sustained normalization of SUA to <6 mg/dL for at least 80% of the time during month 6 (weeks 20, 22, and 24) in subjects receiving KXX with MTX. This is slightly below the urate solubility threshold and this threshold has been the accepted standard for nearly all modern gout trials. Participants who achieve this endpoint were classified as "responders." Serum uric acid (SUA) responders may also be defined as participants achieving and maintaining SUA<6 mg/dL for at least 80% of the time during Month 6 (Weeks 20, 22, and 24).

Blood samples may be collected prior to each pegloticase infusion for measurement of SUA levels using the Beckman Coulter AU System Uric Acid procedure. Participants were declared "non-responders" if there were SUA measures>6 mg/dL at 2 consecutive study visits beginning with the week 2 visit. Participants who had a single SUA>6 mg/dL were allowed to continue (per the prescribing information) and were considered a responder. If the SUA goal is not maintained before or at the 12-week mark, it was assumed that the participant had developed clinically relevant anti-pegloticase antibody and they received no further infusions. This assumption and subsequent discontinuation of pegloticase was consistent with the protocol of large phase III randomized controlled trials and the product label. A formal stopping rule was 2 occasions of SUA levels of greater than 6 mg/dL.

Safety assessments were made throughout the procedure. Safety assessments may include monitoring and recording of all AEs, whether drug-related or not, regular measurement of vital signs, performance of physical examinations and monitoring of hematology and blood chemistry. In the event of an AE suspected to be an IR, a blood sample was collected at that time or the subsequent visit, centrifuged, frozen and stored for the batch evaluation of pegloticase antibodies at a future date. Gout flares were captured as safety events only.

Secondary Objectives/Outcomes

Secondary endpoints may examine anti-pegloticase Ab titers/types, different definitions of SUA level for specific later time points of success, and patient reported outcomes (PROs).

For example, in some embodiments, secondary outcomes may include one or more of the following:

Estimation of the response rate during month 3 (weeks 10, 12, and 14), as measured by the sustained normalization of serum uric acid (SUA) to <6 mg/dL for at least 80% of the time during month 3 in subjects receiving pegloticase with MTX;

Estimation of the overall response rate as measured by the sustained normalization of SUA to <6 mg/dL for at least 80% of the time during month 3 (weeks 10, 12, and 14) and month 6 (weeks 20, 22, and 24) combined in subjects receiving pegloticase with MTX;

Estimation of the 5 mg/dL response rate during month 3, during month 6, and overall (months 3 and 6 combined), as measured by the sustained normalization of SUA to <5 mg/dL for at least 80% of the time during month 3, during month 6, and months 3 and 6 combined in subjects receiving pegloticase with MTX;

Estimation of the mean change in serum uric acid from baseline to weeks 14, 24, 36, and 52 in SUA in subjects receiving pegloticase with MTX.

Exploratory Objectives/Outcomes

Exploratory objectives may include one or more of the following:

Estimation of the response rate during month 9 (weeks 32, 34 and 36), as measured by the sustained normalization of SUA to <6 mg/dL for at least 80% of the time during month 9 in subjects receiving pegloticase with MTX.

Estimation of the response rate during month 12 (weeks 48, 50 and 52), as measured by the sustained normalization of SUA to <6 mg/dL for at least 80% of the time during month 12 in subjects receiving pegloticase with MTX.

Estimation of the 5 mg/dL response rate during Month 9 (Weeks 32, 34 and 36), as measured by the sustained normalization of SUA to <5 mg/dL for at least 80% of the time during Month 9 in subjects receiving pegloticase with MTX.

Estimation of the 5 mg/dL response rate during Month 12 (Weeks 48, 50 and 52), as measured by the sustained normalization of SUA to <5 mg/dL for at least 80% of the time during Month 12 in subjects receiving pegloticase with MTX.

Estimation of the time to first SUA>6 mg/dL in subjects receiving pegloticase with MTX.

Estimation of the time to SUA>6 mg/dL (stopping rule) at 2 consecutive study visits beginning with the week 2 visit (not including post-infusion samples) in subjects receiving pegloticase with MTX.

Estimation of the mean change from baseline to Week 24, 36 and 52 in urate volume and gout erosions using dual-energy computed tomography (DECT) scan of the hands and feet in subjects receiving pegloticase with MTX.

Estimation of the mean change from baseline in number of joints affected by tophi in subjects receiving pegloticase with MTX.

Estimation of the mean change from baseline to Weeks 14, 24, 36, and 52 in tender joint count (68-point scale) in subjects receiving pegloticase with MTX.

Estimation of the mean change from baseline to Weeks 14, 24, 36, and 52 in swollen joint count (66-point scale) in subjects receiving pegloticase with MTX.

Estimation of the mean change from baseline to Weeks 14, 24, 36, and 52 in the Health Assessment Questionnaire-Disability Index (HAQ-DI) in subjects receiving pegloticase with MTX.

Estimation of the mean change from baseline to Weeks 14, 24, 36, and 52 in the HAQ Pain score in subjects receiving pegloticase with MTX.

Estimation of the mean change from baseline to Weeks 14, 24, 36, and 52 in the HAQ Health score in subjects receiving pegloticase with MTX.

Estimation of the mean change from baseline to Weeks 14, 24, 36, and 52 in patient global assessment of gout in subjects receiving pegloticase with MTX.

Estimation of the mean change from baseline to Weeks 14, 24, 36, and 52 in physician global assessment of gout in subjects receiving pegloticase with MTX.

Estimation of the mean change from baseline to Weeks 14, 24, 36, and 52 in subject assessment of average, least, and worst joint pain in subjects receiving pegloticase with MTX.

Estimation of the proportion of subjects achieving 20%, 50%, or 70% improvement based on gout chronic response criteria at Weeks 14, 24, 36, and 52 in subjects receiving pegloticase with MTX.

Pharmacokinetic and Anti-Drug Antibody Objectives/Outcomes

Assessment of the PK of pegloticase in subjects receiving concomitant MTX.

Assessment of the incidence of anti-PEG and anti-Uricase IgG antibodies.

Safety and Tolerability Objectives/Outcomes

Safety and Tolerability objectives/outcomes may include assessment of the incidence of infusion reactions (IRs), anaphylaxis, gout flares, cardiovascular events, and the adverse event (AE)/serious AE profile overall and potentially attributed to the combination of pegloticase and MTX.

Example 3

Laboratory Evaluations

Any or all the following measurements may be assessed for each patient, and at any desired time points during the study.

Hematology—Blood was collected for measurement of hemoglobin concentration, hematocrit, erythrocyte, platelet and leukocyte counts and the differential leukocyte count at screening, and end of treatment or early termination visit.

Clinical Chemistry—Blood samples were collected prior to each pegloticase infusion for measurement of SUA levels (primary efficacy parameter) using the Beckman Coulter AU System Uric Acid procedure. In this procedure uric acid is converted to hydrogen peroxide. Hydrogen peroxide reacts with reagent to produce a chromophore which is read bichromatically at 660/800 nm. The amount of dye formed is proportional to the uric acid concentration in the sample.

Serum samples for measurement of SUA levels were collected at the Screening Visit, the Week −4 Visit (prior to the first dose of MTX), and the Week −2 Visit during the MTX Run-in Period; within 48 hours prior to each pegloticase infusion and after the end of each pegloticase infusion prior to discharge from the site during the Pegloticase+IMM Period; at the non-infusion Week 52/End of Study/Early Termination Visits and at the Post Treatment 3 and 6 Month Follow-up Visits. Additional serum samples for SUA levels were collected at optional non-infusion (Frequent Sampling) Visits at Weeks 1 and 7. If applicable an SUA sample was collected at the End of Pegloticase Visit if a subject did not continue treatment. Subjects with SUA level>6 mg/dL at 2 consecutive visits beginning at Week 2 visit discontinued treatment, completed the End of Pegloticase Infusion Visit procedures within 2 weeks and continued the subject visits according to the protocol (without treatment).

Samples for measurement of SUA levels, PK analysis of pegloticase, pegloticase immunogenicity, and MTX Polyglutamate analysis were collected at specific visits during the treatment regimen.

Safety assessments, including monitoring and recording of all AEs, whether drug-related or not, measurement of vital signs, physical examinations, and monitoring of hematology and blood chemistry, were performed.

The total blood volume to be collected from each subject during this study is approximately 700 mL, increased to 750 mL for the subjects participating in the optional visits at Week 1 and Week 7.

Blood was collected for measurement of transaminases (AST, ALT), alkaline phosphatase, total bilirubin, lactic dehydrogenase (LDH), creatinine, uric acid, glucose, total cholesterol, sodium, potassium, calcium, chloride, total protein, and blood urea nitrogen (BUN) at Screening and end of treatment or early termination visit).

A blood sample was obtained at Screening to evaluate Glucose-6-Phosphate Dehydrogenase (G6PD). G6PD deficiency was an exclusion criterion.

Anti-pegloticase Antibody Assay Development—The presence or absence of antibodies was examined in all participants at the following time point, whichever is earlier: 1) achieve non-responder status or experiencing an IR, or 2) for responders. Anti-pegloticase antibody titers were determined by an enzyme-linked immunosorbent assays (ELISA) upon development of an immune reaction or loss of responder status. We collected and stored all serum samples for future batch analyses.

ELISA plates were coated with pegloticase, recombinant uricase, or polyethylene glycol (PEG) (5 µg/mL each) as the capture antigen, respectively, at 37° C. for 2 hrs. The plates were then washed with phosphate-buffered saline—Tween-20 (PBS—T) and blocked for 60 min with PBS—T plus 3% milk (PBS—T milk). Sera were diluted (1:30 for the anti-pegloticase or anti-uricase assay; and 1:10 for the anti-PEG assay) in PBS—T milk, were transferred to the plates and incubated for 45 min at room temperature. The plates were then incubated with horseradish peroxidase (HRP)-conjugated isotype-specific goat anti-human immunoglobulin-G (IgG) or goat anti-human immunoglobulin-M (IgM) (Southern Biotechnology Associates, Birmingham, AL, USA) at 37° C. for 1 hr. Color development was performed by using 3,3',5,5'-tetramethylbenzidine (TMB) as the substrate. The reaction was stopped by means of acidification and the plate was read at 450 nm by using an Emax Precision Microplate Reader (Molecular Device, Sunnyvale, CA, USA).

Positive Controls for the Anti-Pegloticase ELISA Assay

For the anti-pegloticase assay, a 'positive' ELISA response was initially defined as an ELISA optical density $A_{450}$ greater than 3 SD above the mean for baseline pre-treatment plasma samples from study subjects. Results were further compared with those obtained from a panel of healthy control sera. Positive samples were further validated by the specificity and sensitivity assays. Established seropositive samples were used as positive control for subsequent assays. The positive control for the anti-uricase antibody assay was the monoclonal mouse anti-uricase antibody (Santa Cruz Biotechnology, Inc.). The positive control for the anti-PEG assay was the monoclonal mouse anti-PEG antibody (Academia Sinica, Taiwan).

Determination of Anti-Pegloticase Antibody Titers and Seropositivity

For determination of Ab titers, those serum samples found to contain detectable Ab were subjected to serial 3-fold dilutions in normal serum and analyzed in duplicate. The final titer for each sample was defined as the highest dilution of serum that produced a mean absorbance ($A_{450}$ nm) greater than the negative cut-off value. Antibody seropositivity was further defined as absorbance at 450 nm, >3 SD above the mean for a panel of plasma samples from naive patients.

An enzymatic/fluorescence assay was used to quantitate pegloticase concentrations in serum. In the assay, pegloticase catalyzes the conversion of UA to allantoin, thus releasing hydrogen peroxide ($H_2O_2$) and carbon dioxide. In the presence of horseradish peroxidase, $H_2O_2$ reacts with a 1:1 stoichiometry with Amplex Ultra Red (Molecular Probes, Inc., Eugene, Oregon) to generate the red fluorescence oxidation product, resorufin. The concentration of resorufin, which is determined by fluorometry, is proportional to the amount of active pegloticase present in the serum samples. The lower limit of detection established in previous studies has been determined to be 0.6 µg/mL.

Validation of the Anti-Pegloticase ELISA Assays

Validation included negative cut-off and cut-point factor determinations, as well as tests for intra and inter-assay precision, sensitivity, specificity and recovery, stability (bench top, freeze-thaw cycles, long-term), drug interference, prozone effect and drug competition. In previous studies the sensitivity of the anti-pegloticase Ab assay was 7.5 µg/mL for the enzyme portion and 23 ng/mL for the PEG moiety using purified rabbit anti-uricase and purified mouse anti-PEG positive controls.

Validation of anti-PEG was carried out by determination of assay sensitivity, working range, dilutional linearity, spiking recovery, intra-assay variability, and inter-assay variability using systematic ELISA validation methods. These were carried out with the use of selected samples diluted 1:200 or 1:20 with PBS, pH 7.2, containing 1% BSA and 0.05% Tween 20. Samples used for assay validation were stored at −20° C. until used. Sensitivity was determined by calculating the mean response of 10 sets of blanks and evaluating the mean plus 3 standard deviations on the standard curve. The lower limit of the working range was defined as the sensitivity. The upper limit of the working range was determined by the apparent value of an absorbance, which equals the mean maximum absorbance minus 3 standard deviations, as determined from the mean absorbance in 10 duplicate wells containing approximately 7.5 µg/mL of pegloticase 7.5 µg/mL for the enzyme portion and 23 ng/mL for the PEG moiety. For validation of the assay at different dilutions, at least 4 serum samples were diluted 1:200 and 2 serum samples diluted 1:20. All serum samples were single random samples. Dilutional linearity was determined by evaluating each sample at its initial strength (1:200 or 1:20) and at dilutions of 1:2, 1:4, and 1:8. Spiking recovery was determined by adding 0.0, 0.0125, 0.025, 0.050, 0.100, 0.200, and 0.400 µg/L of pegloticase to each of the diluted serum samples. Intra-assay variability was determined by evaluating the 7 diluted serum samples 10 times within the same assay run [% CV=(standard deviations/mean)*100, where CV=coefficient of variation]. Inter-assay variability was determined by evaluating the 7 diluted serum samples in 10 consecutive assay runs [% CV=(standard deviations/mean)*100].

Competition assays to determine the specificity of anti-pegloticase Ab and anti-uricase Ab, a variety of PEGylated proteins, including pegloticase (~40 PEGs/protein molecule; molecular weight 545 kDa), PEG-asparaginase (~40 PEGs/protein molecule; 340 kDa), PEG-catalase (~40 PEGs/protein molecule; 440 kDa), PEG-chymotrypsin (~9 PEGs/protein molecule; 70 kDa), PEG-subtilisin (~6 PEGs/protein molecule; 57 kDa) and PEG-superoxide dismutase (~10 PEGs/protein molecule; 82 kDa) were used in competition assays. All the proteins except for pegloticase were modified with 5 kDa PEG from Sigma-Aldrich (St Louis, Missouri). Serum from anti-pegloticase sero-positive samples were diluted 1:30 and assayed for Ab in pegloticase-coated ELISA wells in the presence or absence of 200 µg/mL of the various soluble PEGylated proteins. A mixture of lysozyme (50 µg/mL) and propylene oxide (150 µg/mL) were used as a negative control. Also, non-PEGylated proteins were included as the non-competitive controls. To confirm the specificity of the anti-uricase Ab assay, uricase 2 µg/mL (or 2 µg/mL lysozyme for the negative control) were added during the serum incubation step.

Example 4

Participant Population

We recruited and enrolled patients or subjects with SUA≥6 mg/dL diagnosed with chronic refractory gout that failed to normalize SUA and whose signs and symptoms were inadequately controlled with oral ULT at the maximum medically appropriate dose or the xanthine oxidase inhibitor needs to be contraindicated (FDA indication for pegloticase). Recruitment includde men and women of all races/ethnicities. Approximately 12-17 patients were enrolled in the study. This number may change as deemed necessary by the study director.

The primary efficacy endpoint, the proportion of subjects achieving and maintaining SUA<6 mg/dL for at least 80% of the time during Month 6 (Weeks 20, 22, and 24) of the Pegloticase+MTX Period, were demonstrated to be statistically greater than 43.5% (proportion of responders during Month 6 in phase 3 studies), according to an exact test for proportions with a 5% type I error, if at least 10/13 (77%) responders were observed; in that case, the lower bound of a 95% confidence interval for the proportion of responders was about 46%.

Inclusion Criteria

Men and women≥18 years of age. Participants may also be selected based on an age range between 18 and 65 years of age.

Hyperuricemic at screening visit, week −4, or week −2 of the screening or run-in period as documented by SUA>6 mg/dL.

Chronic refractory gout*, defined as subjects who failed to achieve a sustained SUA of <6 mg/dL and whose signs and symptoms were inadequately controlled with xanthine oxidase inhibitors at a medically appropriate dose or for whom these drugs were contraindicated. Uncontrolled gout may be defined as meeting the following criteria: SUA≥6 mg/dL prior to entry into the KXX+MTX Period (any laboratory tests during screening up to and including during the MTX Run in Period) and at least 1 of the following: inability to maintain SUA<6 mg/dL on other urate-lowering therapy; intolerable side effects associated with current urate lowering therapy; functionally limiting tophaceous deposits (including those detected clinically or by DECT imaging).

Able to tolerate MTX at a dosage of 15 mg for 4 weeks during the Screening/MTX Run-in Period prior to the first dose of KXX.

Exclusion Criteria

Weight>160 kg (352 pounds).

Any serious acute bacterial infection, unless treated and complete resolved with antibiotics at least 2 weeks prior to the week −4 Visit of the MTX run-in period.

Severe chronic or recurrent bacterial infections (such as recurrent pneumonia, chronic bronchiectasis)

Current immunocompromised condition, including current or chronic treatment with immunosuppressive agents (prednisone or equivalent dose>5 mg/day). Prednisone>10 mg/day or equivalent dose of other corticosteroid may also exclude certain patients.

Subjects at risk for tuberculosis (TB). Specifically, subjects with i) current clinical, radiographic or laboratory evidence of active or latent TB; ii) a history of active TB within the last 3 years even if it was treated; iii) a history of active TB greater than 3 years ago unless there is documentation that the prior anti-TB treatment was appropriate in duration and type.

Known history of Hepatitis-B surface antigen-positive or Hepatitis B DNA positive subjects.

Known history of Hepatitis C RNA-positive subjects.

Human Immunodeficiency Virus (HIV) infection positive

G6PD deficiency (tested at Screening Visit 1)

Severe chronic renal impairment (glomerular filtration rate [GFR]<25 mL/min/1.73 m$^2$) or currently on dialysis Subjects having any transplant surgery requiring maintenance immunosuppressive therapy.

Non-compensated congestive heart failure, uncontrolled arrhythmia, treatment for acute coronary syndrome (myocardial infarction or unstable angina), or hospitalization for congestive heart failure within 3 months of screening or uncontrolled blood pressure (>160/100 mm Hg) at the end of the screening and MTX run-in period Pregnant, planning to become pregnant, breast-feeding, or not on an effective form of birth control Prior treatment with pegloticase, another recombinant uricase, or concomitant therapy with a polyethylene glycol (PEG)-conjugated drug Known allergy to pegylated products or history of anaphylactic reaction to a recombinant protein or porcine product Contraindication to MTX treatment or MTX treatment considered inappropriate Known immunogenicity to MTX Recipient of an investigational drug within 4 weeks or 5 half-lives prior to study drug or MTX administration or plans to take an investigational agent during the study Current liver disease as determined by alanine transaminase ALT or aspartate transaminase (AST) levels>3 times upper limit of normal Currently receiving treatment for ongoing cancer, excluding non-melanoma skin cancer History of malignancy within 5 years other than skin cancer or in situ carcinoma of cervix Uncontrolled hyperglycemia with a plasma glucose value>240 mg/dL at screening that is not subsequently controlled by the end of the Screening/MTX Run-in Period.

Diagnosed osteomyelitis

Individuals with hypoxanthine-guanine phosphoribosyl-transferase (HGPRT) deficiency such as Lesch-Nyhan and Kelley-Seegmiller syndrome Unsuitable candidate for the study based on opinion of the Investigator (e.g., cognitive impairment) that might create undue risk to the participant or interfere with the participant's ability to comply with the protocol requirements, or to complete the study.

Alcohol use in excess of 3 alcoholic beverages per week.

Currently receiving allopurinol and unable to discontinue medication 7 days prior to MTX dosing at Week −4 and unable to discontinue treatment during the duration of the study.

Example 5

Study Procedures and Assessments

All study visits and procedures were performed at designated clinical study sites. Enrollment was competitive between sites.

Participants were seen at screening, baseline, and every two weeks thereafter for pegloticase infusion and evaluation. Blood samples prior to each pegloticase dose allowed measurement of SUA, comprehensive metabolic panel, and complete blood count (CBC) allowed appropriate measurement for the co-primary safety and secondary outcomes with respect to MTX.

Screening Visit—Within 2 Weeks Prior to First Dose of MTX at Week −4

The screening visit took approximately 1 hour to complete. Potential participants were screened to determine if they satisfied all inclusion and exclusion criteria. Men and women 18 years of age or older were invited to proceed with informed consent (IC) and enroll in the study. At the screening visit, the study objectives were explained to potential participants. After all questions raised by a potential participant were answered, and before any protocol-specified screening procedures were initiated, they were offered the IC for the screening evaluation. A copy of the signed and dated IC form was provided to the participant.

After IC is obtained, a 6-digit participant number was assigned. The first 3 digits of each participant number represented the site and the last 3 were unique for each participant at each site. All screening procedures were completed, and eligibility criteria met, prior to start of immune-modulating therapy and pegloticase infusions. Basic demographic information and reason(s) for exclusion were completed on the specified case report form (CRF) pages for all participants who signed an ICF, but never received pegloticase. During the screening visit, the following procedures were performed, and information was obtained to determine eligibility to continue in this research study:

Review inclusion/exclusion criteria
ICF
Date of birth
Self-reported race/ethnicity
Medical history that might preclude study participation
Gout history and symptom severity
Medication review
Medication history (including use of over the counter medications [e.g., aspirin], use of other prescription medications including gout medications)
Dietary supplement/vitamin use
Vital signs
Physical exam includes, but is not limited to: Eye, Head, Ears, Nose, and Throat Exam (HENT), and Neck; Cardiovascular; Dermatological; Respiratory; Gastrointestinal; Musculoskeletal; Neurologic; Integumentary; VS/Measurements
Gout Flare/ assessment
PROs (e.g., PROMIS-29 & GIS instrument)
Blood draw
Screening Visit Laboratory
CBC with diff
HIV1 and 2 Antibody Screen
IgG
SUA
Pregnancy test for premenopausal women
Comprehensive Metabolic Panel (CMP)
G6PD
Blood sample for serum banking
Vital signs consisted of heart rate, respiratory rate, blood pressure (noting the position in which it was obtained), and body temperature (taken either orally or aurally). All measurements of pulse rate and blood pressure were made after approximately 5 minutes of rest. Focused history and physical examination: Information collected included date of birth, self-reported race/ethnicity (defined as in previous studies investigating its role in rheumatic diseases, gout history, medication history (including use of aspirin, gout medications), weight, and height.

Assessments for presence of tophi were conducted as well as gout history and symptom severity.

Document the number of gout flares in the last 6 months and 12 months and the most recent occurrence. Patients with gout flares can enter the study if the flare treatment is discontinued 1 week prior to the first dose of pegloticase.

Document the presence and/or history of gout-related kidney disease.

Physical examinations were performed by body system at Screening and Week 24 (end of treatment) or early termination visit in the pegloticase dosing phase. Significant findings prior to the administration of pegloticase were recorded in the patient's medical record and included on the Medical History in the CRFs. Significant findings that occur after administration of pegloticase which meet the definition of an AE were recorded in the medical record and on the Adverse Events CRF page.

All women of childbearing potential must use an effective form of birth control during this study and for 30 days after completion of the study. Acceptable methods of birth control include hormonal control methods, inter-uterine device, a double-barrier method (diaphragm with spermicide, condom with spermicide) or abstinence. All male participants were cautioned to use proper birth control methods with their partners during the study in which MTX is received.

Women of childbearing potential (including those with an onset of menopause<2 years prior to screening, non-therapy-induced amenorrhea for <12 months prior to screening, or not surgically sterile [absence of ovaries and/or uterus]) must have negative serum/urine pregnancy tests during the Screening/MTX Run in Period; participants may be required to use 2 reliable forms of contraception during the study, one of which is recommended to be hormonal, such as an oral contraceptive. Hormonal contraception were started≥1 full cycle prior to Week −4 (start of MTX dosing) and continue for 30 days after the last dose of KRYSTEXXA®. Highly effective contraceptive methods (with a failure rate<1% per year), when used consistently and correctly, include implants, injectables, combined oral contraceptives, some intrauterine devices, sexual abstinence, or vasectomized partner. Men who were not vasectomized must agree to not impregnate their female partner during the study and for at least 3 months after the last dose of MTX.

Laboratory: SUA, CMP, CBC with diff, and pregnancy test for premenopausal women. Additionally, a sample was collected at screening, as well as subsequent visits for evaluation of anti-pegloticase Ab. All lab samples were discarded if the participant is deemed not eligible for the study.

Week −4

Confirm study eligibility through review of the inclusion/exclusion criteria.

Collect medical/surgical history, substance use history, and medication history.

Perform a targeted physical examination included heart, lungs and abdominal exam and joint and skin evaluation and assessment of AEs. Any finding was recorded as an AE.

Document gout flares and intensity.

Record vital signs (blood pressure, respiratory rate, temperature, and heart rate).

Obtain blood samples for hematology and clinical chemistry analysis.

Obtain a urine sample for uric acid:creatinine ratio.

Obtain a urine sample from all females of childbearing potential for performance of a pregnancy test.

Obtain a blood sample for measurement of SUA (only 1 sample for central laboratory).

Collect swollen/tender joint counts; administer HAQ; and record patient and physician global assessments and joint pain assessment responses.

Provide dosing calendar for subjects to record the date and time they take MTX (Additional calendar pages may be provided at future visits as needed).

Dispense MTX.

Fill gout prophylaxis, fexofenadine, acetaminophen, and folic acid prescriptions, as needed.

Inquire about AEs.

Screen failure subjects that take MTX during Week −4 or Week −3, and who were females of childbearing potential, received a safety follow-up phone call/e-mail/site visit approximately 30 days after the last dose of MTX to verify at least one ovulatory cycle had occurred since the last dose of MTX. If the subject had not ovulated, a urine pregnancy test was performed. Screen failure subjects who were non-vasectomized males, a phone/e-mail/site visit inquiry was conducted 3 months after MTX discontinuation regarding partner pregnancy.

Week −2

Confirm study eligibility through review of the inclusion/exclusion criteria.

Obtain blood samples for hematology and clinical chemistry analysis.

Obtain a urine sample for uric acid:creatinine ratio.

Obtain a urine sample from all females of childbearing potential for performance of a pregnancy test.

Obtain a blood sample for measurement of SUA (only 1 sample for central laboratory).

Assess MTX compliance and re-dispense MTX.

Document gout flares and intensity.

Ask Yes/No question regarding folic acid and gout flare prophylaxis compliance.

Fill gout prophylaxis, fexofenadine, acetaminophen, and folic acid prescriptions, as needed.

Collect substance use history, and medication history.

Inquire about AEs.

Screen failure subjects that taken MTX during Week −4 or Week −3, Week −2 or Week −1, and who were females of childbearing potential, received a safety follow-up phone call/e-mail/site visit approximately 30 days after the last dose of MTX to verify at least one ovulatory cycle had occurred since the last dose of MTX. If the subject had not ovulated, a urine pregnancy test was performed. Screen failure subjects who were non-vasectomized males, a phone/e-mail/site visit inquiry was conducted 3 months after MTX discontinuation regarding partner pregnancy.

KXX+IMM Period

Day 1

On Day 1, subjects returned to the clinic for the following assessments and the first dose of pegloticase.

Obtained 1 blood sample for measurement of SUA prior to the pegloticase infusion.

Confirmed study eligibility through review of the inclusion/exclusion criteria.

Administered MTX≥60 minutes prior to pegloticase infusion if subject had not taken MTX within the previous 1 to 3 days.

Performed a targeted physical examination including heart, lungs and abdominal exam and joint and skin evaluation and assessment of AEs. Any finding was recorded as an AE.

Documented gout flares and intensity.

Recorded vital signs (blood pressure [prior and post infusion], respiratory rate, temperature, and heart rate [prior and post infusion]), including measurement of weight prior to infusion.

Performed 12-lead ECG prior to the pegloticase infusion.

Collected swollen/tender joint counts; administer HAQ; and record patient and physician global assessments and joint pain assessment responses.

Assessed MTX compliance and re-dispense MTX.

Ask Yes/No question regarding folic acid, gout flare prophylaxis, and IR prophylaxis compliance.

Filled gout prophylaxis, fexofenadine, acetaminophen, and folic acid prescriptions, as needed.

Obtained blood samples for hematology and clinical chemistry analysis.

Obtained a urine sample for uric acid:creatinine ratio.

Obtained a urine sample from all females of childbearing potential for performance of a pregnancy test.

Obtained blood samples for MTX Polyglutamate analysis prior to the infusion.

Obtained blood samples for anti-PEG and anti-uricase IgG antibodies prior to the infusion.

Obtained blood samples for pegloticase PK analysis prior to the infusion.

Administered IR prophylaxis (i.e., fexofenadine, acetaminophen, and methylprednisolone or hydrocortisone).

Administered the first dose of pegloticase and record date, volume, and duration of infusion, and start/stop (inclusive of 10-mL flush) times of dosing.

Obtained a blood sample (1 sample) for measurement of SUA after the end of the pegloticase infusion prior to discharge.

Obtained blood samples for pegloticase PK analysis after the end of the infusion prior to discharge.

Inquired about AEs and concomitant medication use.

Performed DECT (if applicable).

Week 1 (Non-Infusion Visit for Those Who Consent Only)

Inquired about AEs and concomitant medication use.

Obtained blood samples for pegloticase PK analysis.

Obtained blood samples for anti-PEG and anti-uricase IgG antibodies.

Obtained a blood sample (1 sample) for measurement of SUA

Week 2

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Administer MTX≥60 minutes prior to pegloticase infusion if subject had not taken MTX within the previous 1 to 3 days.

Document gout flares and intensity.

Record vital signs (blood pressure [prior and post infusion], respiratory rate, temperature, and heart rate [prior and post infusion]).

Assess MTX compliance and re-dispense MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain blood samples for hematology and clinical chemistry analysis.

Obtain a urine sample for uric acid:creatinine ratio.

Obtain a urine sample from all females of childbearing potential for performance of a pregnancy test.

Obtain blood samples for pegloticase PK analysis prior to the infusion.

Obtain blood samples for anti-PEG and anti-uricase IgG antibodies prior to the infusion.

Administer IR prophylaxis (i.e., fexofenadine, acetaminophen, and methylprednisolone or hydrocortisone).

Administer pegloticase and record date, volume, and duration of infusion, and start/stop (inclusive of 10-mL flush) times of dosing.

Obtain a blood sample (1 sample) for measurement of SUA after the end of pegloticase infusion prior to discharge.

Obtain blood samples for pegloticase PK analysis after the end of the infusion prior to discharge.

Inquire about AEs and concomitant medication use.

Week 4

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administer MTX≥60 minutes prior to pegloticase infusion if subject had not taken MTX within the previous 1 to 3 days.

Perform a targeted physical examination including heart, lungs and abdominal exam and joint and skin evaluation and assessment of AEs. Any finding was recorded as an AE.

Document gout flares and intensity.

Record vital signs (blood pressure [prior and post infusion], respiratory rate, temperature, and heart rate [prior and post infusion]).

Assess MTX compliance and re-dispense MTX.

Obtain blood samples for MTX Polyglutamate analysis prior to the infusion.

Obtain blood samples for pegloticase PK analysis prior to the infusion.

Obtain blood samples for anti-PEG and anti-uricase IgG antibodies prior to the infusion.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone or hydrocortisone).

Administer pegloticase and record date, volume, and duration of infusion, and start/stop (inclusive of 10-mL flush) times of dosing.

Obtain blood samples for pegloticase PK analysis after the end of the infusion prior to discharge.

Obtain a blood sample (1 sample) for measurement of SUA after the end of pegloticase infusion prior to discharge.

Inquire about AEs and concomitant medication use.

Week 6

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]). Assess MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Obtained blood samples for hematology and clinical chemistry analysis.

Obtained a urine sample for uric acid:creatinine ratio.

Obtained blood samples for pegloticase PK analysis prior to the infusion.

Obtained blood samples for anti-PEG and anti-uricase IgG antibodies prior to the infusion.

Administered IR prophylaxis (i.e., fexofenadine, acetaminophen, and methylprednisolone or hydrocortisone).

Administered pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Obtain blood samples for pegloticase PK analysis after the end of the infusion prior to discharge.

Inquire about AEs and concomitant medication use.

Week 7 (Non-Infusion Visit for Those Who Consent Only)

Inquire about AEs and concomitant medication use.

Obtain blood samples for pegloticase PK analysis

Obtain blood samples for anti-PEG and anti-uricase IgG antibodies prior to the infusion.

Obtain a blood sample (1 sample) for measurement of SUA

Week 8

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Performed a targeted physical examination should include heart, lungs and abdominal exam and joint and skin evaluation and assessment of AEs. Any finding was recorded as an AE.

Documented gout flares and intensity.

Recorded vital signs (blood pressure [prior and post infusion], respiratory rate, temperature, and heart rate [prior and post infusion]), including measurement of weight prior to infusion.

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtain blood samples for MTX Polyglutamate analysis prior to the infusion.

Obtain blood samples for pegloticase PK analysis prior to the infusion.

Obtain blood samples for anti-PEG and anti-uricase IgG antibodies prior to the infusion.

Obtain a urine sample from all females of childbearing potential for performance of a pregnancy test.

Administer IR prophylaxis (i.e., fexofenadine, acetaminophen, and methylprednisolone or hydrocortisone).

Administer pegloticase and record date, volume, and duration of infusion, and start/stop (inclusive of 10-mL flush) times of dosing.

Obtain a blood sample (1 sample) for measurement of SUA after the end of pegloticase infusion prior to discharge.

Obtain blood samples for pegloticase PK analysis after the end of the infusion prior to discharge.

Inquire about AEs and concomitant medication use.

Week 10

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained blood samples for pegloticase PK analysis prior to the infusion.

Obtained blood samples for anti-PEG and anti-uricase IgG antibodies prior to the infusion.

Obtained a urine sample from all females of childbearing potential for performance of a pregnancy test.

Administered IR prophylaxis (i.e., fexofenadine, acetaminophen, and methylprednisolone or hydrocortisone).

Administered pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquired about AEs and concomitant medication use.

Week 12

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Performed a targeted physical examination should include heart, lungs and abdominal exam and joint and skin evaluation and assessment of AEs. Any finding was recorded as an AE.

Documented gout flares and intensity.

Recorded vital signs (blood pressure [prior and post infusion], respiratory rate, temperature, and heart rate [prior and post infusion]).

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone)

Administered pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquired about AEs and concomitant medication use.

Week 14

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).

Collected swollen/tender joint counts; administer HAQ; and record patient and physician global assessments and joint pain assessment responses.

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Obtained blood samples for hematology and clinical chemistry analysis.

Obtained a urine sample for uric acid:creatinine ratio.

Obtained a blood sample for pegloticase PK analysis prior to the infusion.

Obtained a blood sample for MTX Polyglutamate analysis prior to the infusion.

Obtained blood samples for anti-PEG and anti-uricase IgG antibodies prior to the infusion.

Administered IR prophylaxis (i.e., fexofenadine, acetaminophen, and methylprednisolone or hydrocortisone. Administer pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquired about AEs and concomitant medication use.

Week 16

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Performed a targeted physical examination should include heart, lungs and abdominal exam and joint and skin evaluation and assessment of AEs. Any finding was recorded as an AE.

Documented gout flares and intensity.

Recorded vital signs (blood pressure [prior and post infusion], respiratory rate, temperature, and heart rate [prior and post infusion]) including measurement of weight prior to infusion. Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone).

Administer pegloticase and record date, volume, and duration of infusion, and start/stop (inclusive of 10-mL flush) times of dosing.

Obtain a blood sample (1 sample) for measurement of SUA after the end of pegloticase infusion prior to discharge.

Inquire about AEs and concomitant medication use.

Week 18

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]). Assess MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtain aed urine sample from all females of childbearing potential for performance of a pregnancy test.

Obtained blood samples for pegloticase PK analysis prior to the infusion.

Obtained blood samples for anti-PEG and anti-uricase IgG antibodies prior to the infusion.

Administered IR prophylaxis (i.e., fexofenadine, acetaminophen, and methylprednisolone or hydrocortisone).

Administered pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquired about AEs and concomitant medication use.

Week 20

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinude treatment and remained in the study.

Administered MTX≥60 minutes prior to pegloticase infusion if subject had not taken MTX within the previous 1 to 3 days.

Performed a targeted physical examination should include heart, lungs and abdominal exam and joint and skin evaluation and assessment of AEs. Any finding was recorded as an AE.

Documented gout flares and intensity.

Recorded vital signs (blood pressure [prior and post infusion], respiratory rate, temperature, and heart rate [prior and post infusion]).

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone). Administer pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquired about AEs and concomitant medication use.

Week 22

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).

Assessed MTX compliance and re-dispense MTX.

Asked Yes/No question regarding folic acid, gout flare prophylaxis, and IR prophylaxis compliance.

Week 24

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remaiedn in the study.

Administered MTX≥60 minutes prior to pegloticase infusion if subject had not taken MTX within the previous 1 to 3 days.

Performed a targeted physical examination should include heart, lungs and abdominal exam and joint and skin evaluation and assessment of AEs. Any finding was recorded as an AE.

Documented gout flares and intensity.

Recorded vital signs (blood pressure [prior and post infusion], respiratory rate, temperature, and heart rate [prior and post infusion]), including measurement of weight prior to infusion. Collected swollen/tender joint counts; administer HAQ; and record patient and physician global assessments and joint pain assessment responses. Assess for the presence of tophi.

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained blood samples for hematology and clinical chemistry analysis.

Obtained a urine sample for uric acid:creatinine ratio.

Obtained a urine sample from all females of childbearing potential for performance of a pregnancy test.

Obtained blood samples for MTX Polyglutamate analysis prior to the infusion.

Obtained blood samples for pegloticase PK analysis prior to the infusion.

Obtained blood samples for anti-PEG and anti-uricase IgG antibodies prior to the infusion.

Administered IR prophylaxis (i.e., fexofenadine, acetaminophen, and methylprednisolone or hydrocortisone).

Administered the first dose of pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquired about AEs and concomitant medication use.

Performed DECT (if applicable).

Performed Investigator assessment of Clinical Status.

Week 26

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]). Assess MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone).

Administered pegloticase and record date, volume, and duration of infusion, and start/stop (inclusive of 10-mL flush) times of dosing.

Inquired about AEs and concomitant medication use.

Week 28

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administer MTX≥60 minutes prior to pegloticase infusion if subject had not taken MTX within the previous 1 to 3 days.

Document gout flares and intensity.

Record vital signs (blood pressure [prior and post infusion], respiratory rate, temperature, and heart rate [prior and post infusion]). Assess MTX compliance and re-dispense MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone or hydrocortisone). Administer pegloticase and record date, volume, and duration of infusion, and start/stop (inclusive of 10-mL flush) times of dosing.

Inquire about AEs and concomitant medication use.

Week 30

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).Assess MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone). Administered pegloticase and record date, volume, and duration of infusion, and start/stop (inclusive of 10-mL flush) times of dosing.

Inquired about AEs and concomitant medication use.

Week 32

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).Assess MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administer IR prophylaxis (i.e., fexofenadine, acetaminophen, and methylprednisolone or hydrocortisone).Administer pegloticase and record date, volume, and duration of infusion, and start/stop (inclusive of 10-mL flush) times of dosing.

Obtain a blood sample (1 sample) for measurement of SUA after the end of pegloticase infusion prior to discharge.

Inquire about AEs and concomitant medication use.

Week 34

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]). Assess MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone), administer pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquire about AEs and concomitant medication use.

Week 36

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administer MTX≥60 minutes prior to pegloticase infusion if subject had not taken MTX within the previous 1 to 3 days.

Document gout flares and intensity.

Perform a targeted physical examination including heart, lungs and abdominal exam and joint and skin evaluation and assessment of AEs. Any finding was recorded as an AE.

Record vital signs (blood pressure [prior and post infusion], respiratory rate, temperature, and heart rate [prior and post infusion]) including measurement of weight.

Collect swollen/tender joint counts; administer HAQ; and record patient and physician global assessments and joint pain assessment responses.

Assess for the presence of tophi.

Assess MTX compliance and re-dispense MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain blood samples for hematology and clinical chemistry analysis.

Obtain a urine sample for uric acid:creatinine ratio.

Obtain blood samples for pegloticase PK analysis prior to the infusion.

Obtain blood samples for anti-PEG and anti-uricase IgG antibodies prior to the infusion.

Obtain blood samples for MTX Polyglutamate analysis prior to the infusion.

Administer IR prophylaxis (i.e., fexofenadine, acetaminophen, and methylprednisolone or hydrocortisone), administer pegloticase and record date, volume, and duration of infusion, and start/stop (inclusive of 10-mL flush) times of dosing.

Obtain a blood sample (1 sample) for measurement of SUA after the end of pegloticase infusion prior to discharge.

Obtain blood samples for pegloticase PK analysis after the end of the infusion prior to discharge.

Perform DECT (if applicable).

Inquire about AEs and concomitant medication use.

Week 38

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administer MTX≥60 minutes prior to pegloticase infusion if subject had not taken MTX within the previous 1 to 3 days.

Document gout flares and intensity.

Record vital signs (blood pressure [prior and post infusion], respiratory rate, temperature, and heart rate [prior and post infusion]).

Assess MTX compliance and re-dispense MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone or hydrocortisone), administer pegloticase and record date, volume, and duration of infusion, and start/stop (inclusive of 10-mL flush) times of dosing. Inquire about AEs and concomitant medication use.

Week 40

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administer edMTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).Assess MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone). Administered pegloticase and record date, volume, and duration of infusion, and start/stop (inclusive of 10-mL flush) times of dosing.

Inquired about AEs and concomitant medication use.

Week 42

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]). Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone).

Administered pegloticase and record date, volume, and duration of infusion, and start/stop (inclusive of 10-mL flush) times of dosing.

Inquired about AEs and concomitant medication use.

Week 44

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone). Administered pegloticase and record date, volume, and duration of infusion, and start/stop (inclusive of 10-mL flush) times of dosing.

Inquired about AEs and concomitant medication use.

Week 46

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]).

Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administered IR prophylaxis (i.e., fexofenadine, acetaminophen, and methylprednisolone or hydrocortisone). Administered pegloticase and record date, volume, and duration of infusion, and start/stop (inclusive of 10-mL flush) times of dosing.

Inquired about AEs and concomitant medication use.

Week 48

Obtained 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure [prior and post infusion], respiratory rate, temperature, and heart rate [prior and post infusion]). Assessed MTX compliance and re-dispense MTX.

Asked Yes/No question regarding folic acid, gout flare prophylaxis, and IR prophylaxis compliance.

Filled gout prophylaxis, fexofenadine, acetaminophen, and folic acid prescriptions, as needed.

Obtained a urine sample from all females of childbearing potential for performance of a pregnancy test.

Administer IR prophylaxis (i.e., fexofenadine, acetaminophen, and methylprednisolone or hydrocortisone).Administer pegloticase and record date, volume, and duration of infusion, and start/stop (inclusive of 10-mL flush) times of dosing.

Obtain a blood sample (1 sample) for measurement of SUA after the end of pegloticase infusion prior to discharge.

Inquire about AEs and concomitant medication use.

Week 50

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit. Stopping Rule: Subjects with an SUA level>6 mg/dL at 2 consecutive study visits beginning with the Week 2 Visit (not including post-infusion samples) discontinued treatment and remained in the study.

Administered MTX≥60 minutes prior to pegloticase infusion if subject had not taken MTX within the previous 1 to 3 days.

Documented gout flares and intensity.

Recorded vital signs (blood pressure, one measurement [prior and post infusion], respiratory rate, temperature, and heart rate [prior and post infusion]). Assessed MTX compliance and dispense.

Asked Yes/No question regarding folic acid, gout flare prophylaxis, and IR prophylaxis compliance.

Obtained a urine sample from all females of childbearing potential for performance of a pregnancy test.

Administered IR prophylaxis (i.e., fexofenadine, acetaminophen, and methylprednisolone or hydrocortisone).

Administered pegloticase and record date, volume, and duration of infusion, and start/stop (inclusive of 10-mL flush) times of dosing.

Obtained a blood sample (1 sample) for measurement of SUA after the end of pegloticase infusion prior to discharge.

Inquired about AEs and concomitant medication use.

MTX was taken one week following the Week 50 Visit and Folic Acid was taken until just prior to the Week 52 Visit.

End of Pegloticase Infusions Visit

Subjects who end pegloticase infusions prior to Week 52 completed the End of Pegloticase Infusions Visit procedures following their final infusion. Subjects continued to participate in all visits through the end of the study. Subjects completed selected study visits at the study site during key efficacy and safety collections Weeks 10, 12, 14, 20, 22, 24, 32, 34, 36, 48, 50 and 52, so that SUA labs and other key assessments can be completed. Visits between these key efficacy and safety collection visits, for subjects who stopped infusions, may be completed in person or via a telephone visit option to collect AEs, concomitant medication and gout flare information. The following procedures were completed at the End of Pegloticase Visit:

Investigator Assessment of Clinical Status.

Document gout flares and intensity.

Perform a targeted physical examination including heart, lungs and abdominal exam and joint and skin evaluation and assessment of AEs. Any finding was recorded as an AE.

Record vital signs (blood pressure, respiratory rate, temperature, and heart rate including the measurement of weight. Collect swollen/tender joint counts; administer HAQ; and record patient and physician global assessments and joint pain assessment responses.

Assessment of Tophi.

Assess MTX compliance.

Ask Yes/No question regarding folic acid, gout flare prophylaxis, and IR prophylaxis compliance.

Obtain a urine sample from all females of childbearing potential for performance of a pregnancy test.

Obtain blood samples for hematology and clinical chemistry analysis.

Obtain a urine sample for uric acid:creatinine ratio.

Obtain blood samples for pegloticase PK analysis.

Obtain blood samples for anti-PEG and anti-uricase IgG antibodies.

Obtain a blood sample (1 sample) for measurement of SUA.

Inquire about AEs and concomitant medication use.

Perform DECT (if applicable). DECT may be completed within +/−5 days of the scheduled visit. Subjects who end pegloticase infusions prior to Week 52 should follow the scheduled timepoints but avoid a repeat DECT scan within 6 weeks of a prior scan.

Week 52/End of Study/Early Termination Visit

Investigator Assessment of Clinical Status.

Perform a targeted physical examination including heart, lungs and abdominal exam and joint and skin evaluation and assessment of AEs. Any finding was recorded as an AE.

Assessment of Tophi.

Document gout flares and intensity.

Record vital signs (blood pressure, respiratory rate, temperature, heart rate) and weight measurement. Collect swollen/tender joint counts; administer HAQ; and record patient and physician global assessments and joint pain assessment responses.

Assess MTX compliance.

Ask Yes/No question regarding folic acid, gout flare prophylaxis, and IR prophylaxis compliance.

Obtain a sample from all females of childbearing potential for performance of a pregnancy test.

Obtain blood samples for hematology and clinical chemistry analysis.

Obtain a urine sample for uric acid:creatinine ratio.

Obtain a blood sample (1 sample) for measurement of SUA.

Obtain blood samples for pegloticase PK analysis.

Obtain blood samples for anti-PEG and anti-uricase IgG antibodies.

Inquire about AEs and concomitant medication use.

Perform DECT (if applicable). DECT may be completed within +/−5 days of the scheduled visit.

Safety Follow-up Phone/Email/Site Visits

Thirty (30) days after the last MTX dose, subjects were contacted by telephone or email or may visit the site to review SAEs. Subjects who were females of childbearing potential were asked to confirm that ovulation had occurred. If the subject had not ovulated, the subject was requested to return to the site for a urine pregnancy test.

Post Treatment Follow-up

The intent was for at least 6 months of follow-up on each subject after cessation of pegloticase infusions. If these 6 months occur prior to end of study at Week 52, such as in the case of a subject who ends pegloticase infusions on or before Week 24, there were no follow-up visits after the Week 52/End of Study Visit. For subjects who end pegloticase infusions between Weeks 26 and 36, there were at least 3 months of follow-up while the subject remains on-study prior to Week 52, and then one follow-up visit after the Week 52/End of Study Visit. For subjects who end pegloticase infusions between Weeks 38 and 52, there were two follow-up visits at intervals of 3 months apart after the Week 52/End of Study Visit. The following procedures were completed at the 3- and 6-month Post Treatment Follow-up Visits:

Document gout flares and intensity.

Record vital signs (blood pressure, respiratory rate, temperature, heart rate and weight). Perform a targeted physical examination including heart, lungs and abdominal exam and joint and skin evaluation and assessment of AEs. Any finding was recorded as an AE.

Collect swollen/tender joint counts; administer HAQ; and record patient and physician global assessments and joint pain assessment responses.

Assessment of Tophi.

Obtain blood samples for hematology and clinical chemistry analysis. Obtain a blood sample (1 sample) for measurement of SUA. Obtain blood samples for anti-PEG and anti-uricase IgG antibodies prior to the infusion (3 Month Post Treatment Follow-up Visit only),Inquire about AEs and concomitant medication use.

Infusion Reaction Ophylaxis

It is required that before a subject begins the KXX+MTX Period, he or she had been taking at least one protocol standard gout flare prophylaxis regimen (i.e., colchicine and/or non-steroidal anti-inflammatory drugs and/or low-dose prednisone≤10 mg/day) for ≥1 week before the first dose of pegloticase and continues flare prophylaxis per American College of Rheumatology guidelines (Khanna et al., 2012) for the greater of (1) 6 months, (2) 3 months after achieving target serum urate (SUA<6 mg/dL) for patients with no tophi detected on physical exam, or (3) 6 months after achieving target serum urate (SUA<5 mg/dL) for patients with one or more tophi detected on initial physical exam that have since resolved. For IR prophylaxis, fexofenadine (60 mg or 180 mg orally based on the Principal Investigator's discretion) was taken the day before each infusion; fexofenadine (60 mg or 180 mg orally based on the Principal Investigator's discretion) and acetaminophen (1000 mg orally) were taken the morning of each infusion; and methylprednisolone (125 mg IV) given over the infusion duration 10-30 minutes (recommended) or hydrocortisone (200 mg IV) was administered immediately prior to each infusion. Gout flare prophylaxis continued for the duration of the study unless medically contraindicated or not tolerated.

Example 6

Medications and Dosing

Pharmacy—MTX 2.5 mg tablets for oral administration were provided to subjects as a commercially available generic. MTX was purchased in bulk quantity. The centralized management of the medication allowed maintenance of a trial. Adherence to the medication was recorded by pill counts at the follow-up study visits and consumption of at least 80% were required to consider the participant compliant. A non-compliant participant continued in the study and entered analyses as mandated by statistician.

Pegloticase—Pegloticase, a clear, colorless, sterile solution in phosphate-buffered saline intended for IV infusion after dilution, were supplied by Horizon Pharma, PLC. Pegloticase is commercially available in the US in a single-use, 2 mL glass vial with a Teflon® coated (latex-free) rubber injection stopper. Each mL of pegloticase contained 8 mg of uricase protein conjugated to 24 mg of 10 kDa monomethoxypoly(ethylene glycol). Excipients included disodium hydrogen phosphate dihydrate, sodium chloride, sodium dihydrogen phosphate dehydrate, and water for injection.

All participants in the study received pegloticase at the same dose of 8 mg administered IV every 2 weeks for a total of 6 infusions over a 12-week treatment period, and over an additional 12-week pegloticase opt-in follow-up period (per standard of care).

Packaging and Clinical Supplies—Study drug pegloticase was provided by Horizon Pharma, PLC.

Storage and Return—Before preparation for use, pegloticase was stored in the carton, maintained under refrigeration between 2° C. and 8° C. (36° F. and 46° F.), protected from light, and was not shaken or frozen. Investigational clinical supplies were received by a designated person at the study site, handled and stored safely and properly, and kept in a secured location to which only the Investigator and designated assistants had access. Clinical supplies were dispensed only in accordance with the protocol. Accurate records were kept of the clinical supplies received, the amount dispensed for each participant, and the amount remaining at conclusion of the study. The label of any vials that were not to be used were marked with a large "X," and the reason for rejecting them was documented on the drug accountability log. In accordance with good pharmacy practice, gloves were worn during preparation of the dose.

The study sites maintained an inventory of drug supplies received and dispensed. UAB provided forms to document all inventory transactions. Upon completion or termination of the study, all clinical pegloticase supplies (used and unused), were destroyed with written certification confirming destruction within sixty (60) days of study completion or expiration of the study drug.

Preparation—Vials were visually inspected for particulate matter and discoloration before administration, whenever solution and container permit. Vials were not used if either was present. Using appropriate aseptic technique, 1 mL of pegloticase was withdrawn from the vial into a sterile syringe. Any unused portion of product remaining in the vial was discarded. Syringe contents were injected into a single 250 mL bag of 0.45% or 0.9% Sodium Chloride Injection, United States Pharmacopeia (USP) for IV infusion and was not mixed or diluted with other drugs. The infusion bag containing the dilute pegloticase solution was inverted several times, but not shaken, to ensure thorough mixing.

Pegloticase diluted in infusion bags was stable for 4 hours at 2° C. to 8° C. (36° F. to 46° F.) and at room temperature (20° C. to 25° C., 68° F. to 77° F.); however, the diluted solution was stored under refrigeration, not frozen, protected from light, and used within 4 hours of dilution. Before administration, the diluted solution of pegloticase was allowed to reach room temperature. Pegloticase in a vial or IV infusion fluid was never subjected to artificial heating.

Administration—Pegloticase was administered as an admixture of 8 mg in 250 mL of 0.45% or 0.9% Sodium Chloride Injection, USP for IV infusion over a target infusion time of 120 minutes by gravity feed or infusion pump. Pegloticase was not administered as an IV push or bolus. Standardized IR prophylaxis consisting of pre-treatment with antihistamines and corticosteroids accompanied each infusion. The drug name, dose, and timing of these prophylactic medications were recorded.

Participants were not fasting on the day of infusion; they were encouraged to have a snack or normal meal 1 hour before, or immediately after, the infusion. Prior to pegloticase infusion participants received infusion prophylaxis (e.g., oral fexofenadine (60 mg) the night before and fexofenadine (60 mg/PO) and acetaminophen (1000 mg/PO) the morning of the infusion; and hydrocortisone IV (200 mg) immediately prior to the infusion).

In a patent IV site, using tubing with no in-line filter, infuse the drug preparation over approximately 120 minutes (within ±15 minutes) while the participant was under close observation for any signs of distress. Administration of drug was immediately discontinued if respiratory distress, agitation, chest or back pain, urticaria, or another clinically significant event occurs during infusion. If the AE meets the definition of an SAE, the infusion may not be restarted under any circumstances. A SAE was reported within 2 hours or sooner to the Data Safety Monitoring Board (DSMB). If the AE does not meet the definition of an SAE, the site PI may make the decision to re-start the infusion depending upon the nature and severity of the AE.

Infusions after an infusion-related reaction in an individual participant may be given in a larger volume of diluent, not to exceed 500 mL. In such a case, the infusion duration was also extended to a minimum of 3 hours. The total volume and duration of infusion was captured in the medical record and CRF.

As a precaution, emergency equipment was readily available to treat a possible hypersensitivity reaction and included drugs that treat an anaphylactic reaction. Personnel fully trained in advanced cardiopulmonary resuscitation and in the use of the emergency equipment was readily available during, and for 1 hour after, the infusion. At the end of the infusion, the IV line was flushed with 10 mL of normal saline to assure the full dose was administered. As IRs can occur after completion observation of participants for approximately an hour post-infusion was performed.

Methotrexate (MTX)—MTX, the immune modulator therapy for the study, is an antifolate drug, and thus inhibits the activation of folic acid in the body. MTX is structurally similar to folic acid, which is important for making new cells. MTX inhibits the enzyme dihydrofolate reductase, which activates folic add.

Packaging and Clinical Supplies:

Labeling—Blinded study drug labeling was annotated with the protocol number by the research pharmacist at the University of Alabama at Birmingham.

Administration—Patients were instructed on how to take MTX. If a dose was missed, it was administered as soon as it was remembered. If it was close to the next scheduled dose, the participant was instructed to skip the missed dose and resume at the next regularly scheduled time; thus, participants were instructed not to double a dose to make up for a missed dose.

Concomitant Medications—Concomitant medications were defined as drug or biological products other than the study drug(s) taken by a participant during the clinical trial. This includes other prescription medications (including preventive vaccines), over-the-counter medications, herbal medications, vitamins, and food supplements.

A comprehensive list of participant's concomitant medications were collected at baseline and at each visit. This included the name of the drug/vitamin/supplement, dose, route of administration, start and stop dates, and the reason for which the medication was taken. All medications were listed by participant using the generic name(s) of the drug/vitamin/supplement.

Severe/Serious adverse events related to the use of a concomitant drug/vitamin/supplement were documented on the appropriate AE CRF.

Gout Flare Prophylaxis—All participants received prophylactic treatment to reduce the risk of acute gout flares, unless medically contraindicated or not tolerated as noted in the FDA-approved pegloticase full prescribing information. The participant began a regime of colchicine (0.6 mg/day) or NSAID prophylaxis at least 1 week before the first dose of pegloticase and continued for the duration of pegloticase therapy. Colchicine prophylaxis was not interrupted during the clinical trial unless medically contraindicated or if the participant became intolerant of colchicine, regardless of whether a gout flare occurs.

Gout Flare Treatment—An increase in gout flares was frequently observed upon initiation of anti-hyperuricemic therapy, including treatment with pegloticase. Participants were instructed to contact the site within 12 hours of the onset of symptoms. Gout flares were confirmed through questioning or direct observation. All participants who experience a gout flare during the study were prescribed anti-inflammatory treatment (e.g., corticosteroids, NSAIDs, colchicine) as deemed clinically indicated by the study physician.

Colchicine may be prescribed in a medically appropriate dose range of 0.6 to 1.8 mg/day, usually dosed as 0.6 mg orally twice per day unless reduced dosing was necessitated by renal insufficiency or gastrointestinal intolerance. The precise dose and regimen of colchicine was individualized for each participant by the investigators, such as in the case of renal insufficiency where colchicine was appropriately started at 0.6 mg/day and increased to three times a day as tolerated.

Example 7

Statistical Methods

The co-primary aims of our initial double-blind, placebo-controlled study were to 1) assess the feasibility of a course of immune modulating therapy with daily methotrexate (MTX). We tested the hypothesis that MTX safely attenuated immunogenicity conferred by pegloticase as determined by the proportion of participants achieving and maintaining an SUA≤to 6 mg/dL, compared to concurrent controls. The proportion of participants achieving and maintaining an SUA≤to 5 mg/dL, compared to concurrent controls was also determined. After co-administration, all participants continued on pegloticase for an additional course of KXX without combination MTX therapy to evaluate the longer-term benefits and safety of this approach; and 2) Assess the incidence and types of adverse events/infusion reactions.

Data Management—The DCC has extensive experience in data management in over approximately 15 active national/international collaborative studies. The data management systems and approaches employed for RECIPE were based on existing, highly successful platforms. The MITS Suite (a distributed data management system) consists of the MITS Studio (electronic Data Entry Management System [eDEMS] Authoring Tool) and the Testing Framework. The clinical centers were responsible for the entry and management of data from their own center, providing cost-effective (as it removes practically all of the query process) higher quality data.

Validation of data—Validation of data was done using the MITS Suite, which contains mechanisms to ensure accuracy, reliability, and the ability to discern invalid or altered records.

Data Analysis—Primary Aims

One of the primary objectives of this study was to determine if there was an overall reduction in immunogenicity leading to increased responders (i.e., enhanced response rate) to pegloticase when MTX was co-administered in adults with chronic refractory gout. This primary objective can be assessed by estimation of the response rate during month 6 (weeks 20, 22, and 24), as measured by the sustained normalization of serum uric acid (SUA) to <6 mg/dL for at least 80% of the time during month 6 in subjects receiving pegloticase with MTX. A decision table was prepared indicating when sufficient evidence was present to move forward to a full-scale clinical trial. Comparison may be made comparing the success rates in peg+MTX versus peg+PBO.

Statistical Analysis on Efficacy Parameters

Efficacy analyses were performed using the modified intention-to-treat (mITT) population, defined as all enrolled subjects who received≥1 dose of pegloticase. The proportion of Month 6 responders was summarized, along with a 95% confidence interval for the proportion. The proportion of Month 3 and overall (Months 3 and 6 combined) responders was analyzed similarly.

A subject was declared a non-responder if the subject had SUA level>6 mg/dL at 2 consecutive study visits beginning with the Week 2 Visit. In addition, a subject who withdraws from study treatment for any reason after the first dose of pegloticase in the KXX+MTX Period and prior to Month 6 (for the primary endpoint) or Month 3 (for the secondary endpoint) was considered a non-responder if SUA values were not collected at the planned time points.

Swollen/tender joint counts, HAQ scores, patient and physician global assessment scores, subject assessment of joint pain scores, and mean SUA changes from baseline and values at baseline and each visit were summarized with descriptive statistics. The proportion of subjects achieving 20%, 50%, or 70% improvement based on gout chronic response criteria were summarized. For subjects with DECT scans, changes from baseline and values at Weeks 24, 36 and 52 for urate volume were summarized with descriptive statistics.

Other statistical methods may be used as necessary to analyze the data. Participants before the primary endpoint that do not tolerate MTX, or were lost to follow-up, withdraw, or were otherwise not evaluable were counted as failures but not non-responders in sensitivity analyses.

In the event of missing antibody data, imputations were considered to assure data completeness for our analyses using PROC MI and PROC MIANALYZE procedures with 5 replicates per value. All analyses were conducted using SAS (V9.4, Cary, North Carolina).

Data Analysis—Secondary Aims and Safety Aims.

The secondary and safety aims were to: 1) Determine the 6 month durability of immune modulation after discontinuation of the course of MTX by: a) assessing the absolute change in SUA from baseline to specific timepoints during treatment with KXX and MTX, and b) determining the proportion of participants with SUA<6 mg/dL throughout the study; 2) Identify and characterize the pegloticase immune response by immunoglobulin isotypes (IgG and IgM), specificities, and antibody titer, and 3) Examine patient reported outcomes (PROs) using the NIH supported Patient Reported Outcomes Measurement Information System (PROMIS) and Gout Impact Scale (GIS) instruments.

Example 8

Adverse Events (AEs)

This study examines two medications (pegloticase and MTX) that were already FDA approved and have been in clinical use for over 5 years but were not commonly co-administered. An AE was defined as any untoward event, whether or not it was considered related to the use of pegloticase or MTX. Any worsening (i.e., any clinically significant adverse change in frequency or intensity) of a preexisting condition which was temporally associated with the use of pegloticase or MTX was also considered an AE. Abnormal laboratory values or test results constitute AEs only if they induce clinical signs or symptoms or require therapy, and were recorded on the AE CRF under the signs, symptoms or were associated with diagnoses associated with them. Screening conditions were not considered AE; however, worsening of a preexisting condition may be considered an AE. AEs were collected starting at the baseline, Visit 1.

The safety events of interest in assessing study risks and benefits were IRs and a co-primary study outcome. Participants were followed for the occurrence of IR and secondary outcomes of interest events at each study visit. Supplementing the data collected during these visits was information collected regarding participant reported health-related quality of life (QOL), and for improved, near real-time assessment of outcome events. Non-severe/serious events that were expected according to previous experience with the study drugs (pegloticase, MTX) as described in the protocol, consent materials, or any approved product labelling were also collected. All severe/serious AEs were reported according to appropriate authority (e.g., FDA, IRB) in compliance with guidelines and regulations.

Expected AEs Associated with KXX

An AE that was not an unexpected AE was an infusion reaction and rarely anaphylaxis. Safety assessments in this study include an evaluation of the frequency and severity of IRs and anaphylaxis. During pre-marketing controlled clinical trials, infusion reactions were reported in 26% of patients treated with pegloticase 8 mg every 2 weeks. During pre-marketing controlled clinical trials, anaphylaxis was reported with a frequency of 6.5% of patients treated with pegloticase. For the purposes of this study, these events shall be defined as follows:

IR—not attributable to another cause that occurs during or within 2 hours after the infusion of pegloticase was defined as an AE. Other cases that occur outside of the 2-hour window may also be categorized as an IR as per site PI discretion.

Anaphylaxis was defined using the National Institute of Allergy and Infectious Diseases (NIAID)/Food Allergy and Anaphylaxis Network (FAAN) criteria: acute onset of an illness (minutes to several hours) with involvement of the skin, mucosal tissue, or both (e.g., generalized hives; pruritus or flushing; urticarial, and angioedema (of lips, tongue, or uvula) and at least one of the following: Hypotension (i.e., systolic blood pressure<90 mm Hg or >30% decrease from that person's screening) or associated symptoms of end-organ failure (e.g., hypotonia [collapse], syncope, incontinence; persistent gastrointestinal symptoms (e.g., crampy, abdominal pain, vomiting), and respiratory compromise (e.g., dyspnea, bronchospasm, stridor, reduced peak expiratory flow, hypoxemia).

Pegloticase has not been formally studied in patients with congestive heart failure, but some patients in clinical trials have experienced exacerbation. Patients who had diagnosed congestive heart failure were not enrolled in the study. It is common for potent urate lowering therapies to lead to acute attacks of gout. Other uncommon symptoms reported in at least 5% patients treated with pegloticase that may occur during the study period were ecchymoses, sore throat, constipation, chest pain, and vomiting.

Expected AEs Associated with MTX

Gastrointestinal: Nausea and vomiting (RA: 12%), diarrhea;

Hematologic & oncologic: Leukopenia (renal transplant: >50%; RA: 28%), neoplasia (renal transplant 3% (other than lymphoma), 0.5% (lymphoma)), thrombocytopenia;

Hepatic: Hepatotoxicity, increased serum alkaline phosphatase, increased serum bilirubin, increased serum transaminases;

Infection: Increased susceptibility to infection (renal transplant 20%; RA<1%; includes bacterial, fungal, protozoal, viral, opportunistic, and reactivation of latent infections)

Expected AEs Associated with Colchicine

Participants taking colchicine for gout flare prophylaxis may experience gastrointestinal intolerance which may lead to nausea, persistent diarrhea, and/or gastrointestinal bleeding. The most commonly reported side effects for the prophylaxis of gout was diarrhea (23%) and pharyngolaryngeal pain (3%).

Other AEs associated with colchicine include: Neutropenia, leading to an increased risk of infection; Anemia; Myalgia or myositis; Alopecia; Pruritus; Neuropathy; Oligospermia.

While taking colchicine participants should avoid eating grapefruit and Seville oranges or drinking grapefruit juice or Seville orange juice. These can increase their chances of getting serious side effects.

Serious Adverse Event (SAE) Criteria

A SAE is any AE occurring at any dose that results in any of the following outcomes: Death; Is life-threatening (places the participant, in the view of the site PI, at immediate risk of death from the AE as it occurred); Inpatient hospitalization or prolongation of existing hospitalization (hospitalization is defined as an inpatient admission, regardless of length of stay, even if hospitalized as a precautionary measure for continued observation); A permanent, persistent, or significant disability (substantial disruption of the ability to conduct normal life functions). A medically significant AE that may jeopardize the participant and may require medical or surgical intervention to prevent one of the outcomes listed in this definition Events NOT considered to be Severe or Serious AEs are: Hospitalization for treatment, which was elective or pre-planned, for a pre-existing condition that did not worsen; Treatment on an emergency, outpatient basis for an event NOT fulfilling any of the definitions of serious given above and NOT resulting in hospital admission; An event that, had it occurred in a more severe form, might have caused death; A sign, symptom, or event that is noticeable but easily tolerated; An event does not significantly influence performance or prevent the participant from carrying on with usual life activities.

Infusion Reaction Prophylaxis

Since IRs can occur with pegloticase, all subjects received IR prophylaxis prior to each infusion, consisting of an antihistamine, acetaminophen, and a corticosteroid. To standardize this regimen, subjects received fexofenadine (60 mg or 180 mg orally based on the Principal Investigator's discretion) the day before each infusion; fexofenadine (60 mg or 180 mg orally based on the Principal Investigator's discretion) and acetaminophen (1000 mg orally) the morning of each infusion; and methylprednisolone (125 mg IV) given over the infusion duration 10-30 minutes (recommended) or hydrocortisone (200 mg IV) was administered immediately prior to each infusion.

Infusion Reaction Treatment

Subjects were monitored closely for signs and symptoms of IRs. In the event of an IR, the infusion should be slowed, or stopped, and restarted at a slower rate at the discretion of the Investigator. If a serious IR occurs, the infusion should be discontinued and treatment should be provided as needed.

If a subject experiences an AE suspected to be an IR:

A physical examination was performed to capture medically relevant details, including, but not limited to, a thorough dermatologic examination for detection of erythema, urticaria (hives), or peri-oral or lingual edema; a chest examination for breath sounds, stridor or wheezing; and a cardiac examination with attention to irregular heartbeat.

Vital signs (sitting or supine blood pressure, heart rate, respiratory rate, and body temperature) were captured at least every 30 minutes until the resolution or stabilization of the AE.

A serum sample was collected in a serum-separating tube at that time or at the subsequent visit. The sample was centrifuged, frozen at −20° C. or colder, and stored for the batch shipment to a Horizon designated laboratory for evaluation of pegloticase antibodies at a future date.

If, in the Investigator's opinion, the subject was experiencing an anaphylactic reaction, pegloticase was immediately discontinued. Any incidence of anaphylaxis was reported as an SAE.

The Investigator may administer any medically indicated pharmacologic agent or procedure intended to relieve symptoms.

After the first incidence of an IR that does not meet the criteria of anaphylaxis or does not meet serious criteria, the Investigator may elect to initiate the next infusion at a slower rate. Additionally, the Investigator may choose to prescribe prednisone (e.g., 20 mg) to be taken in the morning of the next infusion. All changes to infusion rate or dilution, and drugs given for prophylaxis or treatment, were to be recorded in the medical record and in the eCRF.

Example 9

Discontinuation and Participant Withdrawal

Due to the risk of anaphylaxis and IRs being higher in patients who have lost therapeutic response, participants with SUA levels above 6 mg/dL at 2 consecutive visits shall be classified as a non-responder and discontinued from the study. Investigators obtained a pre-dose SUA sample for all patients and reviewed results to verify the SUA level was <6 mg/dL prior to infusion.

Participants could withdraw their consent and discontinue the study at any time by informing the study coordinator. Following OHRP guidance and recommendations on this topic (hhs.gov/ohrp/policy/subjectwithdrawal.html#), if a subject decided to withdraw, we inquired as to whether the subject wished to withdraw from all components of the trial or only from the primary intervention. If the latter, we encouraged continuation on follow-up data collection activities for which the subject previously gave consent. These data may prove very useful Moreover, we documented each case of withdrawal, whether it was based on the decision of the participant or investigator (e.g., non-compliance), and whether the withdrawal was from all study components or only the primary intervention.

If the study drug was discontinued, unless the subject withdrew consent, the subject was followed for the full study period and all data were collected as scheduled. Participants that were lost to follow-up or withdraw and do not provide data informative to the primary study were replaced. This may include but was not limited to the following reasons: (1) The subject deciding to withdraw consent for study; (2) An intolerable AE as judged by study site PI and participant; (3) The subject discontinuing acceptable birth control methods or becoming pregnant; (4) The subject enrolling in a conflicting investigational drug trial.

In the event a participant was lost to follow-up, withdraws consent and discontinues the study before the end and was therefore unable to contribute to the primary outcome, the enrolling site was afforded the opportunity to enroll a replacement participant. Attempts were made to schedule an early end of study assessment in the case of study drug discontinuation.

As stated above, premenopausal women had a pregnancy test before the study started and again throughout the study. If participants suspected that they may have become pregnant during the study, the study coordinator contacted the study PI immediately and the PI or Study Coordinator instructed the participant to stop taking all study medication. If it was confirmed that the participant was pregnant, they were withdrawn from the study. The study PI scheduled a follow-up visit and followed the outcome of the pregnancy. If it was discovered that participants were breastfeeding, they were not eligible to participate in the study and their participation was discontinued immediately.

Based on the known safety profiles of pegloticase and MTX and the procedures in place, it is very unlikely, but possible, that we could witness one severe AE related to infection. We instituted a stopping rule for safety re-evaluation that would occur if we register more than one of such severe adverse reaction (e.g., infection that leads to hospitalization). We then stopped the study to comprehensively review safety and our study protocols in conjunction with the DSMB. Other severe adverse reaction or deaths may or may not be related to the study and stopping or discontinuation of the study was considered on an individual basis.

Example 10

Randomized, Double-Blind, Placebo-Controlled, Multicenter, Efficacy and Safety Study of MTX to Increase Response Rates in Patients with Uncontrolled Gout Receiving KXX The overall objective of this study was to assess the potential for pegloticase with MTX to increase the response rate seen with pegloticase alone, and to characterize the safety, tolerability and pharmacokinetics (PK) of the concomitant use of pegloticase with MTX, by comparing pegloticase co-administered with MTX to pegloticase co-administered with placebo for MTX in adults with uncontrolled gout.

Primary Objective: The primary objective was to evaluate the effect of pegloticase with MTX vs. pegloticase with placebo for MTX on the response rate during Month 6 (Weeks 20, 21, 22, 23 and 24), as measured by the sustained normalization of SUA to <6 mg/dL for at least 80% of the time during Month 6.

Secondary Objectives (Analyzed Sequentially):

Evaluate the effect of pegloticase with MTX vs. pegloticase with placebo for MTX on the response rate during Month 9 (Weeks 32, 34, and 36), as measured by the sustained normalization of SUA to <6 mg/dL for at least 80% of the time during Month 9.

Evaluate the effect of pegloticase with MTX vs. pegloticase with placebo for MTX on the response rate during Month 12 (Weeks 48, 50, and 52), as measured by the sustained normalization of SUA to <6 mg/dL for at least 80% of the time during Month 12.

Evaluate the effect of pegloticase with MTX vs. pegloticase with placebo for MTX on the complete resolution of ≥1 tophi (using digital photography) at Week 52 in subjects with tophi at baseline.

Exploratory Objectives

Evaluate the effect of pegloticase with MTX vs. pegloticase with placebo for MTX on the mean change from baseline in urate deposition volume and bone erosions due to gout to Weeks 14, 24, and 52 based on dual-energy computed tomography (DECT) of the hands and feet.

Evaluate the effect of pegloticase with MTX vs. pegloticase with placebo for MTX on the mean change from baseline in bone erosions due to gout to Weeks 24 and 52 based on X-rays of the hands and feet.

Evaluate the effect of pegloticase with MTX vs. pegloticase with placebo for MTX on the complete resolution of ≥1 tophi (using digital photography) at Weeks 24 and 36 in subjects with tophi at baseline.

Evaluate the effect of pegloticase with MTX vs. pegloticase with placebo for MTX on the mean change from baseline in tophus size (long axis measured using digital photography) to Weeks 14, 24, 36 and 52 in subjects with tophus present at baseline.

Evaluate the effect of pegloticase with MTX vs. pegloticase with placebo for MTX on the response rate during Month 3 (Weeks 10, 12 and 14), as measured by the sustained normalization of SUA to <6 mg/dL for at least 80% of the time during Month 3. Evaluate the effect of pegloticase with MTX vs. pegloticase with placebo for MTX on the overall response rate, as measured by the sustained normalization of SUA to <6 mg/dL for at least 80% of the time during Month 3 (Weeks 10, 12, and 14) and Month 6 (Weeks 20, 21, 22, 23, and 24) combined.

Evaluate the effect of pegloticase with MTX vs. pegloticase with placebo for MTX on reducing SUA to <5 mg/dL for at least 80% of the time during Months 3, 6, 9 and 12, individually.

Evaluate the effect of pegloticase with MTX vs. pegloticase with placebo for MTX on the mean change from baseline in SUA at Weeks 14, 24, 36 and 52.

Evaluate the effect of pegloticase with MTX vs. pegloticase with placebo for MTX on the time to first SUA>6 mg/dL.

Evaluate the effect of pegloticase with MTX vs. pegloticase with placebo for MTX on the time to two consecutive SUA>6 mg/dL (SUA stopping rule).

Evaluate the effect of pegloticase with MTX vs. pegloticase with placebo for MTX on the percentage of non-hyperuricemic (SUA<6 mg/dL) time during Months 3, 6, 9 and 12.

Evaluate the effect of pegloticase with MTX vs. pegloticase with placebo for MTX on the mean change from baseline in HAQ Pain Score at Weeks 14, 24, 36 and 52.

Evaluate the effect of pegloticase with MTX vs. pegloticase with placebo for MTX on the mean change from baseline in HAQ Health Score at Weeks 14, 24, 36 and 52.

Evaluate the effect of pegloticase and MTX vs. pegloticase and placebo for MTX on the mean change from baseline in HAQ-DI Score at Weeks 14, 24, 36 and 52.

Evaluate the effect of pegloticase with MTX vs. pegloticase with placebo for MTX on the mean change from baseline in tender joint count (68-point scale) at Weeks 14, 24, 36 and 52.

Evaluate the effect of pegloticase with MTX vs. pegloticase with placebo for MTX on the mean change from baseline in swollen joint count (66-point scale) at Weeks 14, 24, 36 and 52.

Evaluate the effect of pegloticase with MTX vs. pegloticase with placebo for MTX on the mean change from baseline in number of tender or swollen joints at Weeks 14, 24, 36 and 52.

Evaluate the effect of pegloticase with MTX vs. pegloticase with placebo for MTX on the mean change from baseline in physician global assessment of gout at Weeks 14, 24, 36 and 52.

Evaluate the effect of pegloticase with MTX vs. pegloticase with placebo for MTX on the proportion of subjects achieving 20%, 50%, or 70% improvement based on gout chronic response criteria at Weeks 14, 24, 36 and 52.

Evaluate the effect of pegloticase with MTX vs. pegloticase with placebo for MTX on the proportion of subjects whose treatment goals were met at Weeks 24 and 52.

Evaluate the effect of pegloticase with MTX vs. pegloticase with placebo for MTX on the mean change from baseline in systolic blood pressure (SBP) and diastolic blood pressure (DBP) to each visit.

Assess the PK of pegloticase.

Assess the incidence of anti-PEG and anti-Uricase IgG antibodies.

Safety and Tolerability Objectives

AE/SAE profile overall for pegloticase and the combination of pegloticase and MTX: Incidence of AESI: IRs, anaphylaxis, gout flares, cardiovascular events Laboratory tests Vital signs and physical examination Study Design This study was a Phase 4, multicenter, randomized, double-blind, placebo-controlled, parallel-group, efficacy and safety study of pegloticase with MTX vs. pegloticase with placebo for MTX in adult subjects with uncontrolled gout.

The study design included: 1) a Screening Period (screening should be completed within 4 weeks prior to Week −6); 2) a 2-week MTX Tolerability Assessment Period consisting of 2 weeks oral MTX for all subjects; 3) a Run-In Period consisting of randomization followed by 4 weeks of blinded oral MTX or placebo for MTX; 4) a 52-week Pegloticase+ IMM Period; 5) a Safety Follow-up (Phone/Email/Site Visit) and 6) a 3 and 6 month Post Treatment Follow-up. The Sponsor, Investigator, study site personnel and study subject remained blinded to each subject's treatment assignment (MTX or placebo for MTX)

All subjects who met eligibility criteria at Screening began 15 mg MTX orally weekly at the Week −6 visit. Subjects also took folic acid 1 mg orally every day beginning during the MTX Tolerability Assessment Period (Week −6 to Week −4) and continuing until prior to the Week 52 Visit.

Subjects had to be able to tolerate the weekly dose of MTX 15 mg for 2 weeks to be eligible to be randomized at Week −4. Subjects who were unable to tolerate the 15 mg dose of MTX during the 2 weeks preceding the Week −4 visit were considered screen failures.

Subjects who tolerate the weekly 15 mg MTX dose during the 2 weeks preceding Week −4 Visit and continue to meet eligibility criteria were randomized at the Week −4 Visit in a 2:1 ratio (stratified by presence of tophi) to receive either blinded oral 15 mg MTX or blinded oral placebo for MTX. Subjects continued to take the blinded MTX or placebo for MTX from Week −4 to Day 1 (the Run-in period) at the 15 mg MTX or placebo for MTX dose. If a subject does not tolerate the 15 mg MTX or placebo for MTX dose after randomization at the Week −4 Visit and prior to Day 1, the MTX or placebo for MTX may be dose-reduced or discontinued based on pre-specified criteria and after discussion with the Sponsor medical monitor. The subject was allowed to remain in the study. After Day 1, MTX or placebo for MTX may be re-initiated. The subject was re-initiated to the same treatment they were randomized to at Week −4. The re-initiated MTX or placebo for MTX remained blinded.

All subjects who completed the Run-In Period received the first pegloticase infusion on Day 1. All subsequent doses and study visits were scheduled based on the Day 1 visit date.

It was required that before a subject begins the pegloticase+IMM Period, he or she had been taking at least one protocol standard gout flare prophylaxis regimen (i.e., colchicine and/or non-steroidal anti-inflammatory drugs and/or low-dose prednisone<10 mg/day) for >1 week before the first dose of pegloticase and continues flare prophylaxis per American College of Rheumatology guidelines [Khanna D et al. 2012] for the greater of 1) 6 months, 2) 3 months after achieving target serum urate (SUA<6 mg/dL) for patients with no tophi detected on physical exam, or 3) 6 months after achieving target serum urate (SUA<5 mg/dL) for patients with one or more tophi detected on initial physical exam that had since resolved. For IR prophylaxis, fexofenadine (180 mg orally) was taken the day before each infusion; fexofenadine (180 mg orally) and acetaminophen (1000 mg orally) were taken the morning of each infusion; and methylprednisolone (125 mg IV) given over an infusion duration between 10-30 minutes, immediately prior to each infusion.

During the Pegloticase+IMM Period, pegloticase 8 mg was administered intravenously (IV) every 2 weeks from Day 1 through the Week 50 Visit for a total of 26 infusions; pegloticase was administered after all pre-dose study visit assessments were completed at each visit. The date and start and stop time of infusion were recorded. Serum uric acid stopping rules were applied: subjects with SUA level>6 mg/dL at 2 consecutive study visits beginning with the Week 2 Visit discontinued treatment, complete the End of Pegloticase Infusion Visit procedures within 2 weeks, and continued the subject visits according to the protocol (without treatment).

During the Pegloticase+IMM Period, subjects were instructed to take MTX or placebo for MTX weekly on the same day each week, within 1 to 3 days prior to each pegloticase infusion and one additional weekly dose after the last infusion for subjects who had not stopped pegloticase due to SUA stopping rules; however, if a subject does not do so, MTX or placebo for MTX were taken>60 minutes prior to each pegloticase infusion.

After Day 1, if a subject became unable to tolerate MTX or placebo for MTX, the MTX or placebo for MTX dose was reduced and/or discontinued based on pre-defined criteria, and the subject remained in the study.

The Investigator reviewed the clinical status and individual subject treatment goals at Screening, Week 24, the End of Pegloticase Infusions Visit (if applicable) or the Week 52/End of Study/Early Termination Visit.

After the Week 52 Visit (or End of Pegloticase Infusion Visit [if applicable]), subjects should resume regular care for gout per the judgment of the treating physician, including resumption of ULT upon pegloticase discontinuation, if appropriate. Subjects had a 3- and 6-Month Follow-up visit to assess clinical status, including SUA levels.

Samples for measurement of SUA levels, PK analysis of pegloticase, pegloticase immunogenicity and MTX Polyglutamate analysis were collected at specific visits.

Safety assessments, including monitoring and recording of all AEs, whether drug-related or not, measurement of vital signs, physical examinations, and monitoring of hematology and blood chemistry, were performed. The total blood volume to be collected from each subject during this study was approximately 850 mL.

An external Data Monitoring Committee (DMC) was convened to review data for safety and efficacy with timing and criteria outlined in the DMC Charter, with the possibility of DMC recommendation on study conduct modification per criteria also to be outlined in the Charter.

An independent external adjudication committee reviewed reported events of infusion reactions, cardiovascular events and anaphylaxis.

Subject Population: Subjects eligible for this study had SUA≥7 mg/dL and gout refractory to conventional therapy characterized by failure to normalize serum uric acid despite conventional therapy or contraindication to conventional therapy, and ongoing symptoms of gout including one of the following: visible tophi, recurrent gout flares, or chronic gouty arthropathy.

Inclusion Criteria:

Eligible subjects must meet/provide all the following criteria:

Willing and able to give informed consent.

Willing and able to comply with the prescribed treatment protocol and evaluations for the duration of the study.

Adult men or women≥18 years of age.

Uncontrolled gout, defined as meeting the following criteria:

Hyperuricemia during the screening period defined as SUA≥7 mg/dL, and;

Failure to maintain normalization of SUA with xanthine oxidase inhibitors at the maximum medically appropriate dose, or with a contraindication to xanthine oxidase inhibitor therapy based on medical record review or subject interview, and;

Symptoms of gout including at least 1 of the following:
Presence of at least one tophus
Recurrent flares defined as 2 or more flares in the past 12 months prior to screening
Presence of chronic gouty arthritis
Willing to discontinue any oral urate lowering therapy for at least 7 days prior to MTX dosing at Week −6 and remain off when receiving pegloticase infusions.
Women of childbearing potential (including those with an onset of menopause<2 years prior to screening, non-therapy-induced amenorrhea for <12 months prior to screening, or not surgically sterile [absence of ovaries and/or uterus]) must have negative serum/urine pregnancy tests during Screening and Week −6; subjects must agree to use 2 reliable forms of contraception during the study, one of which was recommended to be hormonal, such as an oral contraceptive. Hormonal contraception were started≥1 full cycle prior to Week −4 (start of MTX) and continue for 30 days after the last dose of pegloticase, or at least one ovulatory cycle after the last dose of MTX or placebo for MTX (whichever was the longest duration after the last dose of pegloticase or MTX or placebo for MTX). Highly effective contraceptive methods (with a failure rate<1% per year), when used consistently and correctly, include implants, injectables, combined oral contraceptives, some intrauterine devices, sexual abstinence, or vasectomized partner.
Men who were not vasectomized must agree to use appropriate contraception so as to not impregnate a female partner of reproductive potential during the study and for at least 3 months after the last dose of MTX or placebo for MTX.
Able to tolerate MTX 15 mg orally for 2 to 4 weeks during the screening/MTX Run-in period prior to the first dose of KXX.

Exclusion Criteria

Subjects were ineligible for study participation if they meet any of the following criteria:
Weight>160 kg (352 pounds) at Screening.
Any serious acute bacterial infection, unless treated and completely resolved with antibiotics at least 2 weeks prior to the Week −6 Visit.
Severe chronic or recurrent bacterial infections, such as recurrent pneumonia or chronic bronchiectasis.
Current or chronic treatment with systemic immunosuppressive agents such as MTX, azathioprine, or mycophenolate mofetil; prednisone≥10 mg/day or equivalent dose of other corticosteroid on a chronic basis (3 months or longer) would also meet exclusion criteria.
History of any transplant surgery requiring maintenance immunosuppressive therapy.
Known history of hepatitis B virus surface antigen positivity or hepatitis B DNA positivity.
Known history of hepatitis C virus RNA positivity.
Known history of Human Immunodeficiency Virus (HIV) positivity.
Glucose-6-phosphate dehydrogenase deficiency (tested at the Screening Visit).
Chronic renal impairment defined as estimated glomerular filtration rate (eGFR)<40 mL/min/1.73 m$^2$ or currently on dialysis.
Non-compensated congestive heart failure or hospitalization for congestive heart failure within 3 months of the Screening Visit, uncontrolled arrhythmia, treatment for acute coronary syndrome (myocardial infarction or unstable angina), or uncontrolled blood pressure (>160/100 mmHg) prior to Randomization at Week −4.
Pregnant, planning to become pregnant, breastfeeding, planning to impregnate female partner, or not on an effective form of birth control, as determined by the Investigator.
Prior treatment with pegloticase, another recombinant uricase (rasburicase), or concomitant therapy with a polyethylene glycol-conjugated drug.
Known allergy to pegylated products or history of anaphylactic reaction to a recombinant protein or porcine product.
Contraindication to MTX treatment or MTX treatment considered inappropriate.
Known immunogenicity of MTX.
Receipt of an investigational drug within 4 weeks or 5 half-lives, whichever was longer, prior to MTX administration at Week −6 or plans to take an investigational drug during the study.
Liver transaminase levels (AST or ALT)>upper limit of normal (ULN) or albumin<the lower limit of normal (LLN) at the Screening Visit.
Chronic liver disease.
White blood cell count<4,000/ul, hematocrit<32 percent, or platelet count <75,000/ul.
Currently receiving systemic or radiologic treatment for ongoing cancer.
History of malignancy within 5 years other than non-melanoma skin cancer or in situ carcinoma of cervix.
Diagnosis of osteomyelitis.
Known history of hypoxanthine-guanine phosphoribosyl-transferase deficiency, such as Lesch-Nyhan and Kelley-Seegmiller syndrome.
Unsuitable candidate for the study, based on the opinion of the Investigator (e.g., cognitive impairment), such that participation might create undue risk to the subject or interfere with the subject's ability to comply with the protocol requirements or complete the study.
Alcohol use in excess of 3 alcoholic beverages per week.
A known intolerance to at least one protocol standard gout flare prophylaxis regimen (i.e., colchicine and/or non-steroidal anti-inflammatory drugs and/or low-dose prednisone≤10 mg/day).
Current pulmonary fibrosis, bronchiectasis or interstitial pneumonitis. If deemed necessary by the Investigator, a chest X-ray may be performed during Screening.

Dose Regimen/Route of Administration:
MTX or Placebo for MTX:
During the MTX Tolerability Assessment Period (Week −6 until the Week −4 visit), all subjects took MTX 15 mg orally weekly.
At the Week −4 visit, subjects who tolerated MTX were randomized to receive MTX 15 mg or placebo for MTX orally weekly. Subjects were blinded to MTX or placebo for MTX beginning at Week −4 through the remainder of the study. Subjects continued to take the blinded MTX or placebo for MTX during the Run-in Period (from Week −4 to Day 1) at the 15 mg MTX dose or placebo for MTX dose.
If a subject did not tolerate the 15 mg MTX or placebo for MTX dose after randomization at the Week −4 Visit and prior to Day 1, the MTX or placebo for MTX may be dose-reduced or discontinued based on pre-specified criteria and after discussion with the Sponsor medical monitor. The subject was allowed to remain in the study. After Day 1, MTX or placebo for MTX may be re-initiated. The subject was re-initiated to the same treatment they were randomized to at Week −4. The re-initiated MTX or placebo for MTX remained blinded. During the Run-in Period, if a dose was missed, it was taken as soon as it was remembered. If it was within 48 hours of the next scheduled dose, the subject was instructed to skip the missed dose and resume at the next regularly scheduled time; thus, subjects were instructed not to double a dose to make up for a missed dose if within 48 hours of the next dose.

During the Pegloticase+IMM Period, subjects were instructed to take MTX or placebo for MTX weekly on the same day each week, within 1 to 3 days prior to each pegloticase infusion and one additional weekly dose after the last infusion for subjects who had not stopped pegloticase due to SUA stopping rules; however, if a subject does not do so, MTX or placebo for MTX were taken≥60 minutes prior to each pegloticase infusion. If a subject becomes unable to tolerate the MTX or placebo for MTX during the Pegloticase+IMM Period, the dosage may be decreased.

Subjects also took folic acid 1 mg orally every day beginning during the MTX Tolerability assessment (Week −6 to Week −4) and continuing until prior to the Week 52 Visit.

Pegloticase:

All subjects who meet the inclusion/exclusion criteria and complete the Run-In Period received pegloticase at a dose of 8 mg administered IV every 2 weeks for a total of 26 infusions from Day 1 through the Week 50 Visit, inclusive (Pegloticase+IMM Period). The date and start and stop time of infusion were recorded. Subjects were not fasting on the day of infusion and were encouraged to have a snack or normal meal before or after the infusion. All subjects received standardized prophylactic treatment to reduce the risk of acute gout flares, beginning≥1 week before the first dose of pegloticase and continues flare prophylaxis per American College of Rheumatology guidelines [Khanna D et al. 2012] for the greater of 1) 6 months, 2) 3 months after achieving target serum urate (SUA<6 mg/dL) for patients with no tophi detected on physical exam, or 3) 6 months after achieving target serum urate (SUA<5 mg/dL) for patients with one or more tophi detected on initial physical exam that had since resolved. Standardized IR prophylaxis consisting of pre-treatment with antihistamines, acetaminophen and corticosteroids accompanied each infusion.

Dosage Form and Strength Formulation (Pegloticase, MTX and Placebo for MTX):

Pegloticase (KRYSTEXXA) is commercially available in the United States and was packaged in sterile, single-use 2-mL glass vials with a Teflon®-coated (latex-free) rubber injection stopper to deliver pegloticase as 8 mg of uricase protein in 1 mL volume. Pegloticase was administered as an admixture of 8 mg in 250 mL of 0.45% or 0.9% Sodium Chloride Injection, United States Pharmacopeia (USP) for IV infusion by gravity feed or infusion pump. Pegloticase was not administered as an IV push or bolus.

MTX 2.5 mg tablets for oral administration during the MTX Tolerability Assessment Period (Week −6 through Week −4) were provided to subjects as a commercially available generic.

MTX 2.5 mg tablets for oral administration during the Run-In Period (Week −4 through Day 1) and the Pegloticase+IMM Period (Day 1 through Week 52) were provided to subjects as a methotrexate 2.5 mg tablet over-encapsulated in a size zero Swedish Orange capsule.

Placebo for methotrexate 2.5 mg for oral administration during the Run-In Period (Week −4 through Day 1) and the Pegloticase+IMM Period (Day 1 through Week 52) were provided as a size zero Swedish Orange capsule with Avicel® filling Duration of Treatment and Follow-Up:

Screening: Completed within 4 weeks prior to the Week −6 visit

MTX Tolerability Assessment Period (Week −6 through Week −4): 2 weeks of oral MTX for all subjects Run-in Period (Week −4 through Day 1): Randomization followed by 4 weeks of blinded oral MTX or placebo for MTX.

Pegloticase+IMM Period (Day 1 through Week 52): MTX or placebo for MTX dosed weekly and 50 weeks of pegloticase infusion visits every 2 weeks; Non-infusion visits at Weeks 21, 23 and 52.

End of Pegloticase Infusions Visit (if applicable): If the subject discontinued pegloticase treatment prior to infusion Week 50, such as due to the SUA stopping rules, the subject completed this visit within approximately 2 weeks of the last infusion. Subjects continued in the study.

End of Study/Early Termination Visit: Week 52 or earlier if the subject withdraws consent to participate in the study.

Safety Follow-up Phone/Email Visit or Visit: All subjects received a safety follow-up phone call/e-mail approximately 30 days after the last dose of pegloticase to assess if any SAE's occurred. Subjects who receive at least one dose of MTX or placebo for MTX and were females of childbearing potential, received a safety follow-up phone call/e-mail approximately 30 days after the last dose of MTX or placebo for MTX to verify at least one ovulatory cycle had occurred after the last dose of MTX or placebo for MTX. If the subject had not ovulated, a urine pregnancy test was performed. Subjects who receive at least one dose of MTX and were non-vasectomized males, a phone/e-mail inquiry were conducted 3 months after MTX discontinuation regarding partner pregnancy (inquiry can occur during the 3-month Post Treatment Follow-up).

3- and 6-Month Post Treatment Follow-up: All subjects were followed for a minimum of 6 months following the last infusion, with follow-up after Week 52 as warranted.

Criteria for Evaluation:

Efficacy was assessed by SUA levels, tophus resolution, tophus size, tender and swollen joint counts, physician global assessment of gout, and DECT and X-ray of hands and feet.

Quality of life was assessed using the HAQ.

The PK of pegloticase was assessed prior to and after the pegloticase infusion at specified time points.

Pegloticase immunogenicity was assessed by the incidence of anti-PEG and anti-uricase IgG antibodies prior to the pegloticase infusion at specified time points.

Safety assessments included monitoring and recording of all AEs, whether drug-related or not, measurement of vital signs, physical examinations, and monitoring of hematology and blood chemistry.

Statistical Analyses:

Primary Efficacy Endpoint

The primary efficacy endpoint was the proportion of Month 6 (Weeks 20, 21, 22, 23 and 24) responders, defined as subjects achieving and maintaining SUA<6 mg/dL for at least 80% of the time during Month 6.

Secondary Efficacy Endpoints

The secondary endpoints were analyzed sequentially:

The proportion of Month 9 (Weeks 32, 34, and 36) responders, defined as subjects achieving and maintaining SUA<6 mg/dL for at least 80% of the time during Month 9.

The proportion of Month 12 (Weeks 48, 50, and 52) responders, defined as subjects achieving and maintaining SUA<6 mg/dL for at least 80% of the time during Month 12.

The proportion of subjects with complete resolution of ≥1 tophi (using digital photography) at Week 52 in subjects with tophi at baseline.

Exploratory Efficacy Endpoints

The mean change from baseline to Weeks 14, 24 and 52 in urate volume and bone erosions due to gout based on DECT of the hands and feet.

The mean change from baseline to Weeks 24 and 52 in bone erosions due to gout based on X-rays of the hands and feet.

The proportion of subjects with complete resolution of ≥1 tophi (using digital photography) at Weeks 24 and 36 in subjects with tophi at baseline.

The mean change from baseline in tophus size (long axis measured using digital photography) to Weeks 14, 24, 36 and 52 in subjects with tophus present at baseline.

The proportion of Month 3 (Weeks 10, 12, and 14) responders, defined as subjects achieving and maintaining SUA<6 mg/dL for at least 80% of the time during Month 3.

The proportion of overall responders, defined as subjects achieving and maintaining SUA<6 mg/dL for at least 80% of the time during Month 3 (Weeks 10, 12, and 14) and Month 6 (Weeks 20, 21, 22, 23 and 24) combined.

The proportion of 5 mg/dL responders during each time interval (Month 3, Month 6, Month 9 and Month 12), defined as subjects achieving and maintaining SUA<5 mg/dL for at least 80% of the time during each time interval.

The mean change from baseline in SUA at Weeks 14, 24, 36 and 52.

The time to first SUA>6 mg/dL.

The time to two consecutive SUA>6 mg/dL (stopping rule).

The percentage of non-hyperuricemic (SUA<6 mg/dL) time during Months 3, 6, 9 and 12.

The mean change from baseline in HAQ Pain score at Weeks 14, 24, 36 and 52.

The mean change from baseline in HAQ Health score at Weeks 14, 24, 36 and 52.

The mean change from baseline in HAQ-DI score at Weeks 14, 24, 36 and 52.

The mean change from baseline in tender joint count (68-point scale) at Weeks 14, 24, 36 and 52.

The mean change from baseline in swollen joint count (66-point scale) at Weeks 14, 24, 36 and 52.

The mean change from baseline in number of tender or swollen joints at Weeks 14, 24, 36 and 52.

The mean change from baseline in physician global assessment of gout at Weeks 14, 24, 36 and 52.

The proportion of subjects achieving 20%, 50%, or 70% improvement based on gout chronic response criteria at Weeks 14, 24, 36 and 52.

The proportion of subjects whose treatment goals were met at Weeks 24 and 52.

The change from baseline in SBP and DBP to each visit.

Pharmacokinetic and Anti-Drug Antibody Endpoints

PK of pegloticase.

The incidence of anti-PEG and anti-Uricase IgG antibodies.

Safety and Tolerability Objectives

AE/SAE profile overall for pegloticase and the combination of pegloticase and MTX: Incidence of AESI: IRs, anaphylaxis, gout flares, cardiovascular events Laboratory tests Vital signs and physical examination Statistical Analysis on Efficacy Parameters The primary analysis was conducted in the Intent-to-Treat (ITT) population, defined as all randomized subjects. The primary efficacy endpoint was the proportion of responders during Month 6. A responder was defined as a subject for whom the proportion of time that the SUA-time curve was <6 mg/dL during the analysis interval was at least 80%. The proportion of time that the SUA level was below 6 mg/dL was defined as the ratio of the time during which the SUA level remains below 6 mg/dL (using linear interpolation, if necessary) to the entire time interval during Month 6. A subject was declared a non-responder if the subject had an SUA level >6 mg/dL at 2 consecutive study visits beginning with the Week 2 Visit prior to or during Month 6. Additionally, a subject who withdraws from study treatment for any reason after randomization and prior to or during Month 6 (for the primary endpoint) or Months 3, 9 or 12 (for the secondary and exploratory endpoints) was considered a non-responder at the time of withdrawal.

The analysis of the primary responder endpoint assessed risk difference (difference in response proportions) in a stratified analysis. The analysis used Cochran-Mantel-Haenszel (CMH) weighting to estimate the common risk difference within strata and to estimate the standard error of the common risk difference. Stratification for the analysis used the same factor as was used to stratify randomization, presence of tophi (yes, no). The difference in response rates, comparing pegloticase with MTX vs. pegloticase with placebo for MTX, was estimated along with the corresponding 95% confidence interval (CI) and p-value.

The proportion of Month 9 responders and Month 12 responders was analyzed similarly. The difference in the proportion of subjects with resolution of ≥1 tophi (100% decrease in the area of at least 1 tophus) at Week 52 between pegloticase and placebo was tested with a chi-square test, and the difference in rates was estimated along with the corresponding 95% CI and p-value.

HAQ-DI score, HAQ Pain and Health scores, tophus size (longest axis), urate volume (DECT), joint erosions due to gout using DECT (hands and feet), joint erosions due to gout using X-ray (hands and feet), swollen/tender joint counts, physician global assessment score, and SUA were summarized at baseline and each visit with descriptive statistics. Changes from baseline for these parameters to each visit and overall were analyzed with a mixed model repeated measures (MMRM) analysis of covariance (ANCOVA) model with a term for baseline score, and factors for treatment group, visit, and visit by treatment group interaction. Baseline was defined as the last observation prior to the first dose of MTX. The proportion of subjects achieving 20%, 50%, or 70% improvement based on gout chronic response criteria were analyzed with a CMH test.

Interim Analysis

An interim analysis was undertaken when all subjects had reached the Week 24 visit. An independent DMC was convened to oversee and interpret this analysis to assess the primary endpoint of maintaining SUA <6 mg/dL at least 80% of the time during Month 6 (Weeks 20, 21, 22, 23 and 24) comparing pegloticase with MTX to pegloticase with placebo for MTX, as well as to assess the safety of the co-administration of pegloticase with MTX based on all accrued data at that time. The DMC recommended unblinding the Sponsor, stopping the study, or continuing without change at the time of the interim analysis, based on pre-defined criteria. In the event of a highly clinically compelling increase in response rates with pegloticase with MTX vs pegloticase with placebo for MTX, and in the absence of any unexpected safety findings, the Sponsor may become unblinded for full data analysis. Subjects would continue on study through Week 52, with investigators and subjects remaining blinded. Clear parameters to guide decision criteria were pre-specified in advance. Upon all subjects reaching Week 52, a final analysis was completed in which the secondary endpoints were tested, including maintaining SUA<6 mg/dL at least 80% of the time during Month 9, maintaining SUA<6 mg/dL at least 80% of the time during Month 12, and proportion of subjects with complete resolution of at least one tophus by digital photography through Week 24. Additional safety data accrued would also be summarized.

Criteria would also established and pre-specified for the DMC to recommend study discontinuation due to futility or an unexpected safety risk. An interim analysis for futility may be completed earlier on the basis of the MIRROR Open-Label study results. At the futility analysis there was no opportunity to conclude a benefit of MTX and therefore there was no adjustment to the Type I error.

If none of the above scenarios were established, the study would continue, and the Sponsor would remain blinded until all subjects reach Week 52.

Sample Size Estimate: The response rate during Month 6 on pegloticase 8 mg every 2 weeks was 43% for the phase 3 studies. A sample size of 135 subjects (90 subjects randomized to receive pegloticase with MTX, 45 subjects randomized to receive pegloticase with placebo for MTX) provides 88% power at the 2-sided alpha=0.05 level to detect a difference of 28% (71% response rate for pegloticase with MTX vs. 43% for pegloticase with placebo for MTX).

Removal of Subjects From Therapy or Study: All subjects were free to withdraw from study participation at any time, for any reason, and without prejudice to their further medical care. In addition, the Investigator may terminate a subject from the study at any time. However, subjects who were removed from pegloticase therapy should remain on study barring withdrawal of consent for study participation.

Removal of Subjects From Pegloticase Therapy: In addition to completion of therapy through Week 52, the reason for discontinuation from the therapy should be recorded on the eCRF using 1 of the following categories:

Lack of Efficacy. (i.e., SUA level>6 mg/dL at 2 consecutive study visits beginning with the Week 2 Visit).

Adverse Event. The subject experiences an AE that imposes an unacceptable risk to the subject's health (e.g., anaphylactic reaction), or the subject was unwilling to continue therapy because of an AE. Subjects who discontinue due to an AE should be followed until resolution or stabilization of the AE, or an adequate explanation for the event was obtained.

The Investigator determined that pegloticase administration poses an unacceptable risk to the subject (specify reason).

Subject refusal of additional therapy (specify reason).

Study Terminated by Sponsor. The Sponsor, IRB, or regulatory agency terminates the study.

Pregnancy

Death

Study Considerations for Subjects Ending Pegloticase Infusions Prior to 52 Weeks:

Methotrexate/placebo for MTX, along with folic acid, were discontinued at the time of cessation of pegloticase infusions prior to Week 52.

All subjects completed the End of Pegloticase Infusions Visit and remained on study through Week 52 regardless of whether they stop infusions due to SUA stopping rules or other reason (e.g., withdrawal of consent for pegloticase infusions).

Subjects were encouraged to continue to participate in all visits through the end of the study. Subjects were especially encouraged to complete study visits at the study site during key efficacy and safety collections at Weeks 20, 21, 22, 23, 24, 32, 34, 36, 48, 50 and 52, so that SUA labs and other key assessments can be completed. During visits between these key efficacy and safety collection visits, in subjects who had stopped infusions, subjects may complete study visits in person or via telephone to collect AEs, concomitant medications, and gout flare information.

Activities related to pre/post infusion monitoring or medication dispensation were not completed once a subject stopped pegloticase infusions. These activities include:

MTX/placebo for MTX compliance/reconciliation

Infusion reaction prophylaxis

IR prophylaxis compliance

Folic acid compliance

Pegloticase infusion

Pegloticase PK sampling

Pre-infusion MTX Polyglutamate sampling

MTX drug/dispensation related items Post Treatment Follow-up: The intent was to obtain at least 6 months of follow-up on each subject after cessation of pegloticase infusions. If these 6 months occur prior to end of study at Week 52, such as in the case of a subject who ends pegloticase infusions on or before Week 24, there were no follow-up visits after the Week 52/End of Study Visit. For subjects who end pegloticase infusions between Weeks 26 and 36, there were at least 3 months of follow-up while the subject remains on-study prior to Week 52, and then one follow-up visit after the Week 52/End of Study Visit. For subjects who end pegloticase infusions between Weeks 38 and 52, there were two follow-up visits at intervals of 3 months apart after the Week 52/End of Study Visit.

Gout flare prophylaxis and treatment, and infusion reaction prophylaxis and treatment are described herein elsewhere.

Screen failure criteria are described herein elsewhere.

Serum samples for measurement of SUA levels were collected at the Screening Visit, the Week −6 Visit (prior to the first dose of MTX), the Week −4 Visit (Randomization) and the Week −2 Visit during the Run-in Period; within 48 hours prior to each pegloticase infusion and after the end of each pegloticase infusion prior to discharge from the site during the Pegloticase+IMM Period on Day 1, at the Weeks 2, 6, 10, 12, 14, 20, 22, 24, 32, 34, 36, 48 and 50; within 48 hours prior to each pegloticase infusion at Weeks 4, 8, 16, 18, 26, 28, 30, 38, 40, 42, 44 and 46. Additional serum samples for SUA levels were collected at non-infusion Visits at Weeks 21 and 23 and the End of Pegloticase Infusions Visit (if applicable) and the Week 52/End of study/Early Termination Visit and 3 and 6 month Follow-up Visits. Subjects with an SUA level>6 mg/dL at 2 consecutive study visits beginning with the Week 2 Visit discontinued pegloticase and completed the End of Pegloticase Infusions Visit (if applicable) or the Week 52/End of study/Early Termination Visit procedures.

Study Procedures

Screening/MTX Tolerability Assessment/Run-In Period

During the Screening/MTX Tolerability Assessment Period, study candidates were evaluated for study entry according to the stated inclusion and exclusion criteria. The following procedures were performed during screening to establish each candidate's eligibility for enrollment into the study.

Screening Visit (Within 2 Weeks Prior to the First Dose of MTX at Week −6)

Obtain signed, written informed consent. Refusal to provide this permission excludes an individual from eligibility for study participation. Record date informed consent was given and who conducted the process on the appropriate source documentation.

Determine study eligibility through review of the inclusion/exclusion criteria.

Obtain demographic information

Investigator review of clinical status and subject treatment goals.

Collect complete gout history (on gout-specific CRF), other relevant medical/surgical history, and medication history, including gout medications starting at the time of diagnosis and up to screening (on gout medications-specific CRF), substance use history, and all other medications currently being taken at screening.

Chest X-ray for subjects that did not have a chest X-ray within 2 years prior to Screening if deemed necessary by the Investigator.

Perform a complete physical examination, including assessment of HEENT, heart, lungs, abdomen, skin, extremities, neurological status and musculoskeletal including an assessment for the presence of tophi.

Document gout flares and intensity.

Record vital signs (blood pressure, respiratory rate, temperature, and heart rate Record height and weight.

Perform 12-lead ECG.

Obtain blood samples for hematology and clinical chemistry analysis.

Obtain a serum sample from all females of childbearing potential for performance of a pregnancy test.

Obtain blood samples to evaluate SUA (only 1 sample for central laboratory) and G6PD.

Administer HAQ and record physician global assessments.

Inquire about AEs and concomitant medication use.

Week −6 (MTX Tolerability Assessment Period)

Confirm study eligibility through review of the inclusion/exclusion criteria.

Perform a targeted physical examination (at a minimum this should include heart, lungs and abdominal examination).

Record vital signs (blood pressure, respiratory rate, temperature, and heart rate).

Record weight.

Document gout flares and intensity.

Collect swollen/tender joint counts; administer HAQ; and record physician global assessments.

Digital photography of hands and feet.

Obtain blood samples for hematology and clinical chemistry analysis.

Obtain a urine sample from all females of childbearing potential for performance of a pregnancy test.

Obtain a blood sample for measurement of SUA (only 1 sample for central laboratory).

Obtain optional whole blood and serum samples from subjects who consent for future analysis.

Provide dosing calendar for subjects to record the date and time they take MTX/placebo for MTX. (Additional calendar pages may be provided at future visits as needed).

Dispense MTX.

Fill gout prophylaxis, fexofenadine, acetaminophen, and folic acid prescriptions, as needed.

Inquire about AEs and concomitant medication use.

Subjects that take MTX during Week −6 or Week −5, and who were females of childbearing potential, received a safety follow-up phone call/e-mail approximately 30 days after the last dose of MTX to verify at least one ovulatory cycle occurred since the last dose of MTX. If the subject had not ovulated, a urine pregnancy test was performed. Subjects who were non-vasectomized males, an inquiry was conducted approximately 3 months after MTX discontinuation regarding partner pregnancy.

Week −4 (Run-In Period)

Confirm study eligibility through review of the inclusion/exclusion criteria.

Document gout flares and intensity.

Record vital signs (blood pressure, respiratory rate, temperature, and heart rate).

Obtain blood samples for hematology and clinical chemistry analysis.

Obtain a urine sample from all females of childbearing potential for performance of a pregnancy test.

Obtain a blood sample for measurement of SUA (only 1 sample for central laboratory).

Assess MTX compliance (from MTX Tolerability Assessment Period)

Dispense MTX/placebo for MTX.

Ask Yes/No question regarding folic acid and gout flare prophylaxis compliance.

Fill gout prophylaxis, fexofenadine, acetaminophen, and folic acid prescriptions, as needed.

Inquire about AEs and concomitant medication use.

Randomization in RTMS to MTX or placebo for MTX.

Subjects that take MTX/placebo for MTX during Week −4 or Week −3, and who were females of childbearing potential, received a safety follow-up phone call/e-mail approximately 30 days after the last dose of MTX/placebo for MTX to verify at least one ovulatory cycle had occurred since the last dose of MTX/placebo for MTX. If the subject had not ovulated, a urine pregnancy test was performed. Subjects who were non-vasectomized males, an inquiry was conducted approximately 3 months after MTX/placebo for MTX discontinuation regarding partner pregnancy. Week −2 (Run-in Period)

Obtain a urine sample from all females of childbearing potential for performance of a pregnancy test.

Obtain a blood sample for measurement of SUA (only 1 sample for central laboratory).

Obtain blood samples for hematology and clinical chemistry analysis.

Assess MTX/placebo for MTX compliance and re-dispense MTX/placebo for MTX.

Ask Yes/No question regarding folic acid and gout flare prophylaxis compliance.

Fill gout prophylaxis, fexofenadine, acetaminophen, and folic acid prescriptions, as needed.

Inquire about AEs and concomitant medication use.

Subjects that take MTX/placebo for MTX during Week −2 or Week −1, and who were females of childbearing potential, received a safety follow-up phone call/e-mail approximately 30 days after the last dose of MTX/placebo for MTX to verify at least one ovulatory cycle occurred since the last dose of MTX/placebo for MTX. If the subject had not ovulated, a urine pregnancy test was performed. Subjects who were non-vasectomized males, an inquiry was conducted approximately 3 months after MTX/placebo for MTX discontinuation regarding partner pregnancy.

Pegloticase+IMM Period
Day 1

On Day 1, subjects returned to the clinic for the following assessments and the first dose of pegloticase.

Perform a targeted physical examination (at a minimum this should include heart, lungs and abdominal examination).

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Record weight.

Digital photography of hands and feet.

For sites with X-ray capability, and subjects who provide consent, an optional X-ray of the hands and feet was obtained.

Document gout flares and intensity.

Collect swollen/tender joint counts; administer HAQ; and record physician global assessments.

For sites with DECT capability, and subjects who provide consent, an optional DECT was obtained. DECT may be completed within +/−5 days of the scheduled visit.

Obtain blood samples for hematology and clinical chemistry analysis.

Obtain a urine sample for albumin:creatinine ratio and allantoin acid.

Obtain a urine sample from all females of childbearing potential for performance of a pregnancy test.

Obtain 1 blood sample for measurement of SUA prior to the pegloticase infusion and after the end of the pegloticase infusion.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Administer MTX/placebo for MTX≥60 minutes prior to pegloticase infusion if subject had not taken MTX/placebo for MTX within the previous 1 to 3 days.

Obtain blood samples for MTX Polyglutamate analysis prior to the infusion.

Obtain blood samples for anti-PEG and anti-uricase IgG antibodies prior to the infusion.

Obtain optional whole blood and serum samples from subjects who consent for future analysis.

Administer IR prophylaxis (i.e., fexofenadine, acetaminophen, and solumedrol).

Administer the first dose of pegloticase and record date, volume, and duration of infusion, and start/stop (inclusive of 10-mL flush) times of dosing.

Obtain blood samples for pegloticase PK analysis any time after the end of the infusion, prior to discharge from the site.

Inquire about AEs and concomitant medication use.

Week 2

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Administer MTX/placebo for MTX≥60 minutes prior to pegloticase infusion if subject had not taken MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain blood samples for hematology and clinical chemistry analysis.

Obtain a urine sample from all females of childbearing potential for performance of a pregnancy test.

Obtain blood samples for pegloticase PK analysis prior to the pegloticase infusion and any time after the end of the infusion, prior to discharge from the site.

Obtain blood samples for anti-PEG and anti-uricase IgG antibodies prior to the infusion.

Obtain optional whole blood and serum samples from subjects who consent for future analysis. Samples were only collected at this visit for subjects having an acute gout flare during this visit.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 4

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Perform a targeted physical examination (at a minimum this should include heart, lungs and abdominal examination).

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain optional whole blood and serum samples from subjects who consent for future analysis. Samples were only collected at this visit for subjects having an acute gout flare during this visit.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.
Week 6

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Collect swollen/tender joint counts; administer HAQ; and record physician global assessments.

Obtain a urine sample from all females of childbearing potential for performance of a pregnancy test.

Obtain blood samples for hematology and clinical chemistry analysis.

Obtain optional whole blood and serum samples from subjects who consent for future analysis.

Obtain blood samples for pegloticase PK analysis prior to the pegloticase infusion and any time after the end of the infusion, prior to discharge from the site.

Obtain blood samples for anti-PEG and anti-uricase IgG antibodies prior to the infusion.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.
Week 8

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Perform a targeted physical examination (at a minimum this should include heart, lungs and abdominal examination).

Document gout flares and intensity.

Record weight.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain optional whole blood and serum samples from subjects who consent for future analysis. Samples were only collected at this visit for subjects having an acute gout flare during this visit.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.
Week 10

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain optional whole blood and serum samples from subjects who consent for future analysis. Samples were only collected at this visit for subjects having a gout flare during this visit.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 12

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Perform a targeted physical examination (at a minimum this should include heart, lungs and abdominal examination).

Document gout flares and intensity.

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain optional whole blood and serum samples from subjects who consent for future analysis. Samples were only collected at this visit for subjects having an acute gout flare during this visit.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 14

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Collect swollen/tender joint counts; administer HAQ; and record physician global assessments.

Digital photography of hands and feet.

For sites with DECT capability, and subjects who provide consent, an optional DECT was obtained. DECT may be completed within +/−5 days of the scheduled visit.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain blood samples for hematology and clinical chemistry analysis.

Obtain a urine sample for albumin:creatinine ratio and allantoin acid.

Obtain blood samples for pegloticase PK analysis prior to the pegloticase infusion and any time after the end of the infusion, prior to discharge from the site.

Obtain blood samples for anti-PEG and anti-uricase IgG antibodies prior to the infusion.

Obtain blood samples for MTX Polyglutamate analysis prior to the infusion.

Obtain optional whole blood and serum samples from subjects who consent for future analysis.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 16

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Perform a targeted physical examination (at a minimum this should include heart, lungs and abdominal examination).

Document gout flares and intensity.

Record vital signs (blood pressure, respiratory rate, temperature, and heart rate) prior to the pegloticase infusion and any time after the end of the infusion, but prior to discharge.

Record weight.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.

Week 18

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.

Week 20

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Perform a targeted physical examination (at a minimum this should include heart, lungs and abdominal examination).

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Collect swollen/tender joint counts; administer HAQ; and record physician global assessments.

Obtain a urine sample from all females of childbearing potential for performance of a pregnancy test.

Administer IR prophylaxis (i.e., fexofenadine, acetaminophen, and methylprednisolone)

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 21

Obtain a blood sample (1 sample) for measurement of SUA.

Obtain blood samples for pegloticase PK analysis.

Inquire about AEs and concomitant medication use.

Document gout flares and intensity.

Fill gout prophylaxis, fexofenadine, acetaminophen, and folic acid prescriptions, as needed.

Week 22

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain blood samples for hematology and clinical chemistry analysis.

Obtain blood samples for anti-PEG and anti-uricase IgG antibodies prior to the infusion.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 23

Obtain a blood sample (1 sample) for measurement of SUA

Inquire about AEs and concomitant medication use.

Document gout flares and intensity.

Fill gout prophylaxis, fexofenadine, acetaminophen, and folic acid prescriptions, as needed.

Week 24

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Investigator review of clinical status and subject treatment goals.

Perform a targeted physical examination (at a minimum this should include heart, lungs and abdominal examination).

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Record weight.

Collect swollen/tender joint counts; administer HAQ; and record physician global assessments.

Digital photography of hands and feet.

For sites with DECT capability, and subjects who provide consent, an optional DECT was obtained. DECT may be completed within +/−5 days of the scheduled visit.

For sites with X-ray capability, and subjects who provide consent, an optional X-ray of the hands and feet was obtained.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain blood samples for hematology and clinical chemistry analysis.

Obtain a urine sample for albumin:creatinine ratio and allantoin acid.

Obtain blood samples for pegloticase PK analysis prior to the pegloticase infusion and any time after the end of the infusion, prior to discharge from the site.

Obtain blood samples for anti-PEG and anti-uricase IgG antibodies prior to the infusion.

Obtain blood samples for MTX Polyglutamate analysis prior to the infusion.

Obtain optional whole blood and serum samples from subjects who consent for future analysis.

Administer IR prophylaxis (i.e., fexofenadine, acetaminophen, and methylprednisolone)

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 26

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone)

Administer pegloticase and record date, volume, and duration of infusion, and start/stop (inclusive of 10-mL flush) times of dosing.

Inquire about AEs and concomitant medication use.

Week 28

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone)

Administer pegloticase and record date, volume, and duration of infusion, and start/stop (inclusive of 10-mL flush) times of dosing.

Inquire about AEs and concomitant medication use.

Week 30

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Collect swollen/tender joint counts; administer HAQ; and record physician global assessments.

Obtain a urine sample from all females of childbearing potential for performance of a pregnancy test.

Administer IR prophylaxis (i.e., fexofenadine, acetaminophen, and methylprednisolone)

Administer pegloticase and record date, volume, and duration of infusion, and start/stop (inclusive of 10-mL flush) times of dosing.

Inquire about AEs and concomitant medication use.

Week 32

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 34

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 36

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Perform a targeted physical examination (at a minimum this should include heart, lungs and abdominal examination).

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Record weight.

Collect swollen/tender joint counts; administer HAQ; and record physician global assessments.

Digital photography of hands and feet.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Obtain blood samples for hematology and clinical chemistry analysis.

Obtain a urine sample for albumin:creatinine ratio and allantoin acid.

Obtain blood samples for pegloticase PK analysis prior to the pegloticase infusion and any time after the end of the infusion, prior to discharge from the site.

Obtain blood samples for anti-PEG and anti-uricase IgG antibodies prior to the infusion.

Obtain blood samples for MTX Polyglutamate analysis prior to the infusion.

Obtain optional whole blood and serum samples from subjects who consent for future analysis.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 38

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.

Week 40

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.

Week 42

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.

Week 44

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Collect swollen/tender joint counts; administer HAQ; and record physician global assessments.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.

Week 46

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Inquire about AEs and concomitant medication use.

Week 48

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge. During the pre-infusion blood pressure collection, at sites who participate and from subjects who consent, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone).

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Week 50

Obtain 2 blood samples for measurement of SUA within 48 hours prior to this visit's pegloticase infusion. Pre-infusion SUA results were reported by the local or central laboratory prior to pegloticase infusion. If a local laboratory sample was drawn at a center other than the research site (within 48 hours prior to the pegloticase infusion), a sample for the central laboratory was drawn prior to the pegloticase infusion on the day of the visit.

Stopping rule: Subjects with an SUA level>6 mg/dL at 2 consecutive study visits beginning with the Week 2 Visit (not including post-infusion samples) subsequently discontinued treatment and remained in the study.

Administer MTX/placebo for MTX≥60 minutes prior to pegloticase infusion if subject had not taken MTX/placebo for MTX within the previous 1 to 3 days.

Document gout flares and intensity.

Record vital signs (blood pressure, respiratory rate, temperature, and heart rate) prior to the pegloticase infusion and any time after the end of the infusion, but prior to discharge.

Assess MTX/placebo for MTX compliance and re-dispense MTX/placebo for MTX.

Ask Yes/No question regarding folic acid, gout flare prophylaxis, and IR prophylaxis compliance.

Fill gout prophylaxis, fexofenadine, acetaminophen, and folic acid prescriptions, as needed.

Obtain a urine sample from all females of childbearing potential for performance of a pregnancy test.

Administer IR prophylaxis (i.e., fexofenadine, acetaminophen, and methylprednisolone)

Administer pegloticase and record date, volume, and duration of infusion, and start/stop (inclusive of 10-mL flush) times of dosing.

Obtain a blood sample (1 sample) for measurement of SUA any time after the end of the infusion, prior to discharge from the site.

Inquire about AEs and concomitant medication use.

Note: MTX was taken one week following the Week 50 Visit and Folic Acid was taken until just prior to the Week 52 Visit.

End of Pegloticase Infusions Visit

Subjects who end pegloticase infusions prior to Week 52 completed the End of Pegloticase Infusions Visit procedures following their final infusion. Subjects continued to participate in all visits through the end of the study. Subjects completed selected study visits at the study site during key efficacy and safety collections at Weeks 12, 13, 14, 20, 21, 22, 23, 24, 32, 34, 36, 48, 50 and 52, so that SUA labs and other key assessments could be completed. During visits between these key efficacy and safety collection visits, in subjects who had stopped infusions, subjects could complete study visits in person or via a telephone visit option to collect AEs, concomitant medications, and gout flare information.

The following procedures were completed at the End of Pegloticase Visit:

Investigator review of clinical status and subject treatment goals.

Document gout flares and intensity.

Perform a targeted physical examination (at a minimum this should include heart, lungs and abdominal examination).

Record vital signs (blood pressure, respiratory rate, temperature, and heart rate) prior to the pegloticase infusion and any time after the end of the infusion, but prior to discharge. At sites that participate and from subjects who consent, during the BP collection, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Record weight.

Collect swollen/tender joint counts; administer HAQ; and record physician global assessments.

Assess MTX/placebo for MTX compliance.

Ask Yes/No question regarding folic acid, gout flare prophylaxis compliance.

Digital photography of hands and feet.

For sites with DECT capability, and subjects who provide consent, an optional DECT was obtained. DECT may be completed within +/−5 days of the scheduled visit. Subjects who end pegloticase infusions prior to Week 52 should follow the scheduled timepoints but avoid a repeat DECT scan within 6 weeks of a prior scan.

For sites with X-ray capability, and subjects who provide consent, an optional X-ray of the hands and feet was obtained. Subjects who end pegloticase infusions prior to Week 52 should follow the scheduled timepoints but avoid a repeat X-ray within 3 months of a prior X-ray.

Obtain a urine sample from all females of childbearing potential for performance of a pregnancy test.

Obtain blood samples for hematology and clinical chemistry analysis.

Obtain a urine sample for albumin:creatinine ratio and allantoin acid.

Obtain blood samples for pegloticase PK analysis.

Obtain blood samples for anti-PEG and anti-uricase IgG antibodies.

Obtain optional whole blood and serum samples from subjects who consent for future analysis.

Obtain a blood sample (1 sample) for measurement of SUA.

Inquire about AEs and concomitant medication use.

Week 52/End of Study/Early Termination Visit

Investigator review of clinical status and subject treatment goals.

Document gout flares and intensity.

Perform a targeted physical examination (at a minimum this should include heart, lungs and abdominal examination).

Record vital signs (blood pressure, respiratory rate, temperature, and heart rate) prior to the pegloticase infusion and any time after the end of the infusion, but prior to discharge. At sites that participate and from subjects who consent, during the BP collection, optional intensive BP collections were obtained. For this optional collection, three blood pressure measurements should be performed, at least 2 minutes apart, with BP readings measured to the nearest mm Hg prior to pegloticase infusion. If any of the 3 systolic blood pressure measurements differed by more than 8 mm Hg or if diastolic measurements differed by more than 5 mm Hg, a second set of 3 sitting blood pressure measurements was obtained.

Record weight.

Collect swollen/tender joint counts; administer HAQ; and record physician global assessments.

Digital photography of hands and feet.

For sites with DECT capability, and subjects who provide consent, an optional DECT was obtained. DECT may be completed within +/−5 days of the scheduled visit.

For sites with X-ray capability, and subjects who provide consent, an optional X-ray of the hands and feet was obtained.

Assess MTX/placebo for MTX compliance.

Ask Yes/No question regarding folic acid compliance.

Obtain a urine sample from all females of childbearing potential for performance of a pregnancy test.

Obtain blood samples for hematology and clinical chemistry analysis.

Obtain a urine sample for albumin:creatinine ratio and allantoin acid.

Obtain blood samples for pegloticase PK analysis.

Obtain blood samples for anti-PEG and anti-uricase IgG antibodies.

Obtain optional whole blood and serum samples from subjects who consent for future analysis.

Obtain a blood sample (1 sample) for measurement of SUA.

Inquire about AEs and concomitant medication use.

Safety Follow-up Phone/Email Visits

Thirty (30) days after the last pegloticase infusion, subjects were contacted by telephone or email to inquire about SAEs. Subjects who were females of childbearing potential were asked to confirm that ovulation had occurred. If the subject had not ovulated, the subject were requested to return to the site for a urine pregnancy test.

MTX Partner Pregnancy Follow-up

Subjects who were non-vasectomized males were asked 3 months after MTX or placebo for MTX discontinuation regarding partner pregnancy. This occured at a scheduled visit or by a phone/email visit.

Post Treatment Follow-Up

The intent was to obtain at least 6 months of follow-up on each subject after cessation of pegloticase infusions. If these 6 months occur prior to end of study at Week 52, such as in the case of a subject who ends pegloticase infusions on or before Week 24, there were no follow-up visits after the Week 52/End of Study Visit. For subjects who end pegloticase infusions between Weeks 26 and 36, there were at least 3 months of follow-up while the subject remains on-study prior to Week 52, and then one follow-up visit after the Week 52/End of Study Visit.

For subjects who end pegloticase infusions between Weeks 38 and 52, there were two follow-up visits at intervals of 3 months apart after the Week 52/End of Study Visit. The following procedures were completed at the 3- and 6-month Post Treatment Follow-up Visits:

Document gout flares and intensity.

Record vital signs (blood pressure, respiratory rate, temperature, and heart rate) prior to discharge.

Perform a targeted physical examination (at a minimum this should include heart, lungs and abdominal examination).

Record weight.

Collect swollen/tender joint counts; administer HAQ; and record physician global assessments.

Digital photography of hands and feet.

Obtain blood samples for hematology and clinical chemistry analysis.

Obtain a blood sample (1 sample) for measurement of SUA.

Obtain blood samples for anti-PEG and anti-uricase IgG antibodies (3 Month Post Treatment Follow-up Visit only).

Inquire about AEs and concomitant medication use.

Populations for Analysis

The following analysis populations were defined for this study:

Intent-to-treat population (ITT): all randomized subjects

Modified intention-to-treat (mITT) population: all randomized subjects who receive at least 1 dose of pegloticase Per-protocol population (PP): all randomized subjects who receive at least 1 dose of pegloticase, were taking the 15 mg dose of MTX or placebo for MTX at the time of first pegloticase dose, and had no major protocol deviations that would challenge the validity of the data Pharmacokinetic (PK) population: all randomized subjects who receive at least one dose of pegloticase and had a post-pegloticase sample evaluable for PK analysis Safety population: all randomized subjects who take at least one dose of blinded MTX or placebo for MTX MTX population: all subjects who take at least one dose of MTX The ITT and mITT populations were used for analysis of efficacy data; subjects were analyzed according to the treatment to which they were randomized. The PP population was used for analysis of select efficacy endpoints; subjects were analyzed according to the treatment received. The safety population was used for analysis of safety data; subjects were analyzed according to the treatment received. The MTX population was used for analysis of safety data during the Run-In period prior to randomization.

Efficacy Endpoint Analysis

Efficacy analyses were performed using the ITT and mITT populations, with select endpoints analyzed using the PP population. Continuous variables were summarized using descriptive statistics (number of subjects, mean, median, standard deviation, minimum, and maximum).

Categorical variables were summarized using frequencies and percentages. Unless otherwise specified, baseline was defined as the last non-missing observation prior to the first dose of MTX.

Primary and Secondary Endpoint Analysis

The primary analysis was conducted in the ITT population. The primary efficacy endpoint was the proportion of responders during Month 6. A responder was defined as a subject for whom the proportion of time that the SUA-time curve was <6 mg/dL during the analysis interval was at least 80%. The proportion of time that the SUA level was below 6 mg/dL was defined as the ratio of the time during which the SUA level remains below 6 mg/dL (using linear interpolation, if necessary) to the entire time interval during Month 6. A subject was declared a non-responder if the subject had 2 SUA levels>6 mg/dL at 2 consecutive study visits beginning with the Week 2 Visit prior to or during Month 6. Additionally, a subject who withdraws from study treatment for any reason other than the stopping rule after randomization and prior to or during Month 6 (for the primary endpoint) or Months 9 or 12 (for the secondary endpoints) was considered a non-responder at the time of withdrawal (and for all subsequent time points) if SUA values were not collected at the planned time points. Sensitivity analyses of the primary and secondary endpoints included data (if available) for subjects who discontinued treatment due to stopping rule and remained on study.

The analysis of the primary endpoint and the secondary responder endpoints assessed risk difference (difference in response proportions) in a stratified analysis. The analysis used Cochran-Mantel-Haenszel (CMH) weighting to estimate the common risk difference within strata and to estimate the standard error of the common risk difference. Stratification for the analysis used the same factor as was used to stratify randomization, presence of tophi (yes, no). The difference in response rates, comparing pegloticase with MTX vs. pegloticase with placebo for MTX, was estimated along with the corresponding 95% confidence interval (CI) and p-value.

Subjects with resolution of ≥1 tophi were subjects with an overall tophus response of complete response (i.e., complete response in at least one tophus and no evidence of progressive disease, see Section 9.5.1.6.1). The difference in the proportion of subjects with resolution of ≥1 tophi at Week 52 between pegloticase with MTX and pegloticase with placebo for MTX was tested with a chi-square test, and the difference in rates was estimated along with the corresponding 95% confidence interval (CI) and p-value.

To control the overall Type 1 error rate of the study, taking into consideration the one primary and 3 secondary endpoints, the endpoints were tested sequentially. For each endpoint, pegloticase with MTX was tested against pegloticase with placebo for MTX at the 0.05 level only if pegloticase with MTX was statistically significant for the endpoint preceding it in the prespecified order and 3 secondary endpoints, the endpoints were tested sequentially. For each endpoint, pegloticase with MTX was tested against pegloticase with placebo for MTX at either the 0.05 level only if pegloticase with MTX was statistically significant for the endpoint preceding it in the prespecified order.

Exploratory Endpoint Analysis

HAQ-DI score, HAQ pain and health scores, tophus size (longest axis), urate deposition volume, swollen/tender joint counts, physician global assessment score, and mean SUA were summarized at baseline and each visit with descriptive statistics. Changes from baseline for these parameters to each visit and overall were analyzed with a mixed model repeated measures (MMRM) analysis of covariance (ANCOVA) model with a term for baseline score, tophi presence at baseline (except for analyses of tophi), and factors of treatment group, visit, and visit by treatment group interaction.

The proportion of subjects achieving 20%, 50%, or 70% improvement based on gout chronic response criteria was defined as 20/50/70% improvement in 4 of the 5 components (TJC, SJC, HAQ pain, HAQ health, and tophus area). The proportion of subjects with improvement was summarized and the difference between treatment groups analyzed with a CMH test. P-values for exploratory endpoints were provided for descriptive purposes only, and treatment effects with corresponding two-sided 95% confidence intervals were provided.

Pharmacokinetic and Anti-drug Antibody Analysis

Concentrations for pegloticase and MTX polyglutamate (as appropriate) were summarized using descriptive statistics for the PK population. Details were provided in a separate PK analysis plan. Incidence of anti-drug antibodies and titer levels were summarized.

Safety Analysis

Treatment-emergent AEs (TEAEs) during the MTX Tolerability Assessment Period and Run-In Period were defined as events with an onset date on or after the first dose of MTX through the first pegloticase infusion, or 30 days after the last dose of MTX for subjects who do not receive pegloticase. TEAEs during the Pegloticase+IMM Period were defined as events that occur after the start of the first pegloticase infusion through 30 days after the last dose of pegloticase and/or MTX or placebo for MTX (whichever was later). TEAEs that occur during the MTX Tolerability Assessment Period prior to randomization (Weeks −6 to −4) was summarized separately for the MTX population. TEAEs were summarized for the safety population separately for the Run-In Period (after randomization at Week −4 to Day 1) by treatment group (MTX and placebo for MTX) and the Pegloticase+IMM Period by treatment group (pegloticase with MTX and pegloticase with placebo for MTX), and overall (after randomization through 30 days after the last dose of treatment) by treatment group (MTX and placebo for MTX). AEs that occur more than 30 days after the last dose of pegloticase and/or MTX or placebo for MTX through the 6-month follow-up visit was also summarized.

The number and percentage of subjects experiencing AEs were summarized by system organ class and preferred term. Summaries by maximum severity and relationship to MTX and/or pegloticase was also provided. SAEs and AEs leading to discontinuation of MTX and/or pegloticase were presented by system organ class and preferred term.

The proportion of subjects with SAEs and each AESI was summarized by treatment group. A Fisher's exact test was performed to evaluate the difference in proportions between pegloticase with MTX vs. pegloticase with placebo for MTX. The proportion of subjects experiencing an SAE and each AESI was summarized for each treatment group, along with the treatment difference in proportions, corresponding 95% CI for the treatment difference and p-value.

Laboratory test results, including urine albumin:creatinine ratio, were summarized by study visit and change from baseline. Shift tables for laboratory parameters by Common Terminology Criteria for Adverse Events grade were presented. Laboratory test results were also classified relative to the normal reference range (normal, low, or high).

Vital signs, including blood pressure, respiratory rate, temperature, and heart rate, were summarized by study visit and change from baseline.

Prior and concomitant medications were summarized and/or included in the data listings.

Data for the MTX Tolerability Assessment Period, Run-in Period and Pegloticase+IMM Period were summarized separately, and for the Run-in and Pegloticase+IMM periods combined, where applicable.

Interim Analyses

An interim analysis was undertaken when all subjects reached the Week 24 visit. An independent DMC was convened to oversee and interpret this analysis to assess the primary endpoint of maintaining SUA<6 mg/dL at least 80% of the time during Month 6 (Weeks 20, 21, 22, 23 and 24) comparing pegloticase with MTX to pegloticase with placebo for MTX, as well as to assess the safety of the co-administration of pegloticase with MTX based on all accrued data at that time. The DMC recommended unblinding the Sponsor, stopping the study, or continuing without change at the time of the interim analysis, based on pre-defined criteria that were outlined in the DMC charter. In the event of a highly clinically compelling increase in response rates with pegloticase with MTX vs pegloticase with placebo for MTX, and in the absence of any unexpected safety findings, the Sponsor may become unblinded for full data analysis. Subjects would continue on study through Week 52, with investigators and subjects remaining blinded. Clear parameters to guide decision criteria were pre-specified in advance.

Upon all subjects reaching Week 52, a final analysis was completed in which the secondary endpoints were tested, including maintaining SUA<6 mg/dL at least 80% of the time during Month 9, maintaining SUA<6 mg/dL at least 80% of the time during Month 12, and proportion of subjects with complete resolution of at least one tophus by digital photography through Week 24. Additional safety data accrued would also be summarized.

Criteria would also established and pre-specified for the DMC to recommend study discontinuation due to futility or an unexpected safety risk. An interim analysis for futility may be completed earlier on the basis of the MIRROR Open-Label study results. At the futility analysis there was no opportunity to conclude a benefit of MTX and therefore there was no adjustment to the Type I error.

If none of the above scenarios were established, the study would continue, and the Sponsor would remain blinded until all subjects reach Week 52.

Sample Size and Power Considerations

The response rate during Month 6 on pegloticase 8 mg every 2 weeks was 43% for the phase 3 studies. A sample size of 135 subjects (90 subjects randomized to receive pegloticase with MTX, 45 subjects randomized to receive pegloticase with placebo for MTX) provides 88% power at the 2-sided alpha=0.05 level to detect a difference of 28% (71% response rate for pegloticase with MTX vs. 43% for pegloticase with placebo for MTX).

Example 11

Results From Open-Label Clinical Trial In Patients With Uncontrolled Gout

Adult patients with uncontrolled gout who were beginning pegloticase therapy were considered for enrollment in this ongoing multicenter, open-label, efficacy and safety study of pegloticase with MTX co-treatment (NCT03635957). Patients were administered oral MTX (15 mg/week) and folate (1 mg/day) 4 weeks prior to the first pegloticase infusion (Day 1) and throughout the pegloticase treatment period. Blood was drawn prior to each infusion to measure sUA level, monitor clinical parameters, and examine for ADA development. All patients followed typical IR prophylaxis protocols (fexofenadine one day before and the morning of each infusion and acetaminophen and IV corticosteroid the morning of each infusion). Patients also received gout flare prophylaxis with either NSAIDs, colchicine or prednisone initiated at least 1 week prior to Day 1. The primary study outcome was the proportion of responders, defined as sUA<6 mg/dL for at least 80% of the time during month 6 (weeks 20, 22, and 24). All analyses were performed on a modified intent-to-treat population, defined as patients who received≥1 pegloticase infusion.

A total of 17 patients were screened and 14 patients (all men, average age: 49.3±8.7 years) were enrolled. Patient characteristics are provided in Table 2. On Day 1, mean sUA was 9.2±2.5 mg/dL and 12 of the 14 patients had visible tophi. At the 6 months timepoint, 11/14 (78.6%, 95% CI 49.2-95.3%) met the responder definition, with 3 patients discontinuing after meeting stopping rules (pre-infusion sUA values greater than 6 mg/dL at 2 consecutive scheduled visits). All patients tolerated MTX. One serious AE of bacterial sepsis occurred (unrelated to study drug, resolved). AEs that occurred in >1 patient were: diarrhea and upper respiratory tract infection in 3 patients each, nasopharyngitis, sinusitis, muscle strain, and hypertension in 2 patients each. Gout flares occurred in 10/14 (71.4%) patients. No new safety concerns were identified.

Results are provided in Tables 3-10. An increased proportion of patients maintained therapeutic response at 6 months when treated concomitantly with MTX and pegloticase (78.6%) when compared to the previously reported 42% using pegloticase alone. These results support and reflect the improved response rates demonstrated in two prior case series.

For the following tables, abbreviations as follows may apply: ITT=Intent-to-Treat, Max=Maximum, Min=Minimum, mITT=Modified Intent-to-Treat, SD=Standard Deviation, sUA=serum Uric Acid, IMM=Immunomodulator, MTX=Methotrexate, PK=Pharmacokinetic, CI=Confidence Interval, NE=Not Estimable, eCRF=electronic case report form.

Percentages were based on the number of subjects in each population. Month 6 includes pre-infusion and post-infusion sUA assessments at Week 20, pre-infusion and post-infusion sUA assessments at Week 22, pre-infusion assessments at Week 24, and pre-infusion unscheduled sUA assessments between Week 20 and Week 24. Local laboratory-reported pre-infusion sUA values were included only when the sUA result from the central laboratory at the same time point was unavailable.

[1] Treatment stopping Rule: Subjects with a sUA level>6 mg/dL at 2 consecutive scheduled study visits beginning with Week 2

[2] If the subject's proportion of hours that sUA was <6 mg/dL was greater than or equal to 80% the subject was called a responder.

Subjects meeting the stopping rule were counted as non-responders. If only one sUA result was collected during Month 6 period, response was based on the single value. A subject with the proportion of hours less than 80% was counted as non-responders.

Any other subject was counted as a non-responder if sUA values were not collected during the Month 6 period.

[3] Two-sided 95% Exact Clopper-Pearson confidence interval.

TABLE 2

Subject Disposition

| Number of Subjects | Overall n (%) |
|---|---|
| Screened | 17 |
| Screen Failures | 3 |
| Received MTX [1] | 1 |
| Did not receive MTX | 2 |
| ITT Population | 15 |
| mITT Population | 14 |
| PK Population | 0 |
| Entered the MTX Run-in Period | 15 |
| Completed the MTX Run-in Period | 14 (93.3) |
| Discontinued from MTX Run-in Period [1] | 1 (6.7) |
| Entered Pegloticase + IMM Period | 14 (100) |
| Completed Treatment [2] | 3 (21.4) |
| 24 Weeks (Amendment 1) | 1 (7.1) |
| 52 Weeks (Amendment 2) | 2 (14.3) |
| Discontinued Treatment [3] | 5 |
| Reasons for Discontinuation | |
| Adverse Events | 0 |
| Lack of Efficacy (sUA stopping criteria met) | 3 (60.0) |
| Unacceptable Risk to Patient | 0 |
| Subject refusal of additional therapy | 2 (40.0) |
| Study Terminated by Sponsor | 0 |
| Pregnancy | 0 |
| Death | 0 |
| Completed Study | 4 (28.6) |
| At Week 24 (Amendment 1) | 1 (7.1) |
| At Week 52 (Amendment 2) | 3 (21.4) |
| Discontinued Study | 3 |

TABLE 2-continued

Subject Disposition

| Number of Subjects | Overall n (%) |
|---|---|
| Reasons for Discontinuation | |
| Death | 0 |
| Lack of Efficacy (sUA stopping criteria met) [4] | 3 (100) |
| Lost to Follow-Up | 0 |
| Study Terminated by Sponsor | 0 |
| Withdrawal by Subject | 0 |
| Have 3 month follow-up | 0 |
| Have 6 month follow-up | 0 |

TABLE 3

SUA < 6 mg/dL Responders during Month 3 and Overall (Months 3 and 6 Combined) (ITT and mITT Populations)

| Time Point | | ITT Population N = 15 | mITT Population N = 14 |
|---|---|---|---|
| Month 3 (Weeks 10, 12, 14) | Responder, n (%) [2] | 11 (73.3) | 11 (78.6) |
| | 95% Clopper-Pearson Confidence Interval [3] | 44.9, 92.2 | 49.2, 95.3 |
| | Non-Responder, n (%) | 4 (26.7) | 3 (21.4) |
| | Proportion of Time during Period that sUA < 6 mg/dL | | |
| | n | 11 | 11 |
| | Mean (SD) | 100.0 (0.00) | 100.0 (0.00) |
| | Median | 100.0 | 100.0 |
| | Min, Max | 100, 100 | 100, 100 |
| Month 3 (Weeks 10, 12,14) | Discontinued due to stopping rule prior to Week 14, n (%) [1] | 3 (20.0) | 3 (21.4) |
| | Subjects missing all data in analysis period, n (%) | 3 (20.0) | 2 (14.3) |
| | Subjects with only one measurement (above cutoff) in analysis period, n (%) | 1 (6.7) | 1 (7.1) |
| | Subjects with only one measurement (below cutoff) in analysis period, n (%) | 0 | 0 |
| Overall (Month 3 and Month 6 Combined) [4] | Responder, n (%) [2] | 11 (73.3) | 11 (78.6) |
| | 95% Clopper-Pearson Confidence Interval [3] | 44.9, 92.2 | 49.2, 95.3 |
| | Non-Responder, n (%) | 4 (26.7) | 3 (21.4) |
| Overall (Month 3 and Month 6 Combined) [4] | Proportion of Time during Period that sUA < 6 mg/dL | | |
| | n | 11 | 11 |
| | Mean (SD) | 100.0 (0.00) | 100.0 (0.00) |
| | Median | 100.0 | 100.0 |
| | Min, Max | 100, 100 | 100, 100 |
| | Discontinued due to stopping rule prior to Week 14, n (%) [1] | 3 (20.0) | 3 (21.4) |

TABLE 4

Serum Uric Acid < 5 mg/dL Responders during Month 3, Month 6, and Overall (Month 3 and Month 6 Combined) (ITT Population and mITT Population)

| Time Point | | ITT Population N = 15 | mITT Population N = 14 |
|---|---|---|---|
| Month 3 (Weeks 10, 12, 14) | Responder, n (%) [2] | 11 (73.3) | 11 (78.6) |
| | 95% Clopper-Pearson Confidence Interval [3] | 44.9, 92.2 | 49.2, 95.3 |
| | Non-Responder, n (%) | 4 (26.7) | 3 (21.4) |
| | Proportion of Time during Period that sUA < 5 mg/dL | | |
| | n | 11 | 11 |
| | Mean (SD) | 100.0 (0.00) | 100.0 (0.00) |
| | Median | 100.0 | 100.0 |
| | Min, Max | 100, 100 | 100, 100 |
| Month 3 (Weeks 10, 12, 14) | Discontinued due to stopping rule prior to Week 14, n (%) [1] | 3 (20.0) | 3 (21.4) |
| | Subjects missing all data in analysis period, n (%) | 3 (20.0) | 2 (14.3) |
| | Subjects with only one measurement (above cutoff) in analysis period, n (%) | 1 (6.7) | 1 (7.1) |
| | Subjects with only one measurement (below cutoff) in analysis period, n (%) | 0 | 0 |
| Month 6 (Weeks 20, 22, 24) | Responder, n (%) [2] | 11 (73.3) | 11 (78.6) |
| | 95% Clopper-Pearson Confidence Interval [3] | 44.9, 92.2 | 49.2, 95.3 |
| | Non-Responder, n (%) | 4 (26.7) | 3 (21.4) |
| Month 6 (Weeks 20, 22, 24) | Proportion of Time during Period that sUA < 5 mg/dL | | |
| | n | 11 | 11 |
| | Mean (SD) | 100.0 (0.00) | 100.0 (0.00) |
| | Median | 100.0 | 100.0 |
| | Min, Max | 100, 100 | 100, 100 |
| | Discontinued due to stopping rule prior to Week 24, n (%) [1] | 3 (20.0) | 3 (21.4) |
| | Subjects missing all data in analysis period, n (%) | 4 (26.7) | 3 (21.4) |
| | Subjects with only one measurement (above cutoff) in analysis period, n (%) | 0 | 0 |
| | Subjects with only one measurement (below cutoff) in analysis period, n (%) | 0 | 0 |
| Overall (Month 3 and Month 6 Combined) [4] | Responder, n (%) [4] | 11 (73.3) | 11 (78.6) |
| | 95% Clopper-Pearson Confidence Interval [3] | 44.9, 92.2 | 49.2, 95.3 |
| | Non-Responder, n (%) | 4 (26.7) | 3 (21.4) |
| | Proportion of Time during Period that sUA < 5 mg/dL | | |
| | n | 11 | 11 |
| | Mean (SD) | 100.0 (0.00) | 100.0 (0.00) |
| | Median | 100.0 | 100.0 |
| | Min, Max | 100, 100 | 100, 100 |
| | Discontinued due to stopping rule prior to Week 24, n (%) [1] | 3 (20.0) | 3 (21.4) |

TABLE 5

Serum Uric Acid (mg/dL): Observed Values and Change from Methotrexate Baseline Values (mITT Population)

| Visit Statistics | mITT Population (N = 14) | | |
|---|---|---|---|
| | Baseline [1] | Observed | Change from Baseline |
| Baseline [2] | | | |
| n | | 14 | |
| Mean (SD) | | 8.91 (1.877) | |
| Median | | 9.05 | |
| Min, Max | | 5.4, 12.4 | |
| 95% CI [3] | | (7.82, 9.99) | |
| sUA < 6 mg/dL, n (%) | | 1 (7.1%) | |
| Week −2 | | | |
| n | 14 | 14 | 14 |
| Mean (SD) | 8.91 (1.877) | 9.45 (2.211) | 0.54 (0.839) |
| Median | 9.05 | 9.30 | 0.50 |
| Min, Max | 5.4, 12.4 | 5.2, 14.6 | −0.9, 2.2 |
| 95% CI [3] | (7.82, 9.99) | (8.17, 10.73) | (0.06, 1.03) |
| sUA < 6 mg/dL, n (%) | | 1 (7.1%) | |
| Day 1-Pre-Infusion | | | |
| n | 14 | 14 | 14 |
| Mean (SD) | 8.91 (1.877) | 9.16 (2.486) | 0.25 (1.283) |
| Median | 9.05 | 9.00 | −0.25 |
| Min, Max | 5.4, 12.4 | 4.7, 15.8 | −1.2, 3.4 |
| 95% CI [3] | (7.82, 9.99) | (7.72, 10.59) | (−0.49, 0.99) |
| sUA < 6 mg/dL, n (%) | | 1 (7.1%) | |
| Day 1-Post-Infusion | | | |
| n | 11 | 11 | 11 |
| Mean (SD) | 8.48 (1.758) | 1.18 (1.417) | −7.30 (2.081) |
| Median | 8.70 | 0.30 | −7.30 |
| Min, Max | 5.4, 11.6 | 0.3, 4.9 | −11.3, −3.8 |
| 95% CI [3] | (7.30, 9.66) | (0.23, 2.13) | (−8.70, −5.90) |
| sUA < 6 mg/dL, n (%) | | 11 (100%) | |
| Week 1 | | | |
| n | 6 | 6 | 6 |
| Mean (SD) | 8.10 (1.541) | 0.30 (0.000) | −7.80 (1.541) |
| Median | 8.30 | 0.30 | −8.00 |
| Min, Max | 5.4, 9.6 | 0.3, 0.3 | −9.3, −5.1 |
| 95% CI [3] | (6.48, 9.72) | (0.30, 0.30) | (−9.42, −6.18) |
| sUA < 6 mg/dL, n (%) | | 6 (100%) | |
| Week 2-Pre-Infusion | | | |
| n | 14 | 14 | 14 |
| Mean (SD) | 8.91 (1.877) | 1.26 (2.163) | −7.65 (2.496) |
| Median | 9.05 | 0.30 | −8.00 |
| Min, Max | 5.4, 12.4 | 0.3, 7.7 | −11.3, −1.0 |
| 95% CI [3] | (7.82, 9.99) | (0.01, 2.51) | (−9.09, −6.21) |
| sUA < 6 mg/dL, n (%) | | 13 (92.9%) | |
| Week 2-Post-Infusion | | | |
| n | 14 | 14 | 14 |
| Mean (SD) | 8.91 (1.877) | 0.30 (0.000) | −8.61 (1.877) |
| Median | 9.05 | 0.30 | −8.75 |
| Min, Max | 5.4, 12.4 | 0.3, 0.3 | −12.1, −5.1 |
| 95% CI [3] | (7.82, 9.99) | (0.30, 0.30) | (−9.69, −7.52) |
| sUA < 6 mg/dL, n (%) | | 14 (100%) | |
| Week 4-Pre-Infusion | | | |
| n | 14 | 14 | 14 |
| Mean (SD) | 8.91 (1.877) | 1.61 (2.637) | −7.29 (3.137) |
| Median | 9.05 | 0.30 | −7.45 |
| Min, Max | 5.4, 12.4 | 0.3, 8.2 | −12.1, −0.5 |
| 95% CI [3] | (7.82, 9.99) | (0.09, 3.14) | (−9.10, −5.48) |
| sUA < 6 mg/dL, n (%) | | 12 (85.7%) | |
| Week 4-Post-Infusion | | | |
| n | 13 | 13 | 13 |
| Mean (SD) | 8.92 (1.953) | 0.30 (0.000) | −8.62 (1.953) |
| Median | 9.40 | 0.30 | −9.10 |
| Min, Max | 5.4, 12.4 | 0.3, 0.3 | −12.1, −5.1 |
| 95% CI [3] | (7.74, 10.10) | (0.30, 0.30) | (−9.80, −7.44) |
| sUA < 6 mg/dL, n (%) | | 13 (100%) | |
| Week 6-Pre-Infusion | | | |
| n | 13 | 13 | 13 |
| Mean (SD) | 8.92 (1.953) | 0.91 (2.191) | −8.02 (2.779) |
| Median | 9.40 | 0.30 | −8.40 |
| Min, Max | 5.4, 12.4 | 0.3, 8.2 | −12.1, −1.4 |
| 95% CI [3] | (7.74, 10.10) | (0.00, 2.23) | (−9.69, −6.34) |
| sUA < 6 mg/dL, n (%) | | 12 (92.3%) | |
| Week 6-Post-Infusion | | | |
| n | 12 | 12 | 12 |
| Mean (SD) | 8.87 (2.029) | 0.30 (0.000) | −8.57 (2.029) |
| Median | 9.05 | 0.30 | −8.75 |
| Min, Max | 5.4, 12.4 | 0.3, 0.3 | −12.1, −5.1 |
| 95% CI [3] | (7.58, 10.16) | (0.30, 0.30) | (−9.86, −7.28) |
| sUA < 6 mg/dL, n (%) | | 12 (100%) | |
| Week 7 | | | |
| n | 4 | 4 | 4 |
| Mean (SD) | 8.70 (2.960) | 0.30 (0.000) | −8.40 (2.960) |
| Median | 8.50 | 0.30 | −8.20 |
| Min, Max | 5.4, 12.4 | 0.3, 0.3 | −12.1, −5.1 |
| 95% CI [3] | (3.99, 13.41) | (0.30, 0.30) | (−13.11, −3.69) |
| sUA < 6 mg/dL, n (%) | | 4 (100%) | |
| Week 8-Pre-Infusion | | | |
| n | 12 | 12 | 12 |
| Mean (SD) | 8.87 (2.029) | 1.08 (2.472) | −7.79 (3.227) |
| Median | 9.05 | 0.30 | −7.98 |
| Min, Max | 5.4, 12.4 | 0.3, 8.9 | −12.1, 0.2 |
| 95% CI [3] | (7.58, 10.16) | (0.00, 2.65) | (−9.84, −5.74) |
| sUA < 6 mg/dL, n (%) | | 11 (91.7%) | |
| Week 8-Post-Infusion | | | |
| n | 12 | 12 | 12 |
| Mean (SD) | 8.87 (2.029) | 0.30 (0.000) | −8.57 (2.029) |
| Median | 9.05 | 0.30 | −8.75 |
| Min, Max | 5.4, 12.4 | 0.3, 0.3 | −12.1, −5.1 |
| 95% CI [3] | (7.58, 10.16) | (0.30, 0.30) | (−9.86, −7.28) |
| sUA < 6 mg/dL, n (%) | | 12 (100%) | |

TABLE 5-continued

Serum Uric Acid (mg/dL): Observed Values and Change from Methotrexate Baseline Values (mITT Population)

mITT Population (N = 14)

| Visit Statistics | Baseline [1] | Observed | Change from Baseline |
|---|---|---|---|
| Week 10-Pre-Infusion | | | |
| n | 12 | 12 | 12 |
| Mean (SD) | 8.87 (2.029) | 0.95 (2.252) | −7.92 (3.069) |
| Median | 9.05 | 0.30 | −8.35 |
| Min, Max | 5.4, 12.4 | 0.3, 8.1 | −12.1, −0.6 |
| 95% CI [3] | (7.58, 10.16) | (0.00, 2.38) | (−9.87, −5.97) |
| sUA < 6 mg/dL, n (%) | | 11 (91.7%) | |
| Week 10-Post-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 12-Pre-Infusion | | | |
| n | 11 | 11 | 11 |
| Mean (SD) | 8.88 (2.127) | 0.30 (0.015) | −8.59 (2.124) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.29, 0.31) | (−10.01, −7.16) |
| sUA < 6 mg/dL, n (%) | | 11 (100%) | |
| Week 12-Post-Infusion | | | |
| n | 10 | 10 | 10 |
| Mean (SD) | 8.98 (2.216) | 0.30 (0.000) | −8.68 (2.216) |
| Median | 9.50 | 0.30 | −9.20 |
| Min, Max | 5.4, 12.4 | 0.3, 0.3 | −12.1, −5.1 |
| 95% CI [3] | (7.40, 10.56) | (0.30, 0.30) | (−10.26, −7.10) |
| sUA < 6 mg/dL, n (%) | | 10 (100%) | |
| Week 14-Pre-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 14-Post-Infusion | | | |
| n | 10 | 10 | 10 |
| Mean (SD) | 8.80 (2.224) | 0.30 (0.000) | −8.50 (2.224) |
| Median | 8.65 | 0.30 | −8.35 |
| Min, Max | 5.4, 12.4 | 0.3, 0.3 | −12.1, −5.1 |
| 95% CI [3] | (7.21, 10.39) | (0.30, 0.30) | (−10.09, −6.91) |
| sUA < 6 mg/dL, n (%) | | 10 (100%) | |
| Week 16-Pre-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 16-Post-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 18-Pre-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 18-Post-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 20-Pre-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 20-Post-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 22-Pre-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 22-Post-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |

TABLE 5-continued

Serum Uric Acid (mg/dL): Observed Values and Change from Methotrexate Baseline Values (mITT Population)

mITT Population (N = 14)

| Visit Statistics | Baseline [1] | Observed | Change from Baseline |
|---|---|---|---|
| Week 24-Pre-Infusion | | | |
| n | 11 | 11 | 11 |
| Mean (SD) | 8.88 (2.127) | 0.30 (0.000) | −8.58 (2.127) |
| Median | 9.40 | 0.30 | −9.10 |
| Min, Max | 5.4, 12.4 | 0.3, 0.3 | −12.1, −5.1 |
| 95% CI [3] | (7.45, 10.31) | (0.30, 0.30) | (−10.01, −7.15) |
| sUA < 6 mg/dL, n (%) | | 11 (100%) | |
| Week 24-Post-Infusion | | | |
| n | 5 | 5 | 5 |
| Mean (SD) | 9.02 (2.648) | 0.30 (0.000) | −8.72 (2.648) |
| Median | 9.60 | 0.30 | −9.30 |
| Min, Max | 5.4, 12.4 | 0.3, 0.3 | −12.1, −5.1 |
| 95% CI [3] | (5.73, 12.31) | (0.30, 0.30) | (−12.01, −5.43) |
| sUA < 6 mg/dL, n (%) | | 5 (100%) | |
| Week 26-Pre-Infusion | | | |
| n | 8 | 8 | 8 |
| Mean (SD) | 9.10 (2.449) | 0.30 (0.000) | −8.80 (2.449) |
| Median | 9.65 | 0.30 | −9.35 |
| Min, Max | 5.4, 12.4 | 0.3, 0.3 | −12.1, −5.1 |
| 95% CI [3] | (7.05, 11.15) | (0.30, 0.30) | (−10.85, −6.75) |
| sUA < 6 mg/dL, n (%) | | 8 (100%) | |
| Week 28-Pre-Infusion | | | |
| n | 8 | 8 | 8 |
| Mean (SD) | 9.10 (2.449) | 0.30 (0.000) | −8.80 (2.449) |
| Median | 9.65 | 0.30 | −9.35 |
| Min, Max | 5.4, 12.4 | 0.3, 0.3 | −12.1, −5.1 |
| 95% CI [3] | (7.05, 11.15) | (0.30, 0.30) | (−10.85, −6.75) |
| sUA < 6 mg/dL, n (%) | | 8 (100%) | |
| Week 30-Pre-Infusion | | | |
| n | 8 | 8 | 8 |
| Mean (SD) | 9.10 (2.449) | 0.30 (0.000) | −8.80 (2.449) |
| Median | 9.65 | 0.30 | −9.35 |
| Min, Max | 5.4, 12.4 | 0.3, 0.3 | −12.1, −5.1 |
| 95% CI [3] | (7.05, 11.15) | (0.30, 0.30) | (−10.85, −6.75) |
| sUA < 6 mg/dL, n (%) | | 8 (100%) | |
| Week 32-Pre-Infusion | | | |
| n | 10 | 10 | 10 |
| Mean (SD) | 8.83 (2.235) | 0.30 (0.000) | −8.53 (2.235) |
| Median | 8.75 | 0.30 | −8.45 |
| Min, Max | 5.4, 12.4 | 0.3, 0.3 | −12.1, −5.1 |
| 95% CI [3] | (7.23, 10.43) | (0.30, 0.30) | (−10.13, −6.93) |
| sUA < 6 mg/dL, n (%) | | 10 (100%) | |
| Week 32-Post-Infusion | | | |
| n | 8 | 8 | 8 |
| Mean (SD) | 9.10 (2.449) | 0.30 (0.000) | −8.80 (2.449) |
| Median | 9.65 | 0.30 | −9.35 |
| Min, Max | 5.4, 12.4 | 0.3, 0.3 | −12.1, −5.1 |
| 95% CI [3] | (7.05, 11.15) | (0.30, 0.30) | (−10.85, −6.75) |
| sUA < 6 mg/dL, n (%) | | 8 (100%) | |
| Week 34-Pre-Infusion | | | |
| n | 10 | 10 | 10 |
| Mean (SD) | 8.83 (2.235) | 0.82 (1.046) | −8.01 (2.709) |
| Median | 8.75 | 0.30 | −8.20 |
| Min, Max | 5.4, 12.4 | 0.3, 2.9 | −12.1, −4.9 |
| 95% CI [3] | (7.23, 10.43) | (0.07, 1.57) | (−9.95, −6.07) |
| sUA < 6 mg/dL, n (%) | | 10 (100%) | |
| Week 34-Post-Infusion | | | |
| n | 8 | 8 | 8 |
| Mean (SD) | 9.10 (2.449) | 0.30 (0.000) | −8.80 (2.449) |
| Median | 9.65 | 0.30 | −9.35 |
| Min, Max | 5.4, 12.4 | 0.3, 0.3 | −12.1, −5.1 |
| 95% CI [3] | (7.05, 11.15) | (0.30, 0.30) | (−10.85, −6.75) |
| sUA < 6 mg/dL, n (%) | | 8 (100%) | |
| Week 36-Pre-Infusion | | | |
| n | 9 | 9 | 9 |
| Mean (SD) | 9.10 (2.190) | 1.58 (2.425) | −7.52 (3.769) |
| Median | 9.60 | 0.30 | −9.14 |
| Min, Max | 5.4, 12.4 | 0.1, 6.4 | −12.1, −1.2 |
| 95% CI [3] | (7.42, 10.78) | (0.00, 3.44) | (−10.42, −4.63) |
| sUA < 6 mg/dL, n (%) | | 8 (88.9%) | |
| Week 36-Post-Infusion | | | |
| n | 6 | 6 | 6 |
| Mean (SD) | 9.38 (2.577) | 0.30 (0.000) | −9.08 (2.577) |
| Median | 9.65 | 0.30 | −9.35 |
| Min, Max | 5.4, 12.4 | 0.3, 0.3 | −12.1, −5.1 |
| 95% CI [3] | (6.68, 12.09) | (0.30, 0.30) | (−11.79, −6.38) |
| sUA < 6 mg/dL, n (%) | | 6 (100%) | |
| Week 38-Pre-Infusion | | | |
| n | 5 | 5 | 5 |
| Mean (SD) | 8.94 (2.613) | 0.93 (1.583) | −8.01 (3.904) |
| Median | 9.60 | 0.30 | −9.30 |
| Min, Max | 5.4, 12.4 | 0.0, 3.8 | −12.1, −1.6 |
| 95% CI [3] | (5.70, 12.18) | (0.00, 2.90) | (−12.86, −3.16) |
| sUA < 6 mg/dL, n (%) | | 5 (100%) | |
| Week 40-Pre-Infusion | | | |
| n | 3 | 3 | 3 |
| Mean (SD) | 10.57 (1.589) | 0.30 (0.000) | −10.27 (1.589) |
| Median | 9.70 | 0.30 | −9.40 |
| Min, Max | 9.6, 12.4 | 0.3, 0.3 | −12.1, −9.3 |
| 95% CI [3] | (6.62, 14.51) | (0.30, 0.30) | (−14.21, −6.32) |
| sUA < 6 mg/dL, n (%) | | 3 (100%) | |
| Week 42-Pre-Infusion | | | |
| n | 3 | 3 | 3 |
| Mean (SD) | 10.57 (1.589) | 0.30 (0.000) | −10.27 (1.589) |
| Median | 9.70 | 0.30 | −9.40 |
| Min, Max | 9.6, 12.4 | 0.3, 0.3 | −12.1, −9.3 |
| 95% CI [3] | (6.62, 14.51) | (0.30, 0.30) | (−14.21, −6.32) |
| sUA < 6 mg/dL, n (%) | | 3 (100%) | |

TABLE 5-continued

Serum Uric Acid (mg/dL): Observed Values and Change from Methotrexate Baseline Values (mITT Population)

mITT Population (N = 14)

| Visit Statistics | Baseline [1] | Observed | Change from Baseline |
|---|---|---|---|
| Week 44-Pre-Infusion | | | |
| n | 3 | 3 | 3 |
| Mean (SD) | 10.57 (1.589) | 1.05 (1.305) | −9.51 (2.487) |
| Median | 9.70 | 0.30 | −9.30 |
| Min, Max | 9.6, 12.4 | 0.3, 2.6 | −12.1, −7.1 |
| 95% CI [3] | (6.62, 14.51) | (0.00, 4.29) | (−15.69, −3.34) |
| sUA < 6 mg/dL, n (%) | | 3 (100%) | |
| Week 46-Pre-Infusion | | | |
| n | 2 | 2 | 2 |
| Mean (SD) | 11.00 (1.980) | 0.30 (0.000) | −10.70 (1.980) |
| Median | 11.00 | 0.30 | −10.70 |
| Min, Max | 9.6, 12.4 | 0.3, 0.3 | −12.1, −9.3 |
| 95% CI [3] | (0.00, 28.79) | (0.30, 0.30) | (−28.49, 7.09) |
| sUA < 6 mg/dL, n (%) | | 2 (100%) | |
| Week 48-Pre-Infusion | | | |
| n | 2 | 2 | 2 |
| Mean (SD) | 11.00 (1.980) | 0.30 (0.000) | −10.70 (1.980) |
| Median | 11.00 | 0.30 | −10.70 |
| Min, Max | 9.6, 12.4 | 0.3, 0.3 | −12.1, −9.3 |
| 95% CI [3] | (0.00, 28.79) | (0.30, 0.30) | (−28.49, 7.09) |
| sUA < 6 mg/dL, n (%) | | 2 (100%) | |
| Week 48-Post-Infusion | | | |
| n | 3 | 3 | 3 |
| Mean (SD) | 9.87 (2.411) | 1.60 (2.252) | −8.27 (4.441) |
| Median | 9.60 | 0.30 | −9.30 |
| Min, Max | 7.6, 12.4 | 0.3, 4.2 | −12.1, −3.4 |
| 95% CI [3] | (3.88, 15.86) | (0.00, 7.19) | (−19.30, 2.77) |
| sUA < 6 mg/dL, n (%) | | 3 (100%) | |
| Week 50-Pre-Infusion | | | |
| n | 2 | 2 | 2 |
| Mean (SD) | 11.00 (1.980) | 0.30 (0.000) | −10.70 (1.980) |
| Median | 11.00 | 0.30 | −10.70 |
| Min, Max | 9.6, 12.4 | 0.3, 0.3 | −12.1, −9.3 |
| 95% CI [3] | (0.00, 28.79) | (0.30, 0.30) | (−28.49, 7.09) |
| sUA < 6 mg/dL, n (%) | | 2 (100%) | |
| Week 50-Post-Infusion | | | |
| n | 3 | 3 | 3 |
| Mean (SD) | 9.87 (2.411) | 1.37 (1.848) | −8.50 (4.060) |
| Median | 9.60 | 0.30 | −9.30 |
| Min, Max | 7.6, 12.4 | 0.3, 3.5 | −12.1, −4.1 |
| 95% CI [3] | (3.88, 15.86) | (0.00, 5.96) | (−18.58, 1.58) |
| sUA < 6 mg/dL, n (%) | | 3 (100%) | |
| Week 52/ET | | | |
| n | 2 | 2 | 2 |
| Mean (SD) | 11.00 (1.980) | 0.30 (0.000) | −10.70 (1.980) |
| Median | 11.00 | 0.30 | −10.70 |
| Min, Max | 9.6, 12.4 | 0.3, 0.3 | −12.1, −9.3 |
| 95% CI [3] | (0.00, 28.79) | (0.30, 0.30) | (−28.49, 7.09) |
| sUA < 6 mg/dL, n (%) | | 2 (100%) | |
| End of Pegloticase Infusions Visit | | | |
| n | 2 | 2 | 2 |
| Mean (SD) | 7.75 (0.212) | 0.30 (0.000) | −7.45 (0.212) |
| Median | 7.75 | 0.30 | −7.45 |
| Min, Max | 7.6, 7.9 | 0.3, 0.3 | −7.6, −7.3 |
| 95% CI [3] | (5.84, 9.66) | (0.30, 0.30) | (−9.36, −5.54) |
| sUA < 6 mg/dL, n (%) | | 2 (100%) | |
| Early Termination Visit | | | |
| n | 3 | 3 | 3 |
| Mean (SD) | 9.00 (0.520) | 8.17 (0.058) | −0.83 (0.493) |
| Median | 8.70 | 8.20 | −0.60 |
| Min, Max | 8.7, 9.6 | 8.1, 8.2 | −1.4, −0.5 |
| 95% CI [3] | (7.71, 10.29) | (8.02, 8.31) | (−2.06, 0.39) |
| sUA < 6 mg/dL, n (%) | | 0 | |

TABLE 6

Serum Uric Acid (mg/dL): Observed Values and Change from Pegloticase Baseline Values (mITT Population)

| Visit Statistics | Baseline [1] | Observed | Change from Baseline |
|---|---|---|---|
| Baseline [2] | | | |
| n | | 14 | |
| Mean (SD) | | 9.16 (2.486) | |
| Median | | 9.00 | |
| Min, Max | | 4.7, 15.8 | |
| 95% CI [3] | | (7.72, 10.59) | |
| sUA < 6 mg/dL, n (%) | | 1 (7.1%) | |
| Day 1 - Post-Infusion | | | |
| n | 11 | 11 | 11 |
| Mean (SD) | 8.47 (1.736) | 1.18 (1.417) | −7.29 (2.254) |
| Median | 8.40 | 0.30 | −7.30 |

TABLE 6-continued

Serum Uric Acid (mg/dL): Observed Values and Change
from Pegloticase Baseline Values (mITT Population)

| Visit<br>Statistics | mITT Population (N = 14) | | |
|---|---|---|---|
| | Baseline [1] | Observed | Change from Baseline |
| Min, Max | 4.7, 11.4 | 0.3, 4.9 | −11.1, −3.5 |
| 95% CI [3] | (7.31, 9.64) | (0.23, 2.13) | (−8.80, −5.78) |
| sUA < 6 mg/dL, n (%) | | 11 (100%) | |
| Week 1 | | | |
| n | 6 | 6 | 6 |
| Mean (SD) | 7.58 (1.556) | 0.30 (0.000) | −7.28 (1.556) |
| Median | 8.05 | 0.30 | −7.75 |
| Min, Max | 4.7, 9.1 | 0.3, 0.3 | −8.8, −4.4 |
| 95% CI [3] | (5.95, 9.22) | (0.30, 0.30) | (−8.92, −5.65) |
| sUA < 6 mg/dL, n (%) | | 6 (100%) | |
| Week 2 - Pre-Infusion | | | |
| n | 14 | 14 | 14 |
| Mean (SD) | 9.16 (2.486) | 1.26 (2.163) | −7.90 (2.878) |
| Median | 9.00 | 0.30 | −8.70 |
| Min, Max | 4.7, 15.8 | 0.3, 7.7 | −11.9, −0.7 |
| 95% CI [3] | (7.72, 10.59) | (0.01, 2.51) | (−9.56, −6.24) |
| sUA < 6 mg/dL, n (%) | | 13 (92.9%) | |
| Week 2 - Post-Infusion | | | |
| n | 14 | 14 | 14 |
| Mean (SD) | 9.16 (2.486) | 0.30 (0.000) | −8.86 (2.486) |
| Median | 9.00 | 0.30 | −8.70 |
| Min, Max | 4.7, 15.8 | 0.3, 0.3 | −15.5, −4.4 |
| 95% CI [3] | (7.72, 10.59) | (0.30, 0.30) | (−10.29, −7.42) |
| sUA < 6 mg/dL, n (%) | | 14 (100%) | |
| Week 4 - Pre-Infusion | | | |
| n | 14 | 14 | 14 |
| Mean (SD) | 9.16 (2.486) | 1.61 (2.637) | −7.54 (3.768) |
| Median | 9.00 | 0.30 | −8.00 |
| Min, Max | 4.7, 15.8 | 0.3, 8.2 | −15.5, −0.2 |
| 95% CI [3] | (7.72, 10.59) | (0.09, 3.14) | (−9.72, −5.37) |
| sUA < 6 mg/dL, η (%) | | 12 (85.7%) | |
| Week 4 - Post-Infusion | | | |
| n | 13 | 13 | 13 |
| Mean (SD) | 9.22 (2.577) | 0.30 (0.000) | −8.92 (2.577) |
| Median | 9.10 | 0.30 | −8.80 |
| Min, Max | 4.7, 15.8 | 0.3, 0.3 | −15.5, −4.4 |
| 95% CI [3] | (7.66, 10.77) | (0.30, 0.30) | (−10.47, −7.36) |
| sUA < 6 mg/dL, n (%) | | 13 (100%) | |
| Week 6 - Pre-Infusion | | | |
| n | 13 | 13 | 13 |
| Mean (SD) | 9.22 (2.577) | 0.91 (2.191) | −8.31 (3.538) |
| Median | 9.10 | 0.30 | −8.80 |
| Min, Max | 4.7, 15.8 | 0.3, 8.2 | −15.5, −0.2 |
| 95% CI [3] | (7.66, 10.77) | (0.00, 2.23) | (−10.45, −6.17) |
| sUA < 6 mg/dL, n (%) | | 12 (92.3%) | |
| Week 6 - Post-Infusion | | | |
| n | 12 | 12 | 12 |
| Mean (SD) | 9.28 (2.679) | 0.30 (0.000) | −8.98 (2.679) |
| Median | 9.25 | 0.30 | −8.95 |
| Min, Max | 4.7, 15.8 | 0.3, 0.3 | −15.5, −4.4 |
| 95% CI [3] | (7.58, 10.99) | (0.30, 0.30) | (−10.69, −7.28) |
| sUA < 6 mg/dL, n (%) | | 12 (100%) | |
| Week 7 | | | |
| n | 4 | 4 | 4 |
| Mean (SD) | 9.20 (4.755) | 0.30 (0.000) | −8.90 (4.755) |
| Median | 8.15 | 0.30 | −7.85 |
| Min, Max | 4.7, 15.8 | 0.3, 0.3 | −15.5, −4.4 |
| 95% CI [3] | (1.63, 16.77) | (0.30, 0.30) | (−16.47, −1.33) |
| sUA < 6 mg/dL, n (%) | | 4 (100%) | |

TABLE 6-continued

Serum Uric Acid (mg/dL): Observed Values and Change
from Pegloticase Baseline Values (mITT Population)

| Visit Statistics | mITT Population (N = 14) | | |
|---|---|---|---|
| | Baseline [1] | Observed | Change from Baseline |
| Week 8 - Pre-Infusion | | | |
| n | 12 | 12 | 12 |
| Mean (SD) | 9.28 (2.679) | 1.08 (2.472) | −8.20 (3.624) |
| Median | 9.25 | 0.30 | −8.33 |
| Min, Max | 4.7, 15.8 | 0.3, 8.9 | −15.5, −0.5 |
| 95% CI [3] | (7.58, 10.99) | (0.00, 2.65) | (−10.51, −5.90) |
| sUA < 6 mg/dL, n (%) | | 11 (91.7%) | |
| Week 8 - Post-Infusion | | | |
| n | 12 | 12 | 12 |
| Mean (SD) | 9.28 (2.679) | 0.30 (0.000) | −8.98 (2.679) |
| Median | 9.25 | 0.30 | −8.95 |
| Min, Max | 4.7, 15.8 | 0.3, 0.3 | −15.5, −4.4 |
| 95% CI [3] | (7.58, 10.99) | (0.30, 0.30) | (−10.69, −7.28) |
| sUA < 6 mg/dL, n (%) | | 12 (100%) | |
| Week 10 - Pre-Infusion | | | |
| n | 12 | 12 | 12 |
| Mean (SD) | 9.28 (2.679) | 0.95 (2.252) | −8.33 (3.476) |
| Median | 9.25 | 0.30 | −8.70 |
| Min, Max | 4.7, 15.8 | 0.3, 8.1 | −15.5, −1.3 |
| 95% CI [3] | (7.58, 10.99) | (0.00, 2.38) | (−10.54, −6.12) |
| sUA < 6 mg/dL, n (%) | | 11 (91.7%) | |
| Week 10 - Post-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 12 - Pre-Infusion | | | |
| n | 11 | 11 | 11 |
| Mean (SD) | 9.27 (2.810) | 0.30 (0.015) | −8.98 (2.806) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.29, 0.31) | (−10.86, −7.09) |
| sUA < 6 mg/dL, n (%) | | 11 (100%) | |
| Week 12 - Post-Infusion | | | |
| n | 10 | 10 | 10 |
| Mean (SD) | 9.43 (2.911) | 0.30 (0.000) | −9.13 (2.911) |
| Median | 9.35 | 0.30 | −9.05 |
| Min, Max | 4.7, 15.8 | 0.3, 0.3 | −15.5, −4.4 |
| 95% CI [3] | (7.35, 11.51) | (0.30, 0.30) | (−11.21, −7.05) |
| sUA < 6 mg/dL, n (%) | | 10 (100%) | |
| Week 14 - Pre-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 14 - Post-Infusion | | | |
| n | 10 | 10 | 10 |
| Mean (SD) | 9.31 (2.959) | 0.30 (0.000) | −9.01 (2.959) |
| Median | 9.35 | 0.30 | −9.05 |
| Min, Max | 4.7, 15.8 | 0.3, 0.3 | −15.5, −4.4 |
| 95% CI [3] | (7.19, 11.43) | (0.30, 0.30) | (−11.13, −6.89) |
| sUA < 6 mg/dL, n (%) | | 10 (100%) | |
| Week 16 - Pre-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |

TABLE 6-continued

Serum Uric Acid (mg/dL): Observed Values and Change
from Pegloticase Baseline Values (mITT Population)

| Visit Statistics | mITT Population (N = 14) | | |
|---|---|---|---|
| | Baseline [1] | Observed | Change from Baseline |
| Week 16 - Post-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 18 - Pre-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 18 - Post-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 20 - Pre-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 20 - Post-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 22 - Pre-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 22 - Post-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 24 - Pre-Infusion | | | |
| n | 11 | 11 | 11 |
| Mean (SD) | 9.27 (2.810) | 0.30 (0.000) | −8.97 (2.810) |
| Median | 9.10 | 0.30 | −8.80 |
| Min, Max | 4.7, 15.8 | 0.3, 0.3 | −15.5, −4.4 |
| 95% CI [3] | (7.38, 11.16) | (0.30, 0.30) | (−10.86, −7.08) |
| sUA < 6 mg/dL, n (%) | | 11 (100%) | |
| Week 24 - Post-Infusion | | | |
| n | 5 | 5 | 5 |
| Mean (SD) | 9.48 (4.135) | 0.30 (0.000) | −9.18 (4.135) |
| Median | 9.60 | 0.30 | −9.30 |
| Min, Max | 4.7, 15.8 | 0.3, 0.3 | −15.5, −4.4 |
| 95% CI [3] | (4.35, 14.61) | (0.30, 0.30) | (−14.31, −4.05) |
| sUA < 6 mg/dL, n (%) | | 5 (100%) | |

TABLE 6-continued

Serum Uric Acid (mg/dL): Observed Values and Change
from Pegloticase Baseline Values (mITT Population)

| Visit | mITT Population (N = 14) | | |
|---|---|---|---|
| Statistics | Baseline [1] | Observed | Change from Baseline |
| Week 26 - Pre-Infusion | | | |
| n | 8 | 8 | 8 |
| Mean (SD) | 9.41 (3.293) | 0.30 (0.000) | −9.11 (3.293) |
| Median | 9.25 | 0.30 | −8.95 |
| Min, Max | 4.7, 15.8 | 0.3, 0.3 | −15.5, −4.4 |
| 95% CI [3] | (6.66, 12.17) | (0.30, 0.30) | (−11.87, −6.36) |
| sUA < 6 mg/dL, n (%) | | 8 (100%) | |
| Week 28 - Pre-Infusion | | | |
| n | 8 | 8 | 8 |
| Mean (SD) | 9.41 (3.293) | 0.30 (0.000) | −9.11 (3.293) |
| Median | 9.25 | 0.30 | −8.95 |
| Min, Max | 4.7, 15.8 | 0.3, 0.3 | −15.5, −4.4 |
| 95% CI [3] | (6.66, 12.17) | (0.30, 0.30) | (−11.87, −6.36) |
| sUA < 6 mg/dL, n (%) | | 8 (100%) | |
| Week 30 - Pre-Infusion | | | |
| n | 8 | 8 | 8 |
| Mean (SD) | 9.41 (3.293) | 0.30 (0.000) | −9.11 (3.293) |
| Median | 9.25 | 0.30 | −8.95 |
| Min, Max | 4.7, 15.8 | 0.3, 0.3 | −15.5, −4.4 |
| 95% CI [3] | (6.66, 12.17) | (0.30, 0.30) | (−11.87, −6.36) |
| sUA < 6 mg/dL, n (%) | | 8 (100%) | |
| Week 32 - Pre-Infusion | | | |
| n | 10 | 10 | 10 |
| Mean (SD) | 9.29 (2.961) | 0.30 (0.000) | −8.99 (2.961) |
| Median | 9.25 | 0.30 | −8.95 |
| Min, Max | 4.7, 15.8 | 0.3, 0.3 | −15.5, −4.4 |
| 95% CI [3] | (7.17, 11.41) | (0.30, 0.30) | (−11.11, −6.87) |
| sUA < 6 mg/dL, n (%) | | 10 (100%) | |
| Week 32 - Post-Infusion | | | |
| n | 8 | 8 | 8 |
| Mean (SD) | 9.41 (3.293) | 0.30 (0.000) | −9.11 (3.293) |
| Median | 9.25 | 0.30 | −8.95 |
| Min, Max | 4.7, 15.8 | 0.3, 0.3 | −15.5, −4.4 |
| 95% CI [3] | (6.66, 12.17) | (0.30, 0.30) | (−11.87, −6.36) |
| sUA < 6 mg/dL, n (%) | | 8 (100%) | |
| Week 34 - Pre-Infusion | | | |
| n | 10 | 10 | 10 |
| Mean (SD) | 9.29 (2.961) | 0.82 (1.046) | −8.47 (3.248) |
| Median | 9.25 | 0.30 | −7.95 |
| Min, Max | 4.7, 15.8 | 0.3, 2.9 | −15.5, −4.4 |
| 95% CI [3] | (7.17, 11.41) | (0.07, 1.57) | (−10.79, −6.15) |
| sUA < 6 mg/dL, n (%) | | 10 (100%) | |
| Week 34 - Post-Infusion | | | |
| n | 8 | 8 | 8 |
| Mean (SD) | 9.41 (3.293) | 0.30 (0.000) | −9.11 (3.293) |
| Median | 9.25 | 0.30 | −8.95 |
| Min, Max | 4.7, 15.8 | 0.3, 0.3 | −15.5, −4.4 |
| 95% CI [3] | (6.66, 12.17) | (0.30, 0.30) | (−11.87, −6.36) |
| sUA < 6 mg/dL, n (%) | | 8 (100%) | |
| Week 36 - Pre-Infusion | | | |
| n | 9 | 9 | 9 |
| Mean (SD) | 9.48 (3.077) | 1.58 (2.425) | −7.90 (4.094) |
| Median | 9.60 | 0.30 | −8.60 |
| Min, Max | 4.7, 15.8 | 0.1, 6.4 | −15.5, −2.5 |
| 95% CI [3] | (7.11, 11.84) | (0.00, 3.44) | (−11.05, −4.75) |
| sUA < 6 mg/dL, n (%) | | 8 (88.9%) | |
| Week 36 - Post-Infusion | | | |
| n | 6 | 6 | 6 |
| Mean (SD) | 9.68 (3.799) | 0.30 (0.000) | −9.38 (3.799) |
| Median | 9.50 | 0.30 | −9.20 |
| Min, Max | 4.7, 15.8 | 0.3, 0.3 | −15.5, −4.4 |
| 95% CI [3] | (5.70, 13.67) | (0.30, 0.30) | (−13.37, −5.40) |
| sUA < 6 mg/dL, n (%) | | 6 (100%) | |

TABLE 6-continued

Serum Uric Acid (mg/dL): Observed Values and Change
from Pegloticase Baseline Values (mITT Population)

| Visit | mITT Population (N = 14) | | |
|---|---|---|---|
| Statistics | Baseline [1] | Observed | Change from Baseline |
| Week 38 - Pre-Infusion | | | |
| n | 5 | 5 | 5 |
| Mean (SD) | 9.34 (4.142) | 0.93 (1.583) | −8.41 (5.229) |
| Median | 8.90 | 0.30 | −8.60 |
| Min, Max | 4.7, 15.8 | 0.0, 3.8 | −15.5, −0.9 |
| 95% CI [3] | (4.20, 14.48) | (0.00, 2.90) | (−14.90, −1.92) |
| sUA < 6 mg/dL, n (%) | | 5 (100%) | |
| Week 40 - Pre-Infusion | | | |
| n | 3 | 3 | 3 |
| Mean (SD) | 11.60 (3.686) | 0.30 (0.000) | −11.30 (3.686) |
| Median | 10.10 | 0.30 | −9.80 |
| Min, Max | 8.9, 15.8 | 0.3, 0.3 | −15.5, −8.6 |
| 95% CI [3] | (2.44, 20.76) | (0.30, 0.30) | (−20.46, −2.14) |
| sUA < 6 mg/dL, n (%) | | 3 (100%) | |
| Week 42 - Pre-Infusion | | | |
| n | 3 | 3 | 3 |
| Mean (SD) | 11.60 (3.686) | 0.30 (0.000) | −11.30 (3.686) |
| Median | 10.10 | 0.30 | −9.80 |
| Min, Max | 8.9, 15.8 | 0.3, 0.3 | −15.5, −8.6 |
| 95% CI [3] | (2.44, 20.76) | (0.30, 0.30) | (−20.46, −2.14) |
| sUA < 6 mg/dL, n (%) | | 3 (100%) | |
| Week 44 - Pre-Infusion | | | |
| n | 3 | 3 | 3 |
| Mean (SD) | 11.60 (3.686) | 1.05 (1.305) | −10.55 (4.625) |
| Median | 10.10 | 0.30 | −9.80 |
| Min, Max | 8.9, 15.8 | 0.3, 2.6 | −15.5, −6.3 |
| 95% CI [3] | (2.44, 20.76) | (0.00, 4.29) | (−22.04, 0.94) |
| sUA < 6 mg/dL, n (%) | | 3 (100%) | |
| Week 46 - Pre-Infusion | | | |
| n | 2 | 2 | 2 |
| Mean (SD) | 12.95 (4.031) | 0.30 (0.000) | −12.65 (4.031) |
| Median | 12.95 | 0.30 | −12.65 |
| Min, Max | 10.1, 15.8 | 0.3, 0.3 | −15.5, −9.8 |
| 95% CI [3] | (0.00, 49.16) | (0.30, 0.30) | (−48.86, 23.56) |
| sUA < 6 mg/dL, n (%) | | 2 (100%) | |
| Week 48 - Pre-Infusion | | | |
| n | 2 | 2 | 2 |
| Mean (SD) | 12.95 (4.031) | 0.30 (0.000) | −12.65 (4.031) |
| Median | 12.95 | 0.30 | −12.65 |
| Min, Max | 10.1, 15.8 | 0.3, 0.3 | −15.5, −9.8 |
| 95% CI [3] | (0.00, 49.16) | (0.30, 0.30) | (−48.86, 23.56) |
| sUA < 6 mg/dL, n (%) | | 2 (100%) | |
| Week 48 - Post-Infusion | | | |
| n | 3 | 3 | 3 |
| Mean (SD) | 11.93 (3.350) | 1.60 (2.252) | −10.33 (4.922) |
| Median | 10.10 | 0.30 | −9.80 |
| Min, Max | 9.9, 15.8 | 0.3, 4.2 | −15.5, −5.7 |
| 95% CI [3] | (3.61, 20.26) | (0.00, 7.19) | (−22.56, 1.89) |
| sUA < 6 mg/dL, n (%) | | 3 (100%) | |
| Week 50 - Pre-Infusion | | | |
| n | 2 | 2 | 2 |
| Mean (SD) | 12.95 (4.031) | 0.30 (0.000) | −12.65 (4.031) |
| Median | 12.95 | 0.30 | −12.65 |
| Min, Max | 10.1, 15.8 | 0.3, 0.3 | −15.5, −9.8 |
| 95% CI [3] | (0.00, 49.16) | (0.30, 0.30) | (−48.86, 23.56) |
| sUA < 6 mg/dL, n (%) | | 2 (100%) | |
| Week 50 - Post-Infusion | | | |
| n | 3 | 3 | 3 |
| Mean (SD) | 11.93 (3.350) | 1.37 (1.848) | −10.57 (4.598) |
| Median | 10.10 | 0.30 | −9.80 |
| Min, Max | 9.9, 15.8 | 0.3, 3.5 | −15.5, −6.4 |
| 95% CI [3] | (3.61, 20.26) | (0.00, 5.96) | (−21.99, 0.86) |
| sUA < 6 mg/dL, n (%) | | 3 (100%) | |

TABLE 6-continued

Serum Uric Acid (mg/dL): Observed Values and Change
from Pegloticase Baseline Values (mITT Population)

| Visit | mITT Population (N = 14) | | |
|---|---|---|---|
| Statistics | Baseline [1] | Observed | Change from Baseline |
| Week 52/ET | | | |
| n | 2 | 2 | 2 |
| Mean (SD) | 12.95 (4.031) | 0.30 (0.000) | −12.65 (4.031) |
| Median | 12.95 | 0.30 | −12.65 |
| Min, Max | 10.1, 15.8 | 0.3, 0.3 | −15.5, −9.8 |
| 95% CI [3] | (0.00, 49.16) | (0.30, 0.30) | (−48.86, 23.56) |
| sUA < 6 mg/dL, n (%) | | 2 (100%) | |
| End of Pegloticase Infusions Visit | | | |
| n | 2 | 2 | 2 |
| Mean (SD) | 8.80 (1.556) | 0.30 (0.000) | −8.50 (1.556) |
| Median | 8.80 | 0.30 | −8.50 |
| Min, Max | 7.7, 9.9 | 0.3, 0.3 | −9.6, −7.4 |
| 95% CI [3] | (0.00, 22.78) | (0.30, 0.30) | (−22.48, 5.48) |
| sUA < 6 mg/dL, n (%) | | 2 (100%) | |
| Early Termination Visit | | | |
| n | 3 | 3 | 3 |
| Mean (SD) | 8.73 (0.577) | 8.17 (0.058) | −0.57 (0.635) |
| Median | 8.40 | 8.20 | −0.20 |
| Min, Max | 8.4, 9.4 | 8.1, 8.2 | −1.3, −0.2 |
| 95% CI [3] | (7.30, 10.17) | (8.02, 8.31) | (−2.14, 1.01) |
| sUA < 6 mg/dL, n (%) | | 0 | |

TABLE 7

Serum Uric Acid (mg/dL): Observed Values and Change from Pegloticase
Baseline Values by Month 6 sUA Responder Subgroup (mITT Population)

| Visit | Month 6 sUA Responders [1] (N = 11) | | | Month 6 sUA Non-Responders [1] (N = 3) | | |
|---|---|---|---|---|---|---|
| Statistics | Baseline [2] | Observed | Change from Baseline | Baseline [2] | Observed | Change from Baseline |
| Baseline [3] | | | | | | |
| n | | 11 | | | 3 | |
| Mean (SD) | | 9.27 (2.810) | | | 8.73 (0.577) | |
| Median | | 9.10 | | | 8.40 | |
| Min, Max | | 4.7, 15.8 | | | 8.4, 9.4 | |
| 95% CI [4] | | (7.38, 11.16) | | | (7.30, 10.17) | |
| sUA < 6 mg/dL, n (%) | | 1 (9.1%) | | | 0 | |
| Day 1 - Post-Infusion | | | | | | |
| n | 8 | 8 | 8 | 3 | 3 | 3 |
| Mean (SD) | 8.38 (2.042) | 0.83 (0.798) | −7.55 (2.158) | 8.73 (0.577) | 2.13 (2.438) | −6.60 (2.848) |
| Median | 8.30 | 0.30 | −7.50 | 8.40 | 1.20 | −7.20 |
| Min, Max | 4.7, 11.4 | 0.3, 2.4 | −11.1, −4.4 | 8.4, 9.4 | 0.3, 4.9 | −9.1, −3.5 |
| 95% CI [4] | (6.67, 10.08) | (0.16, 1.49) | (−9.35, −5.75) | (7.30, 10.17) | (0.00, 8.19) | (−13.67, 0.47) |
| sUA < 6 mg/dL, n (%) | | 8 (100%) | | | 3 (100%) | |
| Week 1 | | | | | | |
| n | 4 | 4 | 4 | 2 | 2 | 2 |
| Mean (SD) | 7.18 (1.836) | 0.30 (0.000) | −6.88 (1.836) | 8.40 (0.000) | 0.30 (0.000) | −8.10 (0.000) |
| Median | 7.45 | 0.30 | −7.15 | 8.40 | 0.30 | −8.10 |
| Min, Max | 4.7, 9.1 | 0.3, 0.3 | −8.8, −4.4 | 8.4, 8.4 | 0.3, 0.3 | −8.1, −8.1 |
| 95% CI [4] | (4.25, 10.10) | (0.30, 0.30) | (−9.80, −3.95) | (8.40, 8.40) | (0.30, 0.30) | (−8.10, −8.10) |
| sUA < 6 mg/dL, n (%) | | 4 (100%) | | | 2 (100%) | |
| Week 2 - Pre-Infusion | | | | | | |
| n | 11 | 11 | 11 | 3 | 3 | 3 |
| Mean (SD) | 9.27 (2.810) | 0.63 (1.096) | −8.64 (2.086) | 8.73 (0.577) | 3.57 (3.775) | −5.17 (4.225) |
| Median | 9.10 | 0.30 | −8.80 | 8.40 | 2.70 | −5.70 |
| Min, Max | 4.7, 15.8 | 0.3, 3.9 | −11.9, −4.4 | 8.4, 9.4 | 0.3, 7.7 | −9.1, −0.7 |
| 95% CI [4] | (7.38, 11.16) | (0.00, 1.37) | (−10.04, −7.24) | (7.30, 10.17) | (0.00, 12.95) | (−15.66, 5.33) |
| sUA < 6 mg/dL, n (%) | | 11 (100%) | | | 2 (66.7%) | |

TABLE 7-continued

Serum Uric Acid (mg/dL): Observed Values and Change from Pegloticase
Baseline Values by Month 6 sUA Responder Subgroup (mITT Population)

| Visit<br>Statistics | Month 6 sUA Responders [1] (N = 11) | | | Month 6 sUA Non-Responders [1] (N = 3) | | |
|---|---|---|---|---|---|---|
| | Baseline [2] | Observed | Change from Baseline | Baseline [2] | Observed | Change from Baseline |
| Week 2 - Post-Infusion | | | | | | |
| n | 11 | 11 | 11 | 3 | 3 | 3 |
| Mean (SD) | 9.27 (2.810) | 0.30 (0.000) | −8.97 (2.810) | 8.73 (0.577) | 0.30 (0.000) | −8.43 (0.577) |
| Median | 9.10 | 0.30 | −8.80 | 8.40 | 0.30 | −8.10 |
| Min, Max | 4.7, 15.8 | 0.3, 0.3 | −15.5, −4.4 | 8.4, 9.4 | 0.3, 0.3 | −9.1, −8.1 |
| 95% CI [4] | (7.38, 11.16) | (0.30, 0.30) | (−10.86, −7.08) | (7.30, 10.17) | (0.30, 0.30) | (−9.87, −7.00) |
| sUA < 6 mg/dL, n (%) | | 11 (100%) | | | 3 (100%) | |
| Week 4 - Pre-Infusion | | | | | | |
| n | 11 | 11 | 11 | 3 | 3 | 3 |
| Mean (SD) | 9.27 (2.810) | 0.68 (1.043) | −8.59 (2.884) | 8.73 (0.577) | 5.03 (4.177) | −3.70 (4.744) |
| Median | 9.10 | 0.30 | −8.60 | 8.40 | 6.60 | −1.80 |
| Min, Max | 4.7, 15.8 | 0.3, 3.8 | −15.5, −4.4 | 8.4, 9.4 | 0.3, 8.2 | −9.1, −0.2 |
| 95% CI [4] | (7.38, 11.16) | (0.00, 1.38) | (−10.53, −6.65) | (7.30, 10.17) | (0.00, 15.41) | (−15.49, 8.09) |
| sUA < 6 mg/dL, n (%) | | 11 (100%) | | | 1 (33.3%) | |
| Week 4 - Post-Infusion | | | | | | |
| n | 11 | 11 | 11 | 2 | 2 | 2 |
| Mean (SD) | 9.27 (2.810) | 0.30 (0.000) | −8.97 (2.810) | 8.90 (0.707) | 0.30 (0.000) | −8.60 (0.707) |
| Median | 9.10 | 0.30 | −8.80 | 8.90 | 0.30 | −8.60 |
| Min, Max | 4.7, 15.8 | 0.3, 0.3 | −15.5, −4.4 | 8.4, 9.4 | 0.3, 0.3 | −9.1, −8.1 |
| 95% CI [4] | (7.38, 11.16) | (0.30, 0.30) | (−10.86, −7.08) | (2.55, 15.25) | (0.30, 0.30) | (−14.95, −2.25) |
| sUA < 6 mg/dL, n (%) | | 11 (100%) | | | 2 (100%) | |
| Week 6 - Pre-Infusion | | | | | | |
| n | 11 | 11 | 11 | 2 | 2 | 2 |
| Mean (SD) | 9.27 (2.810) | 0.30 (0.000) | −8.97 (2.810) | 8.90 (0.707) | 4.25 (5.586) | −4.65 (6.293) |
| Median | 9.10 | 0.30 | −8.80 | 8.90 | 4.25 | −4.65 |
| Min, Max | 4.7, 15.8 | 0.3, 0.3 | −15.5, −4.4 | 8.4, 9.4 | 0.3, 8.2 | −9.1, −0.2 |
| 95% CI [4] | (7.38, 11.16) | (0.30, 0.30) | (−10.86, −7.08) | (2.55, 15.25) | (0.00, 54.44) | (−61.19, 51.89) |
| sUA < 6 mg/dL, n (%) | | 11 (100%) | | | 1 (50.0%) | |
| Week 6 - Post-Infusion | | | | | | |
| n | 11 | 11 | 11 | 1 | 1 | 1 |
| Mean (SD) | 9.27 (2.810) | 0.30 (0.000) | −8.97 (2.810) | 9.40 (NE) | 0.30 (NE) | −9.10 (NE) |
| Median | 9.10 | 0.30 | −8.80 | 9.40 | 0.30 | −9.10 |
| Min, Max | 4.7, 15.8 | 0.3, 0.3 | −15.5, −4.4 | 9.4, 9.4 | 0.3, 0.3 | −9.1, −9.1 |
| 95% CI [4] | (7.38, 11.16) | (0.30, 0.30) | (−10.86, −7.08) | (NE, NE) | (NE, NE) | (NE, NE) |
| sUA < 6 mg/dL, n (%) | | 11 (100%) | | | 1 (100%) | |
| Week 7 | | | | | | |
| n | 4 | 4 | 4 | 0 | 0 | 0 |
| Mean (SD) | 9.20 (4.755) | 0.30 (0.000) | −8.90 (4.755) | | | |
| Median | 8.15 | 0.30 | −7.85 | | | |
| Min, Max | 4.7, 15.8 | 0.3, 0.3 | −15.5, −4.4 | | | |
| 95% CI [4] | (1.63, 16.77) | (0.30, 0.30) | (−16.47, −1.33) | | | |
| sUA < 6 mg/dL, n (%) | | 4 (100%) | | | 0 | |
| Week 8 - Pre-Infusion | | | | | | |
| η | 11 | 11 | 11 | 1 | 1 | 1 |
| Mean (SD) | 9.27 (2.810) | 0.37 (0.224) | −8.91 (2.824) | 9.40 (NE) | 8.90 (NE) | −0.50 (NE) |
| Median | 9.10 | 0.30 | −8.60 | 9.40 | 8.90 | −0.50 |
| Min, Max | 4.7, 15.8 | 0.3, 1.0 | −15.5, −4.4 | 9.4, 9.4 | 8.9, 8.9 | −0.5, −0.5 |
| 95% CI [4] | (7.38, 11.16) | (0.22, 0.52) | (−10.80, −7.01) | (NE, NE) | (NE, NE) | (NE, NE) |
| sUA < 6 mg/dL, n (%) | | 11 (100%) | | | 0 | |
| Week 8 - Post-Infusion | | | | | | |
| n | 11 | 11 | 11 | 1 | 1 | 1 |
| Mean (SD) | 9.27 (2.810) | 0.30 (0.000) | −8.97 (2.810) | 9.40 (NE) | 0.30 (NE) | −9.10 (NE) |
| Median | 9.10 | 0.30 | −8.80 | 9.40 | 0.30 | −9.10 |
| Min, Max | 4.7, 15.8 | 0.3, 0.3 | −15.5, −4.4 | 9.4, 9.4 | 0.3, 0.3 | −9.1, −9.1 |
| 95% CI [4] | (7.38, 11.16) | (0.30, 0.30) | (−10.86, −7.08) | (NE, NE) | (NE, NE) | (NE, NE) |
| sUA < 6 mg/dL, n (%) | | 11 (100%) | | | 1 (100%) | |
| Week 10 - Pre-Infusion | | | | | | |
| n | 11 | 11 | 11 | 1 | 1 | 1 |
| Mean (SD) | 9.27 (2.810) | 0.30 (0.000) | −8.97 (2.810) | 9.40 (NE) | 8.10 (NE) | −1.30 (NE) |
| Median | 9.10 | 0.30 | −8.80 | 9.40 | 8.10 | −1.30 |
| Min, Max | 4.7, 15.8 | 0.3, 0.3 | −15.5, −4.4 | 9.4, 9.4 | 8.1, 8.1 | −1.3, −1.3 |
| 95% CI [4] | (7.38, 11.16) | (0.30, 0.30) | (−10.86, −7.08) | (NE, NE) | (NE, NE) | (NE, NE) |
| sUA < 6 mg/dL, n (%) | | 11 (100%) | | | 0 | |

TABLE 7-continued

Serum Uric Acid (mg/dL): Observed Values and Change from Pegloticase
Baseline Values by Month 6 sUA Responder Subgroup (mITT Population)

| Visit | Month 6 sUA Responders [1] (N = 11) | | | Month 6 sUA Non-Responders [1] (N = 3) | | |
|---|---|---|---|---|---|---|
| Statistics | Baseline [2] | Observed | Change from Baseline | Baseline [2] | Observed | Change from Baseline |
| Week 10 - Post-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 12 - Pre-Infusion | | | | | | |
| n | 11 | 11 | 11 | 0 | 0 | 0 |
| Mean (SD) | 9.27 (2.810) | 0.30 (0.015) | −8.98 (2.806) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.29, 0.31) | (−10.86, −7.09) | | | |
| sUA < 6 mg/dL, n (%) | | 11 (100%) | | | 0 | |
| Week 12 - Post-Infusion | | | | | | |
| n | 10 | 10 | 10 | 0 | 0 | 0 |
| Mean (SD) | 9.43 (2.911) | 0.30 (0.000) | −9.13 (2.911) | | | |
| Median | 9.35 | 0.30 | −9.05 | | | |
| Min, Max | 4.7, 15.8 | 0.3, 0.3 | −15.5, −4.4 | | | |
| 95% CI [4] | (7.35, 11.51) | (0.30, 0.30) | (−11.21, −7.05) | | | |
| sUA < 6 mg/dL, n (%) | | 10 (100%) | | | 0 | |
| Week 14 - Pre-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 14 - Post-Infusion | | | | | | |
| n | 10 | 10 | 10 | 0 | 0 | 0 |
| Mean (SD) | (2.959) | 0.30 (0.000) | −9.01 (2.959) | | | |
| Median | 9.35 | 0.30 | −9.05 | | | |
| Min, Max | 4.7, 15.8 | 0.3, 0.3 | −15.5, −4.4 | | | |
| 95% CI [4] | (7.19, 11.43) | (0.30, 0.30) | (−11.13, −6.89) | | | |
| sUA < 6 mg/dL, n (%) | | 10 (100%) | | | 0 | |
| Week 16 - Pre-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 16 - Post-Infusion | | | | | | |
| n | 11 | 11 | 11 | 0 | 0 | 0 |
| Mean (SD) | (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 18 - Pre-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 18 - Post-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |

TABLE 7-continued

Serum Uric Acid (mg/dL): Observed Values and Change from Pegloticase
Baseline Values by Month 6 sUA Responder Subgroup (mITT Population)

| Visit | Month 6 sUA Responders [1] (N = 11) | | | Month 6 sUA Non-Responders [1] (N = 3) | | |
|---|---|---|---|---|---|---|
| Statistics | Baseline [2] | Observed | Change from Baseline | Baseline [2] | Observed | Change from Baseline |
| Week 20 - Pre-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 20 - Post-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 22 - Pre-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 22 - Post-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 24 - Pre-Infusion | | | | | | |
| n | 11 | 11 | 11 | 0 | 0 | 0 |
| Mean (SD) | 9.27 (2.810) | 0.30 (0.000) | −8.97 (2.810) | | | |
| Median | 9.10 | 0.30 | −8.80 | | | |
| Min, Max | 4.7, 15.8 | 0.3, 0.3 | −15.5, −4.4 | | | |
| 95% CI [4] | (7.38, 11.16) | (0.30, 0.30) | (−10.86, −7.08) | | | |
| sUA < 6 mg/dL, n (%) | | 11 (100%) | | | 0 | |
| Week 24 - Post-Infusion | | | | | | |
| n | 5 | 5 | 5 | 0 | 0 | 0 |
| Mean (SD) | 9.48 (4.135) | 0.30 (0.000) | −9.18 (4.135) | | | |
| Median | 9.60 | 0.30 | −9.30 | | | |
| Min, Max | 4.7, 15.8 | 0.3, 0.3 | −15.5, −4.4 | | | |
| 95% CI [4] | (4.35, 14.61) | (0.30, 0.30) | (−14.31, −4.05) | | | |
| sUA < 6 mg/dL, n (%) | | 5 (100%) | | | 0 | |
| Week 26 - Pre-Infusion | | | | | | |
| n | 8 | 8 | 8 | 0 | 0 | 0 |
| Mean (SD) | 9.41 (3.293) | 0.30 (0.000) | −9.11 (3.293) | | | |
| Median | 9.25 | 0.30 | −8.95 | | | |
| Min, Max | 4.7, 15.8 | 0.3, 0.3 | −15.5, −4.4 | | | |
| 95% CI [4] | (6.66, 12.17) | (0.30, 0.30) | (−11.87, −6.36) | | | |
| sUA < 6 mg/dL, n (%) | | 8 (100%) | | | 0 | |
| Week 28 - Pre-Infusion | | | | | | |
| n | 8 | 8 | 8 | 0 | 0 | 0 |
| Mean (SD) | 9.41 (3.293) | 0.30 (0.000) | −9.11 (3.293) | | | |
| Median | 9.25 | 0.30 | −8.95 | | | |
| Min, Max | 4.7, 15.8 | 0.3, 0.3 | −15.5, −4.4 | | | |
| 95% CI [4] | (6.66, 12.17) | (0.30, 0.30) | (−11.87, −6.36) | | | |
| sUA < 6 mg/dL, n (%) | | 8 (100%) | | | 0 | |
| Week 30 - Pre-Infusion | | | | | | |
| n | 8 | 8 | 8 | 0 | 0 | 0 |
| Mean (SD) | 9.41 (3.293) | 0.30 (0.000) | −9.11 (3.293) | | | |
| Median | 9.25 | 0.30 | −8.95 | | | |
| Min, Max | 4.7, 15.8 | 0.3, 0.3 | −15.5, −4.4 | | | |
| 95% CI [4] | (6.66, 12.17) | (0.30, 0.30) | (−11.87, −6.36) | | | |
| sUA < 6 mg/dL, n (%) | | 8 (100%) | | | 0 | |

TABLE 7-continued

Serum Uric Acid (mg/dL): Observed Values and Change from Pegloticase
Baseline Values by Month 6 sUA Responder Subgroup (mITT Population)

| Visit | Month 6 sUA Responders [1] (N = 11) | | | Month 6 sUA Non-Responders [1] (N = 3) | | |
|---|---|---|---|---|---|---|
| Statistics | Baseline [2] | Observed | Change from Baseline | Baseline [2] | Observed | Change from Baseline |
| Week 32 - Pre-Infusion | | | | | | |
| n | 10 | 10 | 10 | 0 | 0 | 0 |
| Mean (SD) | 9.29 (2.961) | 0.30 (0.000) | −8.99 (2.961) | | | |
| Median | 9.25 | 0.30 | −8.95 | | | |
| Min, Max | 4.7, 15.8 | 0.3, 0.3 | −15.5, −4.4 | | | |
| 95% CI [4] | (7.17, 11.41) | (0.30, 0.30) | (−11.11, −6.87) | | | |
| sUA < 6 mg/dL, n (%) | | 10 (100%) | | | 0 | |
| Week 32 - Post-Infusion | | | | | | |
| n | 8 | 8 | 8 | 0 | 0 | 0 |
| Mean (SD) | 9.41 (3.293) | 0.30 (0.000) | −9.11 (3.293) | | | |
| Median | 9.25 | 0.30 | −8.95 | | | |
| Min, Max | 4.7, 15.8 | 0.3, 0.3 | −15.5, −4.4 | | | |
| 95% CI [4] | (6.66, 12.17) | (0.30, 0.30) | (−11.87, −6.36) | | | |
| sUA < 6 mg/dL, n (%) | | 8 (100%) | | | 0 | |
| Week 34 - Pre-Infusion | | | | | | |
| n | 10 | 10 | 10 | 0 | 0 | 0 |
| Mean (SD) | 9.29 (2.961) | 0.82 (1.046) | −8.47 (3.248) | | | |
| Median | 9.25 | 0.30 | −7.95 | | | |
| Min, Max | 4.7, 15.8 | 0.3, 2.9 | −15.5, −4.4 | | | |
| 95% CI [4] | (7.17, 11.41) | (0.07, 1.57) | (−10.79, −6.15) | | | |
| sUA < 6 mg/dL, n (%) | | 10 (100%) | | | 0 | |
| Week 34 - Post-Infusion | | | | | | |
| n | 8 | 8 | 8 | 0 | 0 | 0 |
| Mean (SD) | 9.41 (3.293) | 0.30 (0.000) | −9.11 (3.293) | | | |
| Median | 9.25 | 0.30 | −8.95 | | | |
| Min, Max | 4.7, 15.8 | 0.3, 0.3 | −15.5, −4.4 | | | |
| 95% CI [4] | (6.66, 12.17) | (0.30, 0.30) | (−11.87, −6.36) | | | |
| sUA < 6 mg/dL, n (%) | | 8 (100%) | | | 0 | |
| Week 36 - Pre-Infusion | | | | | | |
| n | 9 | 9 | 9 | 0 | 0 | 0 |
| Mean (SD) | 9.48 (3.077) | 1.58 (2.425) | −7.90 (4.094) | | | |
| Median | 9.60 | 0.30 | −8.60 | | | |
| Min, Max | 4.7, 15.8 | 0.1, 6.4 | −15.5, −2.5 | | | |
| 95% CI [4] | (7.11, 11.84) | (0.00, 3.44) | (−11.05, −4.75) | | | |
| sUA < 6 mg/dL, n (%) | | 8 (88.9%) | | | 0 | |
| Week 36 - Post-Infusion | | | | | | |
| n | 6 | 6 | 6 | 0 | 0 | 0 |
| Mean (SD) | 9.68 (3.799) | 0.30 (0.000) | −9.38 (3.799) | | | |
| Median | 9.50 | 0.30 | −9.20 | | | |
| Min, Max | 4.7, 15.8 | 0.3, 0.3 | −15.5, −4.4 | | | |
| 95% CI [4] | (5.70, 13.67) | (0.30, 0.30) | (−13.37, −5.40) | | | |
| sUA < 6 mg/dL, n (%) | | 6 (100%) | | | 0 | |
| Week 38 - Pre-Infusion | | | | | | |
| n | 5 | 5 | 5 | 0 | 0 | 0 |
| Mean (SD) | 9.34 (4.142) | 0.93 (1.583) | −8.41 (5.229) | | | |
| Median | 8.90 | 0.30 | −8.60 | | | |
| Min, Max | 4.7, 15.8 | 0.0, 3.8 | −15.5, −0.9 | | | |
| 95% CI [4] | (4.20, 14.48) | (0.00, 2.90) | (−14.90, −1.92) | | | |
| sUA < 6 mg/dL, n (%) | | 5 (100%) | | | 0 | |
| Week 40 - Pre-Infusion | | | | | | |
| n | 3 | 3 | 3 | 0 | 0 | 0 |
| Mean (SD) | 11.60 (3.686) | 0.30 (0.000) | −11.30 (3.686) | | | |
| Median | 10.10 | 0.30 | −9.80 | | | |
| Min, Max | 8.9, 15.8 | 0.3, 0.3 | −15.5, −8.6 | | | |
| 95% CI [4] | (2.44, 20.76) | (0.30, 0.30) | (−20.46, −2.14) | | | |
| sUA < 6 mg/dL, n (%) | | 3 (100%) | | | 0 | |
| Week 42 - Pre-Infusion | | | | | | |
| n | 3 | 3 | 3 | 0 | 0 | 0 |
| Mean (SD) | 11.60 (3.686) | 0.30 (0.000) | −11.30 (3.686) | | | |
| Median | 10.10 | 0.30 | −9.80 | | | |
| Min, Max | 8.9, 15.8 | 0.3, 0.3 | −15.5, −8.6 | | | |
| 95% CI [4] | (2.44, 20.76) | (0.30, 0.30) | (−20.46, −2.14) | | | |
| sUA < 6 mg/dL, n (%) | | 3 (100%) | | | 0 | |

TABLE 7-continued

Serum Uric Acid (mg/dL): Observed Values and Change from Pegloticase
Baseline Values by Month 6 sUA Responder Subgroup (mITT Population)

| Visit | Month 6 sUA Responders [1] (N = 11) | | | Month 6 sUA Non-Responders [1] (N = 3) | | |
|---|---|---|---|---|---|---|
| Statistics | Baseline [2] | Observed | Change from Baseline | Baseline [2] | Observed | Change from Baseline |
| Week 44 - Pre-Infusion | | | | | | |
| n | 3 | 3 | 3 | 0 | 0 | 0 |
| Mean (SD) | 11.60 (3.686) | 1.05 (1.305) | −10.55 (4.625) | | | |
| Median | 10.10 | 0.30 | −9.80 | | | |
| Min, Max | 8.9, 15.8 | 0.3, 2.6 | −15.5, −6.3 | | | |
| 95% CI [4] | (2.44, 20.76) | (0.00, 4.29) | (−22.04, 0.94) | | | |
| sUA < 6 mg/dL, n (%) | | 3 (100%) | | | 0 | |
| Week 46 - Pre-Infusion | | | | | | |
| n | 2 | 2 | 2 | 0 | 0 | 0 |
| Mean (SD) | 12.95 (4.031) | 0.30 (0.000) | −12.65 (4.031) | | | |
| Median | 12.95 | 0.30 | −12.65 | | | |
| Min, Max | 10.1, 15.8 | 0.3, 0.3 | −15.5, −9.8 | | | |
| 95% CI [4] | (0.00, 49.16) | (0.30, 0.30) | (−48.86, 23.56) | | | |
| sUA < 6 mg/dL, n (%) | | 2 (100%) | | | 0 | |
| Week 48 - Pre-Infusion | | | | | | |
| n | 2 | 2 | 2 | 0 | 0 | 0 |
| Mean (SD) | 12.95 (4.031) | 0.30 (0.000) | −12.65 (4.031) | | | |
| Median | 12.95 | 0.30 | −12.65 | | | |
| Min, Max | 10.1, 15.8 | 0.3, 0.3 | −15.5, −9.8 | | | |
| 95% CI [4] | (0.00, 49.16) | (0.30, 0.30) | (−48.86, 23.56) | | | |
| sUA < 6 mg/dL, n (%) | | 2 (100%) | | | 0 | |
| Week 48 - Post-Infusion | | | | | | |
| n | 3 | 3 | 3 | 0 | 0 | 0 |
| Mean (SD) | 11.93 (3.350) | 1.60 (2.252) | −10.33 (4.922) | | | |
| Median | 10.10 | 0.30 | −9.80 | | | |
| Min, Max | 9.9, 15.8 | 0.3, 4.2 | −15.5, −5.7 | | | |
| 95% CI [4] | (3.61, 20.26) | (0.00, 7.19) | (−22.56, 1.89) | | | |
| sUA < 6 mg/dL, n (%) | | 3 (100%) | | | 0 | |
| Week 50 - Pre-Infusion | | | | | | |
| n | 2 | 2 | 2 | 0 | 0 | 0 |
| Mean (SD) | 12.95 (4.031) | 0.30 (0.000) | −12.65 (4.031) | | | |
| Median | 12.95 | 0.30 | −12.65 | | | |
| Min, Max | 10.1, 15.8 | 0.3, 0.3 | −15.5, −9.8 | | | |
| 95% CI [4] | (0.00, 49.16) | (0.30, 0.30) | (−48.86, 23.56) | | | |
| sUA < 6 mg/dL, n (%) | | 2 (100%) | | | 0 | |
| Week 50 - Post-Infusion | | | | | | |
| n | 3 | 3 | 3 | 0 | 0 | 0 |
| Mean (SD) | 11.93 (3.350) | 1.37 (1.848) | −10.57 (4.598) | | | |
| Median | 10.10 | 0.30 | −9.80 | | | |
| Min, Max | 9.9, 15.8 | 0.3, 3.5 | −15.5, −6.4 | | | |
| 95% CI [4] | (3.61, 20.26) | (0.00, 5.96) | (−21.99, 0.86) | | | |
| sUA < 6 mg/dL, n (%) | | 3 (100%) | | | 0 | |
| Week 52/ET | | | | | | |
| n | 2 | 2 | 2 | 0 | 0 | 0 |
| Mean (SD) | 12.95 (4.031) | 0.30 (0.000) | −12.65 (4.031) | | | |
| Median | 12.95 | 0.30 | −12.65 | | | |
| Min, Max | 10.1, 15.8 | 0.3, 0.3 | −15.5, −9.8 | | | |
| 95% CI [4] | (0.00, 49.16) | (0.30, 0.30) | (−48.86, 23.56) | | | |
| sUA < 6 mg/dL, n (%) | | 2 (100%) | | | 0 | |
| End of Pegloticase Infusions Visit | | | | | | |
| n | 2 | 2 | 2 | 0 | 0 | 0 |
| Mean (SD) | 8.80 (1.556) | 0.30 (0.000) | −8.50 (1.556) | | | |
| Median | 8.80 | 0.30 | −8.50 | | | |
| Min, Max | 7.7, 9.9 | 0.3, 0.3 | −9.6, −7.4 | | | |
| 95% CI [4] | (0.00, 22.78) | (0.30, 0.30) | (−22.48, 5.48) | | | |
| sUA < 6 mg/dL, n (%) | | 2 (100%) | | | 0 | |
| Early Termination Visit | | | | | | |
| n | 0 | 0 | 0 | 3 | 3 | 3 |
| Mean (SD) | | | | 8.73 (0.577) | 8.17 (0.058) | −0.57 (0.635) |
| Median | | | | 8.40 | 8.20 | −0.20 |

TABLE 7-continued

Serum Uric Acid (mg/dL): Observed Values and Change from Pegloticase
Baseline Values by Month 6 sUA Responder Subgroup (mITT Population)

| Visit | Month 6 sUA Responders [1] (N = 11) | | | Month 6 sUA Non-Responders [1] (N = 3) | | |
|---|---|---|---|---|---|---|
| Statistics | Baseline [2] | Observed | Change from Baseline | Baseline [2] | Observed | Change from Baseline |
| Min, Max | | | | 8.4, 9.4 | 8.1, 8.2 | −1.3, −0.2 |
| 95% CI [4] | | | | (7.30, 10.17) | (8.02, 8.31) | (−2.14, 1.01) |
| sUA < 6 mg/dL, n (%) | | 0 | | | 0 | |

TABLE 8

Serum Uric Acid < 6 mg/dL Responders during Month 9 and Month 12 (ITT Population and mITT Population)

| Time Point | | ITT Population N = 15 | mITT Population N = 14 |
|---|---|---|---|
| Month 9 (Weeks 32, 34, 36) | Responder, n (%) [3] | 10 (71.4) | 10 (76.9) |
| | 95% Clopper-Pearson Confidence Interval [4] | 41.9, 91.6 | 46.2, 95.0 |
| | Non-Responder, n (%) | 4 (28.6) | 3 (23.1) |
| | Number of subjects eligible for analysis [1] | 14 | 13 |
| | Proportion of Time during Period that sUA < 6 mg/dL | | |
| | n | 10 | 10 |
| | Mean (SD) | 99.48 (1.656) | 99.48 (1.656) |
| | Median | 100.00 | 100.00 |
| | Min, Max | 94.8, 100.0 | 94.8, 100.0 |
| Month 9 (Weeks 32, 34, 36) | Discontinued treatment due to stopping rule prior to Week 36, n (%)[2] | 3 (21.4) | 3 (23.1) |
| | Subjects missing all data in analysis period, n (%) | 4 (28.6) | 3 (23.1) |
| | Subjects with only one measurement (above cutoff) in analysis period, n (%) | 0 | 0 |
| | Subjects with only one measurement (below cutoff) in analysis period, n (%) | 0 | 0 |
| Month 12 (Weeks 48, 50, 52) | Responder, n (%) [5] | 3 (21.4) | 3 (23.1) |
| | 95% Clopper-Pearson Confidence Interval [4] | 4.7, 50.8 | 5.0, 53.8 |
| | Non-Responder, n (%) | 11 (78.6) | 10 (76.9) |
| Month 12 (Weeks 48, 50, 52) | Number of subjects eligible for analysis [1] | 14 | 13 |
| | Proportion of Time during Period that sUA < 6 mg/dL | | |
| | n | 3 | 3 |
| | Mean (SD) | 100.00 (0.000) | 100.00 (0.000) |
| | Median | 100.00 | 100.00 |
| | Min, Max | 100.0, 100.0 | 100.0, 100.0 |
| Month 12 (Weeks 48, 50, 52) | Discontinued treatment due to stopping rule prior to Week 52, n (%)[2] | 3 (21.4) | 3 (23.1) |
| | Subjects missing all data in analysis period, n (%) | 11 (78.6) | 10 (76.9) |
| | Subjects with only one measurement (above cutoff) in analysis period, n (%) | 0 | 0 |
| | Subjects with only one measurement (below cutoff) in analysis period, n (%) | 0 | 0 |

TABLE 9

Serum Uric Acid < 5 mg/dL Responders during Month 9 and Month 12 (ITT Population and mITT Population)

| Time Point | | ITT Population N = 15 | mITT Population N = 14 |
|---|---|---|---|
| Month 9 (Weeks 32, 34, 36) | Responder, n (%) [3] | 10 (71.4) | 10 (76.9) |
| | 95% Clopper-Pearson Confidence Interval [4] | 41.9, 91.6 | 46.2, 95.0 |
| | Non-Responder, n (%) | 4 (28.6) | 3 (23.1) |
| | Number of subjects eligible for analysis 111 | 14 | 13 |
| | Proportion of Time during Period that sUA < 5 mg/dL | | |
| | n | 10 | 10 |
| | Mean (SD) | 97.73 (5.805) | 97.73 (5.805) |
| | Median | 100.00 | 100.00 |
| | Min, Max | 81.7, 100.0 | 81.7, 100.0 |
| Month 9 (Weeks 32. 34. 36) | Discontinued treatment due to stopping rule prior to Week 36, n (%)[2] | 3 (21.4) | 3 (23.1) |
| | Subjects missing all data in analysis period, n (%) | 4 (28.6) | 3 (23.1) |
| | Subjects with only one measurement (above cutoff) in analysis period, n (%) | 0 | 0 |
| | Subjects with only one measurement (below cutoff) in analysis period, n (%) | 0 | 0 |
| Month 12 (Weeks 48, 50, 52) | Responder, n (%) [5] | 3 (21.4) | 3 (23.1) |
| | 95% Clopper-Pearson Confidence Interval [4] | 4.7, 50.8 | 5.0, 53.8 |
| | Non-Responder, n (%) | 11 (78.6) | 10 (76.9) |
| Month 12 (Weeks 48, 50, 52) | Number of subjects eligible for analysis [1] | 14 | 13 |

TABLE 9-continued

Serum Uric Acid < 5 mg/dL Responders during Month 9 and Month 12 (ITT Population and mITT Population)

| Time Point | | ITT Population N = 15 | mITT Population N = 14 |
|---|---|---|---|
| | Proportion of Time during Period that sUA < 5 mg/dL | | |
| | n | 3 | 3 |
| | Mean (SD) | 100.00 (0.000) | 100.00 (0.000) |
| | Median | 100.00 | 100.00 |
| | Min, Max | 100.0, 100.0 | 100.0, 100.0 |
| Month 12 (Weeks 48, 50, 52) | Discontinued treatment due to stopping rule prior to Week 52, n (%)[2] | 3 (21.4) | 3 (23.1) |
| | Subjects missing all data in analysis period, n (%) | 11 (78.6) | 10 (76.9) |
| | Subjects with only one measurement (above cutoff) in analysis period, n (%) | 0 | 0 |
| | Subjects with only one measurement (below cutoff) in analysis period, n (%) | 0 | 0 |

TABLE 10

Time to First Pre-infusion Serum Uric Acid > 6 mg/dU and Time to 2 Consecutive Pre-infusion Serum Uric Acid > 6 mg/dU (mITT Population)

| | mITT Population N = 14 |
|---|---|
| Had pre-Infusion sUA > 6 mg/dL post-Day 1 Pegloticase Infusion, n (%) | |
| Yes | 4 (28.6) |
| No | 10 (71.4) |
| Time to pre-infusion sUA > 6 mg/dL post-Day 1 Pegloticase Infusion (days) [1] | |
| Mean (SD) | 218.3 (110.41) |
| Min, Max | 16, 353 |
| Kaplan-Meier Estimate | |
| Median | NE |
| 95% CI | 57.0, NE |
| Had 2 Consecutive Pre-Infusion sUA > 6 mg/dL post-Day 1 Pegloticase Infusion, n (%) | |
| Yes | 3 (21.4) |
| No | 11 (78.6) |
| Time to 2 Consecutive Pre-Infusion sUA > 6 mg/dL post-Day 1 Pegloticase Infusion (days) [2] | |
| Mean (SD) | 218.3 (110.41) |
| Min, Max | 16, 353 |
| Kaplan-Meier Estimate | |
| Median | NE |
| 95% CI | 57.0, NE |

TABLE 11

Assessment of Number of Joints Affected by Tophi (mITT Population)

mITT Population (N = 14)

| Visit | Statistics | Baseline [1] | Observed | Change from Baseline |
|---|---|---|---|---|
| Screening | n | 13 | | |
| | Mean (SD) | 6.9 (7.94) | | |
| | Median | 4.0 | | |
| | Min, Max | 1, 31 | | |
| Week 24 | n | 9 | 9 | 9 |
| | Mean (SD) | 8.7 (9.10) | 4.0 (3.64) | −4.7 (6.36) |
| | Median | 7.0 | 3.0 | −3.0 |
| | Min, Max | 1, 31 | 1, 12 | −19, 2 |
| Week 36 | n | 4 | 4 | 4 |
| | Mean (SD) | 14.8 (11.15) | 3.3 (3.86) | −11.5 (7.33) |
| | Median | 10.5 | 1.5 | −9.0 |
| | Min, Max | 7, 31 | 1, 9 | −22, −6 |
| Week 52/ET | n | 2 | 2 | 2 |
| | Mean (SD) | 22.0 (12.73) | 5.0 (2.83) | −17.0 (9.90) |
| | Median | 22.0 | 5.0 | −17.0 |
| | Min, Max | 13, 31 | 3, 7 | −24, −10 |

TABLE 12

Tender Joint Count and Swollen Joint Count: Observed Values and Change from Methotrexate Baseline Values (mITT Population)

mITT Population (N = 14)

| Parameter | Visit Statistics | Baseline [1] | Observed | Change from Baseline |
|---|---|---|---|---|
| | Baseline [2] | | | |
| Tender Joint Count | n | | 14 | |
| | Mean (SD) | | 11.6 (15.06) | |
| | Median | | 7.5 | |
| | Min, Max | | 0, 51 | |
| | Day 1 | | | |
| | n | 14 | 14 | 14 |
| | Mean (SD) | 11.6 (15.06) | 9.6 (11.03) | −1.9 (9.75) |
| | Median | 7.5 | 7.0 | 0.0 |
| | Min, Max | 0, 51 | 0, 37 | −23, 11 |
| | 95% CI [3] | | | −7.6, 3.7 |
| | Week 14 | | | |
| | n | 14 | 14 | 14 |
| | Mean (SD) | 11.6 (15.06) | 4.6 (6.16) | −7.0 (14.20) |
| | Median | 7.5 | 2.0 | 0.0 |
| | Min, Max | 0, 51 | 0, 18 | −43, 5 |
| | 95% CI [3] | | | −15.2, 1.2 |
| | Week 24 | | | |
| Tender Joint Count | n | 11 | 11 | 11 |
| | Mean (SD) | 12.8 (16.68) | 2.6 (3.88) | −10.2 (14.27) |
| | Median | 7.0 | 0.0 | −4.0 |
| | Min, Max | 0, 51 | 0, 11 | −40, 0 |
| | 95% CI [3] | | | −19.8, −0.6 |

TABLE 12-continued

Tender Joint Count and Swollen Joint Count: Observed Values and Change from Methotrexate Baseline Values (mITT Population)

| Parameter | Visit Statistics | mITT Population (N = 14) | | |
|---|---|---|---|---|
| | | Baseline [1] | Observed | Change from Baseline |
| | Week 36 | | | |
| | n | 9 | 9 | 9 |
| | Mean (SD) | 14.4 (18.12) | 2.1 (4.54) | −12.3 (14.56) |
| | Median | 7.0 | 0.0 | −7.0 |
| | Min, Max | 0, 51 | 0, 14 | −37, 0 |
| | 95% CI [3] | | | −23.5, −1.1 |
| | Week 52/ET | | | |
| | n | 3 | 3 | 3 |
| | Mean (SD) | 29.3 (18.93) | 5.3 (3.21) | −24.0 (21.38) |
| | Median | 21.0 | 4.0 | −17.0 |
| | Min, Max | 16, 51 | 3, 9 | −48, −7 |
| | 95% CI [3] | | | −77.1, 29.1 |
| | End of Pegloticase Infusions Visit | | | |
| Tender Joint Count | n | 2 | 2 | 2 |
| | Mean (SD) | 14.0 (9.90) | 2.0 (2.83) | −12.0 (7.07) |
| | Median | 14.0 | 2.0 | −12.0 |
| | Min, Max | 7, 21 | 0, 4 | −17, −7 |
| | 95% CI [3] | | | −75.5, 51.5 |
| | Early Termination Visit | | | |
| | n | 3 | 3 | 3 |
| | Mean (SD) | 7.0 (6.56) | 7.7 (8.96) | 0.7 (5.13) |
| | Median | 8.0 | 3.0 | 2.0 |
| | Min, Max | 0, 13 | 2, 18 | −5, 5 |
| | 95% CI [3] | | | −12.1, 13.4 |
| | Baseline [2] | | | |
| Swollen Joint Count | n | | 14 | |
| | Mean (SD) | | 6.0 (9.25) | |
| | Median | | 2.0 | |
| | Min, Max | | 0, 28 | |
| | Day 1 | | | |
| Swollen Joint Count | n | 14 | 14 | 14 |
| | Mean (SD) | 6.0 (9.25) | 5.3 (6.94) | −0.7 (5.21) |
| | Median | 2.0 | 3.5 | 0.5 |
| | Min, Max | 0, 28 | 0, 26 | −12, 6 |
| | 95% CI [3] | | | −3.7, 2.3 |
| | Week 14 | | | |
| | n | 14 | 14 | 14 |
| | Mean (SD) | 6.0 (9.25) | 1.7 (3.73) | −4.3 (7.38) |
| | Median | 2.0 | 0.0 | −2.0 |
| | Min, Max | 0, 28 | 0, 13 | −27, 0 |
| | 95% CI [3] | | | −8.5, 0.0 |
| | Week 24 | | | |
| | n | 11 | 11 | 11 |
| | Mean (SD) | 7.2 (10.16) | 0.5 (1.21) | −6.6 (9.03) |
| | Median | 3.0 | 0.0 | −3.0 |
| | Min, Max | 0, 28 | 0, 3 | −25, 0 |
| | 95% CI [3] | | | −12.7, −0.6 |
| | Week 36 | | | |
| Swollen Joint Count | n | 9 | 9 | 9 |
| | Mean (SD) | 7.9 (11.04) | 0.1 (0.33) | −7.8 (10.81) |
| | Median | 3.0 | 0.0 | −3.0 |
| | Min, Max | 0, 28 | 0, 1 | −27, 0 |
| | 95% CI [3] | | | −16.1, 0.5 |
| | Week 52/ET | | | |
| | n | 3 | 3 | 3 |
| | Mean (SD) | 21.0 (9.64) | 0.0 (0.00) | −21.0 (9.64) |
| | Median | 25.0 | 0.0 | −25.0 |
| | Min, Max | 10, 28 | 0, 0 | −28, −10 |
| | 95% CI [3] | | | −45.0, 3.0 |
| | End of Pegloticase Infusions Visit | | | |
| | n | 2 | 2 | 2 |
| | Mean (SD) | 7.0 (4.24) | 0.0 (0.00) | −7.0 (4.24) |
| | Median | 7.0 | 0.0 | −7.0 |
| | Min, Max | 4, 10 | 0, 0 | −10, −4 |
| | 95% CI [3] | | | −45.1, 31.1 |
| | Early Termination Visit | | | |
| Swollen Joint Count | n | 3 | 3 | 3 |
| | Mean (SD) | 1.7 (2.08) | 0.7 (0.58) | −1.0 (1.73) |
| | Median | 1.0 | 1.0 | 0.0 |
| | Min, Max | 0, 4 | 0, 1 | −3, 0 |
| | 95% CI [3] | | | −5.3, 3.3 |

TABLE 13

Tender Joint Count and Swollen Joint Count: Observed Values and Change from Pegloticase Baseline Values (mITT Population)

| Parameter | Visit Statistics | mITT Population (N = 14) | | |
|---|---|---|---|---|
| | | Baseline [1] | Observed | Change from Baseline |
| Tender Joint Count | Baseline [2] | | | |
| | n | | 14 | |
| | Mean (SD) | | 9.6 (11.03) | |
| | Median | | 7.0 | |
| | Min, Max | | 0, 37 | |
| | Week 14 | | | |
| | n | 14 | 14 | 14 |
| | Mean (SD) | 9.6 (11.03) | 4.6 (6.16) | −5.1 (8.12) |
| | Median | 7.0 | 2.0 | −5.0 |
| | Min, Max | 0, 37 | 0, 18 | −29, 6 |
| | 95% CI [3] | | | −9.8, −0.4 |
| | Week 24 | | | |
| | n | 11 | 11 | 11 |
| | Mean (SD) | 9.5 (11.29) | 2.6 (3.88) | −6.8 (8.16) |
| | Median | 7.0 | 0.0 | −4.0 |
| | Min, Max | 0, 37 | 0, 11 | −26, 1 |
| | 95% CI [3] | | | −12.3, −1.3 |
| Tender Joint Count | Week 36 | | | |
| | n | 9 | 9 | 9 |
| | Mean (SD) | 9.9 (12.57) | 2.1 (4.54) | −7.8 (8.94) |
| | Median | 4.0 | 0.0 | −4.0 |
| | Min, Max | 0, 37 | 0, 14 | −23, 0 |
| | 95% CI [3] | | | −14.7, −0.9 |
| | Week 52/ET | | | |
| | n | 3 | 3 | 3 |
| | Mean (SD) | 21.3 (17.16) | 5.3 (3.21) | −16.0 (17.52) |
| | Median | 24.0 | 4.0 | −15.0 |
| | Min, Max | 3, 37 | 3, 9 | −34, 1 |
| | 95% CI [3] | | | −59.5, 27.5 |

TABLE 13-continued

Tender Joint Count and Swollen Joint Count: Observed Values and Change from Pegloticase Baseline Values (mITT Population)

| Parameter | Visit Statistics | mITT Population (N = 14) | | |
|---|---|---|---|---|
| | | Baseline [1] | Observed | Change from Baseline |
| Tender Joint Count | End of Pegloticase Infusions Visit | | | |
| | n | 2 | 2 | 2 |
| | Mean (SD) | 5.0 (2.83) | 2.0 (2.83) | −3.0 (5.66) |
| | Median | 5.0 | 2.0 | −3.0 |
| | Min, Max | 3, 7 | 0, 4 | −7, 1 |
| | 95% CI [3] | | | −53.8, 47.8 |
| | Early Termination Visit | | | |
| | n | 3 | 3 | 3 |
| | Mean (SD) | 10.3 (12.34) | 7.7 (8.96) | −2.7 (4.16) |
| | Median | 7.0 | 3.0 | −4.0 |
| | Min, Max | 0, 24 | 2, 18 | −6, 2 |
| | 95% CI [3] | | | −13.0, 7.7 |
| Swollen Joint Count | Baseline [2] | | | |
| | n | | 14 | |
| | Mean (SD) | | 5.3 (6.94) | |
| | Median | | 3.5 | |
| | Min, Max | | 0, 26 | |
| | Week 14 | | | |
| | n | 14 | 14 | 14 |
| | Mean (SD) | 5.3 (6.94) | 1.7 (3.73) | −3.6 (7.04) |
| | Median | 3.5 | 0.0 | −2.5 |
| | Min, Max | 0, 26 | 0, 13 | −25, 7 |
| | 95% CI [3] | | | −7.6, 0.5 |
| Swollen Joint Count | Week 24 | | | |
| | n | 11 | 11 | 11 |
| | Mean (SD) | 5.6 (7.71) | 0.5 (1.21) | −5.1 (6.66) |
| | Median | 3.0 | 0.0 | −3.0 |
| | Min, Max | 0, 26 | 0, 3 | −23, 0 |
| | 95% CI [3] | | | −9.6, −0.6 |
| | Week 36 | | | |
| | n | 9 | 9 | 9 |
| | Mean (SD) | 6.3 (8.44) | 0.1 (0.33) | −6.2 (8.15) |
| | Median | 4.0 | 0.0 | −4.0 |
| | Min, Max | 0, 26 | 0, 1 | −25, 0 |
| | 95% CI [3] | | | −12.5, 0.0 |
| | Week 52/ET | | | |
| | n | 3 | 3 | 3 |
| | Mean (SD) | 13.0 (13.00) | 0.0 (0.00) | −13.0 (13.00) |
| | Median | 13.0 | 0.0 | −13.0 |
| | Min, Max | 0, 26 | 0, 0 | −26, 0 |
| | 95% CI [3] | | | −45.3, 19.3 |
| Swollen Joint Count | End of Pegloticase Infusions Visit | | | |
| | n | 2 | 2 | 2 |
| | Mean (SD) | 2.0 (2.83) | 0.0 (0.00) | −2.0 (2.83) |
| | Median | 2.0 | 0.0 | −2.0 |
| | Min, Max | 0, 4 | 0, 0 | −4, 0 |
| | 95% CI [3] | | | −27.4, 23.4 |
| | Early Termination Visit | | | |
| | n | 3 | 3 | 3 |
| | Mean (SD) | 4.0 (3.61) | 0.7 (0.58) | −3.3 (3.06) |
| | Median | 5.0 | 1.0 | −4.0 |
| | Min, Max | 0, 7 | 0, 1 | −6, 0 |
| | 95% CI [3] | | | −10.9, 4.3 |

TABLE 14

Health Assessment Questionnaire: Observed Values and Change from Methotrexate Baseline Values (mITT Population)

| Parameter | Visit Statistics | mITT Population (N = 14) | | |
|---|---|---|---|---|
| | | Baseline [1] | Observed | Change from Baseline |
| HAQ-DI | Baseline [2] | | | |
| | n | | 14 | |
| | Mean (SD) | | 0.7 (0.71) | |
| | Median | | 0.6 | |
| | Min, Max | | 0, 2 | |
| | Day 1 | | | |
| | n | 13 | 13 | 13 |
| | Mean (SD) | 0.8 (0.71) | 0.8 (0.77) | 0.1 (0.27) |
| | Median | 0.6 | 0.5 | 0.0 |
| | Min, Max | 0, 2 | 0, 2 | −0, 1 |
| | 95% CI [3] | | | −0.1, 0.2 |
| | Week 14 | | | |
| | n | 14 | 14 | 14 |
| | Mean (SD) | 0.7 (0.71) | 0.5 (0.41) | −0.2 (0.77) |
| | Median | 0.6 | 0.5 | 0.0 |
| | Min, Max | 0, 2 | 0, 1 | −2, 1 |
| | 95% CI [3] | | | −0.7, 0.2 |
| HAQ-DI | Week 24 | | | |
| | n | 11 | 11 | 11 |
| | Mean (SD) | 0.8 (0.77) | 0.2 (0.33) | −0.5 (0.74) |
| | Median | 0.6 | 0.1 | −0.1 |
| | Min, Max | 0, 2 | 0, 1 | −2, 0 |
| | 95% CI [3] | | | −1.0, 0.0 |
| | Week 36 | | | |
| | n | 9 | 9 | 9 |
| | Mean (SD) | 0.8 (0.86) | 0.3 (0.49) | −0.5 (0.80) |
| | Median | 0.4 | 0.1 | 0.0 |
| | Min, Max | 0, 2 | 0, 1 | −2, 0 |
| | 95% CI [3] | | | −1.1, 0.1 |
| | Week 52/ET | | | |
| | n | 3 | 3 | 3 |
| | Mean (SD) | 1.0 (0.76) | 0.4 (0.29) | −0.6 (0.87) |
| | Median | 0.9 | 0.3 | −0.1 |
| | Min, Max | 0, 2 | 0, 1 | −2, −0 |
| | 95% CI [3] | | | −2.8, 1.5 |
| HAQ-DI | End of Pegloticase Infusions Visit | | | |
| | n | 2 | 2 | 2 |
| | Mean (SD) | 0.3 (0.18) | 0.1 (0.18) | −0.1 (0.35) |
| | Median | 0.3 | 0.1 | −0.1 |
| | Min, Max | 0, 0 | 0, 0 | −0, 0 |
| | 95% CI [3] | | | −3.3, 3.1 |
| | Early Termination Visit | | | |
| | n | 3 | 3 | 3 |
| | Mean (SD) | 0.5 (0.45) | 0.7 (0.51) | 0.2 (0.90) |
| | Median | 0.6 | 0.6 | −0.3 |
| | Min, Max | 0, 1 | 0, 1 | −0, 1 |
| | 95% CI [3] | | | −2.0, 2.5 |
| HAQ-Pain | Baseline [2] | | | |
| | n | | 14 | |
| | Mean (SD) | | 40.9 (23.30) | |
| | Median | | 47.5 | |
| | Min, Max | | 0, 75 | |
| HAQ-Pain | Day 1 | | | |
| | n | 13 | 13 | 13 |
| | Mean (SD) | 40.2 (24.10) | 42.5 (22.24) | 2.3 (19.93) |
| | Median | 45.0 | 40.0 | 0.0 |
| | Min, Max | 0, 75 | 3, 80 | −27, 47 |
| | 95% CI [3] | | | −9.7, 14.4 |

TABLE 14-continued

Health Assessment Questionnaire: Observed Values and Change from Methotrexate Baseline Values (mITT Population)

| | | mITT Population (N = 14) | | |
|---|---|---|---|---|
| Parameter | Visit Statistics | Baseline [1] | Observed | Change from Baseline |
| HAQ-Pain | Week 14 | | | |
| | n | 14 | 14 | 14 |
| | Mean (SD) | 40.9 (23.30) | 27.1 (26.25) | −13.9 (30.48) |
| | Median | 47.5 | 15.0 | −12.5 |
| | Min, Max | 0, 75 | 0, 90 | −60, 60 |
| | 95% CI [3] | | | −31.5, 3.7 |
| | Week 24 | | | |
| | n | 11 | 11 | 11 |
| | Mean (SD) | 44.5 (22.96) | 25.4 (27.50) | −19.2 (35.13) |
| | Median | 50.0 | 20.0 | −10.0 |
| | Min, Max | 0, 75 | 0, 80 | −75, 55 |
| | 95% CI [3] | | | −42.8, 4.4 |
| | Week 36 | | | |
| | n | 9 | 9 | 9 |
| | Mean (SD) | 43.9 (23.02) | 21.0 (27.60) | −22.9 (28.41) |
| | Median | 50.0 | 10.0 | −20.0 |
| | Min, Max | 0, 75 | 0, 80 | −74, 30 |
| | 95% CI [3] | | | −44.7, −1.1 |
| | Week 52/ET | | | |
| | n | 3 | 3 | 3 |
| | Mean (SD) | 46.7 (22.55) | 4.0 (5.20) | −42.7 (18.04) |
| | Median | 45.0 | 1.0 | −44.0 |
| | Min, Max | 25, 70 | 1, 10 | −60, −24 |
| | 95% CI [3] | | | −87.5, 2.1 |
| | End of Pegloticase Infusions Visit | | | |
| HAQ-Pain | | | | |
| | n | 2 | 2 | 2 |
| | Mean (SD) | 37.5 (17.68) | 40.0 (56.57) | 2.5 (74.25) |
| | Median | 37.5 | 40.0 | 2.5 |
| | Min, Max | 25, 50 | 0, 80 | −50, 55 |
| | 95% CI [3] | | | −664.6, 669.6 |
| | Early Termination Visit | | | |
| | n | 3 | 3 | 3 |
| | Mean (SD) | 27.7 (23.59) | 46.7 (40.41) | 19.0 (36.51) |
| | Median | 30.0 | 40.0 | 7.0 |
| | Min, Max | 3, 50 | 10, 90 | −10, 60 |
| | 95% CI [3] | | | −71.7, 109.7 |
| HAQ-Health | Baseline [2] | | | |
| | n | | 14 | |
| | Mean (SD) | | 49.1 (30.79) | |
| | Median | | 55.0 | |
| | Min, Max | | 0, 90 | |
| | Day 1 | | | |
| | n | 13 | 13 | 13 |
| | Mean (SD) | 46.7 (30.68) | 37.8 (27.06) | −8.8 (38.29) |
| | Median | 50.0 | 25.0 | 10.0 |
| | Min, Max | 0, 90 | 2, 75 | −70, 55 |
| | 95% CI [3] | | | −32.0, 14.3 |
| HAQ-Health | Week 14 | | | |
| | n | 14 | 14 | 14 |
| | Mean (SD) | 49.1 (30.79) | 36.6 (33.87) | −12.5 (36.79) |
| | Median | 55.0 | 16.5 | −5.0 |
| | Min, Max | 0, 90 | 0, 90 | −75, 60 |
| | 95% CI [3] | | | −33.7, 8.7 |
| | Week 24 | | | |
| | n | 11 | 11 | 11 |
| | Mean (SD) | 54.5 (29.02) | 21.4 (26.65) | −33.2 (36.01) |
| | Median | 60.0 | 10.0 | −40.0 |
| | Min, Max | 0, 90 | 0, 80 | −80, 20 |
| | 95% CI [3] | | | −57.4, −9.0 |
| | Week 36 | | | |
| | n | 9 | 9 | 9 |
| | Mean (SD) | 55.0 (30.41) | 27.3 (35.18) | −27.7 (42.59) |
| | Median | 60.0 | 10.0 | −10.0 |
| | Min, Max | 0, 90 | 0, 100 | −85, 20 |
| | 95% CI [3] | | | −60.4, 5.1 |
| HAQ-Health | Week 52/ET | | | |
| | n | 3 | 3 | 3 |
| | Mean (SD) | 76.7 (15.28) | 60.0 (48.22) | −16.7 (59.23) |
| | Median | 80.0 | 80.0 | 15.0 |
| | Min, Max | 60, 90 | 5, 95 | −85, 20 |
| | 95% CI [3] | | | −163.8, 130.5 |
| | End of Pegloticase Infusions Visit | | | |
| | n | 2 | 2 | 2 |
| | Mean (SD) | 80.0 (0.00) | 0.0 (0.00) | −80.0 (0.00) |
| | Median | 80.0 | 0.0 | −80.0 |
| | Min, Max | 80, 80 | 0, 0 | −80, −80 |
| | 95% CI [3] | | | −80.0, −80.0 |
| | Early Termination Visit | | | |
| | n | 3 | 3 | 3 |
| | Mean (SD) | 29.0 (34.39) | 28.3 (40.72) | −0.7 (16.77) |
| | Median | 20.0 | 10.0 | 8.0 |
| | Min, Max | 0, 67 | 0, 75 | −20, 10 |
| | 95% CI [3] | | | −42.3, 41.0 |

TABLE 15

Health Assessment Questionnaire: Observed Values and Change from Pegloticase Baseline Values (mITT Population)

| | | mITT Population (N = 14) | | |
|---|---|---|---|---|
| Parameter | Visit Statistics | Baseline [1] | Observed | Change from Baseline |
| HAQ-DI | Baseline [2] | | | |
| | n | | 14 | |
| | Mean (SD) | | 0.8 (0.76) | |
| | Median | | 0.5 | |
| | Min, Max | | 0, 2 | |
| | Week 14 | | | |
| | n | 14 | 14 | 14 |
| | Mean (SD) | 0.8 (0.76) | 0.5 (0.41) | −0.3 (0.80) |
| | Median | 0.5 | 0.5 | 0.0 |
| | Min, Max | 0, 2 | 0, 1 | −2, 1 |
| | 95% CI [3] | | | −0.7, 0.2 |
| | Week 24 | | | |
| | n | 11 | 11 | 11 |
| | Mean (SD) | 0.8 (0.86) | 0.2 (0.33) | −0.6 (0.85) |
| | Median | 0.4 | 0.1 | −0.1 |
| | Min, Max | 0, 2 | 0, 1 | −2, 0 |
| | 95% CI [3] | | | −1.2, 0.0 |
| HAQ-DI | Week 36 | | | |
| | n | 9 | 9 | 9 |
| | Mean (SD) | 0.9 (0.93) | 0.3 (0.49) | −0.5 (0.86) |
| | Median | 0.4 | 0.1 | −0.1 |
| | Min, Max | 0, 2 | 0, 1 | −2, 0 |
| | 95% CI [3] | | | −1.2, 0.1 |

TABLE 15-continued

Health Assessment Questionnaire: Observed Values and Change from Pegloticase Baseline Values (mITT Population)

| Parameter | Visit Statistics | mITT Population (N = 14) | | |
|---|---|---|---|---|
| | | Baseline [1] | Observed | Change from Baseline |
| | Week 52/ET | | | |
| | n | 3 | 3 | 3 |
| | Mean (SD) | 1.2 (0.97) | 0.4 (0.29) | −0.8 (1.08) |
| | Median | 0.9 | 0.3 | −0.1 |
| | Min, Max | 0, 2 | 0, 1 | −2, −0 |
| | 95% CI [3] | | | −3.4, 1.9 |
| | End of Pegloticase Infusions Visit | | | |
| | n | 2 | 2 | 2 |
| | Mean (SD) | 0.3 (0.18) | 0.1 (0.18) | −0.1 (0.35) |
| | Median | 0.3 | 0.1 | −0.1 |
| | Min, Max | 0, 0 | 0, 0 | −0, 0 |
| | 95% CI [3] | | | −3.3, 3.1 |
| HAQ-DI | Early Termination Visit | | | |
| | n | 3 | 3 | 3 |
| | Mean (SD) | 0.5 (0.07) | 0.7 (0.51) | 0.2 (0.56) |
| | Median | 0.5 | 0.6 | 0.1 |
| | Min, Max | 1, 1 | 0, 1 | −0, 1 |
| | 95% CI [3] | | | −1.2, 1.6 |
| HAQ-Pain | Baseline [2] | | | |
| | n | | 14 | |
| | Mean (SD) | | 43.1 (21.46) | |
| | Median | | 45.0 | |
| | Min, Max | | 3, 80 | |
| | Week 14 | | | |
| | n | 14 | 14 | 14 |
| | Mean (SD) | 43.1 (21.46) | 27.1 (26.25) | −16.0 (30.65) |
| | Median | 45.0 | 15.0 | −12.5 |
| | Min, Max | 3, 80 | 0, 90 | −65, 50 |
| | 95% CI [3] | | | −33.7, 1.7 |
| HAQ-Pain | Week 24 | | | |
| | n | 11 | 11 | 11 |
| | Mean (SD) | 42.1 (24.23) | 25.4 (27.50) | −16.7 (38.53) |
| | Median | 30.0 | 20.0 | −10.0 |
| | Min, Max | 3, 80 | 0, 80 | −66, 55 |
| | 95% CI [3] | | | −42.6, 9.2 |
| | Week 36 | | | |
| | n | 9 | 9 | 9 |
| | Mean (SD) | 40.9 (25.46) | 21.0 (27.60) | −19.9 (20.25) |
| | Median | 30.0 | 10.0 | −20.0 |
| | Min, Max | 3, 80 | 0, 80 | −59, 10 |
| | 95% CI [3] | | | −35.5, −4.3 |
| | Week 52/ET | | | |
| | n | 3 | 3 | 3 |
| | Mean (SD) | 45.0 (30.41) | 4.0 (5.20) | −41.0 (25.24) |
| | Median | 30.0 | 1.0 | −29.0 |
| | Min, Max | 25, 80 | 1, 10 | −70, −24 |
| | 95% CI [3] | | | −103.7, 21.7 |
| HAQ-Pain | End of Pegloticase Infusions Visit | | | |
| | n | 2 | 2 | 2 |
| | Mean (SD) | 37.5 (17.68) | 40.0 (56.57) | 2.5 (74.25) |
| | Median | 37.5 | 40.0 | 2.5 |
| | Min, Max | 25, 50 | 0, 80 | −50, 55 |
| | 95% CI [3] | | | −664.6, 669.6 |
| | Early Termination Visit | | | |
| | n | 3 | 3 | 3 |
| | Mean (SD) | 46.7 (5.77) | 46.7 (40.41) | 0.0 (45.83) |
| | Median | 50.0 | 40.0 | −10.0 |
| | Min, Max | 40, 50 | 10, 90 | −40, 50 |
| | 95% CI [3] | | | −113.8, 113.8 |
| HAQ-Health | Baseline [2] | | | |
| | n | | 14 | |
| | Mean (SD) | | 40.9 (28.33) | |
| | Median | | 32.5 | |
| | Min, Max | | 2, 80 | |
| HAQ-Health | Week 14 | | | |
| | n | 14 | 14 | 14 |
| | Mean (SD) | 40.9 (28.33) | 36.6 (33.87) | −4.3 (43.82) |
| | Median | 32.5 | 16.5 | −1.0 |
| | Min, Max | 2, 80 | 0, 90 | −75, 75 |
| | 95% CI [3] | | | −29.6, 21.0 |
| | Week 24 | | | |
| | n | 11 | 11 | 11 |
| | Mean (SD) | 41.1 (29.29) | 21.4 (26.65) | −19.7 (43.38) |
| | Median | 40.0 | 10.0 | −10.0 |
| | Min, Max | 2, 80 | 0, 80 | −80, 55 |
| | 95% CI [3] | | | −48.9, 9.4 |
| | Week 36 | | | |
| | n | 9 | 9 | 9 |
| | Mean (SD) | 43.6 (31.78) | 27.3 (35.18) | −16.2 (50.72) |
| | Median | 50.0 | 10.0 | −10.0 |
| | Min, Max | 2, 80 | 0, 100 | −80, 90 |
| | 95% CI [3] | | | −55.2, 22.8 |
| HAQ-Health | Week 52/ET | | | |
| | n | 3 | 3 | 3 |
| | Mean (SD) | 36.7 (34.03) | 60.0 (48.22) | 23.3 (54.85) |
| | Median | 25.0 | 80.0 | 5.0 |
| | Min, Max | 10, 75 | 5, 95 | −20, 85 |
| | 95% CI [3] | | | −112.9, 159.6 |
| | End of Pegloticase Infusions Visit | | | |
| | n | 2 | 2 | 2 |
| | Mean (SD) | 45.0 (49.50) | 0.0 (0.00) | −45.0 (49.50) |
| | Median | 45.0 | 0.0 | −45.0 |
| | Min, Max | 10, 80 | 0, 0 | −80, −10 |
| | 95% CI [3] | | | −489.7, 399.7 |
| | Early Termination Visit | | | |
| | n | 3 | 3 | 3 |
| | Mean (SD) | 40.0 (30.41) | 28.3 (40.72) | −11.7 (62.52) |
| | Median | 25.0 | 10.0 | −10.0 |
| | Min, Max | 20, 75 | 0, 75 | −75, 50 |
| | 95% CI [3] | | | −167.0, 143.6 |

TABLE 16

Patient Global Assessment of Gout and Physician Global Assessment of Gout: Observed Values and Change from Methotrexate Baseline Values (mITT Population)

| Parameter | Visit Statistics | mITT Population (N = 14) | | |
|---|---|---|---|---|
| | | Baseline [1] | Observed | Change from Baseline |
| Patient Global Assessment of Gout | Baseline [2] | | | |
| | n | | 14 | |
| | Mean (SD) | | 5.6 (2.21) | |
| | Median | | 6.0 | |
| | Min, Max | | 1, 10 | |
| | Day 1 | | | |
| | n | 14 | 14 | 14 |
| | Mean (SD) | 5.6 (2.21) | 5.8 (1.76) | 0.2 (1.85) |
| | Median | 6.0 | 6.0 | 0.0 |
| | Min, Max | 1, 10 | 3, 8 | −3, 4 |
| | 95% CI [3] | | | −0.9, 1.3 |
| | Week 14 | | | |
| | n | 14 | 14 | 14 |
| | Mean (SD) | 5.6 (2.21) | 3.1 (2.27) | −2.5 (2.77) |
| | Median | 6.0 | 3.0 | −2.5 |
| | Min, Max | 1, 10 | 0, 9 | −6, 4 |
| | 95% CI [3] | | | −4.1, −0.9 |
| Patient Global Assessment of Gout | Week 24 | | | |
| | n | 11 | 11 | 11 |
| | Mean (SD) | 5.7 (2.45) | 2.0 (1.79) | −3.7 (3.23) |
| | Median | 6.0 | 3.0 | −3.0 |
| | Min, Max | 1, 10 | 0, 4 | −10, 0 |
| | 95% CI [3] | | | −5.9, −1.6 |
| | Week 36 | | | |
| | n | 9 | 9 | 9 |
| | Mean (SD) | 5.6 (2.07) | 2.1 (2.80) | −3.4 (2.92) |
| | Median | 6.0 | 1.0 | −4.0 |
| | Min, Max | 1, 8 | 0, 8 | −8, 2 |
| | 95% CI [3] | | | −5.7, −1.2 |
| | Week 52/ET | | | |
| | n | 3 | 3 | 3 |
| | Mean (SD) | 5.3 (1.53) | 1.0 (1.00) | −4.3 (0.58) |
| | Median | 5.0 | 1.0 | −4.0 |
| | Min, Max | 4, 7 | 0, 2 | −5, −4 |
| | 95% CI [3] | | | −5.8, −2.9 |
| Patient Global Assessment of Gout | End of Pegloticase Infusions Visit | | | |
| | n | 2 | 2 | 2 |
| | Mean (SD) | 6.0 (1.41) | 2.0 (2.83) | −4.0 (4.24) |
| | Median | 6.0 | 2.0 | −4.0 |
| | Min, Max | 5, 7 | 0, 4 | −7, −1 |
| | 95% CI [3] | | | −42.1, 34.1 |
| | Early Termination Visit | | | |
| | n | 3 | 3 | 3 |
| | Mean (SD) | 5.0 (1.00) | 5.7 (3.06) | 0.7 (2.89) |
| | Median | 5.0 | 5.0 | −1.0 |
| | Min, Max | 4, 6 | 3, 9 | −1, 4 |
| | 95% CI [3] | | | −6.5, 7.8 |
| Physician Global Assessment of Gout | Baseline [2] | | | |
| | n | | 14 | |
| | Mean (SD) | | 6.1 (2.25) | |
| | Median | | 7.0 | |
| | Min, Max | | 1, 9 | |
| Physician Global Assessment of Gout | Day 1 | | | |
| | n | 14 | 14 | 14 |
| | Mean (SD) | 6.1 (2.25) | 6.0 (2.45) | −0.1 (2.35) |
| | Median | 7.0 | 7.0 | 0.0 |
| | Min, Max | 1, 9 | 0, 9 | −6, 4 |
| | 95% CI [3] | | | −1.5, 1.2 |
| | Week 14 | | | |
| | n | 14 | 14 | 14 |
| | Mean (SD) | 6.1 (2.25) | 1.9 (1.64) | −4.2 (2.22) |
| | Median | 7.0 | 2.0 | −5.0 |
| | Min, Max | 1, 9 | 0, 6 | −8, −1 |
| | 95% CI [3] | | | −5.5, −2.9 |
| | Week 24 | | | |
| | n | 11 | 11 | 11 |
| | Mean (SD) | 6.1 (2.39) | 0.8 (0.87) | −5.3 (2.10) |
| | Median | 7.0 | 1.0 | −6.0 |
| | Min, Max | 1, 9 | 0, 3 | −8, −1 |
| | 95% CI [3] | | | −6.7, −3.9 |
| Physician Global Assessment of Gout | Week 36 | | | |
| | n | 9 | 9 | 9 |
| | Mean (SD) | 6.6 (2.40) | 0.7 (1.00) | −5.9 (2.03) |
| | Median | 7.0 | 0.0 | −6.0 |
| | Min, Max | 1, 9 | 0, 2 | −8, −1 |
| | 95% CI [3] | | | −7.4, −4.3 |
| | Week 52/ET | | | |
| | n | 3 | 3 | 3 |
| | Mean (SD) | 8.3 (0.58) | 1.0 (0.00) | −7.3 (0.58) |
| | Median | 8.0 | 1.0 | −7.0 |
| | Min, Max | 8, 9 | 1, 1 | −8, −7 |
| | 95% CI [3] | | | −8.8, −5.9 |
| | End of Pegloticase Infusions Visit | | | |
| | n | 2 | 2 | 2 |
| | Mean (SD) | 7.5 (0.71) | 0.5 (0.71) | −7.0 (0.00) |
| | Median | 7.5 | 0.5 | −7.0 |
| | Min, Max | 7, 8 | 0, 1 | −7, −7 |
| | 95% CI [3] | | | −7.0, −7.0 |
| Physician Global Assessment of Gout | Early Termination Visit | | | |
| | n | 3 | 3 | 3 |
| | Mean (SD) | 6.3 (2.08) | 3.7 (2.08) | −2.7 (2.08) |
| | Median | 7.0 | 3.0 | −2.0 |
| | Min, Max | 4, 8 | 2, 6 | −5, −1 |
| | 95% CI [3] | | | −7.8, 2.5 |

TABLE 17

Patient Global Assessment of Gout and Physician Global Assessment of Gout: Observed Values and Change from Pegloticase Baseline Values (mITT Population)

| Parameter | Visit Statistics | mITT Population (N = 14) | | |
|---|---|---|---|---|
| | | Baseline [1] | Observed | Change from Baseline |
| Patient Global Assessment of Gout | Baseline [2] | | | |
| | n | | 14 | |
| | Mean (SD) | | 5.8 (1.76) | |
| | Median | | 6.0 | |
| | Min, Max | | 3, 8 | |
| | Week 14 | | | |
| | n | 14 | 14 | 14 |
| | Mean (SD) | 5.8 (1.76) | 3.1 (2.27) | −2.7 (2.43) |
| | Median | 6.0 | 3.0 | −3.0 |
| | Min, Max | 3, 8 | 0, 9 | −6, 4 |
| | 95% CI [3] | | | −4.1, −1.3 |
| | Week 24 | | | |
| | n | 11 | 11 | 11 |
| | Mean (SD) | 5.9 (1.97) | 2.0 (1.79) | −3.9 (2.51) |
| | Median | 7.0 | 3.0 | −4.0 |
| | Min, Max | 3, 8 | 0, 4 | −8, 0 |
| | 95% CI [3] | | | −5.6, −2.2 |
| Patient Global Assessment of Gout | Week 36 | | | |
| | n | 9 | 9 | 9 |
| | Mean (SD) | 5.6 (2.01) | 2.1 (2.80) | −3.4 (2.46) |
| | Median | 6.0 | 1.0 | −3.0 |
| | Min, Max | 3, 8 | 0, 8 | −7, 0 |
| | 95% CI [3] | | | −5.3, −1.6 |
| | Week 52/ET | | | |
| | n | 3 | 3 | 3 |
| | Mean (SD) | 5.3 (2.08) | 1.0 (1.00) | −4.3 (1.15) |
| | Median | 6.0 | 1.0 | −5.0 |
| | Min, Max | 3, 7 | 0, 2 | −5, −3 |
| | 95% CI [3] | | | −7.2, −1.5 |
| | End of Pegloticase Infusions Visit | | | |
| | n | 2 | 2 | 2 |
| | Mean (SD) | 6.5 (0.71) | 2.0 (2.83) | −4.5 (3.54) |
| | Median | 6.5 | 2.0 | −4.5 |
| | Min, Max | 6, 7 | 0, 4 | −7, −2 |
| | 95% CI [3] | | | −36.3, 27.3 |
| Patient Global Assessment of Gout | Early Termination Visit | | | |
| | n | 3 | 3 | 3 |
| | Mean (SD) | 5.3 (0.58) | 5.7 (3.06) | 0.3 (3.51) |
| | Median | 5.0 | 5.0 | 0.0 |
| | Min, Max | 5, 6 | 3, 9 | −3, 4 |
| | 95% CI [3] | | | −8.4, 9.1 |
| Physician Global Assessment of Gout | Baseline [2] | | | |
| | n | | 14 | |
| | Mean (SD) | | 6.0 (2.45) | |
| | Median | | 7.0 | |
| | Min, Max | | 0, 9 | |
| | Week 14 | | | |
| | n | 14 | 14 | 14 |
| | Mean (SD) | 6.0 (2.45) | 1.9 (1.64) | −4.1 (2.40) |
| | Median | 7.0 | 2.0 | −4.5 |
| | Min, Max | 0, 9 | 0, 6 | −8, 0 |
| | 95% CI [3] | | | −5.5, −2.7 |
| Physician Global Assessment of Gout | Week 24 | | | |
| | n | 11 | 11 | 11 |
| | Mean (SD) | 6.1 (2.70) | 0.8 (0.87) | −5.3 (2.41) |
| | Median | 7.0 | 1.0 | −6.0 |
| | Min, Max | 0, 9 | 0, 3 | −8, 0 |
| | 95% CI [3] | | | −6.9, −3.7 |

TABLE 17-continued

Patient Global Assessment of Gout and Physician Global Assessment of Gout: Observed Values and Change from Pegloticase Baseline Values (mITT Population)

|  |  | mITT Population (N = 14) | | |
|---|---|---|---|---|
| Parameter | Visit Statistics | Baseline [1] | Observed | Change from Baseline |
|  | Week 36 |  |  |  |
|  | n | 9 | 9 | 9 |
|  | Mean (SD) | 6.1 (2.98) | 0.7 (1.00) | −5.4 (2.46) |
|  | Median | 7.0 | 0.0 | −7.0 |
|  | Min, Max | 0, 9 | 0, 2 | −7, 0 |
|  | 95% CI [3] |  |  | −7.3, −3.6 |
|  | Week 52/ET |  |  |  |
|  | n | 3 | 3 | 3 |
|  | Mean (SD) | 8.3 (1.15) | 1.0 (0.00) | −7.3 (1.15) |
|  | Median | 9.0 | 1.0 | −8.0 |
|  | Min, Max | 7, 9 | 1, 1 | −8, −6 |
|  | 95% CI [3] |  |  | −10.2, −4.5 |
| Physician Global Assessment of Gout | End of Pegloticase Infusions Visit |  |  |  |
|  | n | 2 | 2 | 2 |
|  | Mean (SD) | 7.0 (0.00) | 0.5 (0.71) | −6.5 (0.71) |
|  | Median | 7.0 | 0.5 | −6.5 |
|  | Min, Max | 7, 7 | 0, 1 | −7, −6 |
|  | 95% CI [3] |  |  | −12.9, −0.1 |
|  | Early Termination Visit |  |  |  |
|  | n | 3 | 3 | 3 |
|  | Mean (SD) | 5.7 (1.53) | 3.7 (2.08) | −2.0 (1.00) |
|  | Median | 6.0 | 3.0 | −2.0 |
|  | Min, Max | 4, 7 | 2, 6 | −3, −1 |
|  | 95% CI [3] |  |  | −4.5, 0.5 |

Joint Pain Assessment after Treatment with KXX and MTX

TABLE 18

Joint Pain Associated with Gout Assessment: Observed Values and Change from Methotrexate Baseline Values (mITT Population)

|  |  | mITT Population (N = 14) | | |
|---|---|---|---|---|
| Parameter | Visit Statistics | Baseline [1] | Observed | Change from Baseline |
| Average Joint Pain | Baseline [2] |  |  |  |
|  | n |  | 14 |  |
|  | Mean (SD) |  | 4.9 (2.18) |  |
|  | Median |  | 5.0 |  |
|  | Min, Max |  | 0, 8 |  |
|  | Day 1 |  |  |  |
|  | n | 14 | 14 | 14 |
|  | Mean (SD) | 4.9 (2.18) | 4.9 (1.94) | 0.1 (1.54) |
|  | Median | 5.0 | 5.5 | 0.0 |
|  | Min, Max | 0, 8 | 2, 8 | −3, 3 |
|  | 95% CI [3] |  |  | −0.8, 1.0 |
|  | Week 14 |  |  |  |
|  | n | 14 | 14 | 14 |
|  | Mean (SD) | 4.9 (2.18) | 3.2 (2.42) | −1.6 (3.00) |
|  | Median | 5.0 | 2.5 | −1.5 |
|  | Min, Max | 0, 8 | 0, 9 | −6, 6 |
|  | 95% CI [3] |  |  | −3.4, 0.1 |
| Average Joint Pain | Week 24 |  |  |  |
|  | n | 11 | 11 | 11 |
|  | Mean (SD) | 5.1 (2.39) | 2.3 (2.41) | −2.8 (3.28) |
|  | Median | 6.0 | 2.0 | −3.0 |
|  | Min, Max | 0, 8 | 0, 8 | −8, 3 |
|  | 95% CI [3] |  |  | −5.0, −0.6 |

TABLE 18-continued

Joint Pain Associated with Gout Assessment: Observed Values and
Change from Methotrexate Baseline Values (mITT Population)

| Parameter | Visit Statistics | mITT Population (N = 14) | | |
|---|---|---|---|---|
| | | Baseline [1] | Observed | Change from Baseline |
| | Week 36 | | | |
| | n | 9 | 9 | 9 |
| | Mean (SD) | 5.1 (2.62) | 2.1 (2.76) | −3.0 (2.78) |
| | Median | 6.0 | 1.0 | −2.0 |
| | Min, Max | 0, 8 | 0, 8 | −8, 1 |
| | 95% CI [3] | | | −5.1, −0.9 |
| | Week 52/ET | | | |
| | n | 3 | 3 | 3 |
| | Mean (SD) | 5.0 (2.00) | 2.0 (0.00) | −3.0 (2.00) |
| | Median | 5.0 | 2.0 | −3.0 |
| | Min, Max | 3, 7 | 2, 2 | −5, −1 |
| | 95% CI [3] | | | −8.0, 2.0 |
| Average Joint Pain | End of Pegloticase Infusions Visit | | | |
| | n | 2 | 2 | 2 |
| | Mean (SD) | 6.0 (1.41) | 4.0 (5.66) | −2.0 (7.07) |
| | Median | 6.0 | 4.0 | −2.0 |
| | Min, Max | 5, 7 | 0, 8 | −7, 3 |
| | 95% CI [3] | | | −65.5, 61.5 |
| | Early Termination Visit | | | |
| | n | 3 | 3 | 3 |
| | Mean (SD) | 4.0 (1.00) | 6.0 (3.00) | 2.0 (3.61) |
| | Median | 4.0 | 6.0 | 1.0 |
| | Min, Max | 3, 5 | 3, 9 | −1, 6 |
| | 95% CI [3] | | | −7.0, 11.0 |
| Least Joint Pain | Baseline [2] | | | |
| | n | | 14 | |
| | Mean (SD) | | 3.1 (2.03) | |
| | Median | | 3.5 | |
| | Min, Max | | 0, 6 | |
| Least Joint Pain | Day 1 | | | |
| | n | 14 | 14 | 14 |
| | Mean (SD) | 3.1 (2.03) | 3.4 (2.47) | 0.3 (1.73) |
| | Median | 3.5 | 3.0 | 0.5 |
| | Min, Max | 0, 6 | 0, 8 | −4, 3 |
| | 95% CI [3] | | | −0.7, 1.3 |
| | Week 14 | | | |
| | n | 14 | 14 | 14 |
| | Mean (SD) | 3.1 (2.03) | 1.7 (1.20) | −1.4 (2.14) |
| | Median | 3.5 | 2.0 | −1.5 |
| | Min, Max | 0, 6 | 0, 3 | −6, 3 |
| | 95% CI [3] | | | −2.7, −0.2 |
| | Week 24 | | | |
| | n | 11 | 11 | 11 |
| | Mean (SD) | 3.5 (2.02) | 1.1 (1.45) | −2.4 (1.86) |
| | Median | 4.0 | 0.0 | −2.0 |
| | Min, Max | 0, 6 | 0, 4 | −5, 0 |
| | 95% CI [3] | | | −3.6, −1.1 |
| Least Joint Pain | Week 36 | | | |
| | n | 9 | 9 | 9 |
| | Mean (SD) | 3.2 (2.17) | 1.3 (2.69) | −1.9 (2.15) |
| | Median | 3.0 | 0.0 | −2.0 |
| | Min, Max | 0, 6 | 0, 8 | −5, 2 |
| | 95% CI [3] | | | −3.5, −0.2 |
| | Week 52/ET | | | |
| | n | 3 | 3 | 3 |
| | Mean (SD) | 3.7 (2.08) | 1.0 (1.00) | −2.7 (1.15) |
| | Median | 3.0 | 1.0 | −2.0 |
| | Min, Max | 2, 6 | 0, 2 | −4, −2 |
| | 95% CI [3] | | | −5.5, 0.2 |

TABLE 18-continued

Joint Pain Associated with Gout Assessment: Observed Values and
Change from Methotrexate Baseline Values (mITT Population)

| Parameter | Visit Statistics | mITT Population (N = 14) | | |
|---|---|---|---|---|
| | | Baseline [1] | Observed | Change from Baseline |
| | End of Pegloticase Infusions Visit | | | |
| | n | 2 | 2 | 2 |
| | Mean (SD) | 4.0 (1.41) | 0.0 (0.00) | −4.0 (1.41) |
| | Median | 4.0 | 0.0 | −4.0 |
| | Min, Max | 3, 5 | 0, 0 | −5, −3 |
| | 95% CI [3] | | | −16.7, 8.7 |
| Least Joint Pain | Early Termination Visit | | | |
| | n | 3 | 3 | 3 |
| | Mean (SD) | 2.0 (2.00) | 3.0 (0.00) | 1.0 (2.00) |
| | Median | 2.0 | 3.0 | 1.0 |
| | Min, Max | 0, 4 | 3, 3 | −1, 3 |
| | 95% CI [3] | | | −4.0, 6.0 |
| Worst Joint Pain | Baseline [2] | | | |
| | n | | 14 | |
| | Mean (SD) | | 5.8 (2.49) | |
| | Median | | 6.0 | |
| | Min, Max | | 0, 9 | |
| | Day 1 | | | |
| | n | 14 | 14 | 14 |
| | Mean (SD) | 5.8 (2.49) | 6.3 (2.23) | 0.5 (2.28) |
| | Median | 6.0 | 7.0 | 0.5 |
| | Min, Max | 0, 9 | 2, 9 | −3, 4 |
| | 95% CI [3] | | | −0.8, 1.8 |
| Worst Joint Pain | Week 14 | | | |
| | n | 14 | 14 | 14 |
| | Mean (SD) | 5.8 (2.49) | 4.4 (2.76) | −1.4 (3.16) |
| | Median | 6.0 | 3.5 | −1.0 |
| | Min, Max | 0, 9 | 0, 9 | −6, 6 |
| | 95% CI [3] | | | −3.3, 0.4 |
| | Week 24 | | | |
| | n | 11 | 11 | 11 |
| | Mean (SD) | 5.9 (2.66) | 2.9 (2.66) | −3.0 (4.22) |
| | Median | 6.0 | 3.0 | −2.0 |
| | Min, Max | 0, 9 | 0, 8 | −9, 5 |
| | 95% CI [3] | | | −5.8, −0.2 |
| | Week 36 | | | |
| | n | 9 | 9 | 9 |
| | Mean (SD) | 5.7 (2.74) | 2.8 (3.15) | −2.9 (3.44) |
| | Median | 6.0 | 2.0 | −3.0 |
| | Min, Max | 0, 9 | 0, 8 | −9, 2 |
| | 95% CI [3] | | | −5.5, −0.2 |
| Worst Joint Pain | Week 52/ET | | | |
| | n | 3 | 3 | 3 |
| | Mean (SD) | 5.0 (2.00) | 2.0 (1.00) | −3.0 (1.73) |
| | Median | 5.0 | 2.0 | −2.0 |
| | Min, Max | 3, 7 | 1, 3 | −5, −2 |
| | 95% CI [3] | | | −7.3, 1.3 |
| | End of Pegloticase Infusions Visit | | | |
| | n | 2 | 2 | 2 |
| | Mean (SD) | 5.5 (3.54) | 4.0 (5.66) | −1.5 (9.19) |
| | Median | 5.5 | 4.0 | −1.5 |
| | Min, Max | 3, 8 | 0, 8 | −8, 5 |
| | 95% CI [3] | | | −84.1, 81.1 |
| | Early Termination Visit | | | |
| | n | 3 | 3 | 3 |
| | Mean (SD) | 5.3 (2.08) | 7.3 (1.53) | 2.0 (3.46) |
| | Median | 6.0 | 7.0 | 0.0 |

TABLE 18-continued

Joint Pain Associated with Gout Assessment: Observed Values and
Change from Methotrexate Baseline Values (mITT Population)

| Parameter | Visit Statistics | mITT Population (N = 14) | | |
|---|---|---|---|---|
| | | Baseline [1] | Observed | Change from Baseline |
| | Min, Max | 3, 7 | 6, 9 | 0, 6 |
| | 95% CI [3] | | | −6.6, 10.6 |

Chronic Response to Treatment with KXX+MTX

TABLE 19

Gout Chronic Response - Relative to Methotrexate Baseline (mITT Population)

| Visit in Dual Therapy Period | Category | Parameter Statistics | mITT Population N = 14 |
|---|---|---|---|
| Day 1 | GCR20 | 20% Reduction in Tender Joint Count, n/m (%) | 6/13 (46.2) |
| | | 20% Reduction in Swollen Joint Count, n/m (%) | 4/13 (30.8) |
| | | 20% Reduction in HAQ-Health Score, n/m (%) | 5/12 (41.7) |
| | | 20% Reduction in HAQ-Pain, n/m (%) | 4/12 (33.3) |
| | | GCR20 Responders [1], n (%) | 2/13 (15.4) |
| | | 95% Confidence Interval [2] | 1.9, 45.4 |
| | GCR50 | 50% Reduction in Tender Joint Count, n/m (%) | 4/13 (30.8) |
| | | 50% Reduction in Swollen Joint Count, n/m (%) | 3/13 (23.1) |
| | | 50% Reduction in HAQ-Health Score, n/m (%) | 5/12 (41.7) |
| | | 50% Reduction in HAQ-Pain, n/m (%) | 1/12 (8.3) |
| | | GCR50 Responders [1], n (%) | 1/13 (7.7) |
| | | 95% Confidence Interval [2] | 0.2, 36.0 |
| | GCR70 | 70% Reduction in Tender Joint Count, n/m (%) | 3/13 (23.1) |
| | | 70% Reduction in Swollen Joint Count, n/m (%) | 3/13 (23.1) |
| | | 70% Reduction in HAQ-Health Score, n/m (%) | 4/12 (33.3) |
| | | 70% Reduction in HAQ-Pain, n/m (%) | 1/12 (8.3) |
| | | GCR70 Responders [1], n (%) | 1/13 (7.7) |
| | | 95% Confidence Interval [2] | 0.2, 36.0 |
| Week 14 | GCR20 | 20% Reduction in Tender Joint Count, n/m (%) | 9/13 (69.2) |
| | | 20% Reduction in Swollen Joint Count, n/m (%) | 12/13 (92.3) |
| | | 20% Reduction in HAQ-Health Score, n/m (%) | 7/13 (53.8) |
| | | 20% Reduction in HAQ-Pain, n/m (%) | 9/13 (69.2) |
| | | GCR20 Responders [1], n (%) | 8/13 (61.5) |
| | | 95% Confidence Interval [2] | 31.6, 86.1 |
| | GCR50 | 50% Reduction in Tender Joint Count, n/m (%) | 9/13 (69.2) |
| | | 50% Reduction in Swollen Joint Count, n/m (%) | 10/13 (76.9) |
| | | 50% Reduction in HAQ-Health Score, n/m (%) | 6/13 (46.2) |
| | | 50% Reduction in HAQ-Pain, n/m (%) | 7/13 (53.8) |
| | | GCR50 Responders [1], n (%) | 6/13 (46.2) |
| | | 95% Confidence Interval [2] | 19.2, 74.9 |
| | GCR70 | 70% Reduction in Tender Joint Count, n/m (%) | 7/13 (53.8) |
| | | 70% Reduction in Swollen Joint Count, n/m (%) | 10/13 (76.9) |
| | | 70% Reduction in HAQ-Health Score, n/m (%) | 5/13 (38.5) |
| | | 70% Reduction in HAQ-Pain, n/m (%) | 5/13 (38.5) |
| | | GCR70 Responders [1], n (%) | 5/13 (38.5) |
| | | 95% Confidence Interval [2] | 13.9, 68.4 |
| Week 24 | GCR20 | 20% Reduction in Tender Joint Count, n/m (%) | 10/10 (100) |
| | | 20% Reduction in Swollen Joint Count, n/m (%) | 10/10 (100) |
| | | 20% Reduction in HAQ-Health Score, n/m (%) | 7/10 (70.0) |
| | | 20% Reduction in HAQ-Pain, n/m (%) | 9/10 (90.0) |
| | | GCR20 Responders [1], n (%) | 10/10 (100) |
| | | 95% Confidence Interval [2] | 69.2, 100.0 |
| | GCR50 | 50% Reduction in Tender Joint Count, n/m (%) | 9/10 (90.0) |
| | | 50% Reduction in Swollen Joint Count, n/m (%) | 10/10 (100) |
| | | 50% Reduction in HAQ-Health Score, n/m (%) | 7/10 (70.0) |
| | | 50% Reduction in HAQ-Pain, n/m (%) | 5/10 (50.0) |
| | | GCR50 Responders [1], n (%) | 6/10 (60.0) |
| | | 95% Confidence Interval [2] | 26.2, 87.8 |
| | GCR70 | 70% Reduction in Tender Joint Count, n/m (%) | 8/10 (80.0) |
| | | 70% Reduction in Swollen Joint Count, n/m (%) | 10/10 (100) |
| | | 70% Reduction in HAQ-Health Score, n/m (%) | 6/10 (60.0) |
| | | 70% Reduction in HAQ-Pain, n/m (%) | 5/10 (50.0) |
| | | GCR70 Responders [1], n (%) | 6/10 (60.0) |
| | | 95% Confidence Interval [2] | 26.2, 87.8 |
| Week 36 | GCR20 | 20% Reduction in Tender Joint Count, n/m (%) | 9/9 (100) |
| | | 20% Reduction in Swollen Joint Count, n/m (%) | 9/9 (100) |
| | | 20% Reduction in HAQ-Health Score, n/m (%) | 6/9 (66.7) |

TABLE 19-continued

Gout Chronic Response - Relative to Methotrexate Baseline (mITT Population)

| Visit in Dual Therapy Period | Category | Parameter Statistics | mITT Population N = 14 |
|---|---|---|---|
| | | 20% Reduction in HAQ-Pain, n/m (%) | 8/9 (88.9) |
| | | GCR20 Responders [1], n (%) | 8/9 (88.9) |
| | | 95% Confidence Interval [2] | 51.8, 99.7 |
| | GCR50 | 50% Reduction in Tender Joint Count, n/m (%) | 9/9 (100) |
| | | 50% Reduction in Swollen Joint Count, n/m (%) | 9/9 (100) |
| | | 50% Reduction in HAQ-Health Score, n/m (%) | 6/9 (66.7) |
| | | 50% Reduction in HAQ-Pain, n/m (%) | 6/9 (66.7) |
| | | GCR50 Responders [1], n (%) | 8/9 (88.9) |
| | | 95% Confidence Interval [2] | 51.8, 99.7 |
| | GCR70 | 70% Reduction in Tender Joint Count, n/m (%) | 9/9 (100) |
| | | 70% Reduction in Swollen Joint Count, n/m (%) | 9/9 (100) |
| | | 70% Reduction in HAQ-Health Score, n/m (%) | 4/9 (44.4) |
| | | 70% Reduction in HAQ-Pain, n/m (%) | 5/9 (55.6) |
| | | GCR70 Responders [1], n (%) | 6/9 (66.7) |
| | | 95% Confidence Interval [2] | 29.9, 92.5 |
| Week 52/ET | GCR20 | 20% Reduction in Tender Joint Count, n/m (%) | 3/3 (100) |
| | | 20% Reduction in Swollen Joint Count, n/m (%) | 3/3 (100) |
| | | 20% Reduction in HAQ-Health Score, n/m (%) | 1/3 (33.3) |
| | | 20% Reduction in HAQ-Pain, n/m (%) | 3/3 (100) |
| | | GCR20 Responders [1], n (%) | 3/3 (100) |
| | | 95% Confidence Interval [2] | 29.2, 100.0 |
| | GCR50 | 50% Reduction in Tender Joint Count, n/m (%) | 2/3 (66.7) |
| | | 50% Reduction in Swollen Joint Count, n/m (%) | 3/3 (100) |
| | | 50% Reduction in HAQ-Health Score, n/m (%) | 1/3 (33.3) |
| | | 50% Reduction in HAQ-Pain, n/m (%) | 3/3 (100) |
| | | GCR50 Responders [1], n (%) | 3/3 (100) |
| | | 95% Confidence Interval [2] | 29.2, 100.0 |
| | GCR70 | 70% Reduction in Tender Joint Count, n/m (%) | 2/3 (66.7) |
| | | 70% Reduction in Swollen Joint Count, n/m (%) | 3/3 (100) |
| | | 70% Reduction in HAQ-Health Score, n/m (%) | 1/3 (33.3) |
| | | 70% Reduction in HAQ-Pain, n/m (%) | 3/3 (100) |
| | | GCR70 Responders [1], n (%) | 3/3 (100) |
| | | 95% Confidence Interval [2] | 29.2, 100.0 |

TABLE 20

Gout Chronic Response - Relative to Pegloticase Baseline (mITT Population)

| Visit in Dual Therapy Period | Category | Parameter Statistics | mITT Population N = 14 |
|---|---|---|---|
| Week 14 | GCR20 | 20% Reduction in Tender Joint Count, n/m (%) | 11/13 (84.6) |
| | | 20% Reduction in Swollen Joint Count, n/m (%) | 11/13 (84.6) |
| | | 20% Reduction in HAQ-Health Score, n/m (%) | 6/13 (46.2) |
| | | 20% Reduction in HAQ-Pain, n/m (%) | 9/13 (69.2) |
| | | GCR20 Responders [1], n (%) | 8/13 (61.5) |
| | | 95% Confidence Interval [2] | 31.6, 86.1 |
| | GCR50 | 50% Reduction in Tender Joint Count, n/m (%) | 8/13 (61.5) |
| | | 50% Reduction in Swollen Joint Count, n/m (%) | 11/13 (84.6) |
| | | 50% Reduction in HAQ-Health Score, n/m (%) | 4/13 (30.8) |
| | | 50% Reduction in HAQ-Pain, n/m (%) | 7/13 (53.8) |
| | | GCR50 Responders [1], n (%) | 5/13 (38.5) |
| | | 95% Confidence Interval [2] | 13.9, 68.4 |
| | GCR70 | 70% Reduction in Tender Joint Count, n/m (%) | 7/13 (53.8) |
| | | 70% Reduction in Swollen Joint Count, n/m (%) | 11/13 (84.6) |
| | | 70% Reduction in HAQ-Health Score, n/m (%) | 3/13 (23.1) |
| | | 70% Reduction in HAQ-Pain, n/m (%) | 5/13 (38.5) |
| | | GCR70 Responders [1], n (%) | 4/13 (30.8) |
| | | 95% Confidence Interval [2] | 9.1, 61.4 |
| Week 24 | GCR20 | 20% Reduction in Tender Joint Count, n/m (%) | 9/10 (90.0) |
| | | 20% Reduction in Swollen Joint Count, n/m (%) | 10/10 (100) |
| | | 20% Reduction in HAQ-Health Score, n/m (%) | 6/10 (60.0) |
| | | 20% Reduction in HAQ-Pain, n/m (%) | 6/10 (60.0) |
| | | GCR20 Responders [1], n (%) | 6/10 (60.0) |
| | | 95% Confidence Interval [2] | 26.2, 87.8 |
| | GCR50 | 50% Reduction in Tender Joint Count, n/m (%) | 8/10 (80.0) |
| | | 50% Reduction in Swollen Joint Count, n/m (%) | 10/10 (100) |
| | | 50% Reduction in HAQ-Health Score, n/m (%) | 6/10 (60.0) |
| | | 50% Reduction in HAQ-Pain, n/m (%) | 5/10 (50.0) |
| | | GCR50 Responders [1], n (%) | 5/10 (50.0) |
| | | 95% Confidence Interval [2] | 18.7, 81.3 |

TABLE 20-continued

Gout Chronic Response - Relative to Pegloticase Baseline (mITT Population)

| Visit in Dual Therapy Period | Category | Parameter Statistics | mITT Population N = 14 |
|---|---|---|---|
| | GCR70 | 70% Reduction in Tender Joint Count, n/m (%) | 7/10 (70.0) |
| | | 70% Reduction in Swollen Joint Count, n/m (%) | 10/10 (100) |
| | | 70% Reduction in HAQ-Health Score, n/m (%) | 6/10 (60.0) |
| | | 70% Reduction in HAQ-Pain, n/m (%) | 5/10 (50.0) |
| | | GCR70 Responders [1], n (%) | 5/10 (50.0) |
| | | 95% Confidence Interval [2] | 18.7, 81.3 |
| Week 36 | GCR20 | 20% Reduction in Tender Joint Count, n/m (%) | 9/9 (100) |
| | | 20% Reduction in Swollen Joint Count, n/m (%) | 9/9 (100) |
| | | 20% Reduction in HAQ-Health Score, n/m (%) | 5/9 (55.6) |
| | | 20% Reduction in HAQ-Pain, n/m (%) | 7/9 (77.8) |
| | | GCR20 Responders [1], n (%) | 7/9 (77.8) |
| | | 95% Confidence Interval [2] | 40.0, 97.2 |
| | GCR50 | 50% Reduction in Tender Joint Count, n/m (%) | 8/9 (88.9) |
| | | 50% Reduction in Swollen Joint Count, n/m (%) | 9/9 (100) |
| | | 50% Reduction in HAQ-Health Score, n/m (%) | 5/9 (55.6) |
| | | 50% Reduction in HAQ-Pain, n/m (%) | 5/9 (55.6) |
| | | GCR50 Responders [1], n (%) | 6/9 (66.7) |
| | | 95% Confidence Interval [2] | 29.9, 92.5 |
| | GCR70 | 70% Reduction in Tender Joint Count, n/m (%) | 7/9 (77.8) |
| | | 70% Reduction in Swollen Joint Count, n/m (%) | 9/9 (100) |
| | | 70% Reduction in HAQ-Health Score, n/m (%) | 5/9 (55.6) |
| | | 70% Reduction in HAQ-Pain, n/m (%) | 4/9 (44.4) |
| | | GCR70 Responders [1], n (%) | 4/9 (44.4) |
| | | 95% Confidence Interval [2] | 13.7, 78.8 |
| Week 52/ET | GCR20 | 20% Reduction in Tender Joint Count, n/m (%) | 2/3 (66.7) |
| | | 20% Reduction in Swollen Joint Count, n/m (%) | 3/3 (100) |
| | | 20% Reduction in HAQ-Health Score, n/m (%) | 1/3 (33.3) |
| | | 20% Reduction in HAQ-Pain, n/m (%) | 3/3 (100) |
| | | GCR20 Responders [1], n (%) | 2/3 (66.7) |
| | | 95% Confidence Interval [2] | 9.4, 99.2 |
| | GCR50 | 50% Reduction in Tender Joint Count, n/m (%) | 2/3 (66.7) |
| | | 50% Reduction in Swollen Joint Count, n/m (%) | 3/3 (100) |
| | | 50% Reduction in HAQ-Health Score, n/m (%) | 1/3 (33.3) |
| | | 50% Reduction in HAQ-Pain, n/m (%) | 3/3 (100) |
| | | GCR50 Responders [1], n (%) | 2/3 (66.7) |
| | | 95% Confidence Interval [2] | 9.4, 99.2 |
| | GCR70 | 70% Reduction in Tender Joint Count, n/m (%) | 1/3 (33.3) |
| | | 70% Reduction in Swollen Joint Count, n/m (%) | 3/3 (100) |
| | | 70% Reduction in HAQ-Health Score, n/m (%) | 1/3 (33.3) |
| | | 70% Reduction in HAQ-Pain, n/m (%) | 3/3 (100) |
| | | GCR70 Responders [1], n (%) | 2/3 (66.7) |
| | | 95% Confidence Interval [2] | 9.4, 99.2 |

Assessment of Safety of KXX+MTX Treatment (ADD 195-200 HERE (SAFETY))

TABLE 21

Treatment-Emergent Adverse Events by System Organ Class and Preferred Term during the Methotrexate Run-in Period (ITT Population and mITT Population)

| System Organ Class Preferred Term | ITT Population (N = 15)/ Total PY of MTX = 1.1 | | mITT Population (N = 14)/ Total PY of MTX = 1.0 | |
|---|---|---|---|---|
| | n (%) | Total Events/Incidence Rate (Events/PY of MTX) | n (%) | Total Events/Incidence Rate (Events/PY of MTX) |
| Any TEAEs | 10 (66.7) | 20/18.2 | 10 (71.4) | 20/20.0 |
| Blood And Lymphatic System Disorders | 1 (6.7) | 2/1.8 | 1 (7.1) | 2/2.0 |
| Leukopenia | 1 (6.7) | 1/0.9 | 1 (7.1) | 1/1.0 |
| Neutropenia | 1 (6.7) | 1/0.9 | 1 (7.1) | 1/1.0 |
| Eye Disorders | 1 (6.7) | 1/0.9 | 1 (7.1) | 1/1.0 |
| Dry Eye | 1 (6.7) | 1/0.9 | 1 (7.1) | 1/1.0 |
| Gastrointestinal Disorders | 5 (33.3) | 6/5.5 | 5 (35.7) | 6/6.0 |
| Abdominal Discomfort | 2 (13.3) | 2/1.8 | 2 (14.3) | 2/2.0 |
| Dental Caries | 1 (6.7) | 1/0.9 | 1 (7.1) | 1/1.0 |
| Diarrhoea | 1 (6.7) | 1/0.9 | 1 (7.1) | 1/1.0 |
| Nausea | 2 (13.3) | 2/1.8 | 2 (14.3) | 2/2.0 |
| Infections And Infestations | 2 (13.3) | 2/1.8 | 2 (14.3) | 2/2.0 |
| Chronic Sinusitis | 1 (6.7) | 1/0.9 | 1 (7.1) | 1/1.0 |
| Nasopharyngitis | 1 (6.7) | 1/0.9 | 1 (7.1) | 1/1.0 |
| Metabolism And Nutrition Disorders | 5 (33.3) | 6/5.5 | 5 (35.7) | 6/6.0 |

TABLE 21-continued

Treatment-Emergent Adverse Events by System Organ Class and Preferred Term during the Methotrexate Run-in Period (ITT Population and mITT Population)

| System Organ Class Preferred Term | ITT Population (N = 15)/ Total PY of MTX = 1.1 | | mITT Population (N = 14)/ Total PY of MTX = 1.0 | |
|---|---|---|---|---|
| | n (%) | Total Events/Incidence Rate (Events/PY of MTX) | n (%) | Total Events/Incidence Rate (Events/PY of MTX) |
| Gout | 5 (33.3) | 6/5.5 | 5 (35.7) | 6/6.0 |
| Nervous System Disorders | 1 (6.7) | 1/0.9 | 1 (7.1) | 1/1.0 |
| Headache | 1 (6.7) | 1/0.9 | 1 (7.1) | 1/1.0 |
| Respiratory, Thoracic And Mediastinal Disorders | 1 (6.7) | 1/0.9 | 1 (7.1) | 1/1.0 |
| Cough | 1 (6.7) | 1/0.9 | 1 (7.1) | 1/1.0 |
| Skin And Subcutaneous Tissue Disorders | 1 (6.7) | 1/0.9 | 1 (7.1) | 1/1.0 |
| Pruritus | 1 (6.7) | 1/0.9 | 1 (7.1) | 1/1.0 |

TABLE 22

Treatment-Emergent Adverse Events by System Organ Class and Preferred Term during the Pegloticase + Immunomodulator Period Through Week 24 (mITT Population)

| System Organ Class Preferred Term | n (%) | Total Events/Incidence Rate (Events/PY of MTX) | Total Events/Incidence Rate (Events/PY of Pegloticase) |
|---|---|---|---|
| | mITT Population (N = 14)/ Total PY of MTX = 5.2/ Total PY of Pegloticase = 5.4 | | |
| Any TEAEs | 14 (100) | 110/21.2 | 110/20.4 |
| Eye Disorders | 1 (7.1) | 1/0.2 | 1/0.2 |
| Eye Irritation | 1 (7.1) | 1/0.2 | 1/0.2 |
| Gastrointestinal Disorders | 4 (28.6) | 7/1.3 | 7/1.3 |
| Abdominal Pain | 1 (7.1) | 1/0.2 | 1/0.2 |
| Constipation | 1 (7.1) | 1/0.2 | 1/0.2 |
| Diarrhoea | 3 (21.4) | 3/0.6 | 3/0.6 |
| Gastrooesophageal Reflux Disease | 1 (7.1) | 1/0.2 | 1/0.2 |
| Tooth Impacted | 1 (7.1) | 1/0.2 | 1/0.2 |
| General Disorders And Administration Site Conditions | 1 (7.1) | 1/0.2 | 1/0.2 |
| Non-Cardiac Chest Pain | 1 (7.1) | 1/0.2 | 1/0.2 |
| Hepatobiliary Disorders | 1 (7.1) | 1/0.2 | 1/0.2 |
| Cholecystitis Acute | 1 (7.1) | 1/0.2 | 1/0.2 |
| Infections And Infestations | 7 (50.0) | 10/1.9 | 10/1.9 |
| Bacterial Sepsis | 1 (7.1) | 1/0.2 | 1/0.2 |
| Chronic Sinusitis | 1 (7.1) | 1/0.2 | 1/0.2 |
| Gastroenteritis Viral | 1 (7.1) | 1/0.2 | 1/0.2 |
| Influenza | 1 (7.1) | 1/0.2 | 1/0.2 |
| Nasopharyngitis | 1 (7.1) | 1/0.2 | 1/0.2 |
| Sinusitis | 2 (14.3) | 2/0.4 | 2/0.4 |
| Upper Respiratory Tract Infection | 3 (21.4) | 3/0.6 | 3/0.6 |
| Injury, Poisoning And Procedural Complications | 3 (21.4) | 4/0.8 | 4/0.7 |
| Infusion Related Reaction | 1 (7.1) | 1/0.2 | 1/0.2 |
| Limb Injury | 1 (7.1) | 1/0.2 | 1/0.2 |
| Muscle Strain | 2 (14.3) | 2/0.4 | 2/0.4 |
| Investigations | 2 (14.3) | 2/0.4 | 2/0.4 |
| Alanine Aminotransferase Increased | 1 (7.1) | 1/0.2 | 1/0.2 |
| Liver Function Test Increased | 1 (7.1) | 1/0.2 | 1/0.2 |
| Metabolism And Nutrition Disorders | 12 (85.7) | 68/13.1 | 68/12.6 |
| Gout | 12 (85.7) | 67/12.9 | 67/12.4 |
| Hypercholesterolaemia | 1 (7.1) | 1/0.2 | 1/0.2 |
| Musculoskeletal And Connective Tissue Disorders | 3 (21.4) | 3/0.6 | 3/0.6 |
| Arthralgia | 1 (7.1) | 1/0.2 | 1/0.2 |
| Plantar Fasciitis | 1 (7.1) | 1/0.2 | 1/0.2 |
| Tendonitis | 1 (7.1) | 1/0.2 | 1/0.2 |
| Nervous System Disorders | 3 (21.4) | 4/0.8 | 4/0.7 |
| Carpal Tunnel Syndrome | 1 (7.1) | 1/0.2 | 1/0.2 |
| Dysgeusia | 1 (7.1) | 1/0.2 | 1/0.2 |
| Headache | 1 (7.1) | 1/0.2 | 1/0.2 |
| Parosmia | 1 (7.1) | 1/0.2 | 1/0.2 |
| Renal And Urinary Disorders | 1 (7.1) | 1/0.2 | 1/0.2 |
| Dysuria | 1 (7.1) | 1/0.2 | 1/0.2 |
| Respiratory, Thoracic And Mediastinal Disorders | 1 (7.1) | 1/0.2 | 1/0.2 |

TABLE 22-continued

Treatment-Emergent Adverse Events by System Organ Class and Preferred Term during the Pegloticase + Immunomodulator Period Through Week 24 (mITT Population)

|  | mITT Population (N = 14)/ Total PY of MTX = 5.2/ Total PY of Pegloticase = 5.4 | | |
|---|---|---|---|
| System Organ Class Preferred Term | n (%) | Total Events/Incidence Rate (Events/PY of MTX) | Total Events/Incidence Rate (Events/PY of Pegloticase) |
| Cough | 1 (7.1) | 1/0.2 | 1/0.2 |
| Skin And Subcutaneous Tissue Disorders | 3 (21.4) | 4/0.8 | 4/0.7 |
| Pruritus | 1 (7.1) | 2/0.4 | 2/0.4 |
| Rash Papular | 1 (7.1) | 1/0.2 | 1/0.2 |
| Skin Lesion | 1 (7.1) | 1/0.2 | 1/0.2 |
| Vascular Disorders | 2 (14.3) | 2/0.4 | 2/0.4 |
| Hypertension | 2 (14.3) | 2/0.4 | 2/0.4 |
| Uncoded | 1 (7.1) | 1/0.2 | 1/0.2 |
| Uncoded | 1 (7.1) | 1/0.2 | 1/0.2 |

Assessment of Adverse Events for Treatment with KXX+ MTX (ADD 230-248 HERE (GOUT FLARE))

TABLE 23

Treatment-Emergent Adverse Events of Special Interest during the Methotrexate Run-in Period: Gout Flares (ITT Population and mITT Population)

| Preferred Term | ITT Population N = 15 | mITT Population N = 14 |
|---|---|---|
| Gout Flares, n (%) | 5 (33.3) | 5 (35.7) |
| Number of Gout Flares per Subject, n (%) | | |
| 1 | 4 (26.7) | 4 (28.6) |
| 2 | 1 (6.7) | 1 (7.1) |
| Among subjects with at least one gout flare | | |
| Mean (SD) | 1.2 (0.45) | 1.2 (0.45) |
| Median | 1.0 | 1.0 |
| Min, Max | 1, 2 | 1, 2 |

TABLE 24

Treatment-Emergent Adverse Events of Special Interest during the Pegloticase + Immunomodulator Period Through Week 24: Gout Flares (mITT Population)

| Preferred Term Time Period | mITT Population N = 14 n/m (%) |
|---|---|
| Gout Flares | |
| Full Pegloticase + Immunomodulator Period Number of Gout Flares per Subject | 12/14 (85.7) |
| 1 | 1/14 (7.1) |
| 2 | 2/14 (14.3) |
| 3 | 1/14 (7.1) |
| 4 | 1/14 (7.1) |
| 5 | 3/14 (21.4) |
| 6 | 1/14 (7.1) |
| 9 | 1/14 (7.1) |
| 10 | 1/14 (7.1) |
| 15 | 1/14 (7.1) |
| Among subjects with at least one gout flare | |
| Mean (SD) | 5.6 (4.01) |
| Median | 5.0 |

TABLE 24-continued

Treatment-Emergent Adverse Events of Special Interest during the Pegloticase + Immunomodulator Period Through Week 24: Gout Flares (mITT Population)

| Preferred Term Time Period | mITT Population N = 14 n/m (%) |
|---|---|
| Min, Max | 1, 15 |
| Day 1-Week 12 of the Pegloticase + Immunomodulator Period | 12/14 (85.7) |
| Number of Gout Flares per Subject | |
| 1 | 1/14 (7.1) |
| 2 | 2/14 (14.3) |
| 3 | 1/14 (7.1) |
| 4 | 3/14 (21.4) |
| 5 | 1/14 (7.1) |
| 6 | 2/14 (14.3) |
| 7 | 1/14 (7.1) |
| 8 | 1/14 (7.1) |
| Among subjects with at least one gout flare | |
| Mean (SD) | 4.3 (2.15) |
| Median | 4.0 |
| Min, Max | 1, 8 |
| >Week 12-Week 24 of the Pegloticase + Immunomodulator Period | 5/11 (45.5) |
| Number of Gout Flares per Subject | |
| 1 | 2/11 (18.2) |
| 2 | 1/11 (9.1) |
| 4 | 1/11 (9.1) |
| 7 | 1/11 (9.1) |
| Among subjects with at least one gout flare | |
| Mean (SD) | 3.0 (2.55) |
| Median | 2.0 |
| Min, Max | 1, 7 |

TABLE 25

Assessment of Gout Flares during the Methotrexate Run-in Period and Pegloticase + Immunomodulator Period (ITT Population and mITT Population)

| Time Point | | ITT Population N = 15 | mITT Population N = 14 |
|---|---|---|---|
| Week −4 | Number Assessed | 14 | 13 |
| | Any Gout Flares Since the Last Visit, n (%) | 8 (57.1) | 7 (53.8) |
| | If Yes, the following are assessed | | |
| | Pain different than normal, n (%) | 6 (42.9) | 5 (38.5) |
| | Pain at rest >3 out of 10, n (%) | 7 (50.0) | 6 (46.2) |
| | Swelling in Joints, n (%) | 7 (50.0) | 6 (46.2) |
| | Maximum Reported Intensity of Flare (0-10 scale) [1] | | |
| | n | 6 | 5 |
| | Mean (SD) | 8.5 (1.22) | 8.2 (1.10) |
| | Median | 8.0 | 8.0 |
| | Min, Max | 7, 10 | 7, 10 |
| Day 1 | Number Assessed | 14 | 14 |
| | Any Gout Flares Since the Last Visit, n (%) | 8 (57.1) | 8 (57.1) |
| | If Yes, the following are assessed | | |
| | Pain different than normal, n (%) | 7 (50.0) | 7 (50.0) |
| | Pain at rest >3 out of 10, n (%) | 8 (57.1) | 8 (57.1) |
| | Swelling in Joints, n (%) | 6 (42.9) | 6 (42.9) |
| | Maximum Reported Intensity of Flare (0-10 scale) [1] | | |
| | n | 8 | 8 |
| | Mean (SD) | 5.8 (1.28) | 5.8 (1.28) |
| | Median | 5.5 | 5.5 |
| | Min, Max | 4, 8 | 4, 8 |
| Week 2 | Number Assessed | NA | 14 |
| | Any Gout Flares Since the Last Visit, n (%) | | 12 (85.7) |
| | If Yes, the following are assessed | | |
| | Pain different than normal, n (%) | | 11 (78.6) |
| | Pain at rest >3 out of 10, n (%) | | 12 (85.7) |
| | Swelling in Joints, n (%) | | 10 (71.4) |
| | Maximum Reported Intensity of Flare (0-10 scale) [1] | | |
| | n | | 12 |
| | Mean (SD) | | 6.5 (1.17) |
| | Median | | 7.0 |
| | Min, Max | | 4, 8 |
| Week 4 | Number Assessed | NA | 14 |
| | Any Gout Flares Since the Last Visit, n (%) | | 11 (78.6) |
| | If Yes, the following are assessed | | |
| | Pain different than normal, n (%) | | 9 (64.3) |
| | Pain at rest >3 out of 10, n (%) | | 9 (64.3) |
| | Swelling in Joints, n (%) | | 9 (64.3) |
| | Maximum Reported Intensity of Flare (0-10 scale) [1] | | |
| | n | | 11 |
| | Mean (SD) | | 6.5 (2.62) |
| | Median | | 7.0 |
| | Min, Max | | 2, 10 |
| Week 6 | Number Assessed | NA | 13 |
| | Any Gout Flares Since the Last Visit, n (%) | | 9 (69.2) |
| | If Yes, the following are assessed | | |
| | Pain different than normal, n (%) | | 8 (61.5) |
| | Pain at rest >3 out of 10, n (%) | | 7 (53.8) |
| | Swelling in Joints, n (%) | | 8 (61.5) |
| | Maximum Reported Intensity of Flare (0-10 scale) [1] | | |
| | n | | 9 |
| | Mean (SD) | | 6.0 (2.18) |
| | Median | | 6.0 |
| | Min, Max | | 3, 9 |
| Week 8 | Number Assessed | NA | 12 |
| | Any Gout Flares Since the Last Visit, n (%) | | 7 (58.3) |
| | If Yes, the following are assessed | | |
| | Pain different than normal, n (%) | | 5 (41.7) |
| | Pain at rest >3 out of 10, n (%) | | 6 (50.0) |
| | Swelling in Joints, n (%) | | 5 (41.7) |

TABLE 25-continued

Assessment of Gout Flares during the Methotrexate Run-in Period and Pegloticase + Immunomodulator Period (ITT Population and mITT Population)

| Time Point | | ITT Population N = 15 | mITT Population N = 14 |
|---|---|---|---|
| | Maximum Reported Intensity of Flare (0-10 scale) [1] | | |
| Week 10 | n | | 6 |
| | Mean (SD) | | 5.8 (2.23) |
| | Median | | 6.0 |
| | Min, Max | | 2, 8 |
| | Number Assessed | NA | 12 |
| | Any Gout Flares Since the Last Visit, n (%) | | 6 (50.0) |
| | If Yes, the following are assessed | | |
| | Pain different than normal, n (%) | | 4 (33.3) |
| | Pain at rest >3 out of 10, n (%) | | 4 (33.3) |
| | Swelling in Joints, n (%) | | 4 (33.3) |
| | Maximum Reported Intensity of Flare (0-10 scale) [1] | | |
| Week 12 | n | | 5 |
| | Mean (SD) | | 6.2 (2.86) |
| | Median | | 6.0 |
| | Min, Max | | 3, 10 |
| | Number Assessed | NA | 11 |
| | Any Gout Flares Since the Last Visit, n (%) | | 7 (63.6) |
| | If Yes, the following are assessed | | |
| | Pain different than normal, n (%) | | 5 (45.5) |
| | Pain at rest >3 out of 10, n (%) | | 5 (45.5) |
| | Swelling in Joints, n (%) | | 4 (36.4) |
| | Maximum Reported Intensity of Flare (0-10 scale) [1] | | |
| Week 14 | n | | 6 |
| | Mean (SD) | | 4.3 (0.82) |
| | Median | | 4.5 |
| | Min, Max | | 3, 5 |
| | Number Assessed | NA | 11 |
| | Any Gout Flares Since the Last Visit, n (%) | | 5 (45.5) |
| | If Yes, the following are assessed | | |
| | Pain different than normal, n (%) | | 4 (36.4) |
| | Pain at rest >3 out of 10, n (%) | | 3 (27.3) |
| | Swelling in Joints, n (%) | | 3 (27.3) |
| | Maximum Reported Intensity of Flare (0-10 scale) [1] | | |
| Week 16 | n | | 4 |
| | Mean (SD) | | 5.0 (2.45) |
| | Median | | 4.5 |
| | Min, Max | | 3, 8 |
| | Number Assessed | NA | 11 |
| | Any Gout Flares Since the Last Visit, n (%) | | 4 (36.4) |
| | If Yes, the following are assessed | | |
| | Pain different than normal, n (%) | | 3 (27.3) |
| | Pain at rest >3 out of 10, n (%) | | 3 (27.3) |
| | Swelling in Joints, n (%) | | 2 (18.2) |
| | Maximum Reported Intensity of Flare (0-10 scale) [1] | | |
| Week 18 | n | | 3 |
| | Mean (SD) | | 5.0 (1.73) |
| | Median | | 6.0 |
| | Min, Max | | 3, 6 |
| | Number Assessed | NA | 11 |
| | Any Gout Flares Since the Last Visit, n (%) | | 5 (45.5) |
| | If Yes, the following are assessed | | |
| | Pain different than normal, n (%) | | 3 (27.3) |
| | Pain at rest >3 out of 10, n (%) | | 3 (27.3) |
| | Swelling in Joints, n (%) | | 3 (27.3) |
| | Maximum Reported Intensity of Flare (0-10 scale) [1] | | |
| | n | | 3 |
| | Mean (SD) | | 6.3 (1.53) |
| | Median | | 6.0 |
| | Min, Max | | 5, 8 |

TABLE 25-continued

Assessment of Gout Flares during the Methotrexate Run-in Period and Pegloticase + Immunomodulator Period (ITT Population and mITT Population)

| Time Point | | ITT Population N = 15 | mITT Population N = 14 |
|---|---|---|---|
| Week 20 | Number Assessed | NA | 11 |
| | Any Gout Flares Since the Last Visit, n (%) | | 4 (36.4) |
| | If Yes, the following are assessed | | |
| | Pain different than normal, n (%) | | 2 (18.2) |
| | Pain at rest >3 out of 10, n (%) | | 3 (27.3) |
| | Swelling in Joints, n (%) | | 3 (27.3) |
| | Maximum Reported Intensity of Flare (0-10 scale) [1] | | |
| | n | | 3 |
| | Mean (SD) | | 6.7 (0.58) |
| | Median | | 7.0 |
| | Min, Max | | 6, 7 |
| Week 22 | Number Assessed | NA | 11 |
| | Any Gout Flares Since the Last Visit, n (%) | | 3 (27.3) |
| | If Yes, the following are assessed | | |
| | Pain different than normal, n (%) | | 2 (18.2) |
| | Pain at rest >3 out of 10, n (%) | | 3 (27.3) |
| | Swelling in Joints, n (%) | | 2 (18.2) |
| | Maximum Reported Intensity of Flare (0-10 scale) [1] | | |
| | n | | 2 |
| | Mean (SD) | | 9.0 (0.00) |
| | Median | | 9.0 |
| | Min, Max | | 9, 9 |
| Week 24 | Number Assessed | NA | 11 |
| | Any Gout Flares Since the Last Visit, n (%) | | 2 (18.2) |
| | If Yes, the following are assessed | | |
| | Pain different than normal, n (%) | | 1 (9.1) |
| | Pain at rest >3 out of 10, n (%) | | 1 (9.1) |
| | Swelling in Joints, n (%) | | 1 (9.1) |
| | Maximum Reported Intensity of Flare (0-10 scale) [1] | | |
| | n | | 1 |
| | Mean (SD) | | 8.0 (NE) |
| | Median | | 8.0 |
| | Min, Max | | 8, 8 |
| Week 26 | Number Assessed | NA | 10 |
| | Any Gout Flares Since the Last Visit, n (%) | | 3 (30.0) |
| | If Yes, the following are assessed | | |
| | Pain different than normal, n (%) | | 2 (20.0) |
| | Pain at rest >3 out of 10, n (%) | | 3 (30.0) |
| | Swelling in Joints, n (%) | | 2 (20.0) |
| | Maximum Reported Intensity of Flare (0-10 scale) [1] | | |
| | n | | 2 |
| | Mean (SD) | | 7.5 (0.71) |
| | Median | | 7.5 |
| | Min, Max | | 7, 8 |
| Week 28 | Number Assessed | NA | 10 |
| | Any Gout Flares Since the Last Visit, n (%) | | 2 (20.0) |
| | If Yes, the following are assessed | | |
| | Pain different than normal, n (%) | | 0 |
| | Pain at rest >3 out of 10, n (%) | | 0 |
| | Swelling in Joints, n (%) | | 0 |
| | Maximum Reported Intensity of Flare (0-10 scale) [1] | | |
| | n | | 1 |
| | Mean (SD) | | 3.0 (NE) |
| | Median | | 3.0 |
| | Min, Max | | 3, 3 |
| Week 30 | Number Assessed | NA | 10 |
| | Any Gout Flares Since the Last Visit, n (%) | | 1 (10.0) |
| | If Yes, the following are assessed | | |
| | Pain different than normal, n (%) | | 1 (10.0) |
| | Pain at rest >3 out of 10, n (%) | | 1 (10.0) |
| | Swelling in Joints, n (%) | | 0 |

TABLE 25-continued

Assessment of Gout Flares during the Methotrexate Run-in Period and Pegloticase + Immunomodulator Period (ITT Population and mITT Population)

| Time Point | | ITT Population N = 15 | mITT Population N = 14 |
|---|---|---|---|
| | Maximum Reported Intensity of Flare (0-10 scale) [1] | | |
| Week 32 | n | | 1 |
| | Mean (SD) | | 5.0 (NE) |
| | Median | | 5.0 |
| | Min, Max | | 5, 5 |
| | Number Assessed | NA | 10 |
| | Any Gout Flares Since the Last Visit, n (%) | | 1 (10.0) |
| | If Yes, the following are assessed | | |
| | Pain different than normal, n (%) | | 1 (10.0) |
| | Pain at rest >3 out of 10, n (%) | | 1 (10.0) |
| | Swelling in Joints, n (%) | | 0 |
| | Maximum Reported Intensity of Flare (0-10 scale) [1] | | |
| Week 34 | n | | 1 |
| | Mean (SD) | | 7.0 (NE) |
| | Median | | 7.0 |
| | Min, Max | | 7, 7 |
| | Number Assessed | NA | 10 |
| | Any Gout Flares Since the Last Visit, n (%) | | 2 (20.0) |
| | If Yes, the following are assessed | | |
| | Pain different than normal, n (%) | | 2 (20.0) |
| | Pain at rest >3 out of 10, n (%) | | 2 (20.0) |
| | Swelling in Joints, n (%) | | 1 (10.0) |
| | Maximum Reported Intensity of Flare (0-10 scale) [1] | | |
| Week 36 | n | | 2 |
| | Mean (SD) | | 7.0 (4.24) |
| | Median | | 7.0 |
| | Min, Max | | 4, 10 |
| | Number Assessed | NA | 8 |
| | Any Gout Flares Since the Last Visit, n (%) | | 2 (25.0) |
| | If Yes, the following are assessed | | |
| | Pain different than normal, n (%) | | 2 (25.0) |
| | Pain at rest >3 out of 10, n (%) | | 1 (12.5) |
| | Swelling in Joints, n (%) | | 1 (12.5) |
| | Maximum Reported Intensity of Flare (0-10 scale) [1] | | |
| Week 38 | n | | 1 |
| | Mean (SD) | | 8.0 (NE) |
| | Median | | 8.0 |
| | Min, Max | | 8, 8 |
| | Number Assessed | NA | 6 |
| | Any Gout Flares Since the Last Visit, n (%) | | 2 (33.3) |
| | If Yes, the following are assessed | | |
| | Pain different than normal, n (%) | | 2 (33.3) |
| | Pain at rest >3 out of 10, n (%) | | 1 (16.7) |
| | Swelling in Joints, n (%) | | 1 (16.7) |
| | Maximum Reported Intensity of Flare (0-10 scale) [1] | | |
| Week 40 | n | | 2 |
| | Mean (SD) | | 4.0 (2.83) |
| | Median | | 4.0 |
| | Min, Max | | 2, 6 |
| | Number Assessed | NA | 4 |
| | Any Gout Flares Since the Last Visit, n (%) | | 0 |
| | If Yes, the following are assessed | | |
| | Pain different than normal, n (%) | | 0 |
| | Pain at rest >3 out of 10, n (%) | | 0 |
| | Swelling in Joints, n (%) | | 0 |
| | Maximum Reported Intensity of Flare (0-10 scale) [1] | | |
| Week 42 | n | | 0 |
| | Mean (SD) | | |
| | Median | | |
| | Min, Max | | |
| | Number Assessed | NA | 4 |
| | Any Gout Flares Since the Last Visit, n (%) | | 1 (25.0) |

TABLE 25-continued

Assessment of Gout Flares during the Methotrexate Run-in Period and Pegloticase + Immunomodulator Period (ITT Population and mITT Population)

| Time Point | | ITT Population N = 15 | mITT Population N = 14 |
|---|---|---|---|
| | If Yes, the following are assessed | | |
| | Pain different than normal, n (%) | | 0 |
| | Pain at rest >3 out of 10, n (%) | | 1 (25.0) |
| | Swelling in Joints, n (%) | | 1 (25.0) |
| | Maximum Reported Intensity of Flare (0-10 scale) [1] | | |
| | n | | 1 |
| | Mean (SD) | | 8.0 (NE) |
| | Median | | 8.0 |
| | Min, Max | | 8, 8 |
| Week 44 | Number Assessed | NA | 4 |
| | Any Gout Flares Since the Last Visit, n (%) | | 0 |
| | If Yes, the following are assessed | | |
| | Pain different than normal, n (%) | | 0 |
| | Pain at rest >3 out of 10, n (%) | | 0 |
| | Swelling in Joints, n (%) | | 0 |
| | Maximum Reported Intensity of Flare (0-10 scale) [1] | | |
| | n | | 0 |
| | Mean (SD) | | |
| | Median | | |
| | Min, Max | | |
| Week 46 | Number Assessed | NA | 3 |
| | Any Gout Flares Since the Last Visit, n (%) | | 0 |
| | If Yes, the following are assessed | | |
| | Pain different than normal, n (%) | | 0 |
| | Pain at rest >3 out of 10, n (%) | | 0 |
| | Swelling in Joints, n (%) | | 0 |
| | Maximum Reported Intensity of Flare (0-10 scale) [1] | | |
| | n | | 0 |
| | Mean (SD) | | |
| | Median | | |
| | Min, Max | | |
| Week 48 | Number Assessed | NA | 3 |
| | Any Gout Flares Since the Last Visit, n (%) | | 0 |
| | If Yes, the following are assessed | | |
| | Pain different than normal, n (%) | | 0 |
| | Pain at rest >3 out of 10, n (%) | | 0 |
| | Swelling in Joints, n (%) | | 0 |
| | Maximum Reported Intensity of Flare (0-10 scale) [1] | | |
| | n | | 0 |
| | Mean (SD) | | |
| | Median | | |
| | Min, Max | | |
| Week 50 | Number Assessed | NA | 3 |
| | Any Gout Flares Since the Last Visit, n (%) | | 0 |
| | If Yes, the following are assessed | | |
| | Pain different than normal, n (%) | | 0 |
| | Pain at rest >3 out of 10, n (%) | | 0 |
| | Swelling in Joints, n (%) | | 0 |
| | Maximum Reported Intensity of Flare (0-10 scale) [1] | | |
| | n | | 0 |
| | Mean (SD) | | |
| | Median | | |
| | Min, Max | | |
| Week 52/ET | Number Assessed | NA | 3 |
| | Any Gout Flares Since the Last Visit, n (%) | | 0 |
| | If Yes, the following are assessed | | |
| | Pain different than normal, n (%) | | 0 |
| | Pain at rest >3 out of 10, n (%) | | 0 |
| | Swelling in Joints, n (%) | | 0 |

TABLE 25-continued

Assessment of Gout Flares during the Methotrexate Run-in Period and Pegloticase + Immunomodulator Period (ITT Population and mITT Population)

| Time Point | | ITT Population N = 15 | mITT Population N = 14 |
|---|---|---|---|
| | Maximum Reported Intensity of Flare (0-10 scale) [1] | | |
| | n | | 0 |
| | Mean (SD) | | |
| | Median | | |
| | Min, Max | | |
| End of Pegloticase Infusions Visit | Number Assessed | NA | 2 |
| | Any Gout Flares Since the Last Visit, n (%) | | 1 (50.0) |
| | If Yes, the following are assessed | | |
| | Pain different than normal, n (%) | | 1 (50.0) |
| | Pain at rest >3 out of 10, n (%) | | 1 (50.0) |
| | Swelling in Joints, n (%) | | 1 (50.0) |
| | Maximum Reported Intensity of Flare (0-10 scale) [1] | | |
| | n | | 1 |
| | Mean (SD) | | 8.0 (NE) |
| | Median | | 8.0 |
| | Min, Max | | 8, 8 |

Extent of Methotrexate Exposure (ADD 670-676 HERE)

TABLE 26

Extent of Methotrexate Exposure

| Period Variable Statistic | ITT Population N = 15 | mITT Population N = 14 |
|---|---|---|
| MTX Run-in Period | | |
| Duration of MTX Treatment (days) [1] | | |
| n | 15 | 14 |
| Mean (SD) | 23.0 (4.90) | 24.1 (2.70) |
| Median | 22.0 | 22.0 |
| Min, Max | 8, 28 | 21, 28 |
| Total Dosage (mg) [2] | | |
| n | 15 | 14 |
| Mean (SD) | 64.0 (11.98) | 66.4 (7.70) |
| Median | 60.0 | 60.0 |
| Min, Max | 30, 75 | 60, 75 |
| Any Reductions in dosage from planned 15 mg/week, n (%) [3] | 0 | 0 |
| Pegloticase + Immunomodulator Period Through Week 24 | | |
| Duration of MTX Treatment (days) [1] | | |
| n | 14 | 14 |
| Mean (SD) | 132.2 (50.95) | 132.2 (50.95) |
| Median | 161.5 | 161.5 |
| Min, Max | 22, 164 | 22, 164 |
| Total Dosage (mg) [2] | | |
| n | 14 | 14 |
| Mean (SD) | 288.9 (112.08) | 288.9 (112.08) |
| Median | 357.5 | 357.5 |
| Min, Max | 60, 375 | 60, 375 |
| Any Reductions in dosage from planned 15 mg/week, n (%) [3] | 3 (20.0) | 3 (21.4) |
| Overall | | |
| Duration of MTX Treatment (days) [4] | | |
| n | 15 | 14 |
| Mean (SD) | 152.7 (63.41) | 163.1 (51.02) |
| Median | 190.0 | 190.0 |
| Min, Max | 8, 198 | 57, 198 |
| Total Dosage (mg) [5] | | |
| n | 15 | 14 |
| Mean (SD) | 333.7 (137.78) | 355.4 (113.33) |
| Median | 415.0 | 417.5 |

TABLE 26-continued

Extent of Methotrexate Exposure

| Period<br>Variable<br>Statistic | ITT Population<br>N = 15 | mITT Population<br>N = 14 |
|---|---|---|
| Min, Max | 30, 450 | 135, 450 |
| Any Reductions in dosage from planned 15 mg/week, n (%) [3] | 3 (20.0) | 3 (21.4) |

TABLE 27

Extent of Pegloticase Exposure in the Pegloticase + Immunomodulator Period Through Week 24 (mITT Population)

| | mITT Population<br>N = 14 |
|---|---|
| Pegloticase + Immunomodulator Treatment Period<br>Number of Infusions Received Overall, n (%) [1] | |
| 2 | 1 (7.1) |
| 3 | 1 (7.1) |
| 5 | 1 (7.1) |
| 12 | 3 (21.4) |
| 13 | 8 (57.1) |
| Mean (SD) | 10.7 (4.07) |
| Median | 13.0 |
| Min, Max | 2, 13 |
| Duration of Exposure (days) [2] | |
| n | 14 |
| Mean (SD) | 137.3 (56.89) |
| Median | 168.5 |
| Min, Max | 16, 172 |
| Number of Incomplete Infusions Received, n (%) [1] [3] | |
| 0 Incomplete Infusions | 14 (100) |
| At Least 1 Incomplete Infusion | 0 (0.0) |
| Mean (SD) | |
| Median | |
| Min, Max | |
| Number of Infusions Received with Interruption, n (%) [1] | |
| 0 Infusions with Interruptions | 13 (92.9) |
| At Least 1 Infusion with Interruption | 1 (7.1) |
| 2 | 1 (7.1) |
| Mean (SD) | 2.0 (NE) |
| Median | 2.0 |
| Min, Max | 2, 2 |
| Day 1 Infusion | |
| Number of Subjects Infused | 14 |
| Complete Infusion, n (%) [3] [4] | 14 (100) |
| Completed Infusion without Interruption, n (%) [4] | 14 (100) |
| Interrupted Infusion, n (%) [4] | 0 |
| Week 2 Infusion | |
| Number of Subjects Infused | 14 |
| Complete Infusion, n (%) [3] [4] | 14 (100) |
| Completed Infusion without Interruption, n (%) [4] | 14 (100) |
| Interrupted Infusion, n (%) [4] | 0 |
| Week 4 Infusion | |
| Number of Subjects Infused | 13 |
| Complete Infusion, n (%) [3] [4] | 13 (100) |
| Completed Infusion without Interruption, n (%) [4] | 13 (100) |
| Interrupted Infusion, n (%) [4] | 0 |
| Week 6 Infusion | |
| Number of Subjects Infused | 12 |
| Complete Infusion, n (%) [3] [4] | 12 (100) |
| Completed Infusion without Interruption, n (%) [4] | 12 (100) |
| Interrupted Infusion, n (%) [4] | 0 |
| Week 8 Infusion | |
| Number of Subjects Infused | 12 |
| Complete Infusion, n (%) [3] [4] | 12 (100) |

TABLE 27-continued

Extent of Pegloticase Exposure in the Pegloticase + Immunomodulator Period Through Week 24 (mITT Population)

| | mITT Population N = 14 |
|---|---|
| Completed Infusion without Interruption, n (%) [4] | 11 (91.7) |
| Interrupted Infusion, n (%) [4] | 1 (8.3) |
| Week 10 Infusion | |
| Number of Subjects Infused | 11 |
| Complete Infusion, n (%) [3] [4] | 11 (100) |
| Completed Infusion without Interruption, n (%) [4] | 11 (100) |
| Interrupted Infusion, n (%) [4] | 0 |
| Week 12 Infusion | |
| Number of Subjects Infused | 11 |
| Complete Infusion, n (%) [3] [4] | 11 (100) |
| Completed Infusion without Interruption, n (%) [4] | 11 (100) |
| Interrupted Infusion, n (%) [4] | 0 |
| Week 14 Infusion | |
| Number of Subjects Infused | 11 |
| Complete Infusion, n (%) [3] [4] | 11 (100) |
| Completed Infusion without Interruption, n (%) [4] | 11 (100) |
| Interrupted Infusion, n (%) [4] | 0 |
| Week 16 Infusion | |
| Number of Subjects Infused | 11 |
| Complete Infusion, n (%) [3] [4] | 11 (100) |
| Completed Infusion without Interruption, n (%) [4] | 11 (100) |
| Interrupted Infusion, n (%) [4] | 0 |
| Week 18 Infusion | |
| Number of Subjects Infused | 11 |
| Complete Infusion, n (%) [3] [4] | 11 (100) |
| Completed Infusion without Interruption, n (%) [4] | 11 (100) |
| Interrupted Infusion, n (%) [4] | 0 |
| Week 20 Infusion | |
| Number of Subjects Infused | 11 |
| Complete Infusion, n (%) [3] [4] | 11 (100) |
| Completed Infusion without Interruption, n (%) [4] | 11 (100) |
| Interrupted Infusion, n (%) [4] | 0 |
| Week 22 Infusion | |
| Number of Subjects Infused | 11 |
| Complete Infusion, n (%) [3] [4] | 11 (100) |
| Completed Infusion without Interruption, n (%) [4] | 11 (100) |
| Interrupted Infusion, n (%) [4] | 0 |
| Week 24 Infusion | |
| Number of Subjects Infused | 8 |
| Complete Infusion, n (%) [3] [4] | 8 (100) |
| Completed Infusion without Interruption, n (%) [4] | 8 (100) |
| Interrupted Infusion, n (%) [4] | 0 |

What is claimed is:

1. A method of treating chronic refractory gout in a patient comprising:
    administering a uricase protein to the patient,
    wherein 8 mg of uricase protein is administered intravenously every 2 weeks, and
    administering methotrexate (MTX) to the patient,
    wherein 15 mg of MTX is administered orally per week to the patient;
    wherein a serum uric acid (SUA) level of the patient is measured before each infusion; and
    wherein treatment is discontinued if the SUA level of the patient is above 6 mg/dl.

2. The method of claim 1, wherein the uricase protein is a PEGylated uricase protein.

3. The method of claim 2, wherein the PEGylated uricase protein comprises 24 mg of 10 kDa monomethoxypoly(ethylene glycol) (mPEG) per 8 mg of uricase protein.

4. The method of claim 3, wherein the PEGylated uricase protein is pegloticase.

5. The method of claim 1, further comprising administering folic acid to the patient at a dosage of 1-2 mg per day.

6. The method of claim 5, wherein the MTX and the folic acid are administered at least 4 weeks prior to the first administration of the uricase protein.

7. The method of claim 1, wherein the patient is premedicated with at least one of an antihistamine and a corticosteroid.

8. The method of claim 1, wherein the patient does not have Glucose-6-Phosphate Dehydrogenase (G6PD) deficiency.

9. The method of claim 1, wherein the PEGylated uricase protein is administered by infusion over a minimum of 120 minutes.

10. A method of treating chronic refractory gout in a patient comprising:
   administering a PEGylated uricase protein to the patient, wherein the PEGylated uricase protein comprises 8 mg of a uricase protein, and wherein the PEGylated uricase protein is administered intravenously every 2 weeks; and
   administering 15 mg of MTX orally per week to the patient.

11. The method of claim 10, further comprising administering folic acid to the patient at a dosage of 1-2 mg per day.

12. The method of claim 11, wherein the MTX and the folic acid are administered at least 4 weeks prior to the first administration of the PEGylated uricase protein.

13. The method of claim 10, wherein a SUA level of the patient is measured before each infusion.

14. The method of claim 13, wherein treatment is discontinued if the SUA level of the patient is above 6 mg/dl.

15. The method of claim 13, wherein treatment is discontinued if two consecutive measurements of the SUA levels are above 6 mg/dl.

16. The method of claim 10, wherein the PEGylated uricase protein is pegloticase.

17. A method of treating chronic refractory gout in a patient comprising:
   administering a PEGylated uricase protein to the patient, wherein the PEGylated uricase protein comprises 8 mg of a uricase protein, and wherein the PEGylated uricase protein is administered intravenously every 2 weeks; and
   administering 15 mg of MTX orally per week to the patient;
   wherein the patient is pre-medicated with at least one of an antihistamine and a corticosteroid;
   wherein a SUA level of the patient is measured before each infusion; and
   wherein treatment is discontinued if the SUA level of the patient is above 6 mg/dl in two consecutive measurements.

18. The method of claim 17, wherein the PEGylated uricase protein is pegloticase.

* * * * *